US010834708B2

(12) United States Patent
Si et al.

(10) Patent No.: US 10,834,708 B2
(45) Date of Patent: Nov. 10, 2020

(54) METHOD AND APPARATUS FOR NR SIDELINK SS/PBCH BLOCK

(71) Applicant: Samsung Electronics Co., Ltd., Suwon-si (KR)

(72) Inventors: Hongbo Si, Plano, TX (US); Li Guo, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/503,409

(22) Filed: Jul. 3, 2019

(65) Prior Publication Data

US 2020/0015214 A1 Jan. 9, 2020

Related U.S. Application Data

(60) Provisional application No. 62/694,860, filed on Jul. 6, 2018, provisional application No. 62/702,603, filed
(Continued)

(51) Int. Cl.
*H04W 72/04* (2009.01)
*H04W 72/02* (2009.01)
(Continued)

(52) U.S. Cl.
CPC ... *H04W 72/0406* (2013.01); *H04W 56/0015* (2013.01); *H04W 72/02* (2013.01);
(Continued)

(58) Field of Classification Search
CPC .............. H04J 13/0029; H04J 11/0406; H04L 25/03866; H04L 27/2613; H04W 72/0406; H04W 76/14; H04W 56/0015
See application file for complete search history.

(56) References Cited

U.S. PATENT DOCUMENTS

2016/0218821 A1\* 7/2016 Adhikary .......... H04W 56/0055
2017/0279553 A1\* 9/2017 Sadiq .................... H04L 27/261
(Continued)

FOREIGN PATENT DOCUMENTS

WO      2018/004322 A1    1/2018

OTHER PUBLICATIONS

"LTE; Evolved Universal Terrestrial Radio Access (E-UTRA); Physical channels and modulation", ETSI TS 136 211 V15.2.0, Oct. 2018, 238 pages.
(Continued)

*Primary Examiner* — Mehmood B. Khan
*Assistant Examiner* — Syed Ali

(57) ABSTRACT

A method of a first UE comprises: determining a sidelink synchronization identity (SL-SID) and a set of resources; generating at least one sidelink synchronization signal and physical broadcast channel (S-SSB) based on the SL-SID and the set of resources, wherein each S-SSB of the at least one S-SSB includes first two symbols for a sidelink primary synchronization signal (S-PSS) and second two symbols for a sidelink secondary synchronization signal (S-SSS); generating a first sequence corresponding to the S-PSS, wherein the first sequence is determined based on a binary phase shift keying (BPSK) modulated M-sequence with a 127 of sequence length and a low cross-correlation with a PSS; generating a second sequence corresponding to the S-SSS, wherein the second sequence is determined based on a BPSK modulated Gold-sequence with a 127 of sequence length; and transmitting, the at least one S-SSB over sidelink channels established with the second UE.

20 Claims, 48 Drawing Sheets

Related U.S. Application Data on Jul. 24, 2018, provisional application No. 62/711,148, filed on Jul. 27, 2018, provisional application No. 62/790,253, filed on Jan. 9, 2019, provisional application No. 62/841,371, filed on May 1, 2019, provisional application No. 62/841,961, filed on May 2, 2019, provisional application No. 62/846,937, filed on May 13, 2019, provisional application No. 62/858,522, filed on Jun. 7, 2019, provisional application No. 62/858,423, filed on Jun. 7, 2019.

(51) Int. Cl.
*H04W 56/00* (2009.01)
*H04W 76/14* (2018.01)
*H04W 92/18* (2009.01)

(52) U.S. Cl.
CPC ......... *H04W 72/044* (2013.01); *H04W 76/14* (2018.02); *H04W 92/18* (2013.01)

(56) References Cited

U.S. PATENT DOCUMENTS

| | | | |
|---|---|---|---|
| 2017/0367059 A1 | 12/2017 | Park et al. | |
| 2019/0140689 A1* | 5/2019 | Wang | H04B 1/7083 |
| 2019/0159128 A1* | 5/2019 | Lin | H04L 5/0023 |
| 2019/0254091 A1 | 8/2019 | Kim et al. | |
| 2020/0112400 A1* | 4/2020 | Lee | H04W 76/11 |
| 2020/0178039 A1* | 6/2020 | Lee | H04W 4/40 |
| 2020/0187136 A1* | 6/2020 | Si | H04W 68/02 |

OTHER PUBLICATIONS

"LTE; Evolved Universal Terrestrial Radio Access (E-UTRA); Multiplexing and channel coding", ETSI TS 136 212 V15.2.1, Jul. 2018, 250 pages.
"LTE; Evolved Universal Terrestrial Radio Access (E-UTRA); Physical layer procedures", ETSI TS 136 213 V15.2.0, Oct. 2018, 542 pages.
"5G; NR; Physical channels and modulation", ETSI TS 138 211 V15.2.0, Jul. 2018, 98 pages.
"5G; NR; Multiplexing and channel coding", ETSI TS 138 212 V15.2.0, Jul. 2018, 101 pages.
"5G; NR; Physical layer procedures for control", ETSI TS 138 213 V15.2.0, Jul. 2018, 101 pages.
"5G; NR; Physical layer procedures for data", ETSI TS 138 214 V15.2.0, Jul. 2018, 95 pages.
"5G; NR; Radio Resource Control (RRC); Protocol specification", ETSI TS 138 331 V15.2.1, Jun. 2018, 299 pages.
"LTE; Evolved Universal Terrestrial Radio Access (E-UTRA); Radio Resource Control (RRC); Protocol specification", ETSI TS 136 331 V15.2.2, Sep. 2018, 800 pages.
"3rd Generation Partnership Project; Technical Specification Group Radio Access Network; Evolved Universal Terrestrial Radio Access (E-UTRA); Physical channels and modulation (Release 15)", 3GPP TS 36.211 V15.1.0 (Mar. 2018), 52 pages.
ZTE, "Remaining details of sidelink synchronization enhancement", 3GPP TSG-RAN WG1 Meeting #88, Feb. 13-17, 2017, R1-1701624, 4 pages.
LG Electronics, "Remaining issues on sidelink synchronization enhancement", 3GPP TSG RAN WG1 Meeting #88, Feb. 13-17, 2017, R1-1702399, 3 pages.
International Search Report dated Oct. 16, 2019 in connection with International Patent Application No. PCT/KR2019/008367, 3 pages.
Written Opinion of the International Searching Authority dated Oct. 16, 2019 in connection with International Patent Application No. PCT/KR2019/008367, 4 pages.

\* cited by examiner

METHOD AND APPARATUS FOR NR SIDELINK SS/PBCH BLOCK

CROSS-REFERENCE TO RELATED APPLICATIONS AND CLAIM OF PRIORITY

The present application claims priority to:
U.S. Provisional Patent Application Ser. No. 62/694,860, filed on Jul. 6, 2018;
U.S. Provisional Patent Application Ser. No. 62/702,603, filed on Jul. 24, 2018;
U.S. Provisional Patent Application Ser. No. 62/711,148, filed on Jul. 27, 2018;
U.S. Provisional Patent Application Ser. No. 62/790,253, filed on Jan. 9, 2019;
U.S. Provisional Patent Application Ser. No. 62/841,371, filed on May 1, 2019;
U.S. Provisional Patent Application Ser. No. 62/841,961, filed on May 2, 2019;
U.S. Provisional Patent Application Ser. No. 62/846,937, filed on May 13, 2019;
U.S. Provisional Patent Application Ser. No. 62/858,423, filed on Jun. 7, 2019; and
U.S. Provisional Patent Application Ser. No. 62/858,522, filed on Jun. 7, 2019.

The content of the above-identified patent document is incorporated herein by reference.

TECHNICAL FIELD

The present application relates generally to wireless communication systems, more specifically, this disclosure relates to NR sidelink SS/PBCH block.

BACKGROUND

The present disclosure relates to a pre-$5^{th}$-generation (5G) or 5G communication system to be provided for supporting higher data rates beyond $4^{th}$-generation (4G) communication system such as long-term evolution (LTE). Traditionally, cellular communication networks have been designed to establish wireless communication links between mobile user equipments (UEs) and fixed communication infrastructure components (such as base stations (BSs), enhanced base station (gNB), or access points (APs)) that serve UEs in a wide or local geographic range. However, a wireless network can also be implemented by utilizing only device-to-device (D2D) communication links without the need for fixed infrastructure components. This type of network is typically referred to as an "ad-hoc" network. A hybrid communication network can support devices that connect both to fixed infrastructure components and to other D2D-enabled devices. While UEs such as smartphones can be envisioned for D2D networks, a vehicular communication can also be supported by a communication protocol where vehicles exchange control or data information with other vehicles or other infrastructure or UEs. Such a network is referred to as a vehicle-to-everything (V2X) network. Multiple types of communication links can be supported by nodes supporting V2X in the network and can utilize same or different protocols and systems.

SUMMARY

The present disclosure relates to a pre-5G or 5G communication system to be provided for supporting higher data rates beyond 4G communication system such as LTE. Embodiments of the present disclosure provide transmission structures and format in advanced communication systems.

In one embodiment, a first user equipment (UE) in a wireless communication system is provided. The first UE comprises at least one processor configured to: determine a sidelink synchronization identity (SL-SID) and a set of resources; generate at least one sidelink synchronization signal and physical broadcast channel block (S-SSB) based on the SL-SID and the set of resources, wherein each S-SSB of the at least one S-SSB includes first two symbols for a sidelink primary synchronization signal (S-PSS) and second two symbols for a sidelink secondary synchronization signal (S-SSS); generate a first sequence corresponding to the S-PSS, wherein the first sequence is determined based on a binary phase shift keying (BPSK) modulated M-sequence with a 127 of sequence length and a low cross-correlation with a primary synchronization signal (PSS); generate a second sequence corresponding to the S-SSS, wherein the second sequence is determined based on a BPSK modulated Gold-sequence with a 127 of sequence length. The first UE further comprises a transceiver operably connected to the at least one processor, the transceiver configured to transmit, to a second UE, the at least one S-SSB over sidelink channels established with the second UE.

In another embodiment, a second user equipment (UE) in a wireless communication system is provided. The second UE comprises a transceiver configured to receive, from a first UE, at least one sidelink synchronization signal and physical broadcast channel block (S-SSB) over sidelink channels established with the first UE. The second UE further comprises at least one processor operably connected to the transceiver, the at least one processor configured to: determine a set of resources, wherein the at least one S-SSB is received based on the set of resources, each S-SSB of the at least one S-SSB including first two symbols for a sidelink primary synchronization signal (S-PSS) and second two symbols for a sidelink secondary synchronization signal (S-SSS); detect a first sequence corresponding to the S-PSS, the first sequence being determined based on a binary phase shift keying (BPSK) modulated M-sequence with a 127 of sequence length and a low cross-correlation with a primary synchronization signal (PSS); detect a second sequence corresponding to the S-SSS, the second sequence being determined based on a BPSK modulated Gold-sequence with a 127 of sequence length; and determine a sidelink synchronization identity (SL-SID) based on the detected second sequence.

In yet another embodiment, a method of a first user equipment (UE) in a wireless communication system is provided. The method comprises determining a sidelink synchronization identity (SL-SID) and a set of resources; generating at least one sidelink synchronization signal and physical broadcast channel (S-SSB) based on the SL-SID and the set of resources, wherein each S-SSB of the at least one S-SSB includes first two symbols for a sidelink primary synchronization signal (S-PSS) and second two symbols for a sidelink secondary synchronization signal (S-SSS); generating a first sequence corresponding to the S-PSS, wherein the first sequence is determined based on a binary phase shift keying (BPSK) modulated M-sequence with a 127 of sequence length and a low cross-correlation with a primary synchronization signal (PSS); generating a second sequence corresponding to the S-SSS, wherein the second sequence is determined based on a BPSK modulated Gold-sequence with a 127 of sequence length; and transmitting, to a second UE, the at least one S-SSB over sidelink channels established with the second UE.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIG. 1 through FIG. 37, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TS 38.211 v15.2.0, "NR; Physical channels and modulation;" 3GPP TS 38.212 v15.2.0, "NR; Multiplexing and channel coding;" 3GPP TS 38.213 v15.2.0, "NR; Physical layer procedures for control;" 3GPP TS 38.214 v15.2.0, "NR; Physical layer procedures for data;" 3GPP TS 38.331 v15.2.0, "NR; Radio Resource Control (RRC) protocol specification;" 3GPP TS 36.211 v15.2.0, "E-UTRA; Physical channels and modulation;" 3GPP TS 36.212 v15.2.0, "E-UTRA; Multiplexing and Channel coding;" 3GPP TS 36.213 v15.2.0, "E-UTRA; Physical Layer Procedures;"3GPP TS 36.331 v15.2.0, "E-UTRA; Radio Resource Control (RRC) Protocol Specification;"

Figure 1:
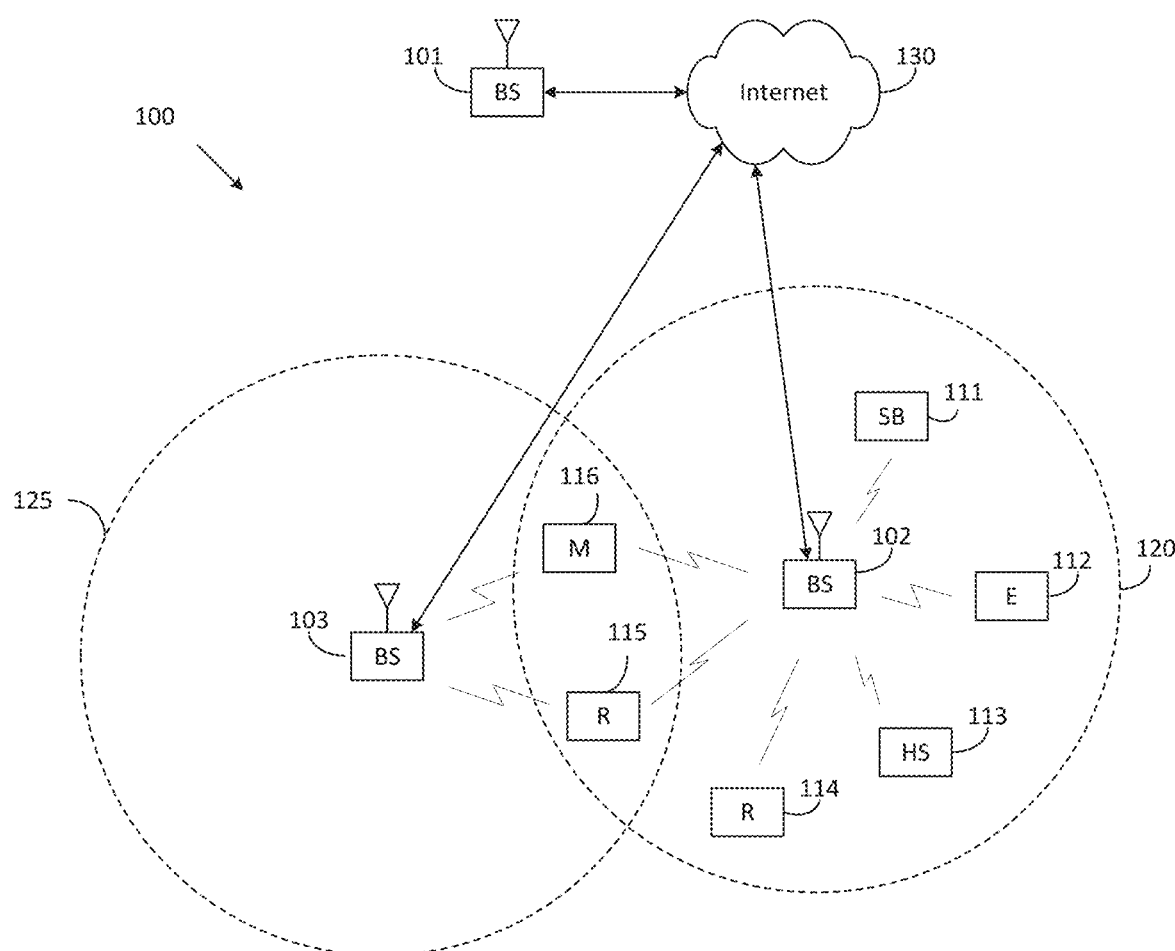
FIG. 1 illustrates an example wireless network according to embodiments of the present disclosure.
Figure 2:
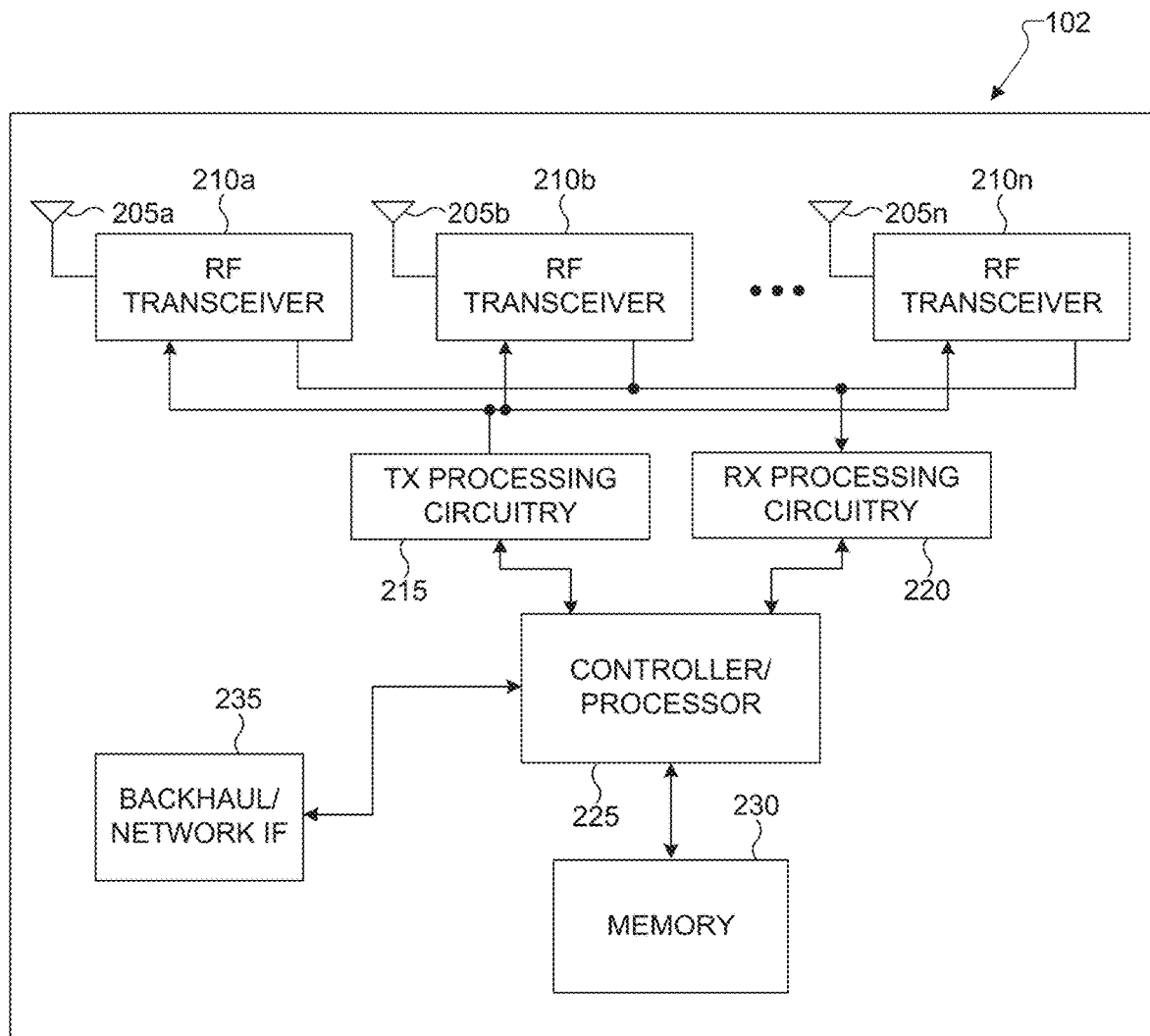
FIG. 2 illustrates an example gNB according to embodiments of the present disclosure.
Figure 3:
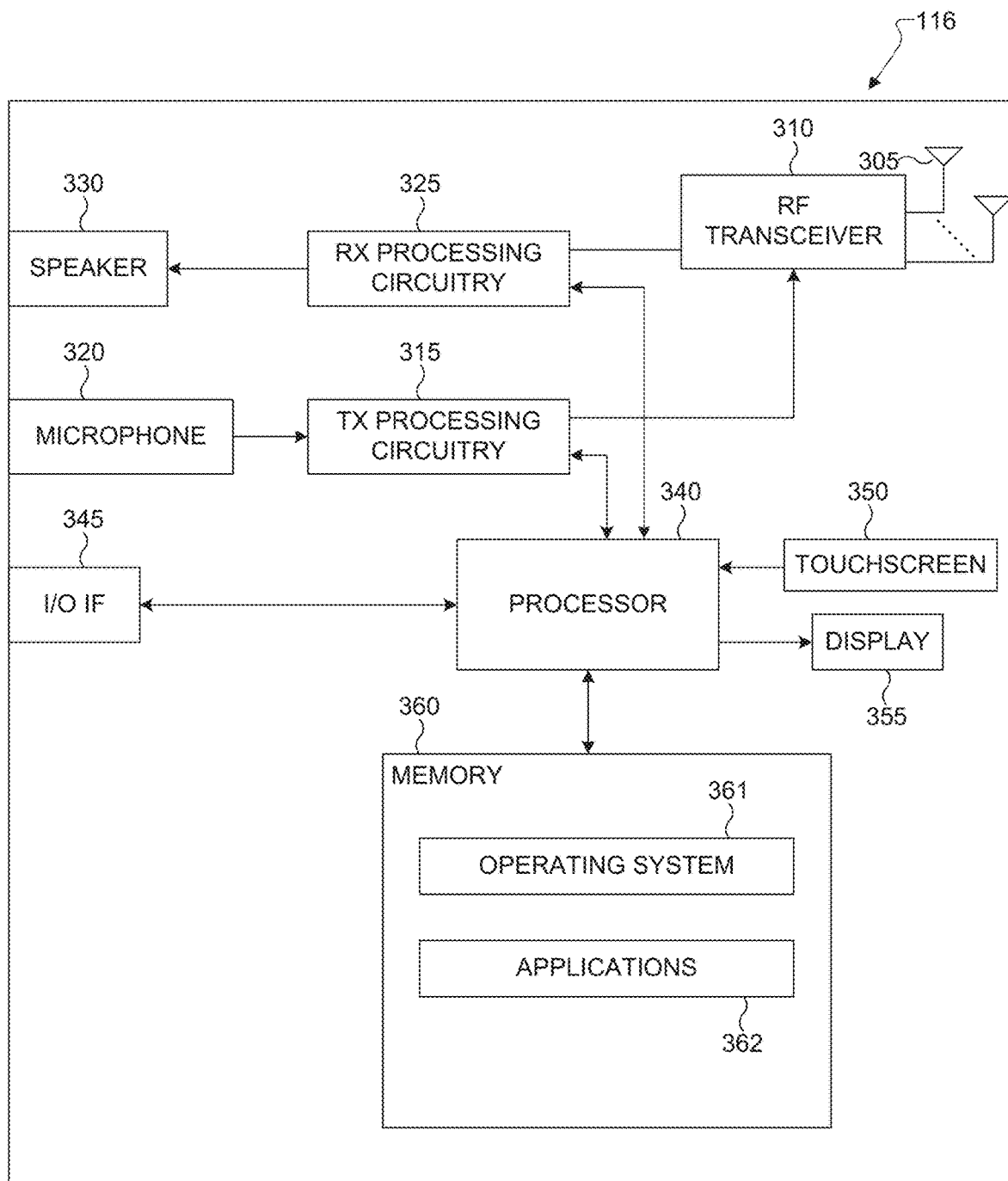
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101, a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE"

can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programming, or a combination thereof, for reception reliability for data and control information in an advanced wireless communication system. In certain embodiments, and one or more of the gNBs 101-103 includes circuitry, programming, or a combination thereof, for efficient NR sidelink SS/PBCH block operation in an advanced wireless communication system.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for beam management. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

The present disclosure relates generally to wireless communication systems and, more specifically, to improving a PDCCH reception reliability and reducing an associated signaling overhead. A communication system includes a downlink (DL) that refers to transmissions from a base station or one or more transmission points to UEs and an uplink (UL) that refers to transmissions from UEs to a base station or to one or more reception points.

To meet the demand for wireless data traffic having increased since deployment of 4G communication systems, efforts have been made to develop an improved 5G or pre-5G communication system. Therefore, the 5G or pre-5G communication system is also called a "beyond 4G network" or a "post LTE system." The 5G communication system is considered to be implemented in higher frequency (mmWave) bands, e.g., 60 GHz bands, so as to accomplish higher data rates. To decrease propagation loss of the radio waves and increase the transmission distance, the beam-forming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, Hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

A time unit for DL signaling or for UL signaling on a cell is referred to as a slot and can include one or more symbols. A symbol can also serve as an additional time unit. A frequency (or bandwidth (BW)) unit is referred to as a resource block (RB). One RB includes a number of sub-carriers (SCs). For example, a slot can have duration of 0.5 milliseconds or 1 millisecond, include 7 symbols or 14 symbols, respectively, and an RB can have a BW of 180 kHz or 360 kHz and include 12 SCs with inter-SC spacing of 15 kHz or 30 kHz.

DL signals include data signals conveying information content, control signals conveying DL control information (DCI), and reference signals (RS) that are also known as pilot signals. A gNB can transmit data information or DCI through respective physical DL shared channels (PDSCHs) or physical DL control channels (PDCCHs). A gNB can transmit one or more of multiple types of RS including channel state information RS (CSI-RS) and demodulation RS (DMRS). A CSI-RS is intended for UEs to measure channel state information (CSI) or to perform other measurements such as ones related to mobility support. A DMRS can be transmitted only in the BW of a respective PDCCH or PDSCH and a UE can use the DMRS to demodulate data or control information.

A vehicular communication, referred to as vehicle-to-everything (V2X), contains the following three different types: 1) vehicle-to-vehicle (V2V) communications; 2) vehicle-to-infrastructure (V21) communications; and 3) vehicle-to-pedestrian (V2P) communications. These three types of V2X can use "co-operative awareness" to provide more intelligent services for end-users. This means that transport entities, such as vehicles, roadside infrastructure, and pedestrians, can collect knowledge of their local environment (e.g., information received from other vehicles or sensor equipment in proximity) to process and share that knowledge in order to provide more intelligent services, such as cooperative collision warning or autonomous driving. A direct communication between vehicles in V2V is based on a sidelink (SL) interface, and SL is the UE to UE interface for synchronization, discovery, and communication.

Figure 4:
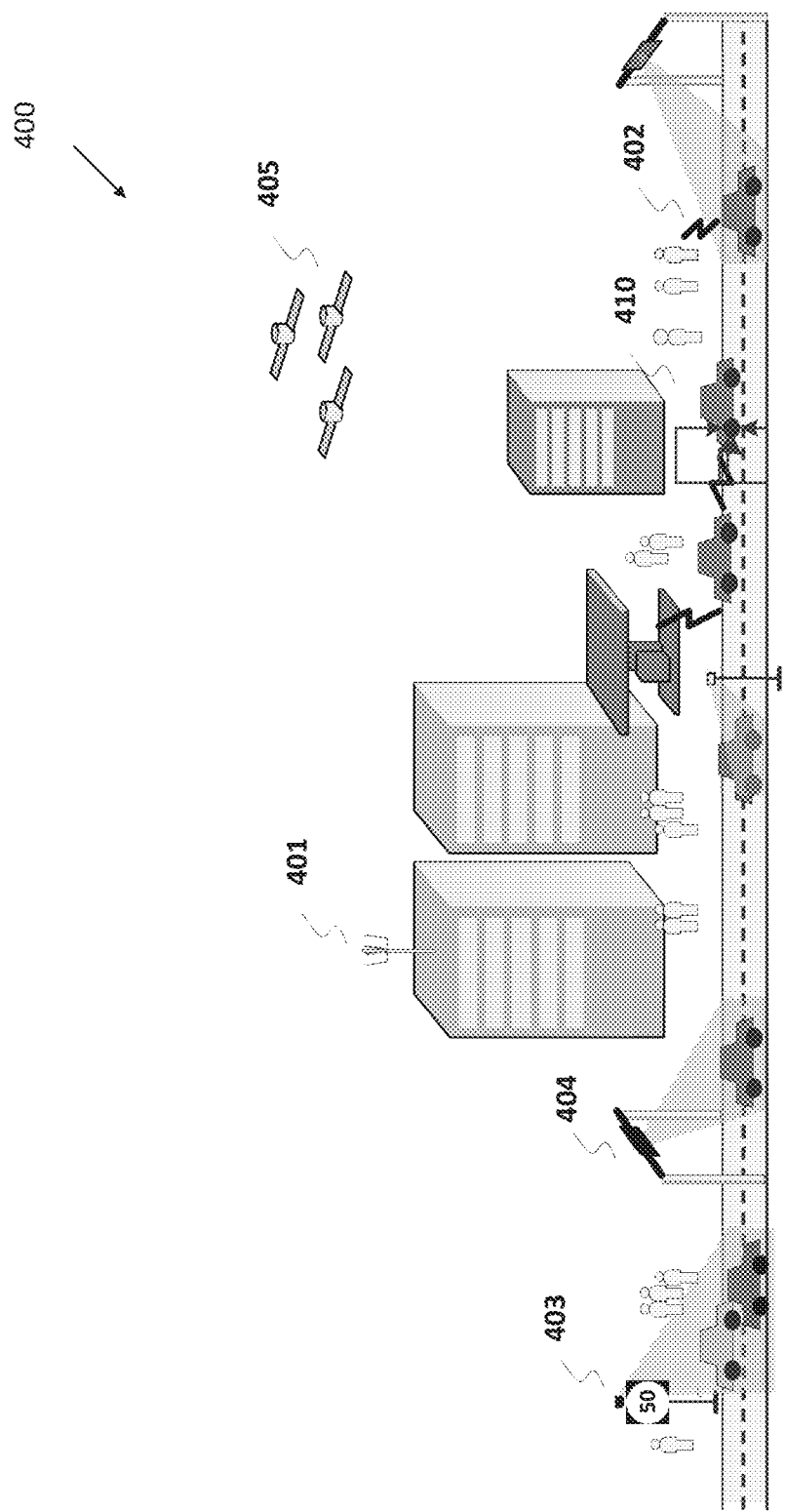
FIG. 4 illustrates an example use case of a vehicle-centric communication network according to illustrative embodiments of the present disclosure.

FIG. 4 illustrates an example use case of a vehicle-centric communication network 400 according to illustrative embodiments of the present disclosure. The embodiment of the gNB 102 illustrated in FIG. 4 is for illustration only. FIG. 4 does not limit the scope of this disclosure to any particular implementation.

Figure 5:
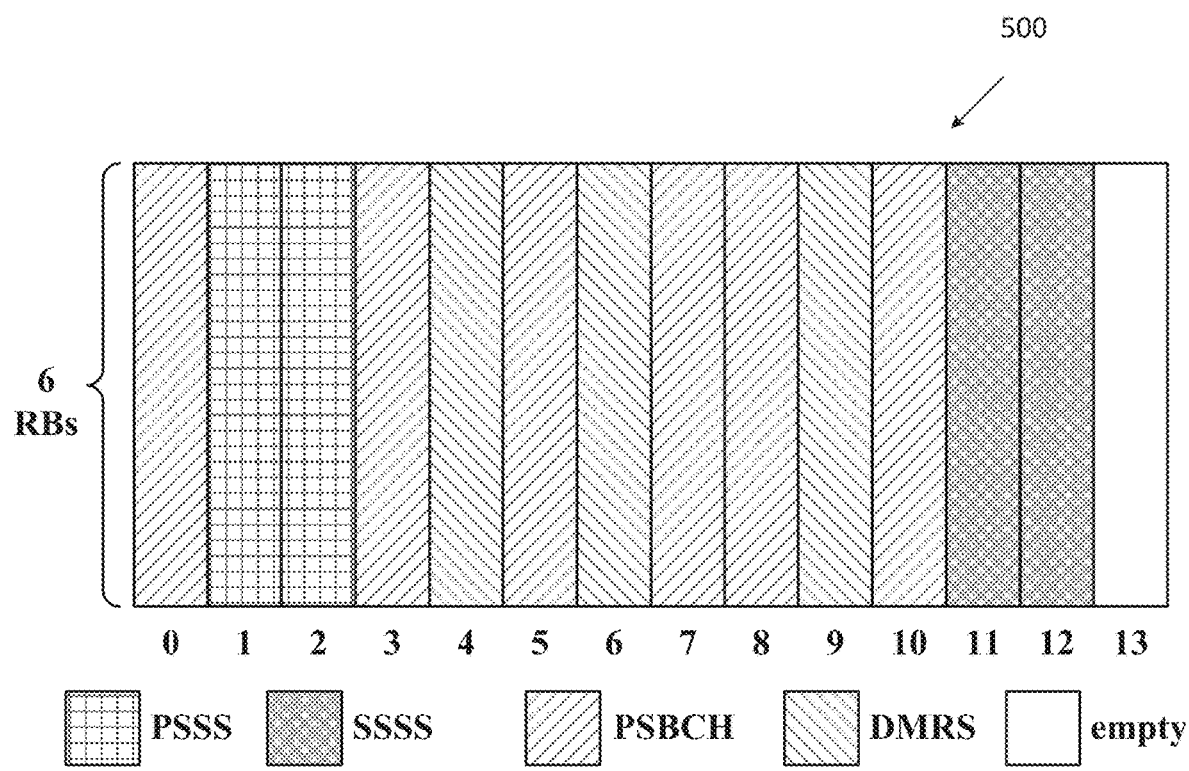
FIG. 5 illustrates an example composition of a sidelink synchronization subframe in LTE-V2X according to embodiments of the present disclosure.

FIG. 5 illustrates an example composition of a sidelink synchronization subframe 500 in LTE-V2X according to embodiments of the present disclosure. The embodiment of the composition of a sidelink synchronization subframe 500 illustrated in FIG. 5 is for illustration only. FIG. 5 does not limit the scope of this disclosure to any particular implementation.

In LTE-V2X, sidelink synchronization is achieved by detecting the sidelink synchronization signals located within the sidelink synchronization subframe. An illustration of the composition of a sidelink synchronization subframe (for normal cyclic prefix) is shown in FIG. 5, wherein the subframe contains 14 symbols, and 13 of them are mapped for either primary sidelink synchronization signal (PSSS), secondary sidelink synchronization signal (SSSS), physical sidelink broadcast channel (PSBCH), or demodulation reference signal (DMRS). The remaining 1 symbol (e.g., the last symbol) are reserved as empty for other purposes (e.g., DL/UL switch gap). The bandwidth of all signals and channels in the synchronization subframe is 6 RBs, and mapped to the central 6 RBs of the carrier.

The sequence constructing PSSS is based on one of two ZC-sequences, with root index 26 and 37, respectively, to represent one of two sets of physical layer sidelink synchronization identities. The sequence constructing SSSS is similar to the sequence constructing LTE secondary synchronization signal (SSS), i.e., interleaved M-sequences with cyclic shifts.

The system information delivered by PSBCH in LTE-V2X is the master information block (MIB), and can be further combined with cyclic redundancy check (CRC) to formulate the whole PBCH content. A summary of LTE-V2X MIB is summarized in Table 1, including the field names, the corresponding bit size of each field, and the corresponding values can be taken. The total number of bits for MIB is 48, and the total bit size PBCH content is 64 bits, by adding another 16 bits for CRC.

TABLE 1

Bit size and filed name

| Field Name | Bit Size | Values |
|---|---|---|
| Sidelink Carrier Bandwidth | 3 | {6, 15, 25, 50, 75, 100} RBs |
| TDD Configuration | 3 | {none, sa0, sa1, sa2, sa3, sa4, sa5, sa6} |
| DFN | 10 | 0 to 1023 |
| Subframe Index within a Frame | 4 | 0 to 9 |
| In Coverage Indicator | 1 | True or False |
| Reserved | 27 | — |

Figure 6:
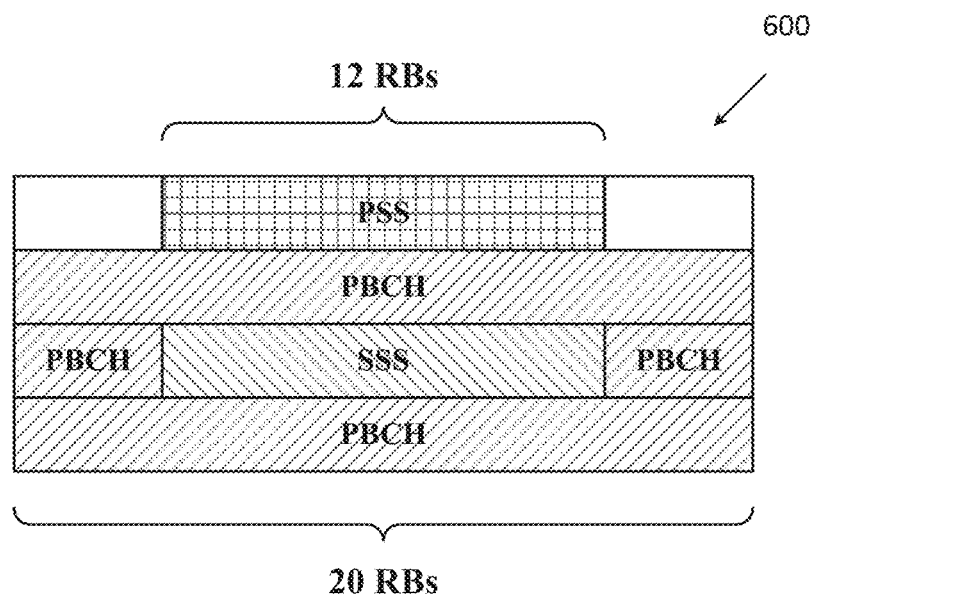
FIG. 6 illustrates an example composition of an SS/PBCH block according to embodiments of the present disclosure.

FIG. 6 illustrates an example composition of an SS/PBCH block 600 according to embodiments of the present disclosure. The embodiment of the composition of an SS/PBCH block 600 illustrated in FIG. 6 is for illustration only. FIG. 6 does not limit the scope of this disclosure to any particular implementation.

New radio (NR) also supports synchronization through synchronization signals transmitted on downlink. Comparing to LTE, NR supports larger range of carrier frequencies, and more flexibly numerology. For example, NR supports multiple synchronization signals and physical broadcast channel blocks (SS/PBCH block) on each carrier frequency range, wherein each SS/PBCH block compromises of four consecutive orthogonal frequency division multiplexing (OFDM) symbols (see FIG. 6), wherein the first symbol is mapped for primary synchronization signal (PSS), the second and forth symbols are mapped for PBCH, and the third symbol is mapped for both secondary synchronization signal (SSS) and PBCH.

The same SS/PBCH block composition is applied to all supported carrier frequency ranges in NR, which spans from 0 GHz to 52.6 GHz. The transmission bandwidth of PSS and SSS (e.g., 12 resource blocks (RBs)) is smaller than the transmission bandwidth of the whole SS/PBCH block (e.g., 20 RBs). In every RB mapped for PBCH, 3 out of the 12 resource elements (REs) are mapped for the demodulation reference signal (DMRS) of PBCH, wherein the 3 REs are uniformly distributed in the PRB and the starting location of the first RE is based on cell ID. Moreover, NR Rel-15 supports one or two subcarrier spacing (SCS) for SS/PBCH block, for a given band, wherein the same SCS is utilized for PSS, SSS, and PBCH (including DMRS). For carrier frequency range 0 GHz to 6 GHz, 15 kHz and/or 30 kHz can be utilized for the SS SCS. For carrier frequency range 6 GHz to 52.6 GHz, 120 kHz and/or 240 kHz can be utilized for SS SCS.

The sequence constructing PSS is based on M-sequence with cyclic shifts to represent the cell ID information carried by PSS, and the sequence constructing SSS is based on Gold-sequence (XOR of two M-sequences), wherein each M-sequence constructing the Gold-sequence performs cyclic shift to represent the cell ID information carried by SSS.

Figure 7:
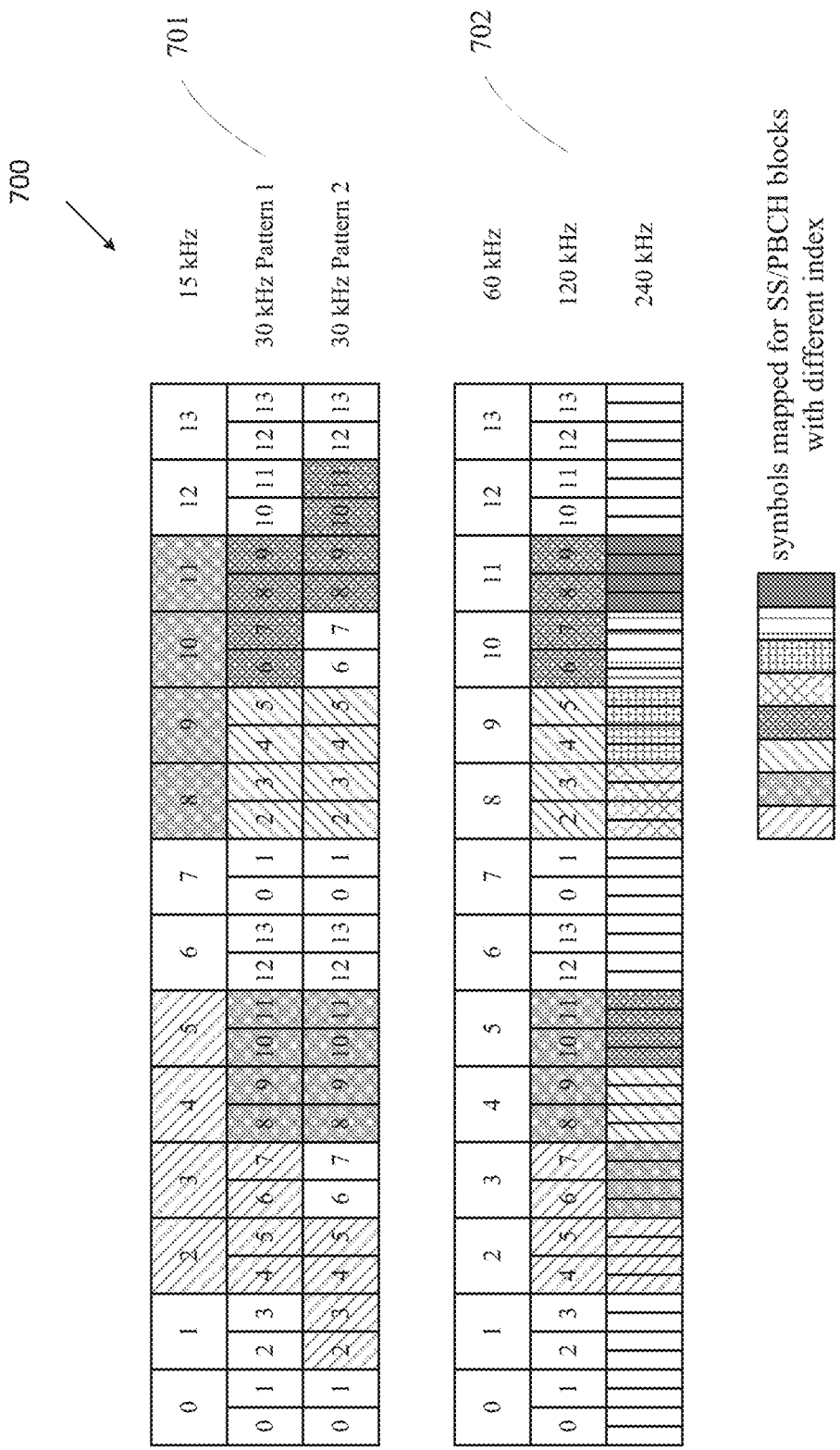
FIG. 7 illustrates an example SS/PBCH block mapping patterns with respect to subcarrier spacings according to embodiments of the present disclosure.

FIG. 7 illustrates an example SS/PBCH block mapping patterns with respect to subcarrier spacings 700 according to embodiments of the present disclosure. The embodiment of the SS/PBCH block mapping patterns with respect to subcarrier spacings 700 illustrated in FIG. 7 is for illustration only. FIG. 7 does not limit the scope of this disclosure to any particular implementation.

In NR, SS/PBCH blocks could be transmitted in a beam-sweeping way up to network implementation, and multiple candidate location for transmitting SS/PBCH blocks are predefined within a unit of half frame. The mapping pattern of SS/PBCH blocks to 1 slot with respect to 15 kHz as the reference SCS for sub 6 GHz and with respect to 60 kHz as the reference SCS for above 6 GHz are illustrated in 701 and 702 of FIG. 7, respectively. Two mapping patterns are designed for 30 kHz SS SCS: Pattern 1 is utilized for non-LTE-NR coexistence bands, and Pattern 2 is utilized for LTE-NR coexistence bands.

Figure 8:
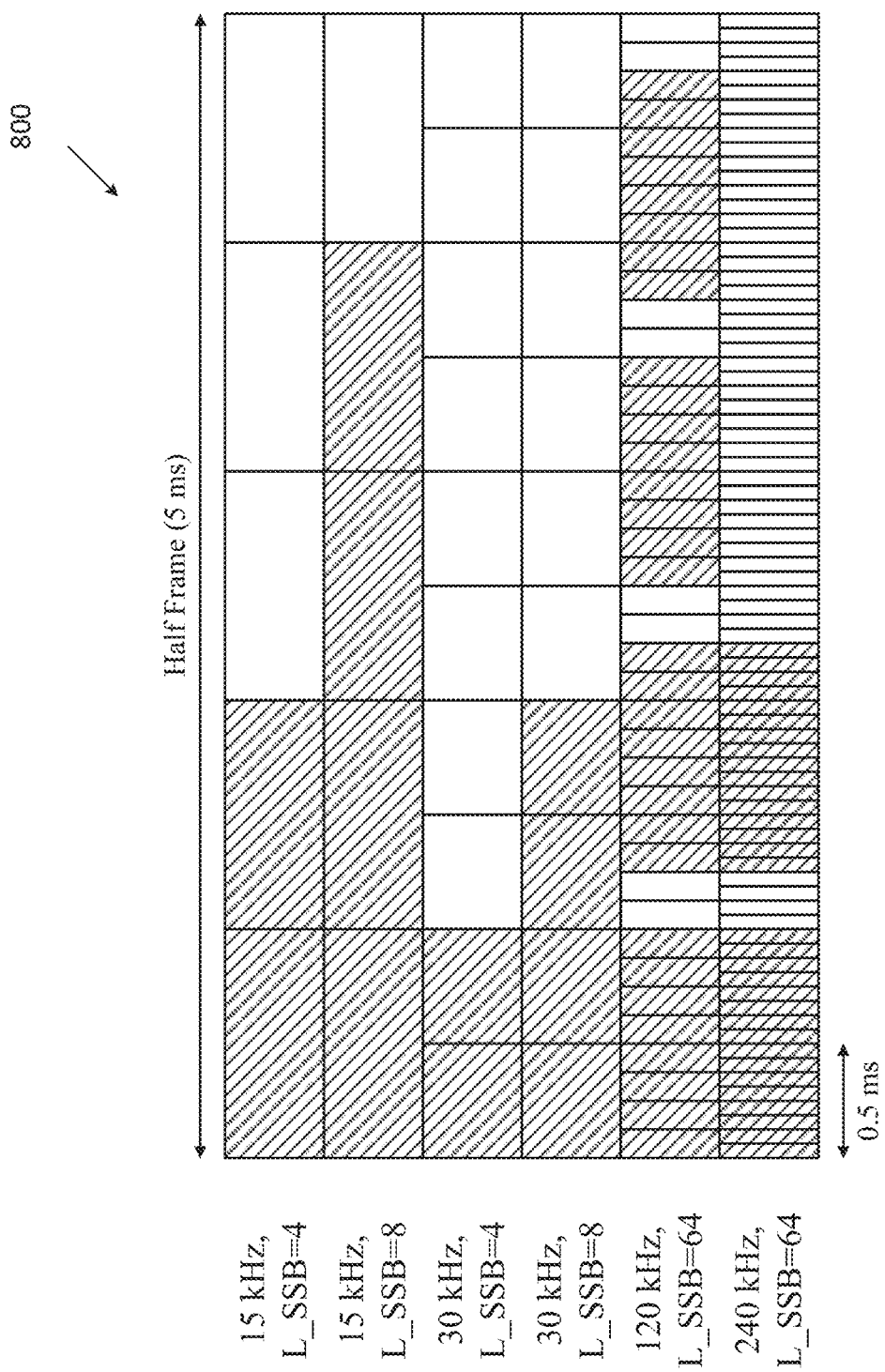
FIG. 8 illustrates example SS/PBCH block locations within a half according to embodiments of the present disclosure.

FIG. 8 illustrates example SS/PBCH block locations within a half 800 according to embodiments of the present disclosure. The embodiment of the SS/PBCH block locations within a half 800 illustrated in FIG. 8 is for illustration only. FIG. 8 does not limit the scope of this disclosure to any particular implementation.

The maximum number of SS/PBCH blocks, denoted as L_SSB, is determined based on carrier frequency range: for carrier frequency range 0 GHz to 3 GHz, L_SSB is 4; for carrier frequency range 3 GHz to 6 GHz, L_SSB is 8; for carrier frequency range 6 GHz to 52.6 GHz, L_SSB is 64. The determination of the slots within the half frame unit which contains the candidate locations of SS/PBCH blocks, with respect to each combination of SS SCS and L_SSB, is illustrated in FIG. 8.

In initial cell selection, UE assumes a default SS burst set periodicity as 20 ms, and for detecting non-standalone NR cell, network provides one SS burst set periodicity information per frequency carrier to UE and information to derive measurement timing/duration if possible.

The SS/PBCH block index is indicated by the DMRS of PBCH in the corresponding SS/PBCH block for carrier frequency range 0 to 6 GHz, and the 3 least significant bits (LSBs) of the SS/PBCH block index is indicated by the DMRS of PBCH in the corresponding SS/PBCH block for carrier frequency range 6 GHz to 52.6 GHz (and the 3 most significant bits (MSBs) are indicated by PBCH content).

In NR, the bit size of PBCH content is 56, including 24 bits CRC. A summary of NR 24-bits MIB together with another 8 bits generated in the physical layer is illustrated in TABLE 2, wherein some bit size and corresponding taken values are specified per carrier frequency range.

TABLE 2

Filed name and bit size

| Field Name | Bit Size | Values |
|---|---|---|
| DFN | 10 | 0 to 1023 |
| Half Frame Indicator | 1 | {0, 1} |
| MSB of SS/PBCH Block Index | 0 (below 6 GHz) 3 (above 6 GHz) | 0 to 7 (above 6 GHz) |
| Common SCS | 1 | {15, 30} kHz (below 6 GHz) {60, 120} kHz (above 6 GHz) |
| SSB SCS Offset | 5 (below 6 GHz) 4 (above 6 GHz) | 0 to 31 (below 6 GHz) 0 to 15 (above 6 GHz) |
| Type0-PDCCH Configuration | 8 | 0 to 255 |
| Barred Cell Indication | 1 | {barred, notBarred} |
| Intra-frequency Reselection Indicator | 1 | {allowed, notAllowed} |
| TypeA DMRS Location | 1 | {pos2, pos3} |
| Reserved | 4 (below 6 GHz) 2 (above 6 GHz) | — |

In NR V2X, the synchronization signals on NR sidelink can use the synchronization signals on downlink as a baseline, and potential enhancement and/or modification to address the exclusive requirement for V2X can be supported. The present disclosure focuses on the design of sidelink SS/PBCH block (S-SSB), including the S-SSB composition, synchronization signals, content of NR sidelink PBCH (PSBCH), PSBCH scrambling, DMRS of PSBCH, and pre-configured system information.

Aspects, features, and advantages of the present disclosure are readily apparent from the following detailed description, simply by illustrating a number of particular embodiments and implementations, including the best mode contemplated for carrying out the present disclosure. The present disclosure is also capable of other and different embodiments, and several details can be modified in various obvious respects, all without departing from the spirit and scope of the present disclosure. Accordingly, the drawings and description are to be regarded as illustrative in nature, and not as restrictive. The present disclosure is illustrated by way of example, and not by way of limitation, in the figures of the accompanying drawings.

The present disclosure covers several components which can be used in conjunction or in combination with one another, or can operate as standalone schemes.

In one embodiment, NR SS/PBCH block composition (e.g., FIG. 6) can be a starting point for designing the NR sidelink SS and PBCH block (S-SSB). This embodiment details the design aspects for S-SSB composition.

Figure 9A:
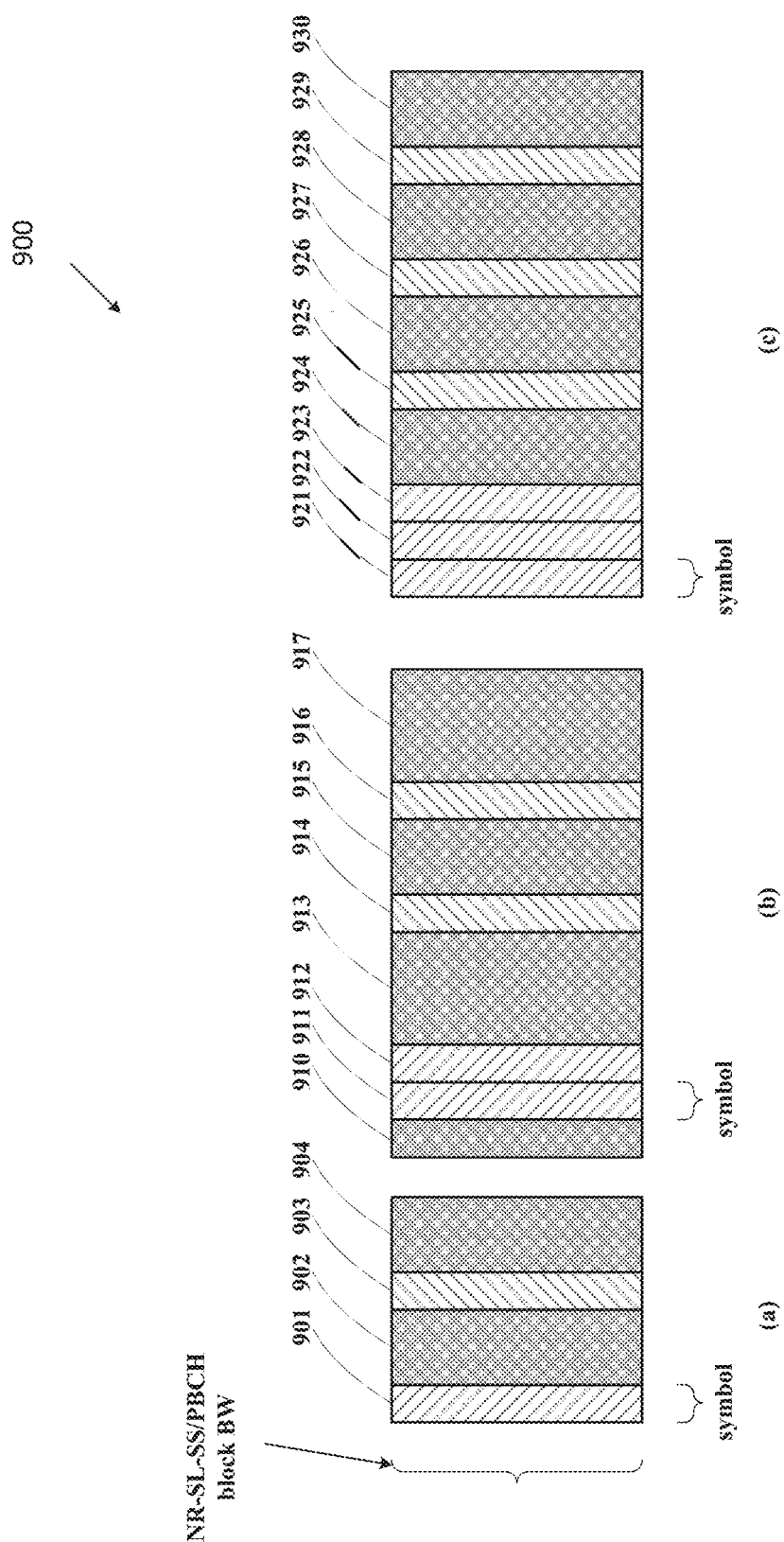
FIG. 9A illustrates an example design of an S-SSB according to embodiments of the present disclosure.

FIG. 9A illustrates an example design of an S-SSB 900 according to embodiments of the present disclosure. The embodiment of the design of an S-SSB 900 illustrated in FIG. 9A is for illustration only. FIG. 9A does not limit the scope of this disclosure to any particular implementation.

Figure 9B:
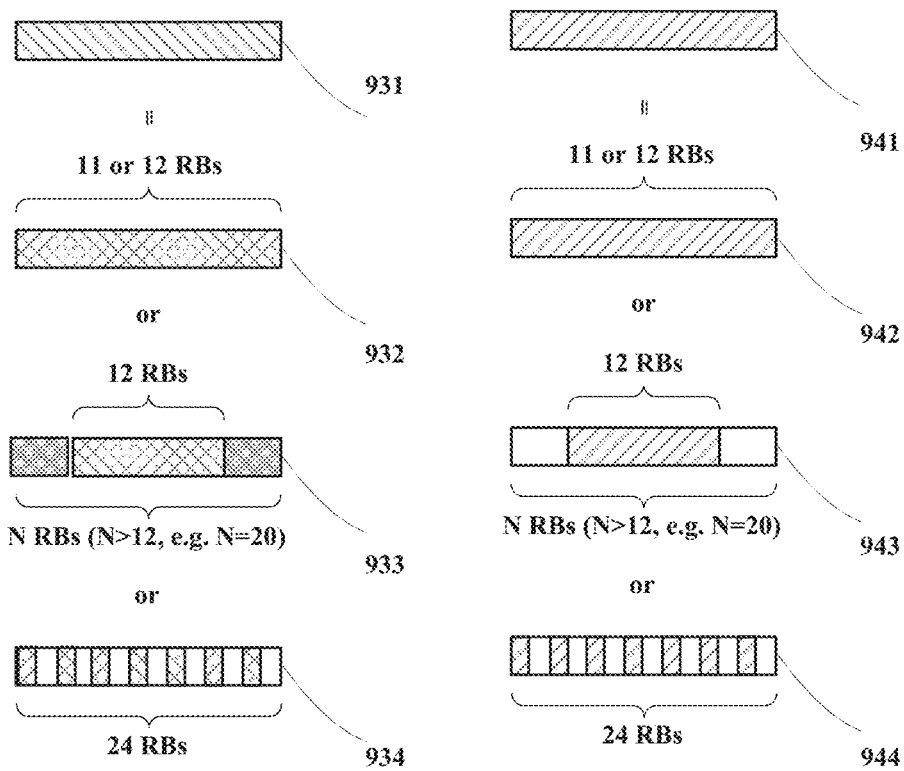
FIG. 9B illustrates another example design of an S-SSB according to embodiments of the present disclosure.

FIG. 9B illustrates another example design of an S-SSB 920 according to embodiments of the present disclosure. The embodiment of design of an S-SSB 920 illustrated in FIG. 9B is for illustration only. FIG. 9B does not limit the scope of this disclosure to any particular implementation.

FIG. 9A and FIG. 9B illustrate design examples of an S-SSB. An S-SSB can comprise at least one symbol mapped for S-PSS, at least one symbol mapped for PSBCH, and at least one symbol mapped for S-SSS or multiplexing of S-SSS and PSBCH.

For one example, the at least one symbol mapped for S-PSS can be mapped for S-PSS only if the bandwidth of S-SSB is 11 or 12 RBs (942 of FIG. 9B). For another example, the at least one symbol mapped for S-PSS can be mapped for multiplexing of S-PSS and empty REs (e.g., empty REs FDMed with S-PSS) if the bandwidth of S-SSB is larger than 12 RBs (such as 20 RBs) (943 of FIG. 9B). For yet another example, the at least one symbol mapped for S-PSS can be mapped for S-PSS in an interleaved way with empty REs (e.g., IFDMed with empty RE in a RE-level such as S-PSS sequence is only mapped to even REs or odd REs) if the bandwidth of S-SSB is 24 RBs (944 of FIG. 9B).

For one example, the at least one symbol mapped for S-SSS or multiplexing of S-SSS and PSBCH can be mapped for S-SSS only if the bandwidth of S-SSB is 11 or 12 RBs (932 of FIG. 9B). For another example, the at least one symbol mapped for S-SSS or multiplexing of S-SSS and PSBCH can be mapped for multiplexing of S-SSS and PSBCH (e.g., PSBCH FDMed with S-SSS) if the bandwidth of S-SSB is larger than 12 RBs (such as 20 RBs) (933 of FIG. 9B). For yet another example, the at least one symbol mapped for S-SSS or multiplexing of S-SSS and PSBCH can be mapped for S-SSS in an interleaved way with empty REs (e.g., IFDMed with empty RE in a RE-level such as S-SSS sequence is only mapped to even REs or odd REs) if the bandwidth of S-SSB is 24 RBs (934 of FIG. 9B).

In a first approach, there can be only one symbol mapped for S-PSS within a S-SSB. For example, in example (a) of FIG. 9A, only one symbol is mapped for S-PSS within an S-SSB.

In a second approach, there can be multiple symbols mapped for S-PSS, wherein the symbols mapped for S-PSS are consecutive. For one example, when there are two symbols mapped for S-PSS (such as example (b) of FIG. 9A), the two symbols mapped for S-PSS are #0 and #1 symbol within the S-SSB. For another example, when there are three symbols mapped for S-PSS (such as example (c) of FIG. 9), the three symbols mapped for S-PSS are #0, #1, and #2 symbol within the S-SSB. For yet another example, when there are two symbols mapped for S-PSS (such as example (b) of FIG. 9A), the two symbols mapped for S-PSS are #1 and #2 symbol within the S-SSB, and the #0 symbol is for AGC purpose.

In a third approach, when there are multiple symbols mapped for S-PSS (such as example (b) or (c) of FIG. 9A), the sequence constructing the multiple S-PSSs in different symbols can be the same. For example, the multiple symbols mapped for S-PSS (other than cyclic prefix) are repetitive.

In a forth approach, when there are multiple symbols mapped for S-PSS (such as example (b) or (c) of FIG. 9A), the sequence constructing the multiple S-PSSs in different symbols can be different. For example, the sequences in different symbols are orthogonal to each other or with low cross-correlation to each other.

In a fifth approach, there can be only one symbol mapped for S-SSS within an S-SSB. For example, in example (a) of FIG. 9A, only one symbol is mapped for S-SSS within an S-SSB.

In a sixth approach, there can be multiple symbols mapped for S-SSS, wherein the symbols mapped for S-SSS are non-consecutive. For one example, when there are two symbols mapped for S-SSS (such as example (b) of FIG. 9A), at least one symbol between the two symbols mapped for S-SSS within the S-SSB is mapped for PSBCH. For another example, when there are three symbols mapped for S-SSS (such as example (c) of FIG. 9A), at least one symbol between each neighboring two symbols mapped for S-SSS within the S-SSB is mapped for PSBCH.

In a seventh approach, there can be multiple symbols mapped for S-SSS, wherein the symbols mapped for S-SSS are consecutive. For one example, when there are X_SSS (where X_SSS>1, e.g., X_SSS=2 or X_SSS=3) symbols mapped for S-SSS, the X_SSS symbols mapped for S-SSS are the last X_SSS symbols within the S-SSB.

In an eighth approach, when there are multiple symbols mapped for S-SSS (such as example (b) or (c) of FIG. 9A), the sequence constructing the multiple S-SSSs in different symbols can be the same. For example, the multiple symbols mapped for S-SSS (other than cyclic prefix) are repetitive.

In a ninth approach, when there are multiple symbols mapped for S-SSS (such as example (b) or (c) of FIG. 9A), the sequence constructing the multiple S-SSSs in different symbols can be different. For example, the sequences in different symbols are orthogonal to each other or with low cross-correlation to each other. For another example, the sequence in one symbol can be the sequence in another symbol scrambled by a predefined sequence.

In a tenth approach, the number of symbols mapped for PSBCH (including DMRS) in each sub-blocks separated by symbol(s) containing S-PSS or S-SSS (such as 902, 904, 913, 915, 917, 924, 926, 928, 930 in FIG. 9A) can be 0, or 1, or 2, and can be independently determined for each sub-block.

In an eleventh approach, DMRS of PSBCH can be TDMed with PSBCH. For example, some of the symbols in the sub-blocks separated by symbol(s) containing S-PSS or S-SSS (such as 902, 904, 913, 915, 917, 924, 926, 928, 930 in FIG. 9A) can be mapped for DMRS of PSBCH, and TDMed with other symbols mapped for PSBCH.

In a twelfth approach, DMRS of PSBCH can be IFDMed with PSBCH. For example, in every RB in the symbol mapped for PSBCH, and in every RB mapped for PSBCH in the symbol mapped for the multiplexing of S-SSS and PSBCH if the bandwidth of S-SSB is larger than 12 RBs, part of the REs are mapped for the DMRS of PSBCH, and the remaining are mapped for PSBCH.

In a thirteenth approach, when there are multiple contiguous symbols mapped for PSBCH, the multiple symbols mapped for PSBCH or a set of the multiple symbols mapped for PSBCH (other than cyclic prefix) can be repetitive.

In a fourteenth approach, the first symbol within the S-SSB is mapped for PSBCH, such as to deal with automatic gain control (AGC).

In a fifteenth approach, the S-PSS, S-SSS, and PSBCH (including DMRS) are transmitted using the same antenna port.

Examples of the approach(s) or combination of the approaches for this embodiment are illustrated in FIGS. 10A to 16B.

Figure 10A:
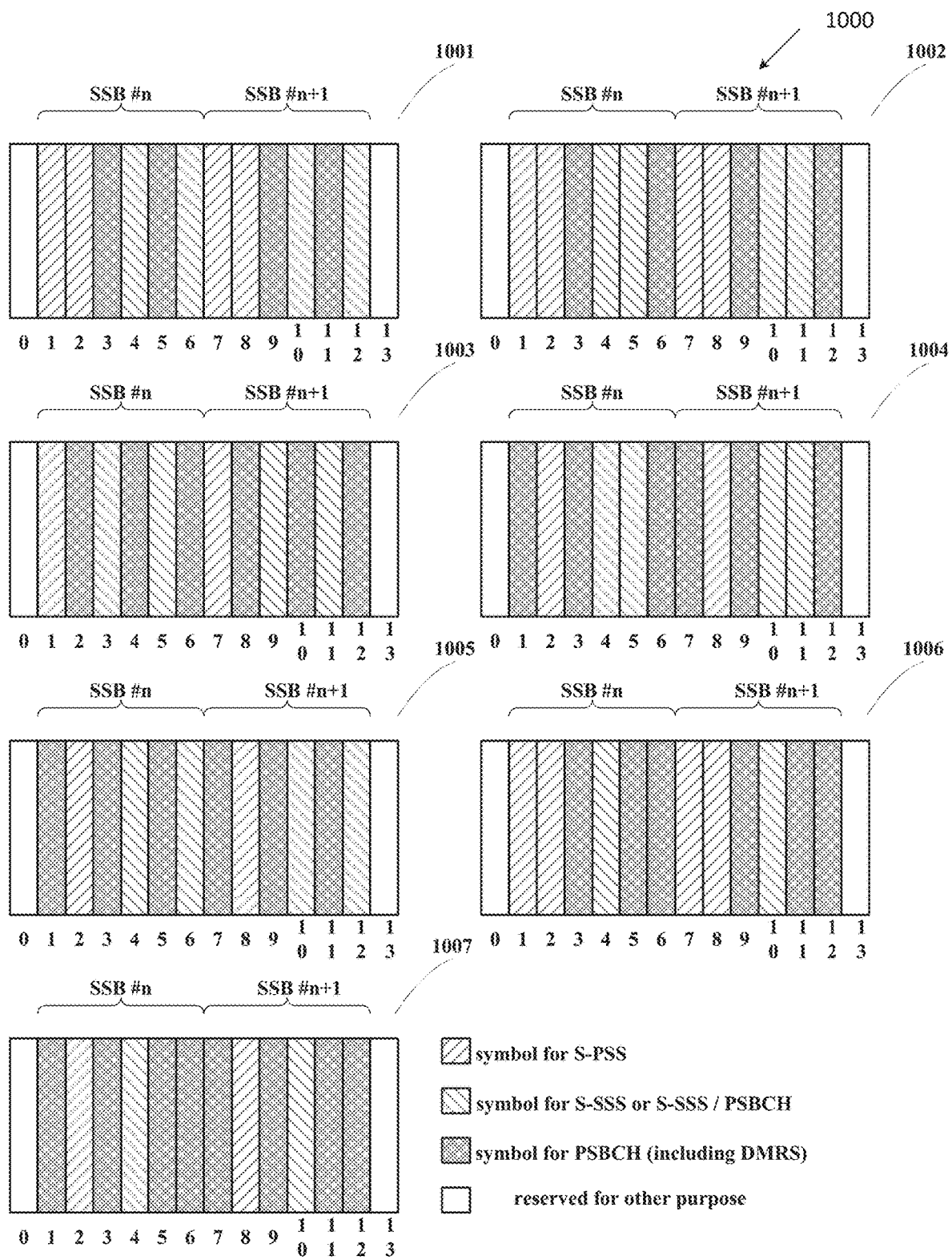
FIG. 10A illustrates an example S-SSB according to embodiments of the present disclosure.

FIG. 10A illustrates an example S-SSB 1000 according to embodiments of the present disclosure. The embodiment of the S-SSB 1000 illustrated in FIG. 10A is for illustration only. FIG. 10A does not limit the scope of this disclosure to any particular implementation.

Figure 10B:
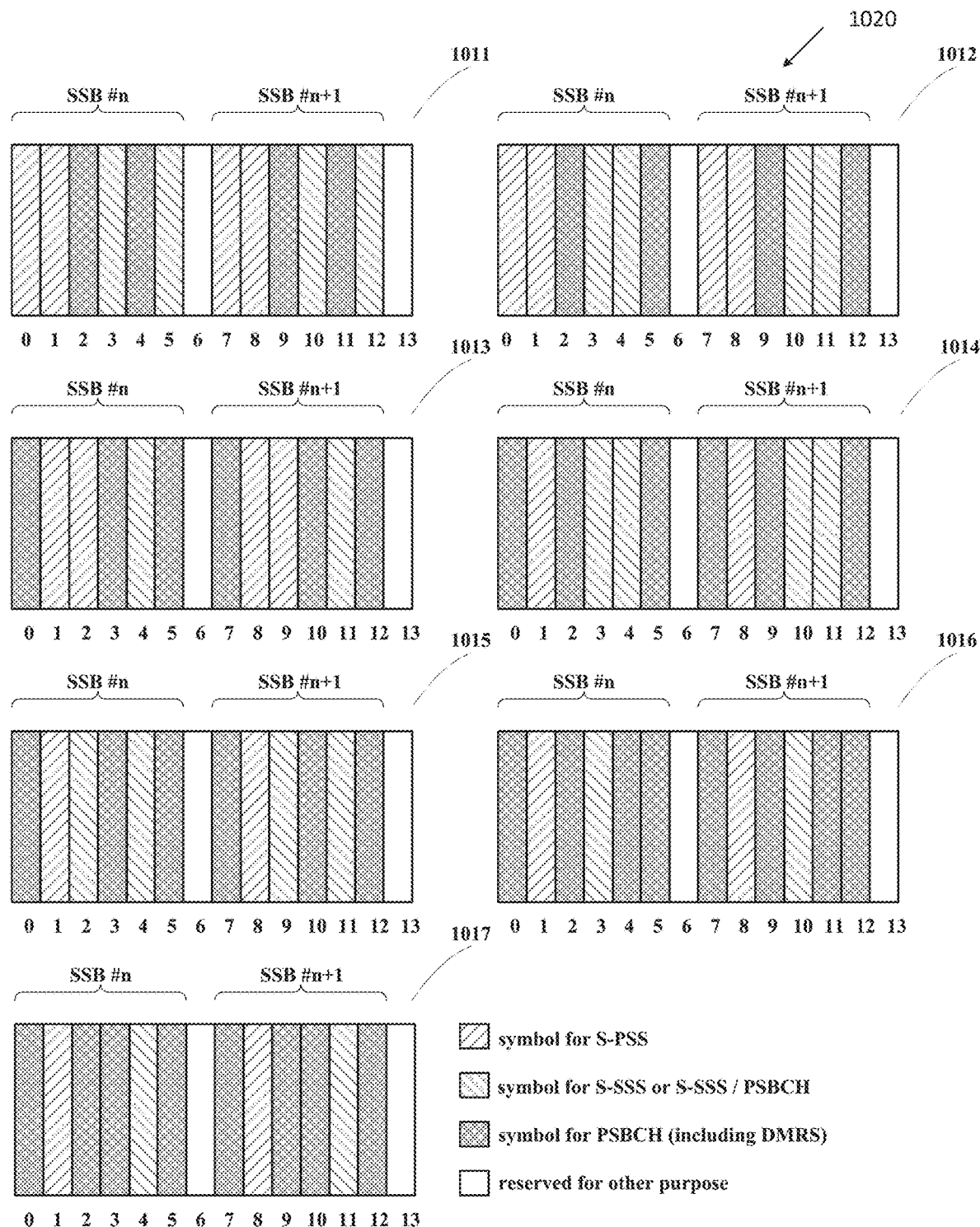
FIG. 10B illustrates another example S-SSB according to embodiments of the present disclosure.

FIG. 10B illustrates another example S-SSB 1020 according to embodiments of the present disclosure. The embodiment of the S-SSB 1020 illustrated in FIG. 10B is for illustration only. FIG. 10B does not limit the scope of this disclosure to any particular implementation.

Figure 11:
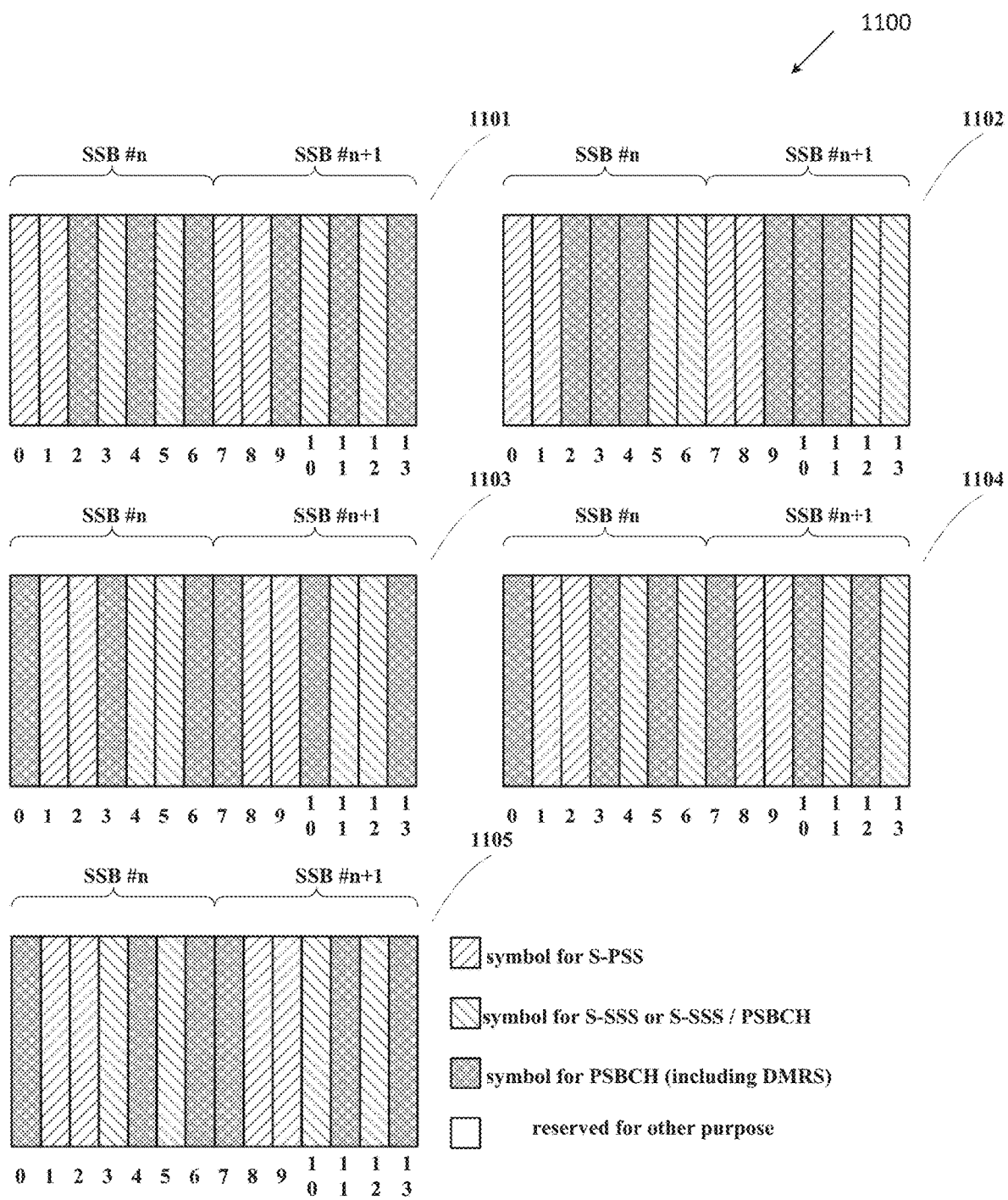
FIG. 11 illustrates yet another example S-SSB according to embodiments of the present disclosure.

FIG. 11 illustrates yet another example S-SSB 1100 according to embodiments of the present disclosure. The embodiment of the S-SSB 1100 illustrated in FIG. 11 is for illustration only. FIG. 11 does not limit the scope of this disclosure to any particular implementation.

Figure 12A:
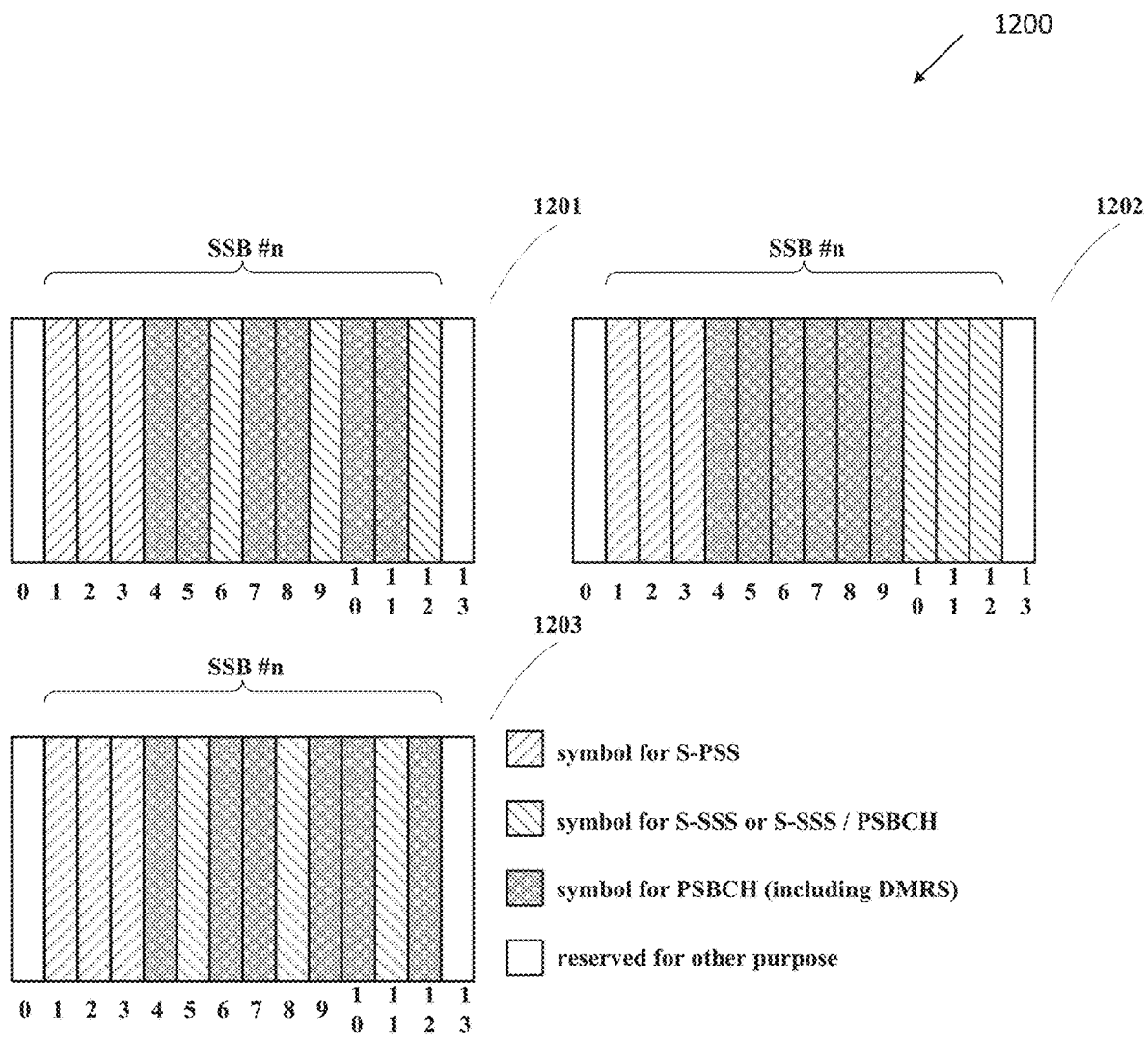
FIG. 12A illustrates yet another example S-SSB according to embodiments of the present disclosure.

FIG. 12A illustrates yet another example S-SSB 1200 according to embodiments of the present disclosure. The embodiment of the S-SSB 1200 illustrated in FIG. 12A is for illustration only. FIG. 12A does not limit the scope of this disclosure to any particular implementation.

Figure 12B:
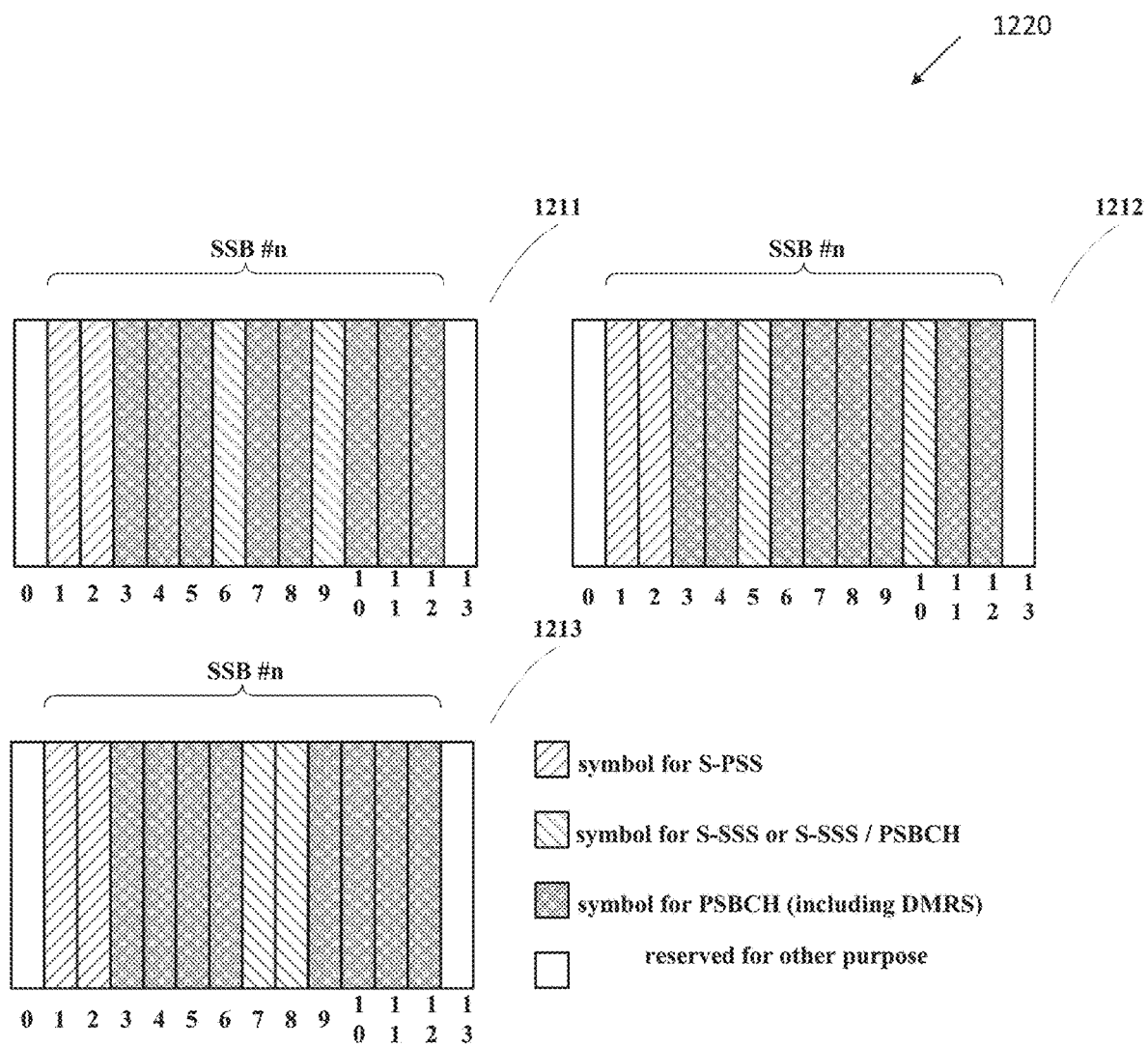
FIG. 12B illustrates yet another example S-SSB according to embodiments of the present disclosure.

FIG. 12B illustrates yet another example S-SSB 1220 according to embodiments of the present disclosure. The embodiment of the S-SSB 1220 illustrated in FIG. 12B is for illustration only. FIG. 12B does not limit the scope of this disclosure to any particular implementation.

Figure 12C:
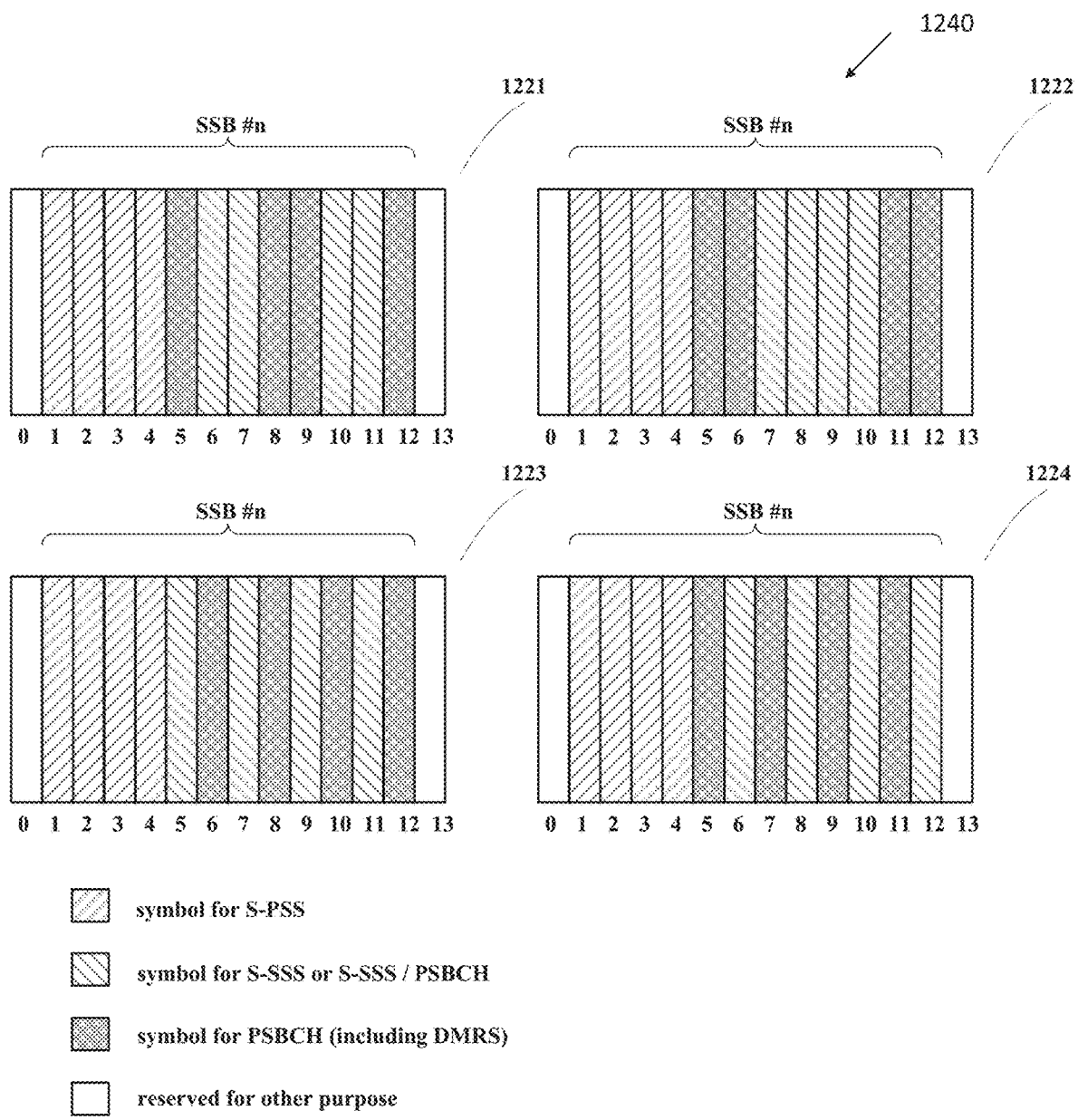
FIG. 12C illustrates yet another example S-SSB according to embodiments of the present disclosure.

FIG. 12C illustrates yet another example S-SSB 1240 according to embodiments of the present disclosure. The embodiment of the S-SSB 12 illustrated in FIG. 12C is for illustration only. FIG. 12C does not limit the scope of this disclosure to any particular implementation.

Figure 13A:
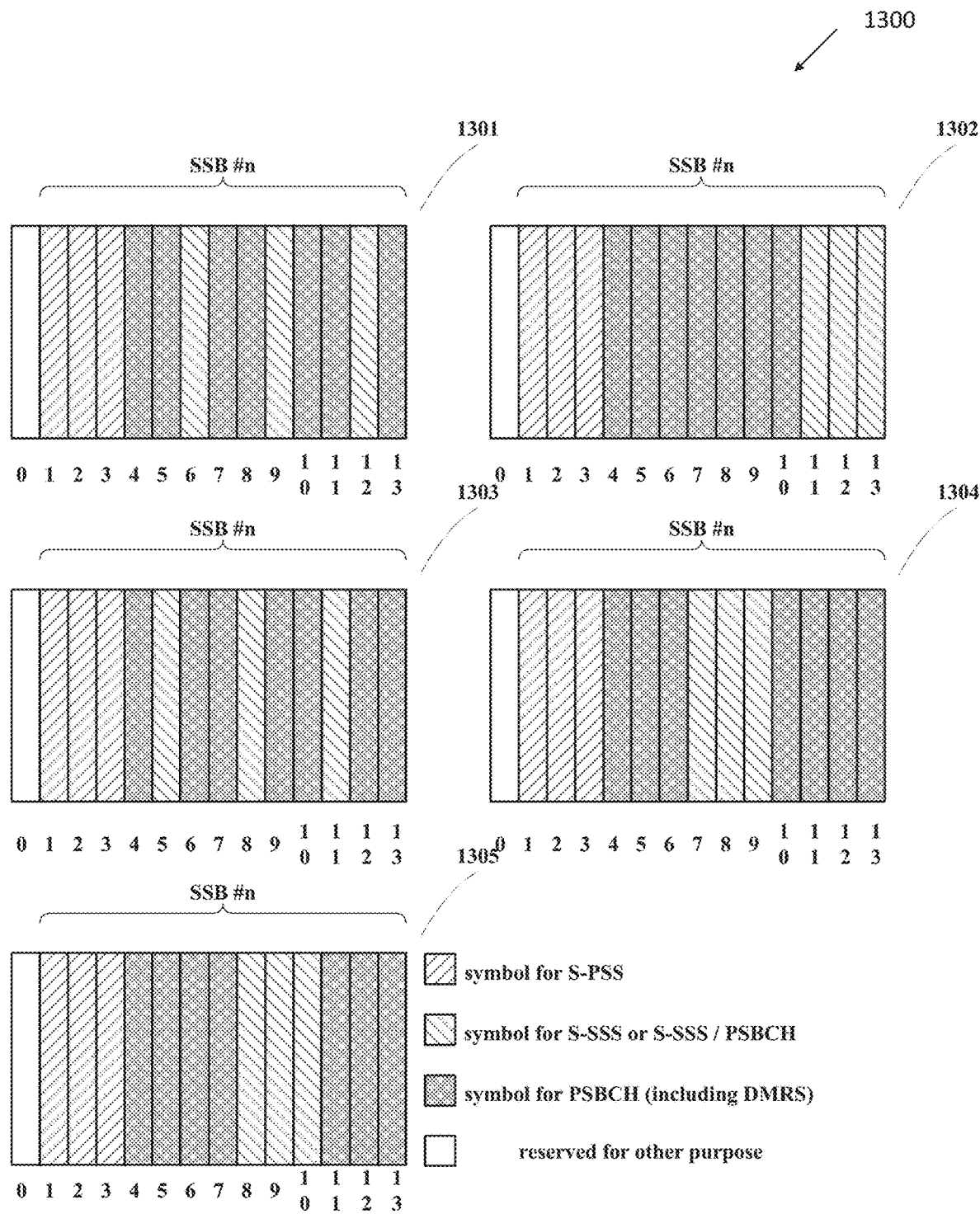
FIG. 13A illustrates yet another example S-SSB according to embodiments of the present disclosure.

FIG. 13A illustrates yet another example S-SSB 1300 according to embodiments of the present disclosure. The embodiment of the S-SSB 1300 illustrated in FIG. 13A is for illustration only. FIG. 13A does not limit the scope of this disclosure to any particular implementation.

Figure 13B:
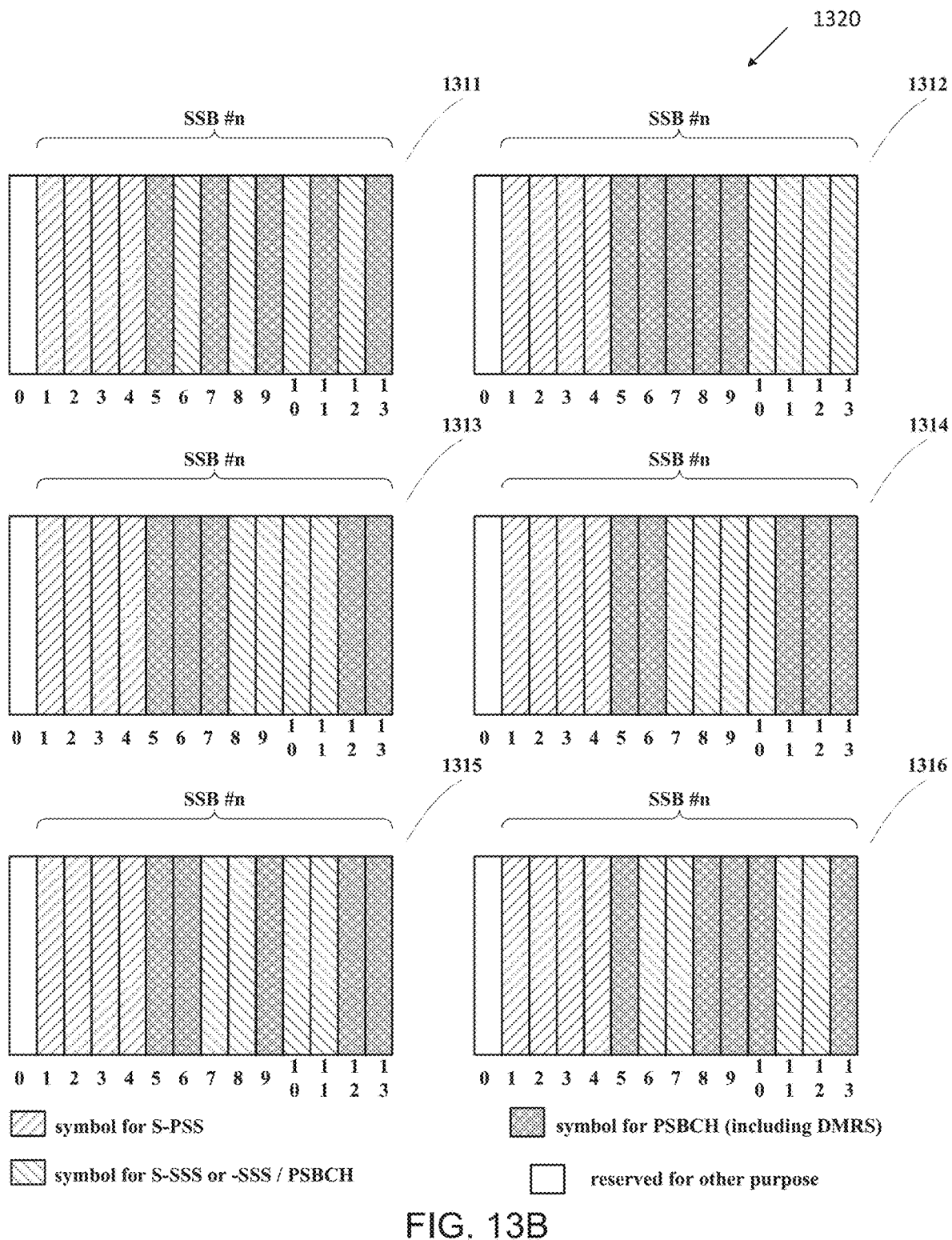
FIG. 13B illustrates yet another example S-SSB according to embodiments of the present disclosure.

FIG. 13B illustrates yet another example S-SSB 1320 according to embodiments of the present disclosure. The embodiment of the S-SSB 1320 illustrated in FIG. 13B is for illustration only. FIG. 13B does not limit the scope of this disclosure to any particular implementation.

Figure 14A:
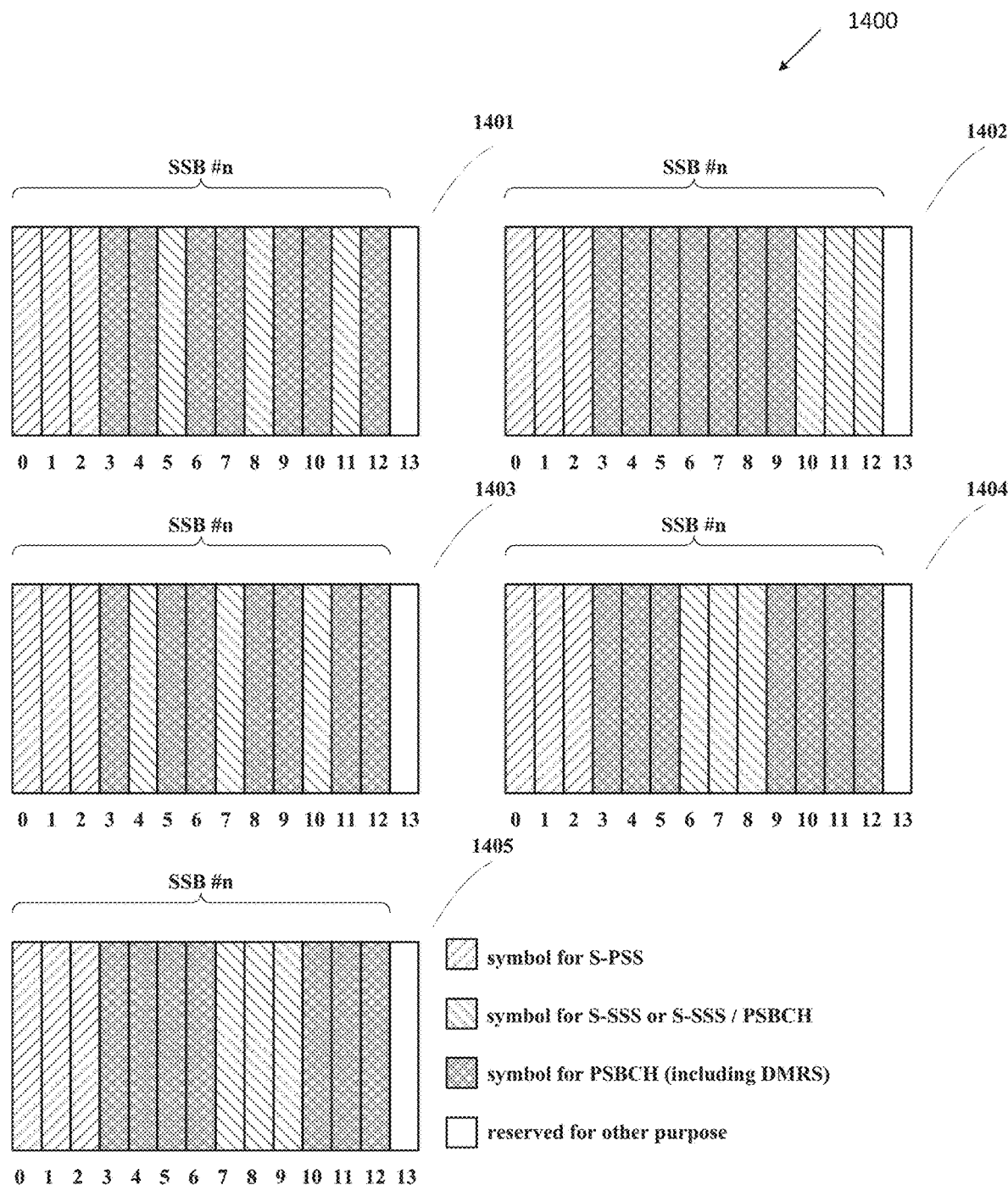
FIG. 14A illustrates yet another example S-SSB according to embodiments of the present disclosure.

FIG. 14A illustrates yet another example S-SSB 1400 according to embodiments of the present disclosure. The embodiment of the S-SSB 1400 illustrated in FIG. 14A is for illustration only. FIG. 14A does not limit the scope of this disclosure to any particular implementation.

Figure 14B:
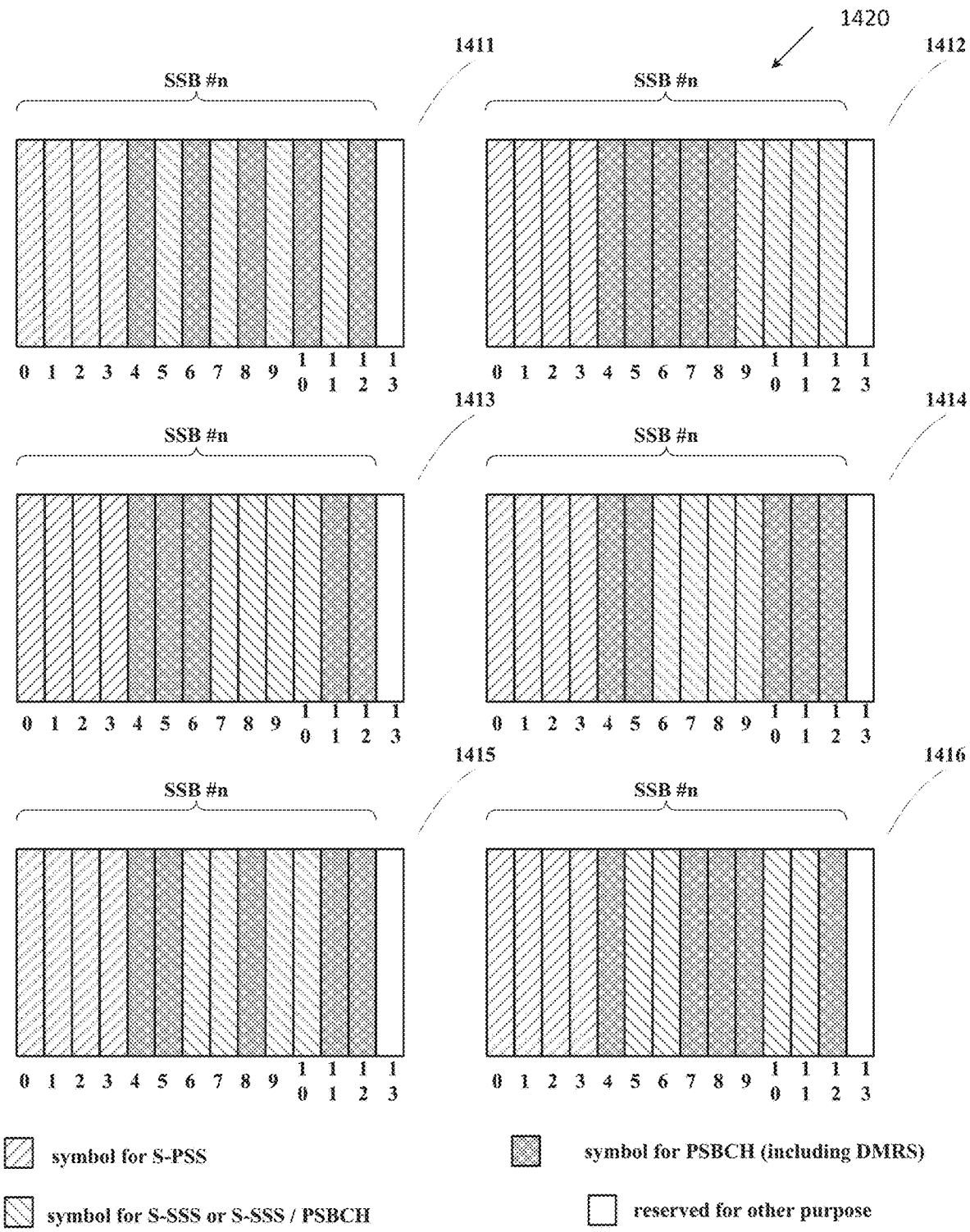
FIG. 14B illustrates yet another example S-SSB according to embodiments of the present disclosure.

FIG. 14B illustrates yet another example S-SSB 1420 according to embodiments of the present disclosure. The embodiment of the S-SSB 1420 illustrated in FIG. 14B is for illustration only. FIG. 14B does not limit the scope of this disclosure to any particular implementation.

Figure 14C:
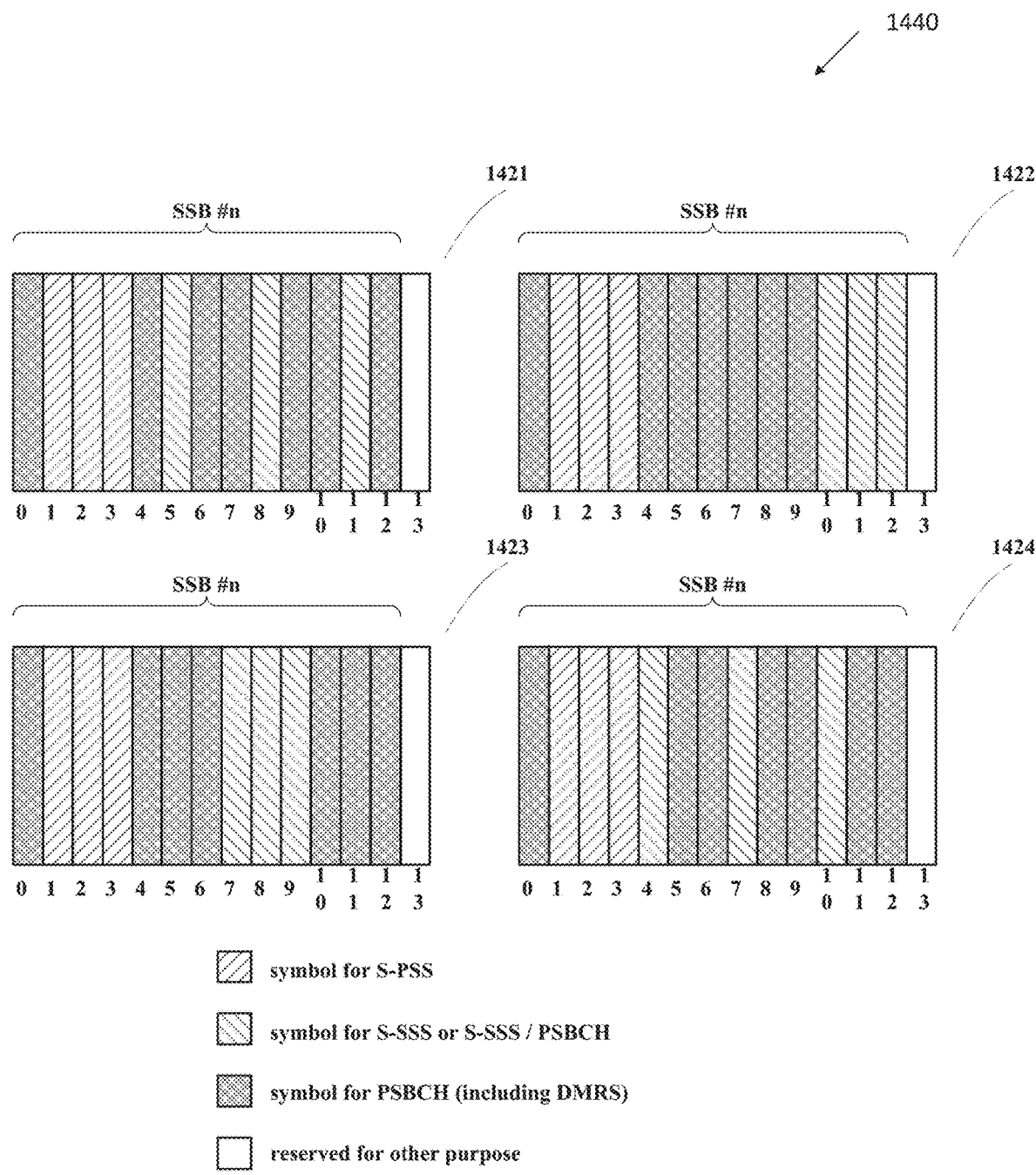
FIG. 14C illustrates yet another example S-SSB according to embodiments of the present disclosure.

FIG. 14C illustrates yet another example S-SSB 1440 according to embodiments of the present disclosure. The embodiment of the S-SSB 1440 illustrated in FIG. 14C is for illustration only. FIG. 14C does not limit the scope of this disclosure to any particular implementation.

Figure 14D:
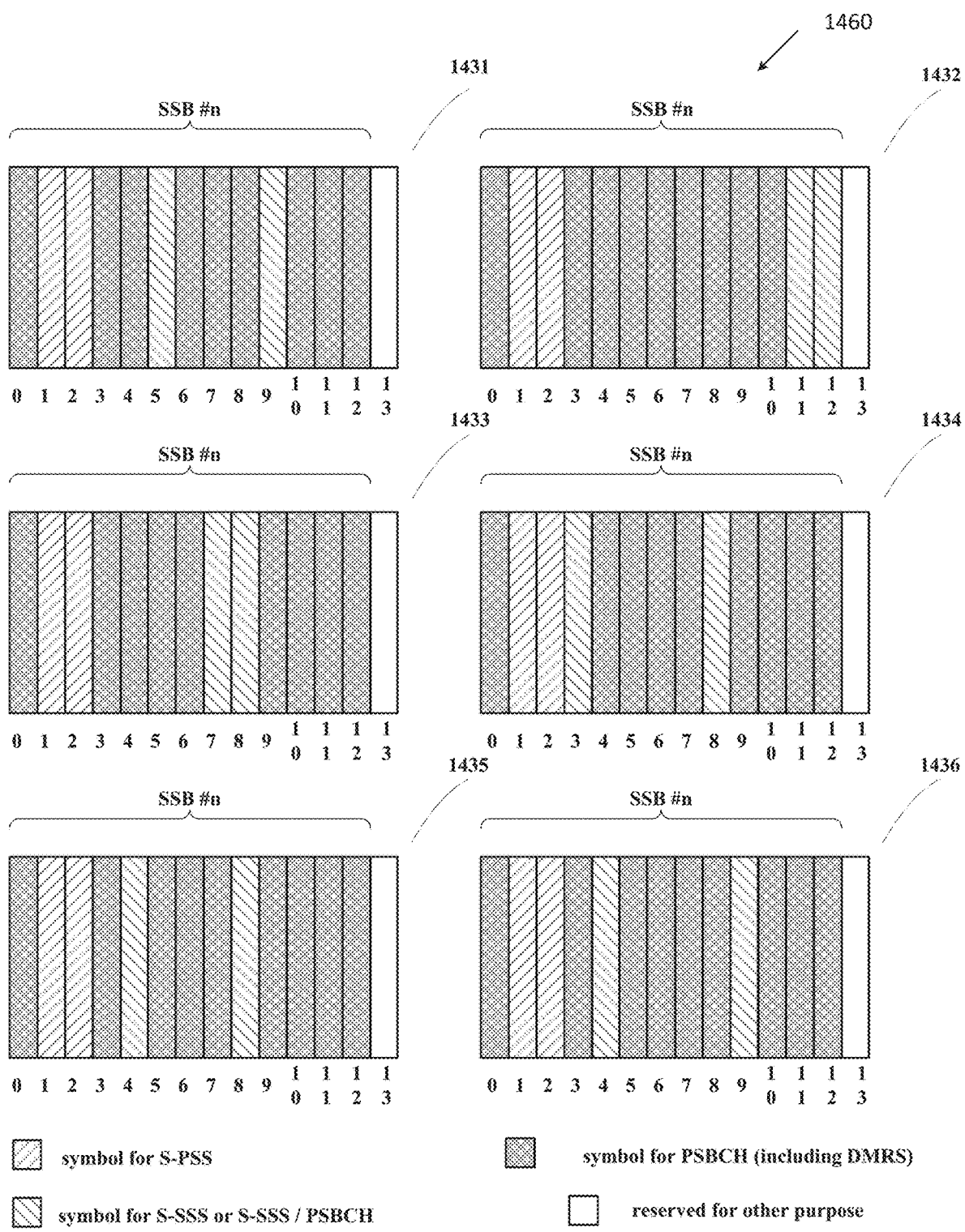
FIG. 14D illustrates yet another example S-SSB according to embodiments of the present disclosure.

FIG. 14D illustrates yet another example S-SSB 1460 according to embodiments of the present disclosure. The embodiment of the S-SSB 1460 illustrated in FIG. 14D is for illustration only. FIG. 14D does not limit the scope of this disclosure to any particular implementation.

Figure 14E:
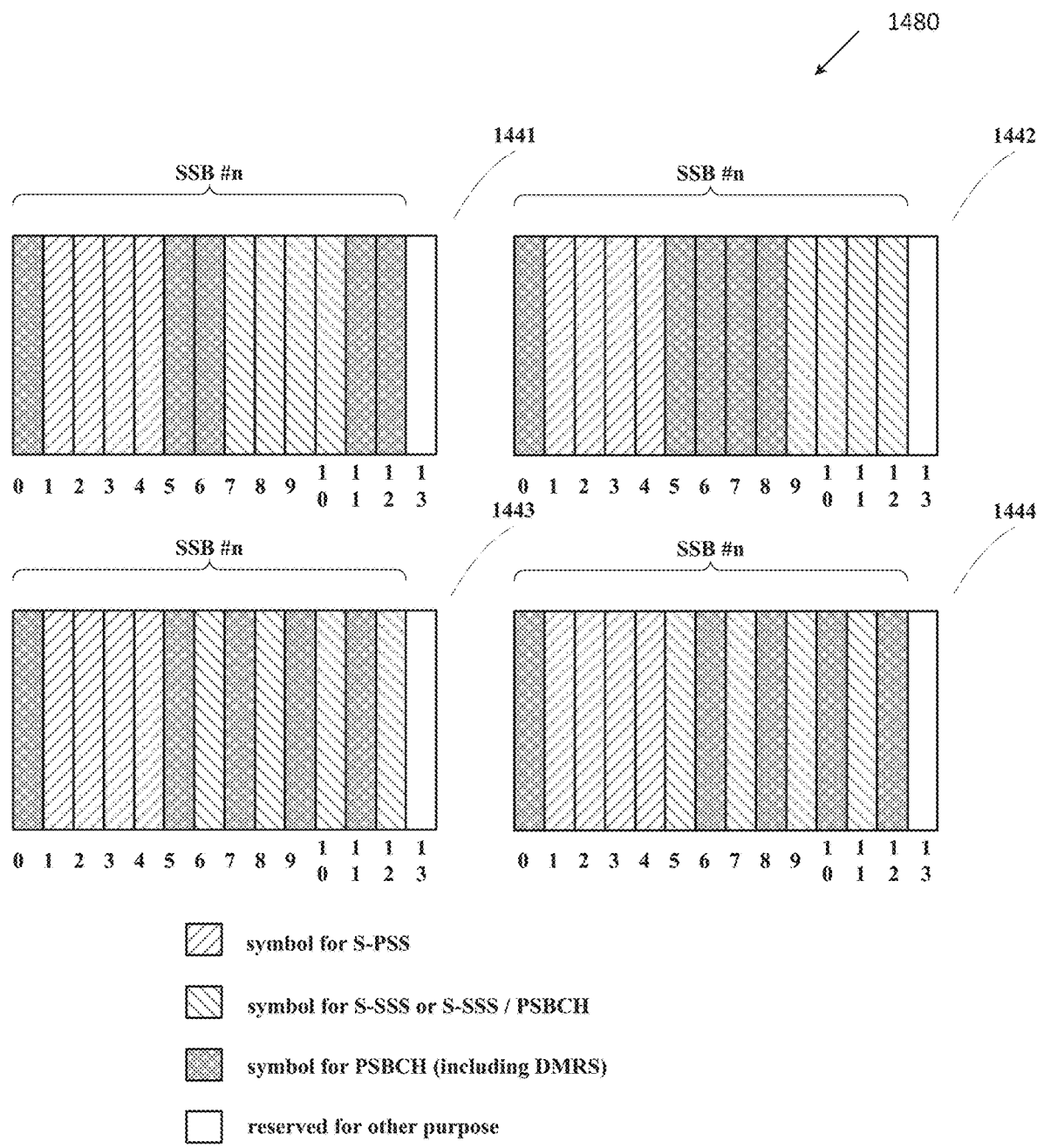
FIG. 14E illustrates yet another example S-SSB according to embodiments of the present disclosure.

FIG. 14E illustrates yet another example S-SSB 1480 according to embodiments of the present disclosure. The embodiment of the S-SSB 1480 illustrated in FIG. 14E is for illustration only. FIG. 14E does not limit the scope of this disclosure to any particular implementation.

Figure 15A:
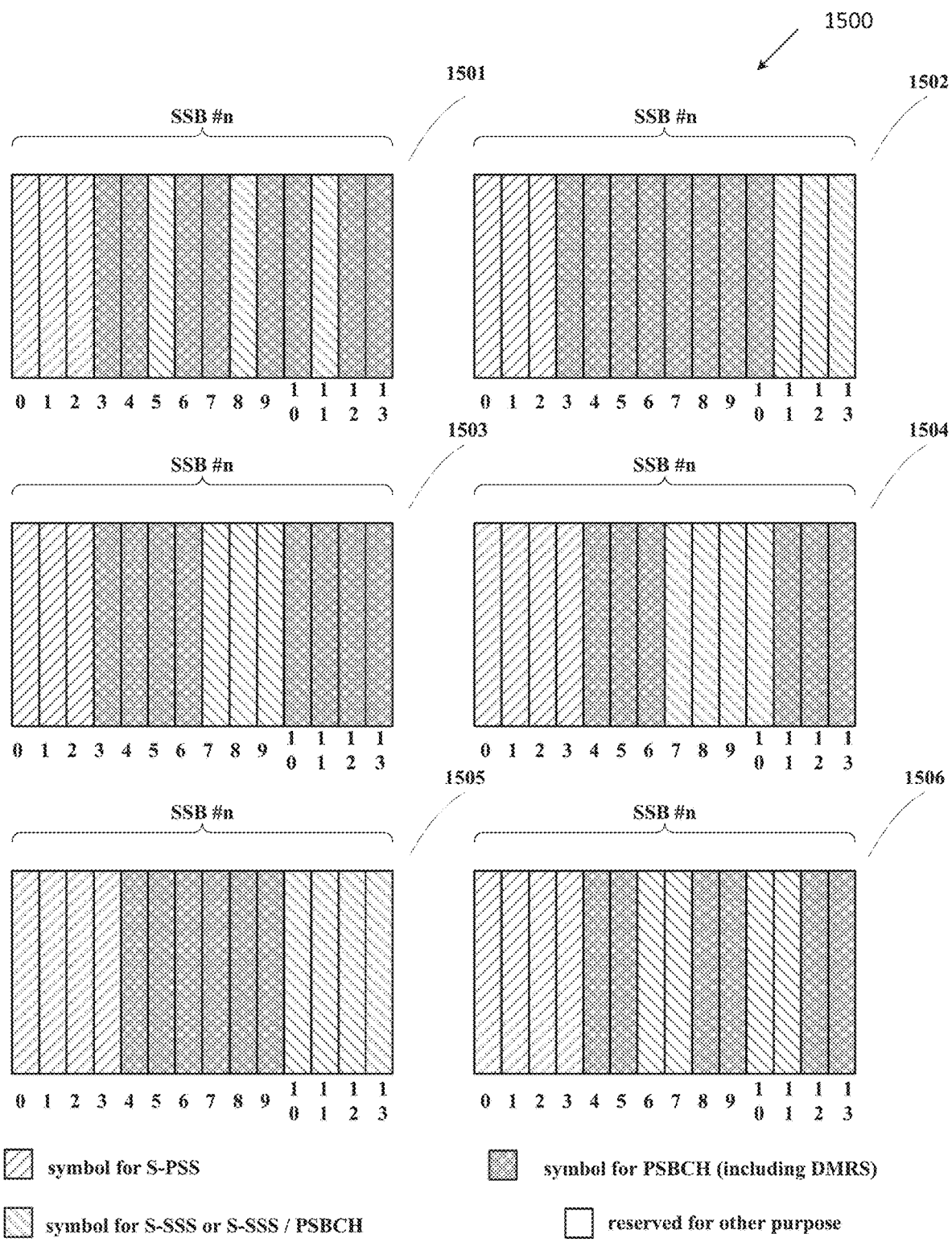
FIG. 15A illustrates yet another example S-SSB according to embodiments of the present disclosure.

FIG. 15A illustrates yet another example S-SSB 1500 according to embodiments of the present disclosure. The embodiment of the S-SSB 1500 illustrated in FIG. 15A is for illustration only. FIG. 15A does not limit the scope of this disclosure to any particular implementation.

Figure 15B:
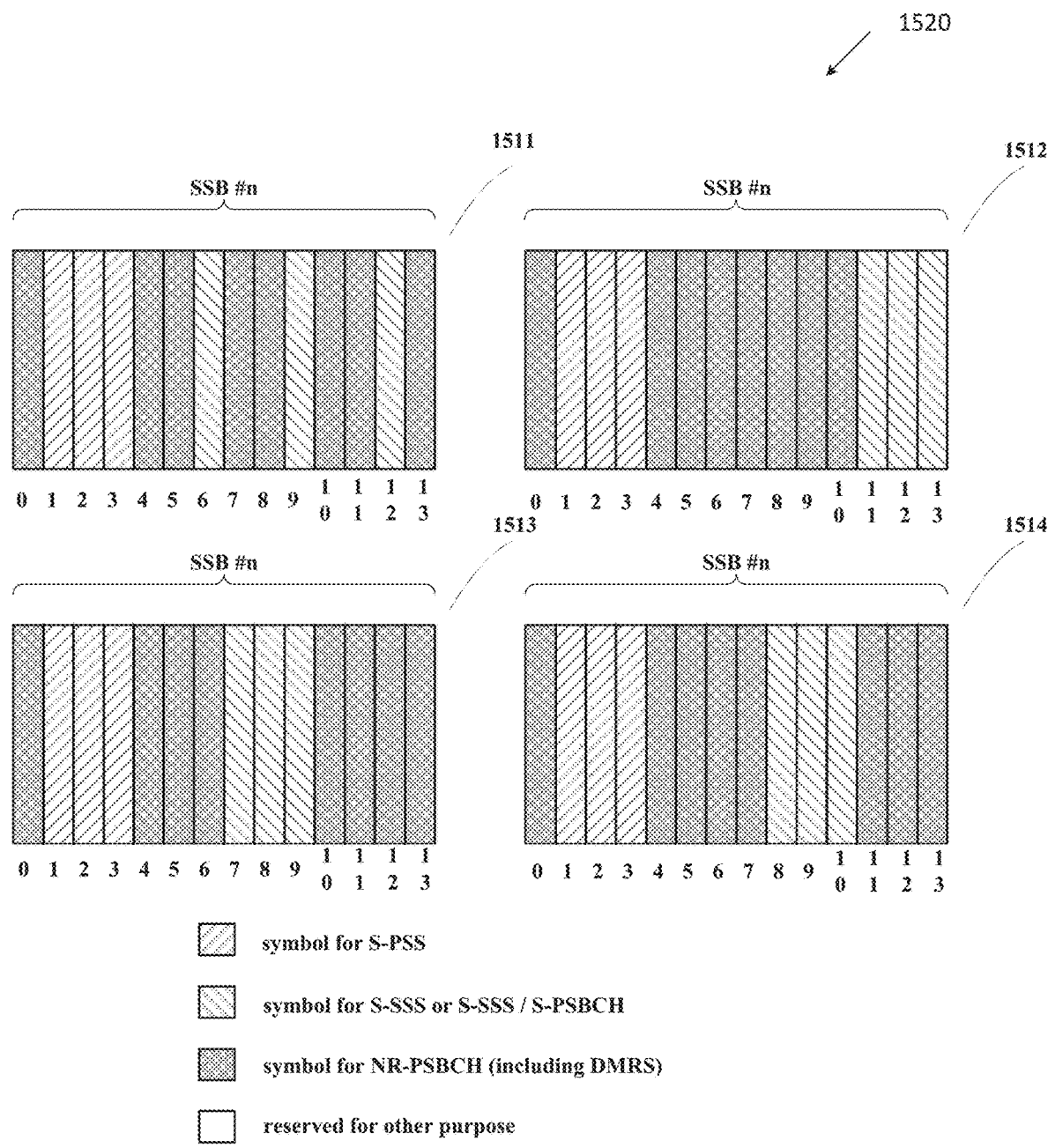
FIG. 15B illustrates yet another example S-SSB according to embodiments of the present disclosure.

FIG. 15B illustrates yet another example S-SSB 1520 according to embodiments of the present disclosure. The embodiment of the S-SSB 1520 illustrated in FIG. 15B is for illustration only. FIG. 15B does not limit the scope of this disclosure to any particular implementation.

Figure 15C:
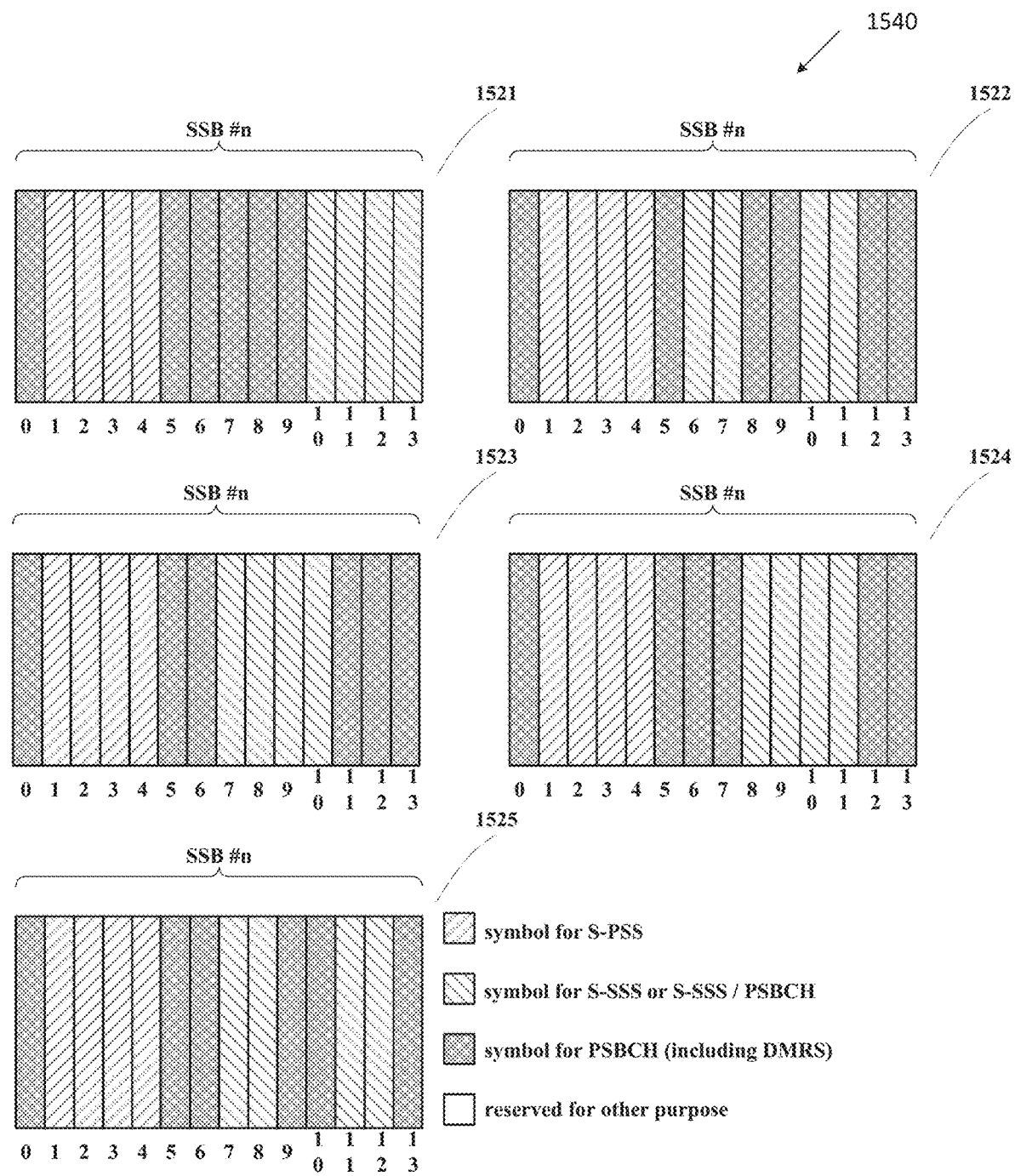
FIG. 15C illustrates yet another example S-SSB according to embodiments of the present disclosure.

FIG. 15C illustrates yet another example S-SSB 1540 according to embodiments of the present disclosure. The embodiment of the S-SSB 1540 illustrated in FIG. 15C is for illustration only. FIG. 15C does not limit the scope of this disclosure to any particular implementation.

Figure 16A:
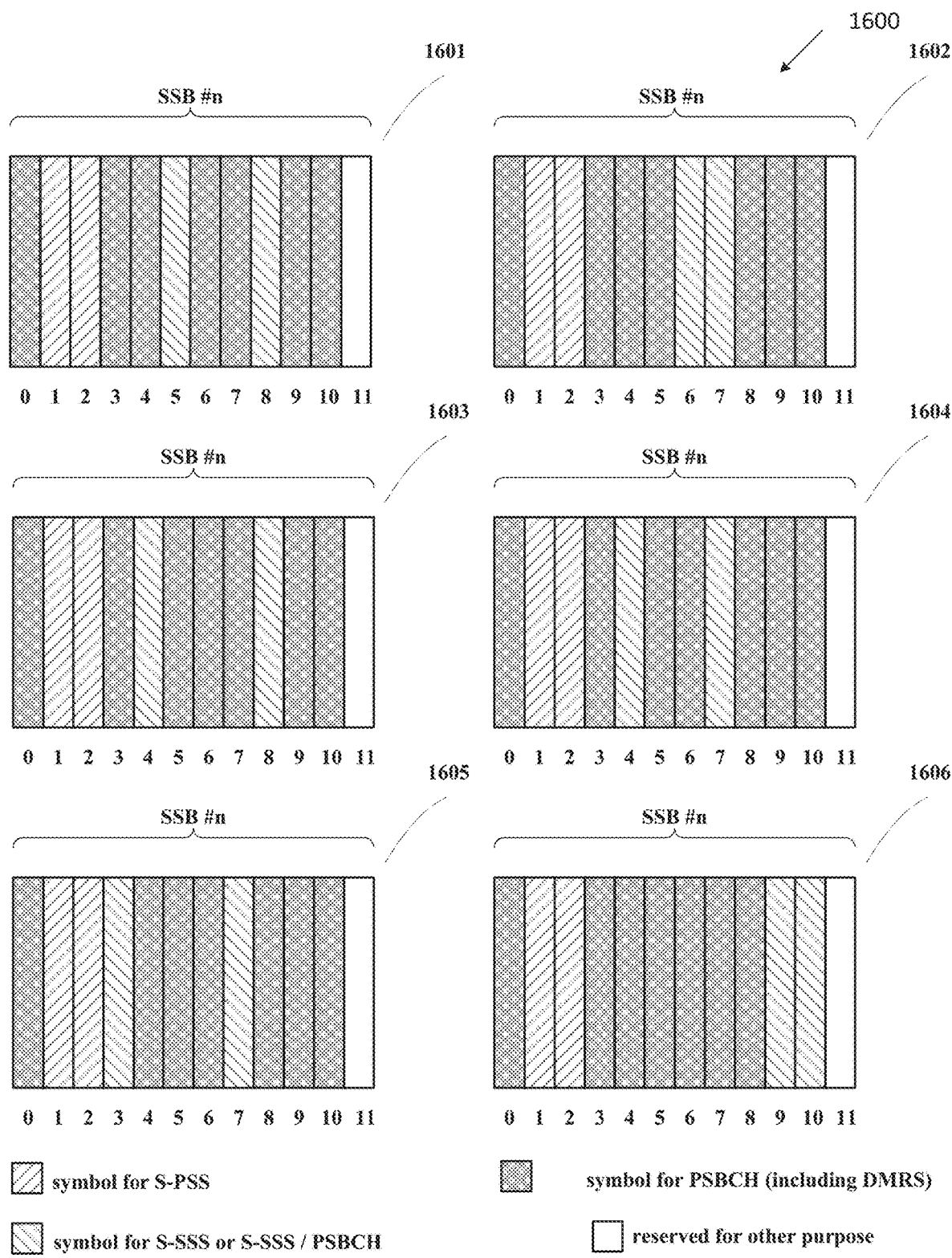
FIG. 16A illustrates yet another example S-SSB according to embodiments of the present disclosure.

FIG. 16A illustrates yet another example S-SSB 1600 according to embodiments of the present disclosure. The embodiment of the S-SSB 1600 illustrated in FIG. 16A is for illustration only. FIG. 16A does not limit the scope of this disclosure to any particular implementation.

Figure 16B:
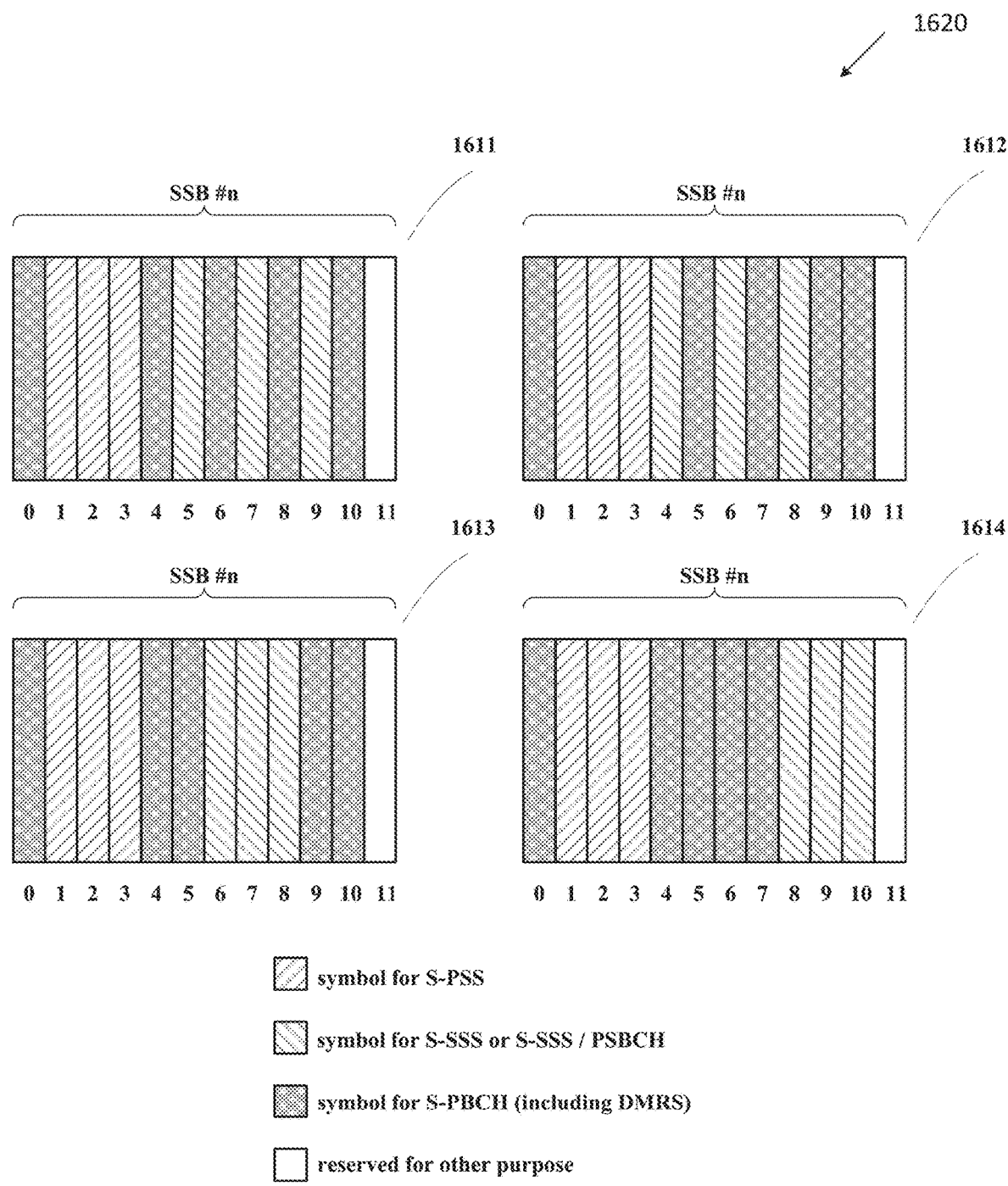
FIG. 16B illustrates yet another example S-SSB according to embodiments of the present disclosure.

FIG. 16B illustrates yet another example S-SSB 1620 according to embodiments of the present disclosure. The embodiment of the S-SSB 1620 illustrated in FIG. 16B is for illustration only. FIG. 16B does not limit the scope of this disclosure to any particular implementation.

FIG. 10A and FIG. 10B illustrate examples of this embodiment wherein one slot with 14 symbols contains two consecutive PSBCH blocks (SSBs), and two symbols (e.g., the first and last symbols in FIG. 10A or the seventh and last symbol in FIG. 10B) of the slot are reserved for other purpose such as automatic gain control (AGC) or transmission-to-reception (TX/RX) switch gap. In one consideration, each PSBCH block contains 2 symbols for S-PSS, 2 symbols for S-SSS or multiplexing of S-SSS and PSBCH, and 2 symbols for PSBCH. In another consideration, each PSBCH block contains 2 symbols for S-PSS, 1 symbol for S-SSS or multiplexing of S-SSS and PSBCH, and 3 symbols for PSBCH. In yet another consideration, each PSBCH block contains 1 symbol for S-PSS, 2 symbols for S-SSS or multiplexing of S-SSS and PSBCH, and 3 symbols for PSBCH. In yet another consideration, each PSBCH block contains 1 symbol for S-PSS, 1 symbol for S-SSS or multiplexing of S-SSS and PSBCH, and 4 symbols for PSBCH.

In one example (e.g., 1001 in FIG. 10A), the first and last symbols within a slot are reserved for other purpose, and symbols #1 to #6 are mapped for a first S-SSB within the slot, and symbols #7 to #12 are mapped for a second S-SSB within a slot, wherein the two S-SSBs have the same composition with respect to the time domain mapping: the first and second symbols in the S-SSB (i.e., symbols #1, #2, #7, and #8 in term of the symbol index within the slot) are mapped for S-PSS, the fourth and sixth symbols in the S-SSB (i.e., symbols #4, #6, #10, and #12 in term of the symbol index within the slot) are mapped for S-SSS (if the BW of S-SSB is 12 RBs or 24 RBs) or multiplexing of S-SSS and PSBCH (if the BW of S-SSB is larger than 12 RBs such as 20 RBs), and the third and fifth symbols in the S-SSB (i.e., symbols #3, #5, #9, and #11 in term of the symbol index within the slot) are mapped for PSBCH.

In another example (e.g., 1002 in FIG. 10A), the first and last symbols within a slot are reserved for other purpose, and symbols #1 to #6 are mapped for a first S-SSB within the slot, and symbols #7 to #12 are mapped for a second S-SSB within a slot, wherein the two S-SSBs have the same composition with respect to the time domain mapping: the first and second symbols in the S-SSB (i.e., symbols #1, #2, #7, and #8 in term of the symbol index within the slot) are mapped for S-PSS, the fourth and fifth symbols in the S-SSB (i.e., symbols #4, #6, #10, and #11 in term of the symbol index within the slot) are mapped for S-SSS (if the BW of S-SSB is 12 RBs or 24 RBs) or multiplexing of S-SSS and PSBCH (if the BW of S-SSB is larger than 12 RBs such as 20 RBs), and the third and sixth symbols in the S-SSB (i.e., symbols #3, #6, #9, and #12 in term of the symbol index within the slot) are mapped for PSBCH.

In yet another example (e.g., 1003 in FIG. 10A), the first and last symbols within a slot are reserved for other purpose, and symbols #1 to #6 are mapped for a first S-SSB within the slot, and symbols #7 to #12 are mapped for a second S-SSB within a slot, wherein the two S-SSBs have the same composition with respect to the time domain mapping: the first symbol in the S-SSB (i.e., symbols #1, and #7 in term of the symbol index within the slot) are mapped for S-PSS, the third and fifth symbols in the S-SSB (i.e., symbols #3, #5, #9, and #11 in term of the symbol index within the slot) are mapped for S-SSS (if the BW of S-SSB is 12 RBs or 24 RBs) or multiplexing of S-SSS and PSBCH (if the BW of S-SSB is larger than 12 RBs such as 20 RBs), and the second, fourth, and sixth symbols in the S-SSB (i.e., symbols #2, #4, #6, #8, #10, and #12 in term of the symbol index within the slot) are mapped for PSBCH.

In yet another example (e.g., 1004 in FIG. 10A), the first and last symbols within a slot are reserved for other purpose, and symbols #1 to #6 are mapped for a first S-SSB within the slot, and symbols #7 to #12 are mapped for a second S-SSB within a slot, wherein the two S-SSBs have the same composition with respect to the time domain mapping: the second symbol in the S-SSB (i.e., symbols #2, and #8 in term of the symbol index within the slot) are mapped for S-PSS, the fourth and fifth symbols in the S-SSB (i.e., symbols #4, #5, #10, and #11 in term of the symbol index within the slot) are mapped for S-SSS (if the BW of S-SSB is 12 RBs or 24 RBs) or multiplexing of S-SSS and PSBCH (if the BW of S-SSB is larger than 12 RBs such as 20 RBs), and the first, third, and sixth symbols in the S-SSB (i.e., symbols #1, #3, #6, #7, #9, and #12 in term of the symbol index within the slot) are mapped for PSBCH.

In yet another example (e.g., 1005 in FIG. 10A), the first and last symbols within a slot are reserved for other purpose, and symbols #1 to #6 are mapped for a first S-SSB within the slot, and symbols #7 to #12 are mapped for a second S-SSB within a slot, wherein the two S-SSBs have the same composition with respect to the time domain mapping: the second symbol in the S-SSB (i.e., symbols #2, and #8 in term of the symbol index within the slot) are mapped for S-PSS, the fourth and sixth symbols in the S-SSB (i.e., symbols #4, #6, #10, and #12 in term of the symbol index within the slot) are mapped for S-SSS (if the BW of S-SSB is 12 RBs or 24 RBs) or multiplexing of S-SSS and PSBCH (if the BW of S-SSB is larger than 12 RBs such as 20 RBs), and the first, third, and fifth symbols in the S-SSB (i.e., symbols #1, #3, #5, #7, #9, and #11 in term of the symbol index within the slot) are mapped for PSBCH.

In yet another example (e.g., 1006 in FIG. 10A), the first and last symbols within a slot are reserved for other purpose, and symbols #1 to #6 are mapped for a first S-SSB within the slot, and symbols #7 to #12 are mapped for a second S-SSB within a slot, wherein the two S-SSBs have the same composition with respect to the time domain mapping: the first and second symbol in the S-SSB (i.e., symbols #1, #2, #7, and #8 in term of the symbol index within the slot) are mapped for S-PSS, the fourth symbol in the S-SSB (i.e., symbols #4, and #10 in term of the symbol index within the slot) are mapped for S-SSS (if the BW of S-SSB is 12 RBs or 24 RBs) or multiplexing of S-SSS and PSBCH (if the BW of S-SSB is larger than 12 RBs such as 20 RBs), and the third, fifth, and sixth symbols in the S-SSB (i.e., symbols #3, #5, #6, #9, #11, and #12 in term of the symbol index within the slot) are mapped for PSBCH.

In yet another example (e.g., 1007 in FIG. 10A), the first and last symbols within a slot are reserved for other purpose, and symbols #1 to #6 are mapped for a first S-SSB within the slot, and symbols #7 to #12 are mapped for a second S-SSB within a slot, wherein the two S-SSBs have the same composition with respect to the time domain mapping: the second symbol in the S-SSB (i.e., symbols #2, and #8 in term of the symbol index within the slot) are mapped for S-PSS, the fourth symbol in the S-SSB (i.e., symbols #4, and #10 in term of the symbol index within the slot) are mapped for S-SSS (if the BW of S-SSB is 12 RBs or 24 RBs) or multiplexing of S-SSS and PSBCH (if the BW of S-SSB is larger than 12 RBs such as 20 RBs), and the first, third, fifth, and sixth symbols in the S-SSB (i.e., symbols #1, #3, #5, #6, #7, #9, #11, and #12 in term of the symbol index within the slot) are mapped for PSBCH.

In yet another example (e.g., 1011 in FIG. 10B), the seventh and last symbols within a slot are reserved for other purpose, and symbols #0 to #5 are mapped for a first S-SSB within the slot, and symbols #7 to #12 are mapped for a second S-SSB within a slot, wherein the two S-SSBs have the same composition with respect to the time domain mapping: the first and second symbol in the S-SSB (i.e., symbols #0, #1, #7, and #8 in term of the symbol index within the slot) are mapped for S-PSS, the fourth and sixth symbol in the S-SSB (i.e., symbols #3, #5, #10, and #12 in term of the symbol index within the slot) are mapped for S-SSS (if the BW of S-SSB is 12 RBs or 24 RBs) or multiplexing of S-SSS and PSBCH (if the BW of S-SSB is larger than 12 RBs such as 20 RBs), and the third, and fifth symbols in the S-SSB (i.e., symbols #2, #4, #9, and #11 in term of the symbol index within the slot) are mapped for PSBCH.

In yet another example (e.g., 1012 in FIG. 10B), the seventh and last symbols within a slot are reserved for other purpose, and symbols #0 to #5 are mapped for a first S-SSB within the slot, and symbols #7 to #12 are mapped for a second S-SSB within a slot, wherein the two S-SSBs have the same composition with respect to the time domain mapping: the first and second symbol in the S-SSB (i.e., symbols #0, #1, #7, and #8 in term of the symbol index within the slot) are mapped for S-PSS, the fourth and fifth symbol in the S-SSB (i.e., symbols #3, #4, #10, and #11 in term of the symbol index within the slot) are mapped for S-SSS (if the BW of S-SSB is 12 RBs or 24 RBs) or multiplexing of S-SSS and PSBCH (if the BW of S-SSB is larger than 12 RBs such as 20 RBs), and the third, and sixth symbols in the S-SSB (i.e., symbols #2, #5, #9, and #12 in term of the symbol index within the slot) are mapped for PSBCH.

In yet another example (e.g., 1013 in FIG. 10B), the seventh and last symbols within a slot are reserved for other purpose, and symbols #0 to #5 are mapped for a first S-SSB within the slot, and symbols #7 to #12 are mapped for a second S-SSB within a slot, wherein the two S-SSBs have the same composition with respect to the time domain mapping: the second and third symbol in the S-SSB (i.e., symbols #1, #2, #8, and #9 in term of the symbol index within the slot) are mapped for S-PSS, the fifth symbol in the S-SSB (i.e., symbols #4, and #11 in term of the symbol index within the slot) are mapped for S-SSS (if the BW of S-SSB is 12 RBs or 24 RBs) or multiplexing of S-SSS and PSBCH (if the BW of S-SSB is larger than 12 RBs such as 20 RBs), and the first, fourth, and sixth symbols in the S-SSB (i.e., symbols #0, #3, #5, #7, #10, and #12 in term of the symbol index within the slot) are mapped for PSBCH.

In yet another example (e.g., 1014 in FIG. 10B), the seventh and last symbols within a slot are reserved for other purpose, and symbols #0 to #5 are mapped for a first S-SSB within the slot, and symbols #7 to #12 are mapped for a second S-SSB within a slot, wherein the two S-SSBs have the same composition with respect to the time domain mapping: the second symbol in the S-SSB (i.e., symbols #1, and #8 in term of the symbol index within the slot) are mapped for S-PSS, the fourth and fifth symbol in the S-SSB (i.e., symbols #3, #4, #10, and #11 in term of the symbol index within the slot) are mapped for S-SSS (if the BW of S-SSB is 12 RBs or 24 RBs) or multiplexing of S-SSS and PSBCH (if the BW of S-SSB is larger than 12 RBs such as 20 RBs), and the first, third, and sixth symbols in the S-SSB (i.e., symbols #0, #2, #5, #7, #9, and #12 in term of the symbol index within the slot) are mapped for PSBCH.

In yet another example (e.g., 1015 in FIG. 10B), the seventh and last symbols within a slot are reserved for other purpose, and symbols #0 to #5 are mapped for a first S-SSB within the slot, and symbols #7 to #12 are mapped for a second S-SSB within a slot, wherein the two S-SSBs have the same composition with respect to the time domain mapping: the second symbol in the S-SSB (i.e., symbols #1, and #8 in term of the symbol index within the slot) are mapped for S-PSS, the third and fifth symbol in the S-SSB (i.e., symbols #2, #4, #9, and #11 in term of the symbol index within the slot) are mapped for S-SSS (if the BW of S-SSB is 12 RBs or 24 RBs) or multiplexing of S-SSS and PSBCH (if the BW of S-SSB is larger than 12 RBs such as 20 RBs), and the first, fourth, and sixth symbols in the S-SSB (i.e., symbols #0, #3, #5, #7, #10, and #12 in term of the symbol index within the slot) are mapped for PSBCH.

In yet another example (e.g., 1016 in FIG. 10B), the seventh and last symbols within a slot are reserved for other purpose, and symbols #0 to #5 are mapped for a first S-SSB within the slot, and symbols #7 to #12 are mapped for a second S-SSB within a slot, wherein the two S-SSBs have the same composition with respect to the time domain mapping: the second symbol in the S-SSB (i.e., symbols #1, and #8 in term of the symbol index within the slot) are mapped for S-PSS, the fourth symbol in the S-SSB (i.e., symbols #3, and #10 in term of the symbol index within the slot) are mapped for S-SSS (if the BW of S-SSB is 12 RBs or 24 RBs) or multiplexing of S-SSS and PSBCH (if the BW of S-SSB is larger than 12 RBs such as 20 RBs), and the first, third, fifth, and sixth symbols in the S-SSB (i.e., symbols #0, #2, #4, #5, #7, #9, #11, and #12 in term of the symbol index within the slot) are mapped for PSBCH.

In yet another example (e.g., 1017 in FIG. 10B), the seventh and last symbols within a slot are reserved for other purpose, and symbols #0 to #5 are mapped for a first S-SSB within the slot, and symbols #7 to #12 are mapped for a second S-SSB within a slot, wherein the two S-SSBs have the same composition with respect to the time domain mapping: the second symbol in the S-SSB (i.e., symbols #1, and #8 in term of the symbol index within the slot) are mapped for S-PSS, the fifth symbol in the S-SSB (i.e., symbols #4, and #11 in term of the symbol index within the slot) are mapped for S-SSS (if the BW of S-SSB is 12 RBs or 24 RBs) or multiplexing of S-SSS and PSBCH (if the BW of S-SSB is larger than 12 RBs such as 20 RBs), and the first, third, fourth, and sixth symbols in the S-SSB (i.e., symbols #0, #2, #3, #5, #7, #9, #10, and #12 in term of the symbol index within the slot) are mapped for PSBCH.

FIG. 11 illustrates examples of this embodiment wherein one slot with 14 symbols contains two consecutive PSBCH blocks (SSBs), and each PSBCH block contains 7 symbols, and no symbol in the slot is reserved for other purpose. In one consideration, each PSBCH block contains 2 symbols for S-PSS, 2 symbols for S-SSS or multiplexing of S-SSS and PSBCH, and 3 symbols for PSBCH.

In yet another example (e.g., 1101 in FIG. 11), symbols #0 to #6 are mapped for a first S-SSB within the slot, and symbols #7 to #13 are mapped for a second S-SSB within a slot, wherein the two S-SSBs have the same composition with respect to the time domain mapping: the first and second symbols in the S-SSB (i.e., symbols #0, #1, #7, and #8 in term of the symbol index within the slot) are mapped for S-PSS, the fourth and sixth symbols in the S-SSB (i.e., symbols #3, #5, #10, and #12 in term of the symbol index within the slot) are mapped for S-SSS (if the BW of S-SSB is 12 RBs or 24 RBs) or multiplexing of S-SSS and PSBCH (if the BW of S-SSB is larger than 12 RBs such as 20 RBs), and the third, fifth, and seventh symbols in the S-SSB (i.e., symbols #2, #4, #6, #9, #11, and #13 in term of the symbol index within the slot) are mapped for PSBCH.

In yet another example (e.g., 1102 in FIG. 11), symbols #0 to #6 are mapped for a first S-SSB within the slot, and symbols #7 to #13 are mapped for a second S-SSB within a slot, wherein the two S-SSBs have the same composition with respect to the time domain mapping: the first and second symbols in the S-SSB (i.e., symbols #0, #1, #7, and #8 in term of the symbol index within the slot) are mapped for S-PSS, the sixth and seventh symbols in the S-SSB (i.e., symbols #5, #6, #12, and #13 in term of the symbol index within the slot) are mapped for S-SSS (if the BW of S-SSB is 12 RBs or 24 RBs) or multiplexing of S-SSS and PSBCH (if the BW of S-SSB is larger than 12 RBs such as 20 RBs), and the third, fourth, and fifth symbols in the S-SSB (i.e., symbols #2, #3, #4, #9, #10, and #11 in term of the symbol index within the slot) are mapped for PSBCH.

In yet another example (e.g., 1103 in FIG. 11), symbols #0 to #6 are mapped for a first S-SSB within the slot, and symbols #7 to #13 are mapped for a second S-SSB within a slot, wherein the two S-SSBs have the same composition with respect to the time domain mapping: the second and third symbols in the S-SSB (i.e., symbols #1, #2, #8, and #9 in term of the symbol index within the slot) are mapped for S-PSS, the fifth and sixth symbols in the S-SSB (i.e., symbols #4, #5, #11, and #12 in term of the symbol index within the slot) are mapped for S-SSS (if the BW of S-SSB is 12 RBs or 24 RBs) or multiplexing of S-SSS and PSBCH (if the BW of S-SSB is larger than 12 RBs such as 20 RBs), and the first, fourth, and seventh symbols in the S-SSB (i.e., symbols #0, #3, #6, #7, #10, and #13 in term of the symbol index within the slot) are mapped for PSBCH.

In yet another example (e.g., 1104 in FIG. 11), symbols #0 to #6 are mapped for a first S-SSB within the slot, and symbols #7 to #13 are mapped for a second S-SSB within a slot, wherein the two S-SSBs have the same composition with respect to the time domain mapping: the second and third symbols in the S-SSB (i.e., symbols #1, #2, #8, and #9 in term of the symbol index within the slot) are mapped for S-PSS, the fifth and seventh symbols in the S-SSB (i.e., symbols #4, #6, #11, and #13 in term of the symbol index within the slot) are mapped for S-SSS (if the BW of S-SSB is 12 RBs or 24 RBs) or multiplexing of S-SSS and PSBCH (if the BW of S-SSB is larger than 12 RBs such as 20 RBs), and the first, fourth, and sixth symbols in the S-SSB (i.e., symbols #0, #3, #5, #7, #10, and #12 in term of the symbol index within the slot) are mapped for PSBCH.

In yet another example (e.g., 1105 in FIG. 11), symbols #0 to #6 are mapped for a first S-SSB within the slot, and symbols #7 to #13 are mapped for a second S-SSB within a slot, wherein the two S-SSBs have the same composition with respect to the time domain mapping: the second and third symbols in the S-SSB (i.e., symbols #1, #2, #8, and #9 in term of the symbol index within the slot) are mapped for S-PSS, the fourth and sixth symbols in the S-SSB (i.e., symbols #3, #5, #10, and #12 in term of the symbol index within the slot) are mapped for S-SSS (if the BW of S-SSB is 12 RBs or 24 RBs) or multiplexing of S-SSS and PSBCH (if the BW of S-SSB is larger than 12 RBs such as 20 RBs), and the first, third, and fifth symbols in the S-SSB (i.e., symbols #0, #4, #6, #7, #11, and #13 in term of the symbol index within the slot) are mapped for PSBCH.

FIG. 12A, FIG. 12B, and FIG. 12C illustrate examples of this embodiment wherein one slot with 14 symbols contains one PSBCH block (SSB), and the PSBCH block contains 12 symbols, and the first and last symbols in the slot are reserved for other purpose such as automatic gain control (AGC) or transmission-to-reception (TX/RX) switch gap. In one consideration, each PSBCH block contains 3 symbols for S-PSS, 3 symbols for S-SSS or multiplexing of S-SSS and PSBCH, and 6 symbols for PSBCH. In another consideration, each PSBCH block contains 2 symbols for S-PSS, 2 symbols for S-SSS or multiplexing of S-SSS and PSBCH, and 8 symbols for PSBCH. In yet another consideration, each PSBCH block contains 4 symbols for S-PSS, 4 symbols for S-SSS or multiplexing of S-SSS and PSBCH, and 4 symbols for PSBCH.

In one example (e.g., 1201 in FIG. 12A), symbols #1 to #12 are mapped for the S-SSB within the slot, wherein: the first, second, and third symbols in the S-SSB (i.e., symbols #1, #2, and #3 in term of the symbol index within the slot) are mapped for S-PSS, the sixth, ninth, and twelfth symbols in the S-SSB (i.e., symbols #6, #9, and #12 in term of the symbol index within the slot) are mapped for S-SSS (if the BW of S-SSB is 12 RBs or 24 RBs) or multiplexing of S-SSS and PSBCH (if the BW of S-SSB is larger than 12 RBs such as 20 RBs), and the fourth, fifth, seventh, eighth, tenth, and eleventh symbols in the S-SSB (i.e., symbols #4, #5, #7, #8, #10, and #11 in term of the symbol index within the slot) are mapped for PSBCH.

In another example (e.g., 1202 in FIG. 12A), symbols #1 to #12 are mapped for the S-SSB within the slot, wherein:

the first, second, and third symbols in the S-SSB (i.e., symbols #1, #2, and #3 in term of the symbol index within the slot) are mapped for S-PSS, the tenth, eleventh, and twelfth symbols in the S-SSB (i.e., symbols #10, #11, and #12 in term of the symbol index within the slot) are mapped for S-SSS (if the BW of S-SSB is 12 RBs or 24 RBs) or multiplexing of S-SSS and PSBCH (if the BW of S-SSB is larger than 12 RBs such as 20 RBs), and the fourth, fifth, sixth, seventh, eighth, and ninth symbols in the S-SSB (i.e., symbols #4, #5, #6, #7, #8, and #9 in term of the symbol index within the slot) are mapped for PSBCH.

In yet another example (e.g., 1203 in FIG. 12A), symbols #1 to #12 are mapped for the S-SSB within the slot, wherein: the first, second, and third symbols in the S-SSB (i.e., symbols #1, #2, and #3 in term of the symbol index within the slot) are mapped for S-PSS, the fifth, eighth, and eleventh symbols in the S-SSB (i.e., symbols #5, #8, and #11 in term of the symbol index within the slot) are mapped for S-SSS (if the BW of S-SSB is 12 RBs or 24 RBs) or multiplexing of S-SSS and PSBCH (if the BW of S-SSB is larger than 12 RBs such as 20 RBs), and the fourth, sixth, seventh, ninth, tenth, and twelfth symbols in the S-SSB (i.e., symbols #4, #6, #7, #9, #10, and #12 in term of the symbol index within the slot) are mapped for PSBCH.

In yet another example (e.g., 1211 in FIG. 12B), symbols #1 to #12 are mapped for the S-SSB within the slot, wherein: the first, and second symbols in the S-SSB (i.e., symbols #1, and #2 in term of the symbol index within the slot) are mapped for S-PSS, the sixth, and ninth symbols in the S-SSB (i.e., symbols #6, and #9 in term of the symbol index within the slot) are mapped for S-SSS (if the BW of S-SSB is 12 RBs or 24 RBs) or multiplexing of S-SSS and PSBCH (if the BW of S-SSB is larger than 12 RBs such as 20 RBs), and the third, fourth, fifth, seventh, eighth, tenth, eleventh, and twelfth symbols in the S-SSB (i.e., symbols #3, #4, #5, #7, #8, #10, #11, and #12 in term of the symbol index within the slot) are mapped for PSBCH.

In yet another example (e.g., 1212 in FIG. 12B), symbols #1 to #12 are mapped for the S-SSB within the slot, wherein: the first, and second symbols in the S-SSB (i.e., symbols #1, and #2 in term of the symbol index within the slot) are mapped for S-PSS, the fifth, and tenth symbols in the S-SSB (i.e., symbols #5, and #10 in term of the symbol index within the slot) are mapped for S-SSS (if the BW of S-SSB is 12 RBs or 24 RBs) or multiplexing of S-SSS and PSBCH (if the BW of S-SSB is larger than 12 RBs such as 20 RBs), and the third, fourth, sixth, seventh, eighth, ninth, eleventh, and twelfth symbols in the S-SSB (i.e., symbols #3, #4, #6, #7, #8, #9, #11, and #12 in term of the symbol index within the slot) are mapped for PSBCH.

In yet another example (e.g., 1213 in FIG. 12B), symbols #1 to #12 are mapped for the S-SSB within the slot, wherein: the first, and second symbols in the S-SSB (i.e., symbols #1, and #2 in term of the symbol index within the slot) are mapped for S-PSS, the seventh, and eighth symbols in the S-SSB (i.e., symbols #7, and #8 in term of the symbol index within the slot) are mapped for S-SSS (if the BW of S-SSB is 12 RBs or 24 RBs) or multiplexing of S-SSS and PSBCH (if the BW of S-SSB is larger than 12 RBs such as 20 RBs), and the third, fourth, fifth, sixth, ninth, tenth, eleventh, and twelfth symbols in the S-SSB (i.e., symbols #3, #4, #6, #7, #8, #9, #11, and #12 in term of the symbol index within the slot) are mapped for PSBCH.

In yet another example (e.g., 1221 in FIG. 12C), symbols #1 to #12 are mapped for the S-SSB within the slot, wherein: the first, second, third, and fourth symbols in the S-SSB (i.e., symbols #1, #2, #3, and #4 in term of the symbol index within the slot) are mapped for S-PSS, the sixth, seventh, tenth, and eleventh symbols in the S-SSB (i.e., symbols #6, #7, #10, and #11 in term of the symbol index within the slot) are mapped for S-SSS (if the BW of S-SSB is 12 RBs or 24 RBs) or multiplexing of S-SSS and PSBCH (if the BW of S-SSB is larger than 12 RBs such as 20 RBs), and the fifth, eighth, ninth, and twelfth symbols in the S-SSB (i.e., symbols #5, #8, #9, and #12 in term of the symbol index within the slot) are mapped for PSBCH.

In yet another example (e.g., 1222 in FIG. 12C), symbols #1 to #12 are mapped for the S-SSB within the slot, wherein: the first, second, third, and fourth symbols in the S-SSB (i.e., symbols #1, #2, #3, and #4 in term of the symbol index within the slot) are mapped for S-PSS, the seventh, eighth, ninth, and tenth symbols in the S-SSB (i.e., symbols #7, #8, #9, and #10 in term of the symbol index within the slot) are mapped for S-SSS (if the BW of S-SSB is 12 RBs or 24 RBs) or multiplexing of S-SSS and PSBCH (if the BW of S-SSB is larger than 12 RBs such as 20 RBs), and the fifth, sixth, eleventh, and twelfth symbols in the S-SSB (i.e., symbols #5, #6, #11, and #12 in term of the symbol index within the slot) are mapped for PSBCH.

In yet another example (e.g., 1223 in FIG. 12C), symbols #1 to #12 are mapped for the S-SSB within the slot, wherein: the first, second, third, and fourth symbols in the S-SSB (i.e., symbols #1, #2, #3, and #4 in term of the symbol index within the slot) are mapped for S-PSS, the fifth, seventh, ninth, and eleventh symbols in the S-SSB (i.e., symbols #5, #7, #9, and #11 in term of the symbol index within the slot) are mapped for S-SSS (if the BW of S-SSB is 12 RBs or 24 RBs) or multiplexing of S-SSS and PSBCH (if the BW of S-SSB is larger than 12 RBs such as 20 RBs), and the sixth, eighth, tenth, and twelfth symbols in the S-SSB (i.e., symbols #6, #8, #10, and #12 in term of the symbol index within the slot) are mapped for PSBCH.

In yet another example (e.g., 1224 in FIG. 12C), symbols #1 to #12 are mapped for the S-SSB within the slot, wherein: the first, second, third, and fourth symbols in the S-SSB (i.e., symbols #1, #2, #3, and #4 in term of the symbol index within the slot) are mapped for S-PSS, the sixth, eighth, tenth, and twelfth symbols in the S-SSB (i.e., symbols #6, #8, #10, and #12 in term of the symbol index within the slot) are mapped for S-SSS (if the BW of S-SSB is 12 RBs or 24 RBs) or multiplexing of S-SSS and PSBCH (if the BW of S-SSB is larger than 12 RBs such as 20 RBs), and the fifth, seventh, ninth, and eleventh symbols in the S-SSB (i.e., symbols #5, #7, #9, and #11 in term of the symbol index within the slot) are mapped for PSBCH.

FIG. 13A and FIG. 13B illustrate examples of this embodiment wherein one slot with 14 symbols contains one PSBCH block (SSB), and the PSBCH block contains 13 symbols, and the first symbol in the slot is reserved for other purpose such as automatic gain control (AGC) or transmission-to-reception (TX/RX) switch gap. In one consideration, each PSBCH block contains 3 symbols for S-PSS, 3 symbols for S-SSS or multiplexing of S-SSS and PSBCH, and 7 symbols for PSBCH. In another consideration, each PSBCH block contains 2 symbols for S-PSS, 2 symbols for S-SSS or multiplexing of S-SSS and PSBCH, and 9 symbols for PSBCH. In yet another consideration, each PSBCH block contains 4 symbols for S-PSS, 4 symbols for S-SSS or multiplexing of S-SSS and PSBCH, and 5 symbols for PSBCH.

In one example (e.g., 1301 in FIG. 13A), symbols #1 to #13 are mapped for the S-SSB within the slot, wherein: the first, second, and third symbols in the S-SSB (i.e., symbols #1, #2, and #3 in term of the symbol index within the slot)

are mapped for S-PSS, the sixth, ninth, and twelfth symbols in the S-SSB (i.e., symbols #6, #9, and #12 in term of the symbol index within the slot) are mapped for S-SSS (if the BW of S-SSB is 12 RBs or 24 RBs) or multiplexing of S-SSS and PSBCH (if the BW of S-SSB is larger than 12 RBs such as 20 RBs), and the fourth, fifth, seventh, eighth, ninth, eleventh, and thirteenth symbols in the S-SSB (i.e., symbols #4, #5, #7, #8, #10, #11, and #13 in term of the symbol index within the slot) are mapped for PSBCH.

In another example (e.g., 1302 in FIG. 13A), symbols #1 to #13 are mapped for the S-SSB within the slot, wherein: the first, second, and third symbols in the S-SSB (i.e., symbols #1, #2, and #3 in term of the symbol index within the slot) are mapped for S-PSS, the eleventh, twelfth, and thirteenth symbols in the S-SSB (i.e., symbols #11, #12, and #13 in term of the symbol index within the slot) are mapped for S-SSS (if the BW of S-SSB is 12 RBs or 24 RBs) or multiplexing of S-SSS and PSBCH (if the BW of S-SSB is larger than 12 RBs such as 20 RBs), and the fourth, fifth, sixth, seventh, eighth, ninth, and tenth symbols in the S-SSB (i.e., symbols #4, #5, #6, #7, #8, #9, and #10 in term of the symbol index within the slot) are mapped for PSBCH.

In yet another example (e.g., 1303 in FIG. 13A), symbols #1 to #13 are mapped for the S-SSB within the slot, wherein: the first, second, and third symbols in the S-SSB (i.e., symbols #1, #2, and #3 in term of the symbol index within the slot) are mapped for S-PSS, the fifth, eighth, and eleventh symbols in the S-SSB (i.e., symbols #5, #8, and #11 in term of the symbol index within the slot) are mapped for S-SSS (if the BW of S-SSB is 12 RBs or 24 RBs) or multiplexing of S-SSS and PSBCH (if the BW of S-SSB is larger than 12 RBs such as 20 RBs), and the fourth, sixth, seventh, ninth, tenth, twelfth, and thirteenth symbols in the S-SSB (i.e., symbols #4, #6, #7, #9, #10, #12, and #13 in term of the symbol index within the slot) are mapped for PSBCH.

In yet another example (e.g., 1304 in FIG. 13A), symbols #1 to #13 are mapped for the S-SSB within the slot, wherein: the first, second, and third symbols in the S-SSB (i.e., symbols #1, #2, and #3 in term of the symbol index within the slot) are mapped for S-PSS, the seventh, eighth, and ninth symbols in the S-SSB (i.e., symbols #7, #8, and #9 in term of the symbol index within the slot) are mapped for S-SSS (if the BW of S-SSB is 12 RBs or 24 RBs) or multiplexing of S-SSS and PSBCH (if the BW of S-SSB is larger than 12 RBs such as 20 RBs), and the fourth, fifth, sixth, tenth, eleventh, twelfth, and thirteenth symbols in the S-SSB (i.e., symbols #4, #5, #6, #10, #11, #12, and #13 in term of the symbol index within the slot) are mapped for PSBCH.

In yet another example (e.g., 1305 in FIG. 13A), symbols #1 to #13 are mapped for the S-SSB within the slot, wherein: the first, second, and third symbols in the S-SSB (i.e., symbols #1, #2, and #3 in term of the symbol index within the slot) are mapped for S-PSS, the eighth, ninth, and tenth symbols in the S-SSB (i.e., symbols #8, #9, and #10 in term of the symbol index within the slot) are mapped for S-SSS (if the BW of S-SSB is 12 RBs or 24 RBs) or multiplexing of S-SSS and PSBCH (if the BW of S-SSB is larger than 12 RBs such as 20 RBs), and the fourth, fifth, sixth, seventh, eleventh, twelfth, and thirteenth symbols in the S-SSB (i.e., symbols #4, #5, #6, #7, #11, #12, and #13 in term of the symbol index within the slot) are mapped for PSBCH.

In yet another example (e.g., 1311 in FIG. 13B), symbols #1 to #13 are mapped for the S-SSB within the slot, wherein: the first, second, third, and fourth symbols in the S-SSB (i.e., symbols #1, #2, #3, and #4 in term of the symbol index within the slot) are mapped for S-PSS, the sixth, eighth, tenth, and twelfth symbols in the S-SSB (i.e., symbols #6, #8, #10, and #12 in term of the symbol index within the slot) are mapped for S-SSS (if the BW of S-SSB is 12 RBs or 24 RBs) or multiplexing of S-SSS and PSBCH (if the BW of S-SSB is larger than 12 RBs such as 20 RBs), and the fifth, seventh, ninth, eleventh, and thirteenth symbols in the S-SSB (i.e., symbols #5, #7, #9, #11, and #13 in term of the symbol index within the slot) are mapped for PSBCH.

In yet another example (e.g., 1312 in FIG. 13B), symbols #1 to #13 are mapped for the S-SSB within the slot, wherein: the first, second, third, and fourth symbols in the S-SSB (i.e., symbols #1, #2, #3, and #4 in term of the symbol index within the slot) are mapped for S-PSS, the tenth, eleventh, twelfth, and thirteenth symbols in the S-SSB (i.e., symbols #10, #11, #12, and #13 in term of the symbol index within the slot) are mapped for S-SSS (if the BW of S-SSB is 12 RBs or 24 RBs) or multiplexing of S-SSS and PSBCH (if the BW of S-SSB is larger than 12 RBs such as 20 RBs), and the fifth, sixth, seventh, eighth, and ninth symbols in the S-SSB (i.e., symbols #5, #6, #7, #8, and #9 in term of the symbol index within the slot) are mapped for PSBCH.

In yet another example (e.g., 1313 in FIG. 13B), symbols #1 to #13 are mapped for the S-SSB within the slot, wherein: the first, second, third, and fourth symbols in the S-SSB (i.e., symbols #1, #2, #3, and #4 in term of the symbol index within the slot) are mapped for S-PSS, the eighth, ninth, tenth, and eleventh symbols in the S-SSB (i.e., symbols #8, #9, #10, and #11 in term of the symbol index within the slot) are mapped for S-SSS (if the BW of S-SSB is 12 RBs or 24 RBs) or multiplexing of S-SSS and PSBCH (if the BW of S-SSB is larger than 12 RBs such as 20 RBs), and the fifth, sixth, seventh, twelfth, and thirteenth symbols in the S-SSB (i.e., symbols #5, #6, #7, #12, and #13 in term of the symbol index within the slot) are mapped for PSBCH.

In yet another example (e.g., 1314 in FIG. 13B), symbols #1 to #13 are mapped for the S-SSB within the slot, wherein: the first, second, third, and fourth symbols in the S-SSB (i.e., symbols #1, #2, #3, and #4 in term of the symbol index within the slot) are mapped for S-PSS, the seventh, eighth, ninth, and tenth symbols in the S-SSB (i.e., symbols #7, #8, #9, and #10 in term of the symbol index within the slot) are mapped for S-SSS (if the BW of S-SSB is 12 RBs or 24 RBs) or multiplexing of S-SSS and PSBCH (if the BW of S-SSB is larger than 12 RBs such as 20 RBs), and the fifth, sixth, eleventh, twelfth, and thirteenth symbols in the S-SSB (i.e., symbols #5, #6, #11, #12, and #13 in term of the symbol index within the slot) are mapped for PSBCH.

In yet another example (e.g., 1315 in FIG. 13B), symbols #1 to #13 are mapped for the S-SSB within the slot, wherein: the first, second, third, and fourth symbols in the S-SSB (i.e., symbols #1, #2, #3, and #4 in term of the symbol index within the slot) are mapped for S-PSS, the seventh, eighth, tenth, and eleventh symbols in the S-SSB (i.e., symbols #7, #8, #10, and #11 in term of the symbol index within the slot) are mapped for S-SSS (if the BW of S-SSB is 12 RBs or 24 RBs) or multiplexing of S-SSS and PSBCH (if the BW of S-SSB is larger than 12 RBs such as 20 RBs), and the fifth, sixth, ninth, twelfth, and thirteenth symbols in the S-SSB (i.e., symbols #5, #6, #9, #12, and #13 in term of the symbol index within the slot) are mapped for PSBCH.

In yet another example (e.g., 1316 in FIG. 13B), symbols #1 to #13 are mapped for the S-SSB within the slot, wherein: the first, second, third, and fourth symbols in the S-SSB (i.e., symbols #1, #2, #3, and #4 in term of the symbol index within the slot) are mapped for S-PSS, the sixth, seventh, eleventh, and twelfth symbols in the S-SSB (i.e., symbols

6, #7, #11, and #12 in term of the symbol index within the slot) are mapped for S-SSS (if the BW of S-SSB is 12 RBs or 24 RBs) or multiplexing of S-SSS and PSBCH (if the BW of S-SSB is larger than 12 RBs such as 20 RBs), and the fifth, eighth, ninth, tenth, and thirteenth symbols in the S-SSB (i.e., symbols #5, #8, #9, #10, and #13 in term of the symbol index within the slot) are mapped for PSBCH.

FIG. 14A, FIG. 14B, FIG. 14C, and FIG. 14D illustrate examples of this embodiment wherein one slot with 14 symbols contains one PSBCH block (SSB), and the PSBCH block contains 13 symbols, and the last symbol in the slot is reserved for other purpose such as transmission-to-reception (TX/RX) switch gap. In one consideration, each PSBCH block contains 3 symbols for S-PSS, 3 symbols for S-SSS or multiplexing of S-SSS and PSBCH, and 7 symbols for PSBCH. In another consideration, each PSBCH block contains 2 symbols for S-PSS, 2 symbols for S-SSS or multiplexing of S-SSS and PSBCH, and 9 symbols for PSBCH. In yet another consideration, each PSBCH block contains 4 symbols for S-PSS, 4 symbols for S-SSS or multiplexing of S-SSS and PSBCH, and 5 symbols for PSBCH.

In one example (e.g., 1401 in FIG. 14A), symbols #0 to #12 are mapped for the S-SSB within the slot, wherein: the first, second, and third symbols in the S-SSB (i.e., symbols #0, #1, and #2 in term of the symbol index within the slot) are mapped for S-PSS, the sixth, ninth, and twelfth symbols in the S-SSB (i.e., symbols #5, #8, and #11 in term of the symbol index within the slot) are mapped for S-SSS (if the BW of S-SSB is 12 RBs or 24 RBs) or multiplexing of S-SSS and PSBCH (if the BW of S-SSB is larger than 12 RBs such as 20 RBs), and the fourth, fifth, seventh, eighth, ninth, eleventh, and thirteenth symbols in the S-SSB (i.e., symbols #3, #4, #6, #7, #9, #10, and #12 in term of the symbol index within the slot) are mapped for PSBCH.

In another example (e.g., 1402 in FIG. 14A), symbols #0 to #12 are mapped for the S-SSB within the slot, wherein: the first, second, and third symbols in the S-SSB (i.e., symbols #0, #1, and #2 in term of the symbol index within the slot) are mapped for S-PSS, the eleventh, twelfth, and thirteenth symbols in the S-SSB (i.e., symbols #10, #11, and #12 in term of the symbol index within the slot) are mapped for S-SSS (if the BW of S-SSB is 12 RBs or 24 RBs) or multiplexing of S-SSS and PSBCH (if the BW of S-SSB is larger than 12 RBs such as 20 RBs), and the fourth, fifth, sixth, seventh, eighth, ninth, and tenth symbols in the S-SSB (i.e., symbols #3, #4, #5, #6, #7, #8, and #9 in term of the symbol index within the slot) are mapped for PSBCH.

In yet another example (e.g., 1403 in FIG. 14A), symbols #0 to #12 are mapped for the S-SSB within the slot, wherein: the first, second, and third symbols in the S-SSB (i.e., symbols #0, #1, and #2 in term of the symbol index within the slot) are mapped for S-PSS, the fifth, eighth, and eleventh symbols in the S-SSB (i.e., symbols #4, #7, and #10 in term of the symbol index within the slot) are mapped for S-SSS (if the BW of S-SSB is 12 RBs or 24 RBs) or multiplexing of S-SSS and PSBCH (if the BW of S-SSB is larger than 12 RBs such as 20 RBs), and the fourth, sixth, seventh, ninth, tenth, twelfth, and thirteenth symbols in the S-SSB (i.e., symbols #3, #5, #6, #8, #9, #11, and #12 in term of the symbol index within the slot) are mapped for PSBCH.

In yet another example (e.g., 1404 in FIG. 14A), symbols #0 to #12 are mapped for the S-SSB within the slot, wherein: the first, second, and third symbols in the S-SSB (i.e., symbols #0, #1, and #2 in term of the symbol index within the slot) are mapped for S-PSS, the seventh, eighth, and ninth symbols in the S-SSB (i.e., symbols #6, #7, and #8 in term of the symbol index within the slot) are mapped for S-SSS (if the BW of S-SSB is 12 RBs or 24 RBs) or multiplexing of S-SSS and PSBCH (if the BW of S-SSB is larger than 12 RBs such as 20 RBs), and the fourth, fifth, sixth, tenth, eleventh, twelfth, and thirteenth symbols in the S-SSB (i.e., symbols #3, #4, #5, #9, #10, #11, and #12 in term of the symbol index within the slot) are mapped for PSBCH.

In yet another example (e.g., 1405 in FIG. 14A), symbols #0 to #12 are mapped for the S-SSB within the slot, wherein: the first, second, and third symbols in the S-SSB (i.e., symbols #0, #1, and #2 in term of the symbol index within the slot) are mapped for S-PSS, the eighth, ninth, and tenth symbols in the S-SSB (i.e., symbols #7, #8, and #9 in term of the symbol index within the slot) are mapped for S-SSS (if the BW of S-SSB is 12 RBs or 24 RBs) or multiplexing of S-SSS and PSBCH (if the BW of S-SSB is larger than 12 RBs such as 20 RBs), and the fourth, fifth, sixth, seventh, eleventh, twelfth, and thirteenth symbols in the S-SSB (i.e., symbols #3, #4, #5, #6, #10, #11, and #12 in term of the symbol index within the slot) are mapped for PSBCH.

In yet another example (e.g., 1411 in FIG. 14B), symbols #0 to #12 are mapped for the S-SSB within the slot, wherein: the first, second, third, and fourth symbols in the S-SSB (i.e., symbols #0, #1, #2, and #3 in term of the symbol index within the slot) are mapped for S-PSS, the sixth, eighth, tenth, and twelfth symbols in the S-SSB (i.e., symbols #5, #7, #9, and #11 in term of the symbol index within the slot) are mapped for S-SSS (if the BW of S-SSB is 12 RBs or 24 RBs) or multiplexing of S-SSS and PSBCH (if the BW of S-SSB is larger than 12 RBs such as 20 RBs), and the fifth, seventh, ninth, eleventh, and thirteenth symbols in the S-SSB (i.e., symbols #4, #6, #8, #10, and #12 in term of the symbol index within the slot) are mapped for PSBCH.

In yet another example (e.g., 1412 in FIG. 14B), symbols #0 to #12 are mapped for the S-SSB within the slot, wherein: the first, second, third, and fourth symbols in the S-SSB (i.e., symbols #0, #1, #2, and #3 in term of the symbol index within the slot) are mapped for S-PSS, the tenth, eleventh, twelfth, and thirteenth symbols in the S-SSB (i.e., symbols #9, #10, #11, and #12 in term of the symbol index within the slot) are mapped for S-SSS (if the BW of S-SSB is 12 RBs or 24 RBs) or multiplexing of S-SSS and PSBCH (if the BW of S-SSB is larger than 12 RBs such as 20 RBs), and the fifth, sixth, seventh, eighth, and ninth symbols in the S-SSB (i.e., symbols #4, #5, #6, #7, and #8 in term of the symbol index within the slot) are mapped for PSBCH.

In yet another example (e.g., 1413 in FIG. 14B), symbols #0 to #12 are mapped for the S-SSB within the slot, wherein: the first, second, third, and fourth symbols in the S-SSB (i.e., symbols #0, #1, #2, and #3 in term of the symbol index within the slot) are mapped for S-PSS, the eighth, ninth, tenth, and eleventh symbols in the S-SSB (i.e., symbols #7, #8, #9, and #10 in term of the symbol index within the slot) are mapped for S-SSS (if the BW of S-SSB is 12 RBs or 24 RBs) or multiplexing of S-SSS and PSBCH (if the BW of S-SSB is larger than 12 RBs such as 20 RBs), and the fifth, sixth, seventh, twelfth, and thirteenth symbols in the S-SSB (i.e., symbols #4, #5, #6, #11, and #12 in term of the symbol index within the slot) are mapped for PSBCH.

In yet another example (e.g., 1414 in FIG. 14B), symbols #0 to #12 are mapped for the S-SSB within the slot, wherein: the first, second, third, and fourth symbols in the S-SSB (i.e., symbols #0, #1, #2, and #3 in term of the symbol index within the slot) are mapped for S-PSS, the seventh, eighth, ninth, and tenth symbols in the S-SSB (i.e., symbols #6, #7, #8, and #9 in term of the symbol index within the slot) are mapped for S-SSS (if the BW of S-SSB is 12 RBs or 24

RBs) or multiplexing of S-SSS and PSBCH (if the BW of S-SSB is larger than 12 RBs such as 20 RBs), and the fifth, sixth, eleventh, twelfth, and thirteenth symbols in the S-SSB (i.e., symbols #4, #5, #10, #11, and #12 in term of the symbol index within the slot) are mapped for PSBCH.

In yet another example (e.g., 1415 in FIG. 14B), symbols #0 to #12 are mapped for the S-SSB within the slot, wherein: the first, second, third, and fourth symbols in the S-SSB (i.e., symbols #0, #1, #2, and #3 in term of the symbol index within the slot) are mapped for S-PSS, the seventh, eighth, tenth, and eleventh symbols in the S-SSB (i.e., symbols #6, #7, #9, and #10 in term of the symbol index within the slot) are mapped for S-SSS (if the BW of S-SSB is 12 RBs or 24 RBs) or multiplexing of S-SSS and PSBCH (if the BW of S-SSB is larger than 12 RBs such as 20 RBs), and the fifth, sixth, ninth, twelfth, and thirteenth symbols in the S-SSB (i.e., symbols #4, #5, #8, #11, and #12 in term of the symbol index within the slot) are mapped for PSBCH.

In yet another example (e.g., 1416 in FIG. 14B), symbols #0 to #12 are mapped for the S-SSB within the slot, wherein: the first, second, third, and fourth symbols in the S-SSB (i.e., symbols #0, #1, #2, and #3 in term of the symbol index within the slot) are mapped for S-PSS, the sixth, seventh, eleventh, and twelfth symbols in the S-SSB (i.e., symbols #5, #6, #10, and #11 in term of the symbol index within the slot) are mapped for S-SSS (if the BW of S-SSB is 12 RBs or 24 RBs) or multiplexing of S-SSS and PSBCH (if the BW of S-SSB is larger than 12 RBs such as 20 RBs), and the fifth, eighth, ninth, tenth, and thirteenth symbols in the S-SSB (i.e., symbols #4, #7, #8, #9, and #12 in term of the symbol index within the slot) are mapped for PSBCH.

In yet another example (e.g., 1421 in FIG. 14C), symbols #0 to #12 are mapped for the S-SSB within the slot, wherein: the second, third, and fourth symbols in the S-SSB (i.e., symbols #1, #2, and #3 in term of the symbol index within the slot) are mapped for S-PSS, the sixth, ninth, and twelfth symbols in the S-SSB (i.e., symbols #5, #8, and #11 in term of the symbol index within the slot) are mapped for S-SSS (if the BW of S-SSB is 12 RBs or 24 RBs) or multiplexing of S-SSS and PSBCH (if the BW of S-SSB is larger than 12 RBs such as 20 RBs), and the first, fifth, seventh, eighth, tenth, eleventh, and thirteenth symbols in the S-SSB (i.e., symbols #0, #4, #6, #7, #9, #10, and #12 in term of the symbol index within the slot) are mapped for PSBCH.

In yet another example (e.g., 1422 in FIG. 14C), symbols #0 to #12 are mapped for the S-SSB within the slot, wherein: the second, third, and fourth symbols in the S-SSB (i.e., symbols #1, #2, and #3 in term of the symbol index within the slot) are mapped for S-PSS, the eleventh, twelfth, and thirteenth symbols in the S-SSB (i.e., symbols #10, #11, and #12 in term of the symbol index within the slot) are mapped for S-SSS (if the BW of S-SSB is 12 RBs or 24 RBs) or multiplexing of S-SSS and PSBCH (if the BW of S-SSB is larger than 12 RBs such as 20 RBs), and the first, fifth, sixth, seventh, eighth, ninth, and tenth symbols in the S-SSB (i.e., symbols #0, #4, #5, #6, #7, #8, and #9 in term of the symbol index within the slot) are mapped for PSBCH.

In yet another example (e.g., 1423 in FIG. 14C), symbols #0 to #12 are mapped for the S-SSB within the slot, wherein: the second, third, and fourth symbols in the S-SSB (i.e., symbols #1, #2, and #3 in term of the symbol index within the slot) are mapped for S-PSS, the eighth, ninth, and tenth symbols in the S-SSB (i.e., symbols #7, #8, and #9 in term of the symbol index within the slot) are mapped for S-SSS (if the BW of S-SSB is 12 RBs or 24 RBs) or multiplexing of S-SSS and PSBCH (if the BW of S-SSB is larger than 12 RBs such as 20 RBs), and the first, fifth, sixth, seventh, eleventh, twelfth, and thirteenth symbols in the S-SSB (i.e., symbols #0, #4, #5, #6, #10, #11, and #12 in term of the symbol index within the slot) are mapped for PSBCH.

In yet another example (e.g., 1424 in FIG. 14C), symbols #0 to #12 are mapped for the S-SSB within the slot, wherein: the second, third, and fourth symbols in the S-SSB (i.e., symbols #1, #2, and #3 in term of the symbol index within the slot) are mapped for S-PSS, the fifth, eighth, and eleventh symbols in the S-SSB (i.e., symbols #4, #7, and #10 in term of the symbol index within the slot) are mapped for S-SSS (if the BW of S-SSB is 12 RBs or 24 RBs) or multiplexing of S-SSS and PSBCH (if the BW of S-SSB is larger than 12 RBs such as 20 RBs), and the first, sixth, seventh, ninth, tenth, twelfth, and thirteenth symbols in the S-SSB (i.e., symbols #0, #5, #6, #8, #9, #11, and #12 in term of the symbol index within the slot) are mapped for PSBCH.

In yet another example (e.g., 1431 in FIG. 14D), symbols #0 to #12 are mapped for the S-SSB within the slot, wherein: the second, and third symbols in the S-SSB (i.e., symbols #1, and #2 in term of the symbol index within the slot) are mapped for S-PSS, the sixth, and tenth symbols in the S-SSB (i.e., symbols #5, and #9 in term of the symbol index within the slot) are mapped for S-SSS (if the BW of S-SSB is 12 RBs or 24 RBs) or multiplexing of S-SSS and PSBCH (if the BW of S-SSB is larger than 12 RBs such as 20 RBs), and the first, fourth, fifth, seventh, eighth, ninth, eleventh, twelfth, and thirteenth symbols in the S-SSB (i.e., symbols #0, #3, #4, #6, #7, #8, #10, #11, and #12 in term of the symbol index within the slot) are mapped for PSBCH.

In yet another example (e.g., 1432 in FIG. 14D), symbols #0 to #12 are mapped for the S-SSB within the slot, wherein: the second, and third symbols in the S-SSB (i.e., symbols #1, and #2 in term of the symbol index within the slot) are mapped for S-PSS, the twelfth, and thirteenth symbols in the S-SSB (i.e., symbols #11, and #12 in term of the symbol index within the slot) are mapped for S-SSS (if the BW of S-SSB is 12 RBs or 24 RBs) or multiplexing of S-SSS and PSBCH (if the BW of S-SSB is larger than 12 RBs such as 20 RBs), and the first, fourth, fifth, sixth, seventh, eighth, ninth, tenth, and eleventh symbols in the S-SSB (i.e., symbols #0, #3, #4, #5, #6, #7, #8, #9, and #10 in term of the symbol index within the slot) are mapped for PSBCH.

In yet another example (e.g., 1433 in FIG. 14D), symbols #0 to #12 are mapped for the S-SSB within the slot, wherein: the second, and third symbols in the S-SSB (i.e., symbols #1, and #2 in term of the symbol index within the slot) are mapped for S-PSS, the eighth, and ninth symbols in the S-SSB (i.e., symbols #7, and #8 in term of the symbol index within the slot) are mapped for S-SSS (if the BW of S-SSB is 12 RBs or 24 RBs) or multiplexing of S-SSS and PSBCH (if the BW of S-SSB is larger than 12 RBs such as 20 RBs), and the first, fourth, fifth, sixth, seventh, tenth, eleventh, twelfth, and thirteenth symbols in the S-SSB (i.e., symbols #0, #3, #4, #5, #6, #9, #10, #11, and #12 in term of the symbol index within the slot) are mapped for PSBCH.

In yet another example (e.g., 1434 in FIG. 14D), symbols #0 to #12 are mapped for the S-SSB within the slot, wherein: the second, and third symbols in the S-SSB (i.e., symbols #1, and #2 in term of the symbol index within the slot) are mapped for S-PSS, the fourth, and ninth symbols in the S-SSB (i.e., symbols #3, and #8 in term of the symbol index within the slot) are mapped for S-SSS (if the BW of S-SSB is 12 RBs or 24 RBs) or multiplexing of S-SSS and PSBCH (if the BW of S-SSB is larger than 12 RBs such as 20 RBs), and the first, fifth, sixth, seventh, eighth, tenth, eleventh, twelfth, and thirteenth symbols in the S-SSB (i.e., symbols

0, #4, #5, #6, #7, #9, #10, #11, and #12 in term of the symbol index within the slot) are mapped for PSBCH.

In yet another example (e.g., 1435 in FIG. 14D), symbols #0 to #12 are mapped for the S-SSB within the slot, wherein: the second, and third symbols in the S-SSB (i.e., symbols #1, and #2 in term of the symbol index within the slot) are mapped for S-PSS, the fifth, and ninth symbols in the S-SSB (i.e., symbols #4, and #8 in term of the symbol index within the slot) are mapped for S-SSS (if the BW of S-SSB is 12 RBs or 24 RBs) or multiplexing of S-SSS and PSBCH (if the BW of S-SSB is larger than 12 RBs such as 20 RBs), and the first, fourth, sixth, seventh, eighth, tenth, eleventh, twelfth, and thirteenth symbols in the S-SSB (i.e., symbols #0, #3, #5, #6, #7, #9, #10, #11, and #12 in term of the symbol index within the slot) are mapped for PSBCH.

In yet another example (e.g., 1436 in FIG. 14D), symbols #0 to #12 are mapped for the S-SSB within the slot, wherein: the second, and third symbols in the S-SSB (i.e., symbols #1, and #2 in term of the symbol index within the slot) are mapped for S-PSS, the fifth, and tenth symbols in the S-SSB (i.e., symbols #4, and #9 in term of the symbol index within the slot) are mapped for S-SSS (if the BW of S-SSB is 12 RBs or 24 RBs) or multiplexing of S-SSS and PSBCH (if the BW of S-SSB is larger than 12 RBs such as 20 RBs), and the first, fourth, sixth, seventh, eighth, ninth, eleventh, twelfth, and thirteenth symbols in the S-SSB (i.e., symbols #0, #3, #5, #6, #7, #8, #10, #11, and #12 in term of the symbol index within the slot) are mapped for PSBCH.

In yet another example (e.g., 1441 in FIG. 14E), symbols #0 to #12 are mapped for the S-SSB within the slot, wherein: the second, third, fourth, and fifth symbols in the S-SSB (i.e., symbols #1, #2, #3, and #4 in term of the symbol index within the slot) are mapped for S-PSS, the eighth, ninth, tenth, and eleventh symbols in the S-SSB (i.e., symbols #7, #8, #9, and #10 in term of the symbol index within the slot) are mapped for S-SSS (if the BW of S-SSB is 12 RBs or 24 RBs) or multiplexing of S-SSS and PSBCH (if the BW of S-SSB is larger than 12 RBs such as 20 RBs), and the first, sixth, seventh, twelfth, and thirteenth symbols in the S-SSB (i.e., symbols #0, #5, #6, #11, and #12 in term of the symbol index within the slot) are mapped for PSBCH.

In yet another example (e.g., 1442 in FIG. 14E), symbols #0 to #12 are mapped for the S-SSB within the slot, wherein: the second, third, fourth, and fifth symbols in the S-SSB (i.e., symbols #1, #2, #3, and #4 in term of the symbol index within the slot) are mapped for S-PSS, the tenth, eleventh, twelfth, and thirteenth symbols in the S-SSB (i.e., symbols #9, #10, #11, and #12 in term of the symbol index within the slot) are mapped for S-SSS (if the BW of S-SSB is 12 RBs or 24 RBs) or multiplexing of S-SSS and PSBCH (if the BW of S-SSB is larger than 12 RBs such as 20 RBs), and the first, sixth, seventh, eighth, and ninth symbols in the S-SSB (i.e., symbols #0, #5, #6, #7, and #8 in term of the symbol index within the slot) are mapped for PSBCH.

In a seventeenth example (e.g., 1443 in FIG. 14E), symbols #0 to #12 are mapped for the S-SSB within the slot, wherein: the second, third, fourth, and fifth symbols in the S-SSB (i.e., symbols #1, #2, #3, and #4 in term of the symbol index within the slot) are mapped for S-PSS, the seventh, ninth, eleventh, and thirteenth symbols in the S-SSB (i.e., symbols #6, #8, #10, and #12 in term of the symbol index within the slot) are mapped for S-SSS (if the BW of S-SSB is 12 RBs or 24 RBs) or multiplexing of S-SSS and PSBCH (if the BW of S-SSB is larger than 12 RBs such as 20 RBs), and the first, sixth, eighth, tenth, and twelfth symbols in the S-SSB (i.e., symbols #0, #5, #7, #9, and #11 in term of the symbol index within the slot) are mapped for PSBCH.

In yet another example (e.g., 1444 in FIG. 14E), symbols #0 to #12 are mapped for the S-SSB within the slot, wherein: the second, third, fourth, and fifth symbols in the S-SSB (i.e., symbols #1, #2, #3, and #4 in term of the symbol index within the slot) are mapped for S-PSS, the sixth, eighth, tenth, and twelfth symbols in the S-SSB (i.e., symbols #5, #7, #9, and #11 in term of the symbol index within the slot) are mapped for S-SSS (if the BW of S-SSB is 12 RBs or 24 RBs) or multiplexing of S-SSS and PSBCH (if the BW of S-SSB is larger than 12 RBs such as 20 RBs), and the first, seventh, ninth, eleventh, and thirteenth symbols in the S-SSB (i.e., symbols #0, #6, #8, #10, and #12 in term of the symbol index within the slot) are mapped for PSBCH.

FIG. 15A, FIG. 15B, and FIG. 15C illustrate examples of this embodiment wherein one slot with 14 symbols contains one PSBCH block (SSB), and the PSBCH block contains 14 symbols, and no symbol in the slot is reserved for other purpose. In one consideration, each PSBCH block contains 3 symbols for S-PSS, 3 symbols for S-SSS or multiplexing of S-SSS and PSBCH, and 8 symbols for PSBCH. In another consideration, each PSBCH block contains 2 symbols for S-PSS, 2 symbols for S-SSS or multiplexing of S-SSS and PSBCH, and 10 symbols for PSBCH. In yet another consideration, each PSBCH block contains 4 symbols for S-PSS, 4 symbols for S-SSS or multiplexing of S-SSS and PSBCH, and 6 symbols for PSBCH.

In one example (e.g., 1501 in FIG. 15A), symbols #0 to #13 are mapped for the S-SSB within the slot, wherein: the first, second, and third symbols in the S-SSB (i.e., symbols #0, #1, and #2 in term of the symbol index within the slot) are mapped for S-PSS, the sixth, ninth, and twelfth symbols in the S-SSB (i.e., symbols #5, #8, and #11 in term of the symbol index within the slot) are mapped for S-SSS (if the BW of S-SSB is 12 RBs or 24 RBs) or multiplexing of S-SSS and PSBCH (if the BW of S-SSB is larger than 12 RBs such as 20 RBs), and the fourth, fifth, seventh, eighth, ninth, eleventh, thirteenth, and fourteenth symbols in the S-SSB (i.e., symbols #3, #4, #6, #7, #9, #10, #12, and #13 in term of the symbol index within the slot) are mapped for PSBCH.

In another example (e.g., 1502 in FIG. 15A), symbols #0 to #13 are mapped for the S-SSB within the slot, wherein: the first, second, and third symbols in the S-SSB (i.e., symbols #0, #1, and #2 in term of the symbol index within the slot) are mapped for S-PSS, the twelfth, thirteenth, and fourteenth symbols in the S-SSB (i.e., symbols #11, #12, and #13 in term of the symbol index within the slot) are mapped for S-SSS (if the BW of S-SSB is 12 RBs or 24 RBs) or multiplexing of S-SSS and PSBCH (if the BW of S-SSB is larger than 12 RBs such as 20 RBs), and the fourth, fifth, seventh, eighth, ninth, eleventh, thirteenth, and fourteenth symbols in the S-SSB (i.e., symbols #3, #4, #6, #7, #9, #10, #12, and #13 in term of the symbol index within the slot) are mapped for PSBCH.

In a third example (e.g., 1503 in FIG. 15A), symbols #0 to #13 are mapped for the S-SSB within the slot, wherein: the first, second, and third symbols in the S-SSB (i.e., symbols #0, #1, and #2 in term of the symbol index within the slot) are mapped for S-PSS, the eighth, ninth, and tenth symbols in the S-SSB (i.e., symbols #7, #8, and #9 in term of the symbol index within the slot) are mapped for S-SSS (if the BW of S-SSB is 12 RBs or 24 RBs) or multiplexing of S-SSS and PSBCH (if the BW of S-SSB is larger than 12 RBs such as 20 RBs), and the fourth, fifth, sixth, seventh, eleventh, twelfth, thirteenth, and fourteenth symbols in the S-SSB (i.e., symbols #3, #4, #5, #6, #10, #11, #12, and #13 in term of the symbol index within the slot) are mapped for PSBCH.

In yet another example (e.g., 1504 in FIG. 15A), symbols #0 to #13 are mapped for the S-SSB within the slot, wherein: the first, second, third, and fourth symbols in the S-SSB (i.e., symbols #0, #1, #2, and #3 in term of the symbol index within the slot) are mapped for S-PSS, the eighth, ninth, tenth, and eleventh symbols in the S-SSB (i.e., symbols #7, #8, #9, and #10 in term of the symbol index within the slot) are mapped for S-SSS (if the BW of S-SSB is 12 RBs or 24 RBs) or multiplexing of S-SSS and PSBCH (if the BW of S-SSB is larger than 12 RBs such as 20 RBs), and the fifth, sixth, seventh, twelfth, thirteenth, and fourteenth symbols in the S-SSB (i.e., symbols #4, #5, #6, #11, #12, and #13 in term of the symbol index within the slot) are mapped for PSBCH.

In yet another example (e.g., 1505 in FIG. 15A), symbols #0 to #13 are mapped for the S-SSB within the slot, wherein: the first, second, third, and fourth symbols in the S-SSB (i.e., symbols #0, #1, #2, and #3 in term of the symbol index within the slot) are mapped for S-PSS, the eleventh, twelfth, thirteenth, and fourteenth symbols in the S-SSB (i.e., symbols #10, #11, #12, and #13 in term of the symbol index within the slot) are mapped for S-SSS (if the BW of S-SSB is 12 RBs or 24 RBs) or multiplexing of S-SSS and PSBCH (if the BW of S-SSB is larger than 12 RBs such as 20 RBs), and the fifth, sixth, seventh, eighth, ninth, and tenth symbols in the S-SSB (i.e., symbols #4, #5, #6, #7, #8, and #9 in term of the symbol index within the slot) are mapped for PSBCH.

In yet another example (e.g., 1506 in FIG. 15A), symbols #0 to #13 are mapped for the S-SSB within the slot, wherein: the first, second, third, and fourth symbols in the S-SSB (i.e., symbols #0, #1, #2, and #3 in term of the symbol index within the slot) are mapped for S-PSS, the seventh, eighth, eleventh, and twelfth symbols in the S-SSB (i.e., symbols #6, #7, #10, and #11 in term of the symbol index within the slot) are mapped for S-SSS (if the BW of S-SSB is 12 RBs or 24 RBs) or multiplexing of S-SSS and PSBCH (if the BW of S-SSB is larger than 12 RBs such as 20 RBs), and the fifth, sixth, ninth, tenth, thirteenth, and fourteenth symbols in the S-SSB (i.e., symbols #4, #5, #8, #9, #12, and #13 in term of the symbol index within the slot) are mapped for PSBCH.

In yet another example (e.g., 1511 in FIG. 15B), symbols #0 to #13 are mapped for the S-SSB within the slot, wherein: the second, third, and fourth symbols in the S-SSB (i.e., symbols #1, #2, and #3 in term of the symbol index within the slot) are mapped for S-PSS, the seventh, tenth, and thirteenth symbols in the S-SSB (i.e., symbols #6, #9, and #12 in term of the symbol index within the slot) are mapped for S-SSS (if the BW of S-SSB is 12 RBs or 24 RBs) or multiplexing of S-SSS and PSBCH (if the BW of S-SSB is larger than 12 RBs such as 20 RBs), and the first, fifth, sixth, eighth, ninth, eleventh, twelfth, and fourteenth symbols in the S-SSB (i.e., symbols #0, #4, #5, #7, #8, #10, #11, and #13 in term of the symbol index within the slot) are mapped for PSBCH.

In yet another example (e.g., 1512 in FIG. 15B), symbols #0 to #13 are mapped for the S-SSB within the slot, wherein: the second, third, and fourth symbols in the S-SSB (i.e., symbols #1, #2, and #3 in term of the symbol index within the slot) are mapped for S-PSS, the twelfth, thirteenth, and fourteenth symbols in the S-SSB (i.e., symbols #11, #12, and #13 in term of the symbol index within the slot) are mapped for S-SSS (if the BW of S-SSB is 12 RBs or 24 RBs) or multiplexing of S-SSS and PSBCH (if the BW of S-SSB is larger than 12 RBs such as 20 RBs), and the first, fifth, sixth, seventh, eighth, ninth, tenth, and eleventh symbols in the S-SSB (i.e., symbols #0, #4, #5, #6, #7, #8, #9, and #10 in term of the symbol index within the slot) are mapped for PSBCH.

In yet another example (e.g., 1513 in FIG. 15B), symbols #0 to #13 are mapped for the S-SSB within the slot, wherein: the second, third, and fourth symbols in the S-SSB (i.e., symbols #1, #2, and #3 in term of the symbol index within the slot) are mapped for S-PSS, the eighth, ninth, and tenth symbols in the S-SSB (i.e., symbols #7, #8, and #9 in term of the symbol index within the slot) are mapped for S-SSS (if the BW of S-SSB is 12 RBs or 24 RBs) or multiplexing of S-SSS and PSBCH (if the BW of S-SSB is larger than 12 RBs such as 20 RBs), and the first, fifth, sixth, seventh, eleventh, twelfth, thirteenth, and fourteenth symbols in the S-SSB (i.e., symbols #0, #4, #5, #6, #10, #11, #12, and #13 in term of the symbol index within the slot) are mapped for PSBCH.

In yet another example (e.g., 1514 in FIG. 15B), symbols #0 to #13 are mapped for the S-SSB within the slot, wherein: the second, third, and fourth symbols in the S-SSB (i.e., symbols #1, #2, and #3 in term of the symbol index within the slot) are mapped for S-PSS, the ninth, tenth, and eleventh symbols in the S-SSB (i.e., symbols #8, #9, and #10 in term of the symbol index within the slot) are mapped for S-SSS (if the BW of S-SSB is 12 RBs or 24 RBs) or multiplexing of S-SSS and PSBCH (if the BW of S-SSB is larger than 12 RBs such as 20 RBs), and the first, fifth, sixth, seventh, eighth, twelfth, thirteenth, and fourteenth symbols in the S-SSB (i.e., symbols #0, #4, #5, #6, #7, #11, #12, and #13 in term of the symbol index within the slot) are mapped for PSBCH.

In yet another example (e.g., 1521 in FIG. 15C), symbols #0 to #13 are mapped for the S-SSB within the slot, wherein: the second, third, fourth, and fifth symbols in the S-SSB (i.e., symbols #1, #2, #3, and #4 in term of the symbol index within the slot) are mapped for S-PSS, the eleventh, twelfth, thirteenth, and fourteenth symbols in the S-SSB (i.e., symbols #10, #11, #12, and #13 in term of the symbol index within the slot) are mapped for S-SSS (if the BW of S-SSB is 12 RBs or 24 RBs) or multiplexing of S-SSS and PSBCH (if the BW of S-SSB is larger than 12 RBs such as 20 RBs), and the first, sixth, seventh, eighth, ninth, and tenth symbols in the S-SSB (i.e., symbols #0, #5, #6, #7, #8, and #9 in term of the symbol index within the slot) are mapped for PSBCH.

In yet another example (e.g., 1522 in FIG. 15C), symbols #0 to #13 are mapped for the S-SSB within the slot, wherein: the second, third, fourth, and fifth symbols in the S-SSB (i.e., symbols #1, #2, #3, and #4 in term of the symbol index within the slot) are mapped for S-PSS, the seventh, eighth, eleventh, and twelfth symbols in the S-SSB (i.e., symbols #6, #7, #10, and #11 in term of the symbol index within the slot) are mapped for S-SSS (if the BW of S-SSB is 12 RBs or 24 RBs) or multiplexing of S-SSS and PSBCH (if the BW of S-SSB is larger than 12 RBs such as 20 RBs), and the first, sixth, ninth, tenth, thirteenth, and fourteenth symbols in the S-SSB (i.e., symbols #0, #5, #8, #9, #12, and #13 in term of the symbol index within the slot) are mapped for PSBCH.

In yet another example (e.g., 1523 in FIG. 15C), symbols #0 to #13 are mapped for the S-SSB within the slot, wherein: the second, third, fourth, and fifth symbols in the S-SSB (i.e., symbols #1, #2, #3, and #4 in term of the symbol index within the slot) are mapped for S-PSS, the eighth, ninth, tenth, and eleventh symbols in the S-SSB (i.e., symbols #7, #8, #9, and #10 in term of the symbol index within the slot)

are mapped for S-SSS (if the BW of S-SSB is 12 RBs or 24 RBs) or multiplexing of S-SSS and PSBCH (if the BW of S-SSB is larger than 12 RBs such as 20 RBs), and the first, sixth, seventh, twelfth, thirteenth, and fourteenth symbols in the S-SSB (i.e., symbols #0, #5, #6, #11, #12, and #13 in term of the symbol index within the slot) are mapped for PSBCH.

In yet another example (e.g., 1524 in FIG. 15C), symbols #0 to #13 are mapped for the S-SSB within the slot, wherein: the second, third, fourth, and fifth symbols in the S-SSB (i.e., symbols #1, #2, #3, and #4 in term of the symbol index within the slot) are mapped for S-PSS, the ninth, tenth, eleventh, and twelfth symbols in the S-SSB (i.e., symbols #8, #9, #10, and #11 in term of the symbol index within the slot) are mapped for S-SSS (if the BW of S-SSB is 12 RBs or 24 RBs) or multiplexing of S-SSS and PSBCH (if the BW of S-SSB is larger than 12 RBs such as 20 RBs), and the first, sixth, seventh, eighth, thirteenth, and fourteenth symbols in the S-SSB (i.e., symbols #0, #5, #6, #7, #12, and #13 in term of the symbol index within the slot) are mapped for PSBCH.

In yet another example (e.g., 1525 in FIG. 15C), symbols #0 to #13 are mapped for the S-SSB within the slot, wherein: the second, third, fourth, and fifth symbols in the S-SSB (i.e., symbols #1, #2, #3, and #4 in term of the symbol index within the slot) are mapped for S-PSS, the eighth, ninth, twelfth, and thirteenth symbols in the S-SSB (i.e., symbols #7, #8, #11, and #12 in term of the symbol index within the slot) are mapped for S-SSS (if the BW of S-SSB is 12 RBs or 24 RBs) or multiplexing of S-SSS and PSBCH (if the BW of S-SSB is larger than 12 RBs such as 20 RBs), and the first, sixth, seventh, tenth, eleventh, and fourteenth symbols in the S-SSB (i.e., symbols #0, #5, #6, #9, #10, and #13 in term of the symbol index within the slot) are mapped for PSBCH.

FIG. 16A and FIG. 16B illustrate examples of this embodiment wherein one slot with 12 symbols (e.g., for extended CP) contains one PSBCH block (SSB), and the PSBCH block contains 11 symbols, and one symbol (e.g., the last symbol) in the slot is reserved for other purpose such as transmission-to-reception (TX/RX) switch gap. In one consideration, each PSBCH block contains 3 symbols for S-PSS, 3 symbols for S-SSS or multiplexing of S-SSS and PSBCH, and 5 symbols for PSBCH. In another consideration, each PSBCH block contains 2 symbols for S-PSS, 2 symbols for S-SSS or multiplexing of S-SSS and PSBCH, and 7 symbols for PSBCH. In yet another consideration, each PSBCH block contains 4 symbols for S-PSS, 4 symbols for S-SSS or multiplexing of S-SSS and PSBCH, and 3 symbols for PSBCH.

In one example (e.g., 1601 in FIG. 16A), symbols #0 to #10 are mapped for the S-SSB within the slot, wherein: the second, and third symbols in the S-SSB (i.e., symbols #1, and #2 in term of the symbol index within the slot) are mapped for S-PSS, the sixth, and ninth symbols in the S-SSB (i.e., symbols #5, and #8 in term of the symbol index within the slot) are mapped for S-SSS (if the BW of S-SSB is 12 RBs or 24 RBs) or multiplexing of S-SSS and PSBCH (if the BW of S-SSB is larger than 12 RBs such as 20 RBs), and the first, fourth, fifth, seventh, eighth, tenth, and eleventh symbols in the S-SSB (i.e., symbols #0, #3, #4, #6, #7, #9, and #10 in term of the symbol index within the slot) are mapped for PSBCH.

In another example (e.g., 1602 in FIG. 16A), symbols #0 to #10 are mapped for the S-SSB within the slot, wherein: the second, and third symbols in the S-SSB (i.e., symbols #1, and #2 in term of the symbol index within the slot) are mapped for S-PSS, the seventh, and eighth symbols in the S-SSB (i.e., symbols #6, and #7 in term of the symbol index within the slot) are mapped for S-SSS (if the BW of S-SSB is 12 RBs or 24 RBs) or multiplexing of S-SSS and PSBCH (if the BW of S-SSB is larger than 12 RBs such as 20 RBs), and the first, fourth, fifth, sixth, ninth, tenth, and eleventh symbols in the S-SSB (i.e., symbols #0, #3, #4, #5, #8, #9, and #10 in term of the symbol index within the slot) are mapped for PSBCH.

In yet another example (e.g., 1603 in FIG. 16A), symbols #0 to #10 are mapped for the S-SSB within the slot, wherein: the second, and third symbols in the S-SSB (i.e., symbols #1, and #2 in term of the symbol index within the slot) are mapped for S-PSS, the fifth, and ninth symbols in the S-SSB (i.e., symbols #4, and #8 in term of the symbol index within the slot) are mapped for S-SSS (if the BW of S-SSB is 12 RBs or 24 RBs) or multiplexing of S-SSS and PSBCH (if the BW of S-SSB is larger than 12 RBs such as 20 RBs), and the first, fourth, sixth, seventh, eighth, tenth, and eleventh symbols in the S-SSB (i.e., symbols #0, #3, #5, #6, #7, #9, and #10 in term of the symbol index within the slot) are mapped for PSBCH.

In yet another example (e.g., 1604 in FIG. 16A), symbols #0 to #10 are mapped for the S-SSB within the slot, wherein: the second, and third symbols in the S-SSB (i.e., symbols #1, and #2 in term of the symbol index within the slot) are mapped for S-PSS, the fifth, and eighth symbols in the S-SSB (i.e., symbols #4, and #7 in term of the symbol index within the slot) are mapped for S-SSS (if the BW of S-SSB is 12 RBs or 24 RBs) or multiplexing of S-SSS and PSBCH (if the BW of S-SSB is larger than 12 RBs such as 20 RBs), and the first, fourth, sixth, seventh, ninth, tenth, and eleventh symbols in the S-SSB (i.e., symbols #0, #3, #5, #6, #8, #9, and #10 in term of the symbol index within the slot) are mapped for PSBCH.

In yet another example (e.g., 1605 in FIG. 16A), symbols #0 to #10 are mapped for the S-SSB within the slot, wherein: the second, and third symbols in the S-SSB (i.e., symbols #1, and #2 in term of the symbol index within the slot) are mapped for S-PSS, the fourth, and eighth symbols in the S-SSB (i.e., symbols #3, and #7 in term of the symbol index within the slot) are mapped for S-SSS (if the BW of S-SSB is 12 RBs or 24 RBs) or multiplexing of S-SSS and PSBCH (if the BW of S-SSB is larger than 12 RBs such as 20 RBs), and the first, fifth, sixth, seventh, ninth, tenth, and eleventh symbols in the S-SSB (i.e., symbols #0, #4, #5, #6, #8, #9, and #10 in term of the symbol index within the slot) are mapped for PSBCH.

In yet another example (e.g., 1606 in FIG. 16A), symbols #0 to #10 are mapped for the S-SSB within the slot, wherein: the second, and third symbols in the S-SSB (i.e., symbols #1, and #2 in term of the symbol index within the slot) are mapped for S-PSS, the tenth, and eleventh symbols in the S-SSB (i.e., symbols #9, and #10 in term of the symbol index within the slot) are mapped for S-SSS (if the BW of S-SSB is 12 RBs or 24 RBs) or multiplexing of S-SSS and PSBCH (if the BW of S-SSB is larger than 12 RBs such as 20 RBs), and the first, fourth, fifth, sixth, seventh, eighth, and ninth symbols in the S-SSB (i.e., symbols #0, #3, #4, #5, #6, #7, and #8 in term of the symbol index within the slot) are mapped for PSBCH.

In yet another example (e.g., 1611 in FIG. 16B), symbols #0 to #10 are mapped for the S-SSB within the slot, wherein: the second, third, and fourth symbols in the S-SSB (i.e., symbols #1, #2, and #3 in term of the symbol index within the slot) are mapped for S-PSS, the sixth, eighth, and tenth symbols in the S-SSB (i.e., symbols #5, #7, and #9 in term of the symbol index within the slot) are mapped for S-SSS (if the BW of S-SSB is 12 RBs or 24 RBs) or multiplexing of S-SSS and PSBCH (if the BW of S-SSB is larger than 12 RBs such as 20 RBs), and the first, fifth, seventh, ninth, and eleventh symbols in the S-SSB (i.e., symbols #0, #4, #6, #8, and #10 in term of the symbol index within the slot) are mapped for PSBCH.

In yet another example (e.g., 1612 in FIG. 16B), symbols #0 to #10 are mapped for the S-SSB within the slot, wherein: the second, third, and fourth symbols in the S-SSB (i.e., symbols #1, #2, and #3 in term of the symbol index within the slot) are mapped for S-PSS, the fifth, seventh, and ninth symbols in the S-SSB (i.e., symbols #4, #6, and #8 in term of the symbol index within the slot) are mapped for S-SSS (if the BW of S-SSB is 12 RBs or 24 RBs) or multiplexing of S-SSS and PSBCH (if the BW of S-SSB is larger than 12 RBs such as 20 RBs), and the first, sixth, eighth, tenth, and eleventh symbols in the S-SSB (i.e., symbols #0, #5, #7, #9, and #10 in term of the symbol index within the slot) are mapped for PSBCH.

In yet another example (e.g., 1613 in FIG. 16B), symbols #0 to #10 are mapped for the S-SSB within the slot, wherein: the second, third, and fourth symbols in the S-SSB (i.e., symbols #1, #2, and #3 in term of the symbol index within the slot) are mapped for S-PSS, the seventh, eighth, and ninth symbols in the S-SSB (i.e., symbols #6, #7, and #8 in term of the symbol index within the slot) are mapped for S-SSS (if the BW of S-SSB is 12 RBs or 24 RBs) or multiplexing of S-SSS and PSBCH (if the BW of S-SSB is larger than 12 RBs such as 20 RBs), and the first, fifth, sixth, tenth, and eleventh symbols in the S-SSB (i.e., symbols #0, #4, #5, #9, and #10 in term of the symbol index within the slot) are mapped for PSBCH.

In yet another example (e.g., 1614 in FIG. 16B), symbols #0 to #10 are mapped for the S-SSB within the slot, wherein: the second, third, and fourth symbols in the S-SSB (i.e., symbols #1, #2, and #3 in term of the symbol index within the slot) are mapped for S-PSS, the ninth, tenth, and eleventh symbols in the S-SSB (i.e., symbols #8, #9, and #10 in term of the symbol index within the slot) are mapped for S-SSS (if the BW of S-SSB is 12 RBs or 24 RBs) or multiplexing of S-SSS and PSBCH (if the BW of S-SSB is larger than 12 RBs such as 20 RBs), and the first, fifth, sixth, seventh, and eighth symbols in the S-SSB (i.e., symbols #0, #4, #5, #6, and #7 in term of the symbol index within the slot) are mapped for PSBCH.

In a first approach for the time-domain mapping of an S-SSB burst set, contiguous slots containing an S-SSB burst set can be mapped from a predefined location, such as the beginning of the period for transmitting the S-SSB burst set.

Figure 17:
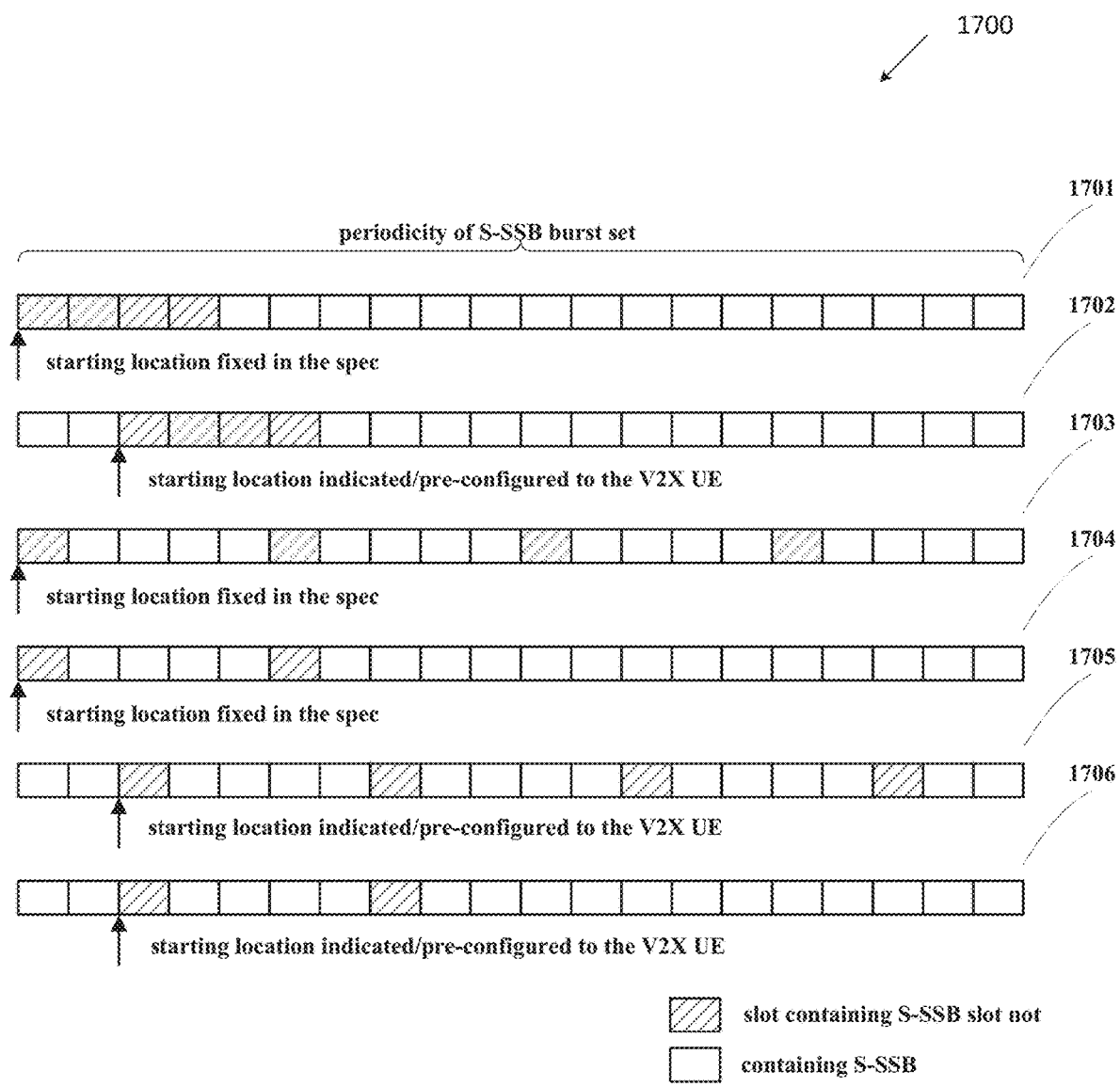
FIG. 17 illustrates an example time-domain mapping of an S-SSB burst set according to embodiments of the present disclosure.

FIG. 17 illustrates an example time-domain mapping of an S-SSB burst set 1700 according to embodiments of the present disclosure. The embodiment of the time-domain mapping of an S-SSB burst set 1700 illustrated in FIG. 17 is for illustration only. FIG. 17 does not limit the scope of this disclosure to any particular implementation.

In one example of this approach (e.g., 1701 in FIG. 17), if the periodicity for transmitting the S-SSB burst set is N slots, and the duration of the S-SSB burst set is M slots, contiguous slots containing an S-SSB burst set can start from the first slot of every period of N slots, e.g., the burst set is mapped to slots #0, #1, . . . , # M−1.

In a second approach for the time-domain mapping of an S-SSB burst set, contiguous slots containing an S-SSB burst set can be mapped from starting from any slot within the period for transmitting the S-SSB burst set. In this approach, the starting location of the S-SSB burst set (e.g., slot index within the period) can be indicated to the V2X UE (such as using synchronization signals, or PBCH content, or DMRS of PBCH, or their combination), or can be pre-configured to the V2X UE.

In one example of this approach (e.g., 1702 in FIG. 17), if the periodicity for transmitting the S-SSB burst set is N slots, and the duration of the S-SSB burst set is M slots, then the contiguous slots containing an S-SSB burst set can be starting from any slot within the N slots (e.g., slots # S, # S+1, . . . , # S+M−1), and the starting location (e.g., information about slot S) can be indicated to the V2X UE (e.g., in the form of a slot index, or a combination of system frame number (SFN)/direct frame number (DFN) and a slot index within the indicated SFN/DFN), such as using synchronization signals, or PBCH content, or DMRS of PBCH, or their combination, or can be pre-configured to the V2X UE.

In another example of this approach, if the periodicity for transmitting the S-SSB burst set is N slots, and the duration of the S-SSB burst set is M slots, then the contiguous slots containing an S-SSB burst set can be starting from any frame boundary, and the starting location (e.g., information about slot S) can be indicated to the V2X UE (e.g., in the form of a system frame number (SFN)/direct frame number (DFN)), such as using synchronization signals, or PBCH content, or DMRS of PBCH, or their combination, or can be pre-configured to the V2X UE.

In yet another example of this approach, if the periodicity for transmitting the S-SSB burst set is N slots, and the duration of the S-SSB burst set is M slots, then the contiguous slots containing an S-SSB burst set can be starting from any half frame boundary, and the starting location (e.g., information about slot S) can be indicated to the V2X UE (e.g., in the form of half frame index within a system frame number (SFN)/direct frame number (DFN) and the SFN/DFN), such as using synchronization signals, or PBCH content, or DMRS of PBCH, or their combination, or can be pre-configured to the V2X UE.

In a third approach for the time-domain mapping of an S-SSB burst set, slots containing an S-SSB burst set can be non-contiguous. In one sub-approach, every transmission of the S-SSB burst set only has one slot, and the multiple slots containing an S-SSB burst set can be with uniform interval within the period of the S-SSB burst set.

For a first example of this approach (e.g., 1703 in FIG. 17), if the periodicity for transmitting the S-SSB burst set is N slots, and the duration of the S-SSB burst set is M slots, the slots containing S-SSBs can be uniformly distributed within the whole period duration, e.g., the slots containing S-SSBs are #0, #(N/M), #2*(N/M), . . . , #(M−1)*(N/M).

In a second example of this approach (e.g., 1704 in FIG. 17), if the periodicity for transmitting the S-SSB burst set is N slots, and the duration of the S-SSB burst set is M slots, the slots containing S-SSBs can be uniformly distributed within a subset of the period duration, e.g., the slots containing S-SSBs are #0, #(N/K), #2*(N/K), . . . , #(M−1)*(N/K), where K is a predefined value and K>M.

In a third example of this approach (e.g., 1705 in FIG. 17), if the periodicity for transmitting the S-SSB burst set is N slots, and the duration of the S-SSB burst set is M slots, the slots containing S-SSBs can be uniformly distributed within the whole period duration, and the starting slot can be any viable and indicated to the V2X UE, e.g., the slots containing S-SSBs are # X, # X+(N/M), # X+2*(N/M), . . . , # X+(M−1)*(N/M), wherein X is the starting location and can be indicated to the V2X UE (e.g., in the form of a slot index, or a combination of SFN/DFN and a slot index within the indicated SFN/DFN), such as using synchronization signals, or PBCH content, or DMRS of PBCH, or their combination, or can be pre-configured to the V2X UE.

In a fourth example of this approach (e.g., 1706 in FIG. 17), if the periodicity for transmitting the S-SSB burst set is N slots, and the duration of the S-SSB burst set is M slots, the slots containing S-SSBs can be uniformly distributed within a subset of the period duration, and the starting slot can be any viable and indicated to the V2X UE, e.g., the slots containing S-SSBs are # X, # X+(N/K), # X+2*(N/K), . . . , # X+(M−1)*(N/K), wherein K is a predefined value and K>M, and X is the starting location and can be indicated to the V2X UE (e.g., in the form of a slot index, or a combination of SFN/DFN and a slot index within the indicated SFN/DFN), such as using synchronization signals, or PBCH content, or DMRS of PBCH, or their combination, or can be pre-configured to the V2X UE.

In one embodiment, the design of S-PSS sequence can be combined with examples in the other embodiments of this disclosure.

In one approach, the number of sequence constructing S-PSS within each symbol is one (i.e., N_SPSS=1). In one aspect of this approach, the sequence constructing S-PSS does not carry any information about sidelink synchronization ID. In another aspect of this approach, the set of sidelink synchronization IDs can still be divided into groups to represent different synchronization sources, wherein the size of each group may not be the same. For one example of this approach, 3 groups of sidelink synchronization IDs are for indicating GNSS, in-coverage UE, and out-of-coverage UE, respectively, wherein the number of IDs for each group may not be the same.

In a first example of this approach, when there is a single symbol mapped for S-PSS within a S-SSB, the single sequence constructing S-PSS is one of the sequences constructing NR-PSS (e.g., choosing 1 from the 3 sequences constructing NR-PSS).

In a second example of this approach, when there is a single symbol mapped for S-PSS within an S-SSB, the single sequence constructing S-PSS is orthogonal or with low cross-correlation to all the sequences constructing NR-PSS.

In a third example of this approach, when there are multiple symbols mapped for S-PSS within an S-SSB, the single sequence constructing the S-PSS in different symbols is different, and the sequences constructing S-PSSs are from the set or a subset of the set of the sequences constructing NR-PSS (e.g., choosing 2 or 3 from the 3 sequences constructing NR-PSS).

In a fourth example of this approach, when there are multiple symbols mapped for S-PSS within a S-SSB, the single sequence constructing the S-PSS in different symbols is different, and some of the sequences constructing S-PSSs in one symbol is from the set or a subset of the set of the sequences constructing NR-PSS (e.g., choosing 1 or 2 or 3 from the 3 sequences constructing NR-PSS), and the others are orthogonal or with low cross-correlation to the sequence from the subset of the sequences constructing NR-PSS.

In a fifth example of this approach, when there are multiple symbols mapped for S-PSS within a S-SSB, the single sequence constructing the S-PSS in different symbols is different, and none of the sequences constructing S-PSSs is from the set of sequences constructing NR-PSS, and all the sequences are orthogonal or with low cross-correlation to all the sequences constructing NR-PSS.

In a sixth example of this approach, when there are multiple symbols mapped for S-PSS within a S-SSB, the single sequence constructing the S-PSS in different symbols is the same, but mapped in different pattern to the symbols for S-PSS. For example, the single sequence constructing S-PSS is mapped in low-to-high order in the frequency domain in some of the symbols for S-PSS, and mapped in high-to-low order in the frequency domain in the other symbol for S-PSS.

In a seventh example of this approach, when there are multiple symbols mapped for S-PSS within a S-SSB, the single sequence constructing the S-PSS in different symbols is the same, and mapped to the symbols for S-PSS in the same pattern (e.g., the symbols for S-PSS (not including CP) are repeated).

In an eighth example of this approach, when there are multiple symbols mapped for S-PSS within a S-SSB, the single sequence for S-PSS can be generated for and mapped to all the symbols for S-PSS.

In another approach, the number of sequence constructing S-PSS within each symbol is two (i.e., N_SPSS=2). In this approach, the sequence constructing S-PSS can be used to identify the group index within two groups of the sidelink synchronization IDs.

For one example on the two groups, it can be referred that the synchronization source is from NR nodes or LTE node. For another example on the two groups, it can be referred that the synchronization source is within the coverage of gNB/eNB or not. For yet another example on the two groups, it can be referred that the synchronization source is a NodeB or UE. For yet another example of the two groups, it can be referred that the synchronization source is either one of within the coverage of a gNB/eNB or GNSS, or out of the coverage of a gNB/eNB. For yet another example of the two groups, it can be referred that the synchronization source is either within the coverage of a gNB/eNB, or one of out of the coverage of a gNB/eNB or GNSS.

For one example on the number of sidelink synchronization IDs within each group, the size of two groups can be identical (e.g., easy for S-SSS sequence design). For another example on the number of sidelink synchronization IDs within each group, the size of two groups can be not identical (e.g., if the two groups of IDs are referring to out of gNB/eNB coverage and within gNB/eNB coverage, the number of IDs in each group may not be the same regarding the use case of each group).

In a first example of this approach, when there is a single symbol mapped for S-PSS within a S-SSB, the set of sequences constructing S-PSS is a subset of the sequences constructing NR-PSS (e.g., choosing 2 from the 3 sequences constructing NR-PSS).

In a second example of this approach, when there is a single symbol mapped for S-PSS within a S-SSB, none of the sequences constructing S-PSSs is from the set of sequences constructing NR-PSS, and is orthogonal or with low cross-correlation to all the sequences constructing NR-PSS.

In a third example of this approach, when there are multiple symbols mapped for S-PSS within a S-SSB, the sets of sequences constructing the S-PSS in different symbols are different, and the sets of sequences constructing S-PSSs in different symbols are orthogonal or with low cross-correlation across the sets. For instance, one set of sequences constructing S-PSS for some of the symbols is a subset of the sequences constructing NR-PSS (e.g., choosing 2 from the 3 sequences constructing NR-PSS), and the remaining set(s) of sequences are not from the set of sequences constructing NR-PSS and orthogonal or with low cross-correlation to the set of sequences constructing NR-PSS.

In a fourth example of this approach, when there are multiple symbols mapped for S-PSS within a S-SSB, the sets of sequences constructing the S-PSS in different symbols are different, and the sets of sequences constructing S-PSSs in different symbols are orthogonal or with low cross-correlation across the sets. For instance, none of the sequences constructing S-PSSs is from the set of sequences constructing NR-PSS, and orthogonal or with low cross-correlation to all the sequences constructing NR-PSS.

In a fifth example of this approach, when there are multiple symbols mapped for S-PSS within a S-SSB, the set of sequences constructing the S-PSS in different symbols is the same, but mapped in different pattern to the symbols for S-PSS. For example, the sequence constructing S-PSS is mapped in low-to-high order in the frequency domain in one of the symbols for S-PSS, and mapped in high-to-low order in the frequency domain in the other symbol for S-PSS.

In a sixth example of this approach, when there are multiple symbols mapped for S-PSS within a S-SSB, the set of sequences constructing the S-PSS in different symbols is the same, and mapped to the symbols for S-PSS in the same pattern (e.g., the symbols for S-PSS (not including CP) are repeated).

In a seventh example of this approach, when there are multiple symbols mapped for S-PSS within a S-SSB, each of the two sequences for S-PSS can be generated for and mapped to all the symbols for S-PSS.

In yet another approach, the number of sequence constructing S-PSS within each symbol is three (i.e., N_SPSS=3). In this approach, the sequence constructing S-PSS can be used to identify the sidelink synchronization ID group index.

For one example on the three groups, it can be referred that different type of synchronization source are considered, e.g., NR gNB, NR UE, or LTE eNB.

For one example, the number of sidelink synchronization IDs within each group is identical (e.g., easy for S-SSS sequence design), and each of the group refers to a particular use case. For another example, the number of sidelink synchronization IDs within each group is identical (e.g., easy for S-SSS sequence design), and two groups refer to a use case while the other group refers to another use case (e.g., 2 groups for within gNB coverage and 1 group for out of gNB/eNB coverage, or 1 group for within gNB/eNB coverage and 2 groups for out of gNB/eNB coverage). For yet another example, the number of sidelink synchronization IDs within each group is not identical (e.g., if the three groups of IDs are referring to different use cases, the number of IDs in each group may not be the same regarding the use case of each group).

In a first example of this approach, when there is a single symbol mapped for S-PSS within a S-SSB, the set of sequences constructing S-PSS is the set of the sequences constructing NR-PSS (e.g., choosing the 3 sequences constructing NR-PSS).

In a second example of this approach, when there is a single symbol mapped for S-PSS within a S-SSB, none of the sequences constructing S-PSSs is from the set of sequences constructing NR-PSS, and orthogonal or with low cross-correlation to all the sequences constructing NR-PSS.

In a third example of this approach, when there are multiple symbols mapped for S-PSS within a S-SSB, the sets of sequences constructing the S-PSS in different symbols are different, and the sets of sequences constructing S-PSSs in different symbols are orthogonal or with low cross-correlation across the sets. For instance, one set of sequences constructing S-PSS for some of the symbols is from the set of sequences constructing NR-PSS (e.g., choosing the 3 sequences constructing NR-PSS), and the remaining set(s) of sequences are not from the set of sequences constructing NR-PSS and orthogonal or with low cross-correlation to the set of sequences constructing NR-PSS.

In a fourth example of this approach, when there are multiple symbols mapped for S-PSS within a S-SSB, the sets of sequences constructing the S-PSS in different symbols are different, and the sets of sequences constructing S-PSSs in different symbols are orthogonal or with low cross-correlation across the sets. For instance, none of the sequences constructing S-PSSs is from the set of sequences constructing NR-PSS, and orthogonal or with low cross-correlation to all the sequences constructing NR-PSS.

In a fifth example of this approach, when there are multiple symbols mapped for S-PSS within a S-SSB, the set of sequences constructing the S-PSS in different symbols is the same, but mapped in different pattern to the symbols for S-PSS. For example, the sequence constructing S-PSS is mapped in low-to-high order in the frequency domain in one of the symbols for S-PSS, and mapped in high-to-low order in the frequency domain in the other symbol for S-PSS.

In a sixth example of this approach, when there are multiple symbols mapped for S-PSS within a S-SSB, the set of sequences constructing the S-PSS in different symbols is the same, and mapped to the symbols for S-PSS in the same pattern (e.g., the symbols for S-PSS (not including CP) are repeated).

In a seventh example of this approach, when there are multiple symbols mapped for S-PSS within a S-SSB, each of the three sequences for S-PSS can be generated for and mapped to all the symbols for S-PSS.

Some examples of sequences constructing S-PSS are illustrated in details as follows, wherein the sequence design reflects the above approaches in this embodiment. There can be multiple examples utilized simultaneously (e.g., one example mapped for one symbol for S-PSS, and another example mapped for another symbol for S-PSS).

In one example III-1, the sequence $d\_SPSS(n)$ in a symbol for S-PSS is defined by a BPSK modulated M-sequence with length-127, and given by: $d\_SPSS(n)=1-2*x(m)$, $m=(n+43*N\_GID^{SL})$ mod 127, $0 \leq n < 127$ where $x(m)$ is M-sequence with generator polynomial $g(x)=x^7+x^4+1$, i.e., $x(i+7)=(x(i+4)+x(i))$ mod 2 for $i=0, 1, \ldots, 119$, and initial condition of $x(m)$ is given by $x(6:0)=[1\ 1\ 1\ 0\ 1\ 1\ 0]$.

In one aspect, if the number of sequence for S-PSS in a symbol is one, the SL synchronization ID group index $N\_GID^{SL}=0$.

In another aspect, if the number of sequences for S-PSS in a symbol are two, the SL synchronization ID group index $N\_GID^{SL}$ is 0 or 1.

In yet another aspect, if the number of sequences for S-PSS in a symbol are three, the SL synchronization ID group index $N\_GID^{SL}$ is 0 or 1 or 2.

In one example of III-2, the sequence $d\_SPSS(n)$ in a symbol for S-PSS is defined by a BPSK modulated M-sequence with length-127, and given by: $d\_SPSS(n)=1-2*x(m)$, $m=(n+43*N\_GID^{SL}+K\_1)$ mod 127, $0 \leq n < 127$ where $x(m)$ is M-sequence with generator polynomial $g(x)=x^7+x^4+1$, i.e., $x(i+7)=(x(i+4)+x(i))$ mod 2 for $i=0, 1, \ldots, 119$, and initial condition of $x(m)$ is given by $x(6:0)=[1\ 1\ 1\ 0\ 1\ 1\ 0]$, and $K\_1$ is a predefined and constant integer other than 0, 43, or 86.

In one aspect, if the number of sequence for S-PSS in a symbol is one, the SL synchronization ID group index $N\_GID^{SL}=0$.

In another aspect, if the number of sequences for S-PSS in a symbol are two, the SL synchronization ID group index N_GID^SL is 0 or 1.

In yet another aspect, if the number of sequences for S-PSS in a symbol are three, the SL synchronization ID group index N_GID^SL is 0 or 1 or 2.

In one sub-example, within a S-SSB, if the sequence for S-PSS in a symbol for S-PSS is different from the sequence for S-PSS in another symbol for S-PSS, K_1 can be selected differently for the two symbols, e.g., K_1=21 for one symbol for S-PSS and K_1=64 for another symbol for S-PSS, or K_1=22 for one symbol for S-PSS and K_1=65 for another symbol for S-PSS.

Figure 18:
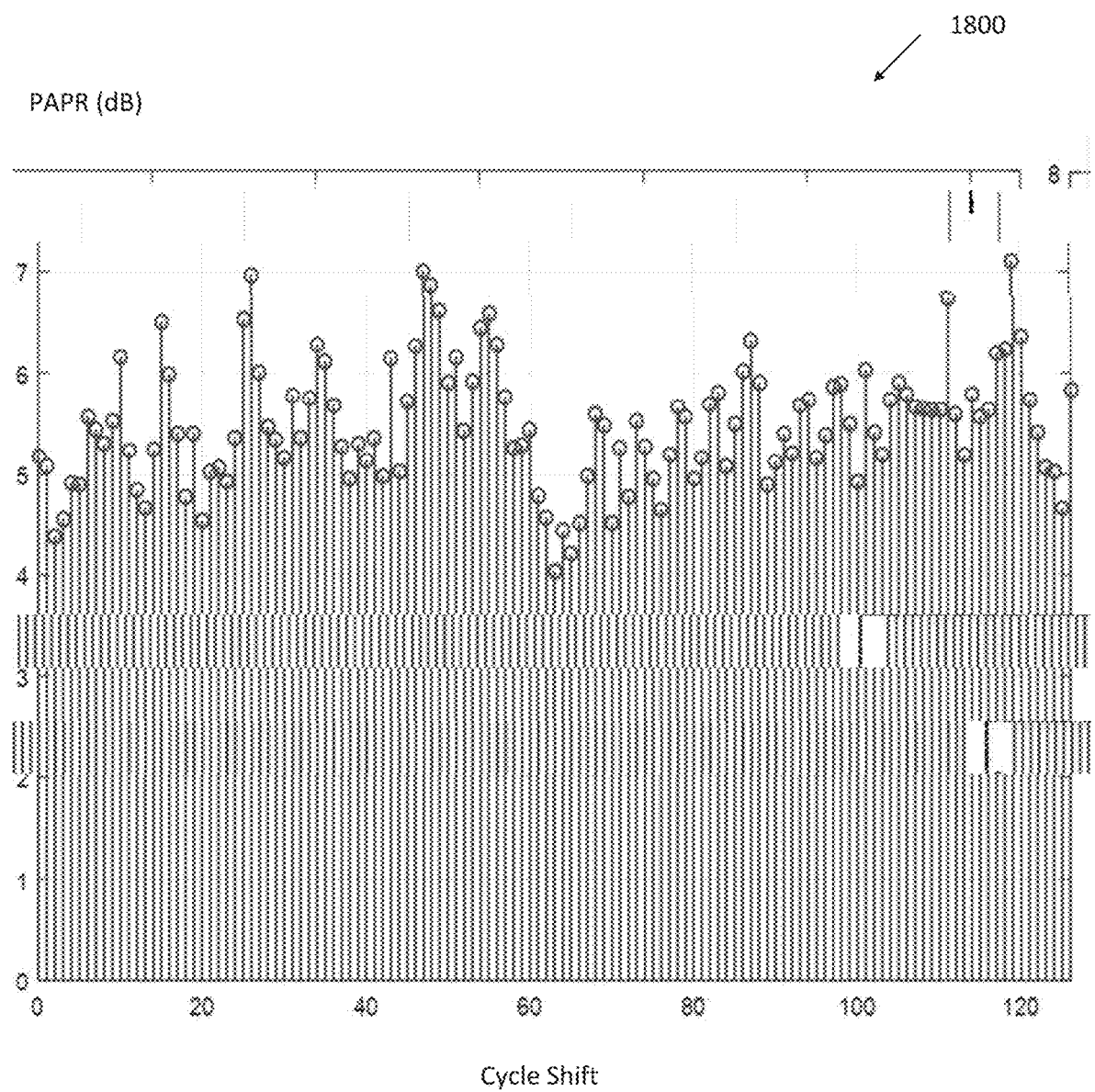
FIG. 18 illustrates an example PAPR value of S-PSS sequences according to embodiments of the present disclosure.

FIG. 18 illustrates an example PAPR value of S-PSS sequences 1800 according to embodiments of the present disclosure. The embodiment of the PAPR value of S-PSS sequences 1800 illustrated in FIG. 18 is for illustration only. FIG. 18 does not limit the scope of this disclosure to any particular implementation.

In another sub-example, K_1 can be chosen to minimize the PAPR value of the S-PSS sequence, e.g., K_1=63 (e.g., according to FIG. 18).

In yet another sub-example, K_1 can be chosen as with maximum distance from cyclic shifts used for NR-PSS (e.g., 0, 43, and 86), e.g., K_1=21, or K_1=22, or K_1=64, or K_1=65.

In one example of III-3, the sequence d_SPSS(n) in a symbol for S-PSS is defined by a BPSK modulated M-sequence with length-127, and given by: d_SPSS(n)=1−2*x(m), m=(n+K_1) mod 127, 0≤n<127 where x(m) is M-sequence with generator polynomial given by one of the example in Table 3, e.g., g(x)=x^7+x+1 or g(x)=x^7+x^3+1, with a proper initial condition, e.g., x(6:0)=[1 1 1 0 1 1 0] or [0 0 0 0 0 0 1]; and K_1 is an integer that may be depending on the SL synchronization ID group index N_GID^SL.

Figure 19:
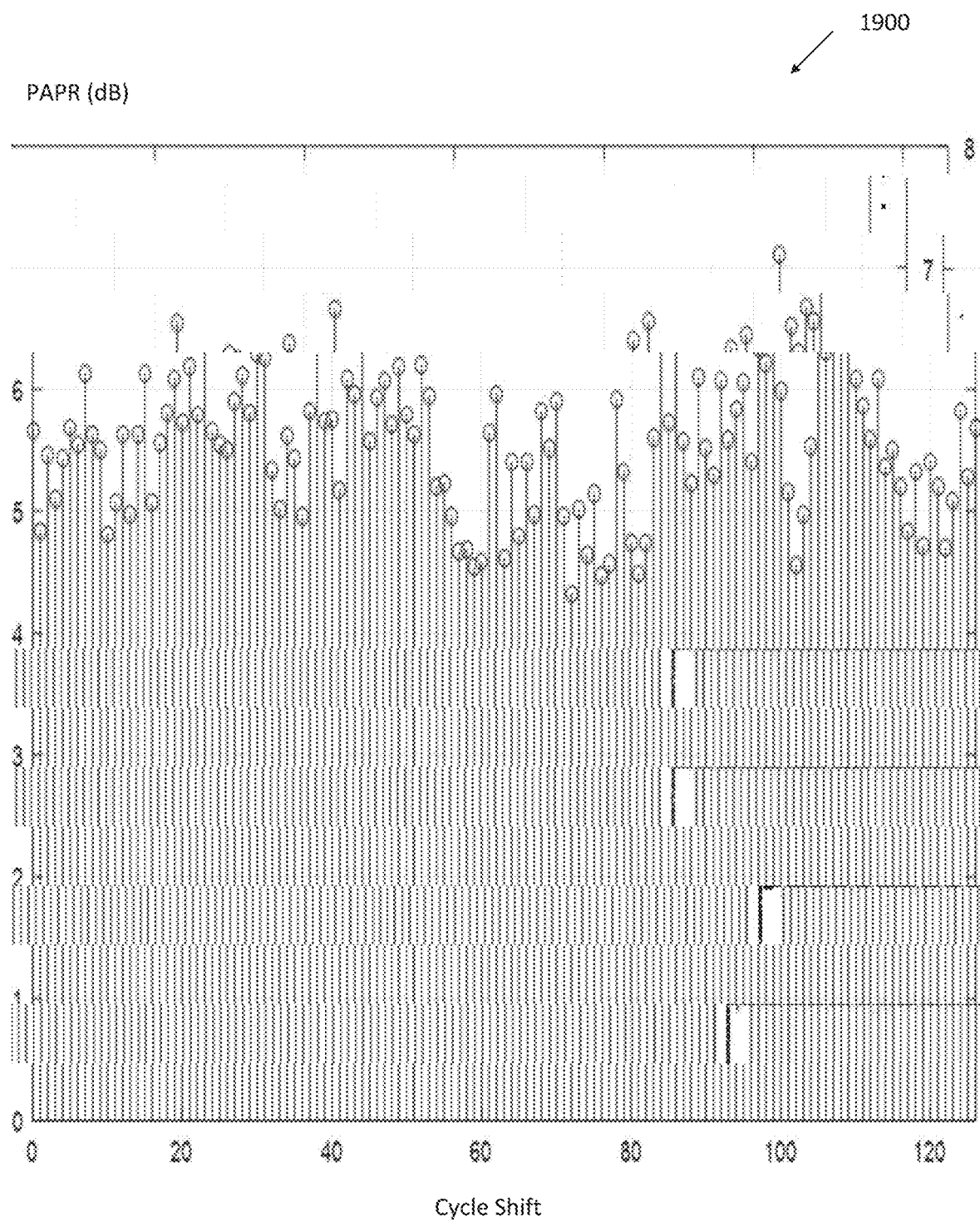
FIG. 19 illustrates another example PAPR value of S-PSS sequences according to embodiments of the present disclosure.

FIG. 19 illustrates another example PAPR value of S-PSS sequences 1900 according to embodiments of the present disclosure. The embodiment of the PAPR value of S-PSS sequences 1900 illustrated in FIG. 19 is for illustration only. FIG. 19 does not limit the scope of this disclosure to any particular implementation.

Figure 20:
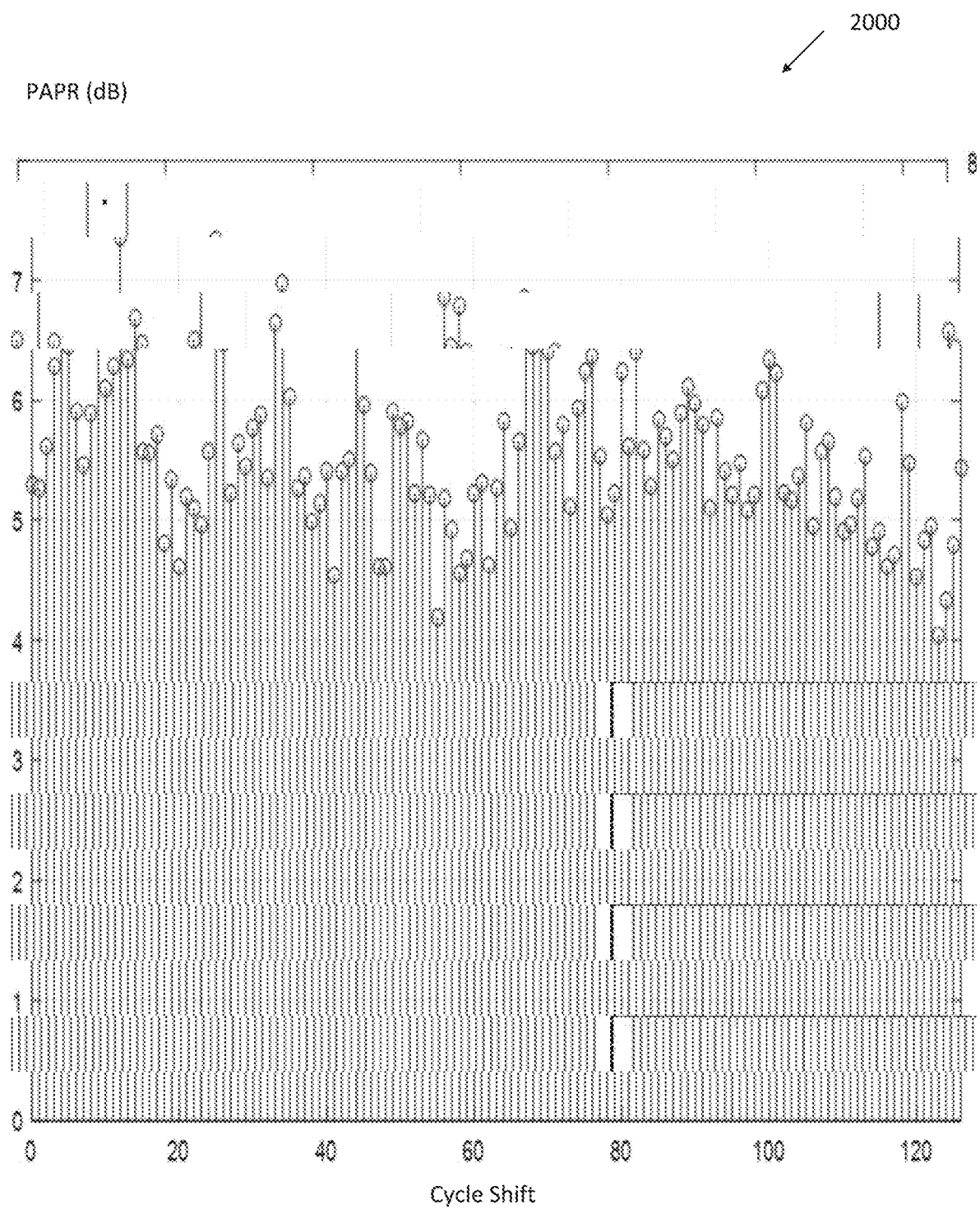
FIG. 20 illustrates yet another example PAPR value of S-PSS sequences according to embodiments of the present disclosure.

FIG. 20 illustrates yet another example PAPR value of S-PSS sequences 2000 according to embodiments of the present disclosure. The embodiment of the PAPR value of S-PSS sequences 2000 illustrated in FIG. 20 is for illustration only. FIG. 20 does not limit the scope of this disclosure to any particular implementation.

In one aspect, if the number of sequence for S-PSS in a symbol is one, the SL synchronization ID group index N_GID^SL=0. Then, K_1 can be a predefined constant integer for this aspect. In one consideration for this aspect, K_1 can be chosen as 0 (no cyclic shift for the single sequence). For another consideration for this aspect, K_1 can be chosen to minimize the PAPR value of the S-PSS sequence, e.g., K_1=72 (e.g., according to FIG. 19) if generator is using g(x)=x^7+x+1, or K_1=123 (e.g., according to FIG. 20) if generator is using g(x)=x^7+x^3+1. In another consideration, K_1 can be chosen as with maximum distance from cyclic shifts used for NR-PSS (e.g., 0, 43, and 86), e.g., K_1=21, or K_1=22, or K_1=64, or K_1=65.

In another aspect, if the number of sequences for S-PSS in a symbol are two, the SL synchronization ID group index N_GID^SL is 0 or 1. Then, K_1 is taking one of two candidate predefined integer values, depending on the value of N_GID^SL. In one consideration for this aspect, K_1 can be chosen to minimize the PAPR values of the S-PSS sequences, e.g., K_1=72 for N_GID^SL=0 and K_1=102 for N_GID^SL=1 (e.g., according to FIG. 19) if generator is using g(x)=x^7+x+1, or K_1=55 for N_GID^SL=0 and K_1=123 for N_GID^SL=1 (e.g., according to FIG. 20) if generator is using g(x)=x^7+x^3+1. In another consideration, K_1 can be chosen as with maximum distance from cyclic shifts used for NR-PSS (e.g., 0, 43, and 86), e.g., K_1=21 for N_GID^SL=0 and K_1=65 for N_GID^SL=1. In yet another consideration, K_1 is in the form of K_1=N_GID^SL*64+K_2, wherein K_2 is a predefined integer, e.g., K_2=0, or K_2=32. In yet another consideration, K_1 is in the form of K_1=N_GID^SL*43+K_2, wherein K_2 is a predefined integer, e.g., K_2=0, or K_2=21, or K_2=22.

In yet another aspect, if the number of sequences for S-PSS in a symbol are three, the SL synchronization ID group index N_GID^SL is 0 or 1 or 2. In one consideration for this aspect, K_1 can be chosen to minimize the PAPR values of the S-PSS sequences. In another consideration, K_1 is in the form of K_1=N_GID^SL*43+K_2, wherein K_2 is a predefined integer, e.g., K_2=0, or K_2=21, or K_2=22.

In one sub-example, within a S-SSB, if the sequence for S-PSS in a symbol for S-PSS is different from the sequence for S-PSS in another symbol for S-PSS, g(x) can be selected differently for the two symbols, e.g., g(x)=x^7+x+1 for one symbol for S-PSS and g(x)=x^7+x^3+1 for another symbol for S-PSS.

TABLE 3

Polynomial and corresponding method

| Index | Generator polynomial g(x) | Corresponding generation method (i = 0, 1, . . . , 119) |
|---|---|---|
| 1 | x^7 + x^6 + 1 | x(i + 7) = x(i + 6) + x(i) |
| 2 | x^7 + x + 1 | x(i + 7) = x(i + 1) + x(i) |
| 3 | x^7 + x^4 + 1 | x(i + 7) = x(i + 4) + x(i) |
| 4 | x^7 + x^3 + 1 | x(i + 7) = x(i + 3) + x(i) |
| 5 | x^7 + x^6 + x^5 + x^4 + 1 | x(i + 7) = x(i + 6) + x(i + 5) + x(i + 4) + x(i) |
| 6 | x^7 + x^3 + x^2 + x + 1 | x(i + 7) = x(i + 3) + x(i + 2) + x(i + 1) + x(i) |
| 7 | x^7 + x^6 + x^5 + x^2 + 1 | x(i + 7) = x(i + 6) + x(i + 5) + x(i + 2) + x(i) |
| 8 | x^7 + x^5 + x^2 + x + 1 | x(i + 7) = x(i + 5) + x(i + 2) + x(i + 1) + x(i) |
| 9 | x^7 + x^5 + x^4 + x^3 + 1 | x(i + 7) = x(i + 5) + x(i + 4) + x(i + 3) + x(i) |
| 10 | x^7 + x^4 + x^3 + x^2 + 1 | x(i + 7) = x(i + 4) + x(i + 3) + x(i + 2) + x(i) |
| 11 | x^7 + x^6 + x^4 + x^2 + 1 | x(i + 7) = x(i + 6) + x(i + 4) + x(i + 2) + x(i) |
| 12 | x^7 + x^5 + x^3 + x + 1 | x(i + 7) = x(i + 5) + x(i + 3) + x(i + 1) + x(i) |
| 13 | x^7 + x^6 + x^4 + x + 1 | x(i + 7) = x(i + 6) + x(i + 4) + x(i + 1) + x(i) |
| 14 | x^7 + x^6 + x^3 + x + 1 | x(i + 7) = x(i + 6) + x(i + 3) + x(i + 1) + x(i) |

TABLE 3-continued

Polynomial and corresponding method

| Index | Generator polynomial g(x) | Corresponding generation method (i = 0, 1, ..., 119) |
|---|---|---|
| 15 | $x^7 + x^5 + x^4 + x^3 + x^2 + x + 1$ | $x(i + 7) = x(i + 5) + x(i + 4) + x(i + 3) + x(i + 2) + x(i + 1) + x(i)$ |
| 16 | $x^7 + x^6 + x^5 + x^4 + x^3 + x^2 + 1$ | $x(i + 7) = x(i + 6) + x(i + 5) + x(i + 4) + x(i + 3) + x(i + 2) + x(i)$ |
| 17 | $x^7 + x^6 + x^5 + x^3 + x^2 + x + 1$ | $x(i + 7) = x(i + 6) + x(i + 5) + x(i + 3) + x(i + 2) + x(i + 1) + x(i)$ |
| 18 | $x^7 + x^6 + x^5 + x^4 + x^2 + x + 1$ | $x(i + 7) = x(i + 6) + x(i + 5) + x(i + 4) + x(i + 2) + x(i + 1) + x(i)$ |

In one example of III-4, the sequence d_SPSS(n) in a symbol for S-PSS is defined by a BPSK modulated M-sequence with length-255, and given by: d_SPSS(n)=1−2*x(m), m=(n+K_1*N_GID^SL) mod 255, 0≤n<255 where x(m) is M-sequence with generator polynomial given by one of the example in Table 4, e.g., $g(x)=x^8 \pm x^7 \pm x^6+x+1$, with a proper initial condition, e.g., x(7:0)=[1 0 0 0 0 0 0 0] or [0 0 0 0 0 0 0 1]; and K_1 is a predefined constant integer, e.g., K_1=⌈255/N_SPSS⌉ if N_SPSS>1 and K_1=0 if N_SPSS=1. This example applies when the sequence(s) constructing S-PSS is (are) mapped to all the symbols for S-PSS.

In one aspect, if the number of sequence for S-PSS in a symbol is one, the SL synchronization ID group index N_GID^SL=0.

In another aspect, if the number of sequences for S-PSS in a symbol are two, the SL synchronization ID group index N_GID^SL is 0 or 1.

In yet another aspect, if the number of sequences for S-PSS in a symbol are three, the SL synchronization ID group index N_GID^SL is 0 or 1 or 2.

condition of x(m) is given by x(6:0)=[1 1 1 0 1 1 0], and K_1 is an integer other than 0, 43, or 86, and may depend on the SL synchronization ID group index N_GID^SL.

In one aspect, if the number of sequence for S-PSS in a symbol is one, the SL synchronization ID group index N_GID^SL=0. In one consideration, K_1 can be chosen to minimize the PAPR value of the S-PSS sequence, e.g., K_1=63 (e.g., according to FIG. 18). In another consideration, K_1 can be chosen as with maximum distance from cyclic shifts used for NR-PSS (e.g., 0, 43, and 86), e.g., K_1=21, or K_1=22, or K_1=64, or K_1=65.

In another aspect, if the number of sequences for S-PSS in a symbol are two, the SL synchronization ID group index N_GID^SL is 0 or 1. In one consideration, K_1 can be chosen to minimize the PAPR values of the S-PSS sequences, e.g., K_1=20 for N_GID^SL=0, and K_1=63 for N_GID^SL=1 (e.g., according to FIG. 18). In another consideration, K_1 can be chosen as with maximum distance from cyclic shifts used for NR-PSS (e.g., 0, 43, and 86), e.g., K_1=21 for N_GID^SL=0, and K_1=65 for N_GID^SL=1, or K_1=22 for N_GID^SL=0, and K_1=64 for N_GID^SL=1.

TABLE 4

Polynomial and corresponding method

| Index | Generator polynomial g(x) | Corresponding generation method (i = 0, 1, ..., 246) |
|---|---|---|
| 1 | $x^8 + x^7 + x^6 + x + 1$ | $x(i + 8) = x(i + 7) + x(i + 6) + x(i + 1) + x(i)$ |
| 2 | $x^8 + x^7 + x^2 + x + 1$ | $x(i + 8) = x(i + 7) + x(i + 2) + x(i + 1) + x(i)$ |
| 3 | $x^8 + x^7 + x^5 + x^3 + 1$ | $x(i + 8) = x(i + 7) + x(i + 5) + x(i + 3) + x(i)$ |
| 4 | $x^8 + x^5 + x^3 + x + 1$ | $x(i + 8) = x(i + 5) + x(i + 3) + x(i + 1) + x(i)$ |
| 5 | $x^8 + x^6 + x^5 + x^4 + 1$ | $x(i + 8) = x(i + 6) + x(i + 5) + x(i + 4) + x(i)$ |
| 6 | $x^8 + x^4 + x^3 + x^2 + 1$ | $x(i + 8) = x(i + 4) + x(i + 3) + x(i + 2) + x(i)$ |
| 7 | $x^8 + x^6 + x^5 + x^3 + 1$ | $x(i + 8) = x(i + 6) + x(i + 5) + x(i + 3) + x(i)$ |
| 8 | $x^8 + x^5 + x^3 + x^2 + 1$ | $x(i + 8) = x(i + 5) + x(i + 3) + x(i + 2) + x(i)$ |
| 9 | $x^8 + x^6 + x^5 + x^2 + 1$ | $x(i + 8) = x(i + 6) + x(i + 5) + x(i + 2) + x(i)$ |
| 10 | $x^8 + x^6 + x^3 + x^2 + 1$ | $x(i + 8) = x(i + 6) + x(i + 3) + x(i + 2) + x(i)$ |
| 11 | $x^8 + x^6 + x^5 + x + 1$ | $x(i + 8) = x(i + 6) + x(i + 5) + x(i + 1) + x(i)$ |
| 12 | $x^8 + x^7 + x^3 + x^2 + 1$ | $x(i + 8) = x(i + 7) + x(i + 3) + x(i + 2) + x(i)$ |
| 13 | $x^8 + x^7 + x^6 + x^5 + x^4 + x^2 + 1$ | $x(i + 8) = x(i + 7) + x(i + 6) + x(i + 5) + x(i + 4) + x(i + 2) + x(i)$ |
| 14 | $x^8 + x^6 + x^4 + x^3 + x^2 + x + 1$ | $x(i + 8) = x(i + 6) + x(i + 4) + x(i + 3) + x(i + 2) + x(i + 1) + x(i)$ |
| 15 | $x^8 + x^7 + x^6 + x^5 + x^2 + x + 1$ | $x(i + 8) = x(i + 7) + x(i + 6) + x(i + 5) + x(i + 2) + x(i + 1) + x(i)$ |
| 16 | $x^8 + x^7 + x^6 + x^3 + x^2 + x + 1$ | $x(i + 8) = x(i + 7) + x(i + 6) + x(i + 3) + x(i + 2) + x(i + 1) + x(i)$ |

In one example of III-5: The sequence d_SPSS(n) in a symbol for S-PSS is defined by a BPSK modulated M-sequence with length-127, and given by: d_SPSS(n)=1−2*x(m), m=(n+K_1) mod 127, 0≤n<127, where x(m) is M-sequence with generator polynomial $g(x)=x^7+x^4+1$, i.e., x(i+7)=(x(i+4)+x(i)) mod 2 for i=0, 1, ..., 119, and initial In yet another aspect, if the number of sequences for S-PSS in a symbol are three, the SL synchronization ID group index N_GID^SL is 0 or 1 or 2. In one consideration, K_1 can be chosen to minimize the PAPR values of the S-PSS sequences, e.g., K_1=20 for N_GID^SL=0, K_1=63 for N_GID^SL=1, and K_1=100 for N_GID^SL=2, (e.g., according to FIG. 18). In another consideration, K_1 can be chosen as with maximum distance from cyclic shifts used for NR-PSS (e.g., 0, 43, and 86), e.g., K_1=21 for N_GID^SL=0, K_1=65 for N_GID^SL=1, and K_1=108 for N_GID^SL=2, or K_1=22 for N_GID^SL=0, K_1=64 for N_GID^SL=1, and K_1=107 for N_GID^SL=2.

In one embodiment, the design of S-SSS sequence can be combined with examples in the other embodiments of this disclosure.

In one approach, the number of sequences constructing S-SSS within each symbol is the same as the number of sidelink synchronization IDs (e.g., every sidelink synchronization ID is mapped to a unique sequence for S-SSS within each symbol mapped for S-SSS).

In a first example of this approach, when there is a single symbol mapped for S-SSS within a S-SSB, the set of sequences constructing S-SSS is a subset of sequences constructing NR-SSS, if the number of sequences for S-SSS is smaller or equal to 1008.

In a second example of this approach, when there is a single symbol mapped for S-SSS within a S-SSB, the set of sequences constructing S-SSS is different from the set of sequences constructing NR-SSS, e.g., by using at least one different M-sequence generator polynomial and/or cyclic shifts.

In a third example of this approach, when there are multiple symbols mapped for S-SSS within a S-SSB, the sequences constructing the S-SSS in different symbols can be the same, and mapped in different pattern to the symbols for S-SSS. For example, the sequence constructing S-SSS is mapped in low-to-high order in the frequency domain in one of the symbols for S-SSS, and mapped in high-to-low order in the frequency domain in the other symbol for S-SSS.

In a fourth example of this approach, when there are multiple symbols mapped for S-SSS within a S-SSB, the sequences constructing the S-SSS in different symbols can be the same, and mapped to the symbols for S-SSS in the same pattern (e.g., the symbols for S-SSS (not including CP) are repeated.

In a fifth example of this approach, when there are multiple symbols mapped for S-SSS within a S-SSB, the sequences constructing the S-SSS in one symbol can be different from the sequences constructing the S-SSS in another symbol, and mapped to the symbols for S-SSS in the same pattern (e.g., time-frequency domain mapping order), where the sequences in each symbol can be using the sequences in the first or second example of this approach. For instance, one way to achieve different set of sequences in different symbols is using cover code (i.e., the sequences constructing the S-SSS in one symbol can be the sequences constructing the S-SSS in another symbol with a cover code), and another way to achieve different set of sequences in different symbols is using different generator polynomials and/or different cyclic shifts.

In a sixth example of this approach, when there are multiple symbols mapped for S-SSS within a S-SSB, the sequences constructing the S-SSS in one symbol can be different from the sequences constructing the S-SSS in another symbol, and mapped in different pattern to the symbols for S-SSS, where the sequences in each symbol can be using the sequences in the first or second example of this approach. For example, the sequence constructing S-SSS is mapped in low-to-high order in the frequency domain in some of the symbols for S-SSS, and mapped in high-to-low order in the frequency domain in the other symbols for S-SSS. For instance, one way to achieve different set of sequences in different symbols is using cover code (i.e., the sequences constructing the S-SSS in one symbol can be the sequences constructing the S-SSS in another symbol with a cover code), and another way to achieve different set of sequences in different symbols is using different generator polynomials and/or different cyclic shifts.

In a seventh example of this approach, when there are multiple symbols mapped for S-SSS within a S-SSB, each of the sequences for S-SSS can be generated for and mapped to all the symbols for S-SSS.

Some examples of sequences constructing S-SSS are illustrated in details as follows, wherein the sequence design reflects the above approaches in this embodiment. There can be multiple examples utilized simultaneously (e.g., one example mapped for one symbol for S-SSS, and another example mapped for another symbol for S-SSS).

In one example of IV-1, the construction method is same as NR-SSS, such that the set of S-SSS is a subset of the same as the set of NR-SSS. For example, the sequence d_SSSS(n) in a symbol for S-SSS is defined by a BPSK modulated Gold-sequence with length-127, and given by: d_SSSS(n)= (1−2*x_0(n_0))*(1−2*x_1(n_1)), n_0=(n+m_0) mod 127, n_1=(n+m_1) mod 127, m_0=15*⌊N_IDinG^SL/112⌋+ 5*N_GID^SL, m_1=N_IDinG^SL mod 112, 0≤n<127 where x_0(n_0) is M-sequence with generator polynomial g_0(x)=x^7+x^4+1, i.e., x_0(i+7)=(x_0(i+4)+x_0(i)) mod 2 for i=0, 1, ..., 119, and initial condition of x_0(n_0) is given by x_0 (6:0)=[0 0 0 0 0 0 1]; and x_1(n_1) is M-sequence with generator polynomial g_1(x)=x^7+x+1, i.e., x_1(i+7)= (x_1(i)+x_1(i)) mod 2 for i=0, 1, . . . , 119, and initial condition of x_1(n_1) is given by x_1 (6:0)=[0 0 0 0 0 0 1]; and N_IDinG^SL is the SL synchronization ID index within a group, and N_ID^SL=N_SPSS*N_IDinG^SL+N_GID^SL. For one consideration, this example applies when the sequences constructing S-SSS in one of the symbols for S-SSS is a subset of sequences constructing NR-SSS.

For one instance, when N_SPSS=1, N_GID^SL=0, N_IDinG^SL is the same as N_ID^SL.

For another instance, when N_SPSS=2, N_GID^SL=0 or 1.

In one example of IV-2, the sequence d_SSSS(n) in a symbol for S-SSS is defined by a BPSK modulated Gold-sequence with length-127, and given by: d_SSSS(n)=(1− 2*x_0(n_0))*(1−2*x_1(n_1)), n_0=(n+m_0) mod 127, n_1=(n+m_1) mod 127, m_0=K_2*⌊N_IDinG^SL/K_3⌋+ K_4*N_GID^SL, m_1=N_IDinG^SL mod K_3, 0≤n<127 where x_0(n_0) is M-sequence with generator polynomial g_0(x)=x^7+x^4+1, i.e., x_0(i+7)=(x_0(i+4)+x_0(i)) mod 2 for i=0, 1, ..., 119, and initial condition of x_0(n_0) is given by x_0 (6:0)=[0 0 0 0 0 0 1]; and x_1(n_1) is M-sequence with generator polynomial g_1(x)=x^7+x+1, i.e., x_1(i+7)= (x_1(i)+x_1(i)) mod 2 for i=0, 1, . . . , 119, and initial condition of x_1(n_1) is given by x_1 (6:0)=[0 0 0 0 0 0 1]; and N_IDinG^SL is the SL synchronization ID index within a group, and N_ID^SL=N_SPSS*N_IDinG^SL+N_GID^SL; and K_2, K_3, and K_4 are predefined integers.

For one instance, when N_SPSS=1, N_GID^SL=0, N_IDinG^SL is the same as N_ID^SL, and K_2=15, K_3=112, K_4=0, if N_NID^SL is 336.

For another instance, when N_SPSS=1, N_GID^SL=0, N_IDinG^SL is the same as N_ID^SL, and K_2=45, K_3=112, K_4=0, if N_NID^SL is 336.

For yet another instance, when N_SPSS=1, N_GID^SL=0, N_IDinG^SL is the same as N_ID^SL, and K_2=15, K_3=112, K_4=0, if N_NID^SL is 504.

For yet another instance, when N_SPSS=1, N_GID^SL=0, N_IDinG^SL is the same as N_ID^SL, and K_2=45, K_3=112, K_4=0, if N_NID^SL is 504.

For yet another instance, when N_SPSS=1, N_GID^SL=0, N_IDinG^SL is the same as N_ID^SL, and K_2=15, K_3=112, K_4=0, if N_NID^SL is 672.

For yet another instance, when N_SPSS=1, N_GID^SL=0, N_IDinG^SL is the same as N_ID^SL, and K_2=15, K_3=126, K_4=0, if N_NID^SL is 1008.

For yet another particular instance, when N_SPSS=1, N_GID^SL=0, N_IDinG^SL is the same as N_ID^SL, and K_2=15, K_3=112, K_4=0, if N_NID^SL is 1008.

For yet another instance, when N_SPSS=2, N_GID^SL=0 or 1, and K_2=15, K_3=112, K_4=5, if N_NID^SL is 672.

For yet another instance, when N_SPSS=2, N_GID^SL=0 or 1, and K_2=15, K_3=84, K_4=5, if N_NID^SL is 336.

For yet another instance, when N_SPSS=2, N_GID^SL=0 or 1, and K_2=15, K_3=56, K_4=5, if N_NID^SL is 336.

For yet another instance, when N_SPSS=3, N_GID^SL=0 or 1 or 2, and K_2=15, K_3=112, K_4=5, if N_NID^SL is 672.

For yet another instance, when N_SPSS=3, N_GID^SL=0 or 1 or 2, and K_2=15, K_3=75, K_4=5, if N_NID^SL is 672.

For yet another instance, when N_SPSS=3, N_GID^SL=0 or 1 or 2, and K_2=15, K_3=112, K_4=5, if N_NID^SL is 336.

In one example of IV-3, the sequence $d\_SSSS(n)$ in a symbol for S-SSS is defined by a BPSK modulated Gold-sequence with length-127, and given by: $d\_SSSS(n)=(1-2*x\_0(n\_0))*(1-2*x\_1(n\_1))$, $n\_0=(n+m\_0)$ mod 127, $n\_1=(n+m\_1)$ mod 127, $m\_0=K\_2*\lfloor N\_IDinG^{\wedge}SL/K\_3 \rfloor + K\_4*N\_GID^{\wedge}SL$, $m\_1=N\_IDinG^{\wedge}SL$ mod $K\_3$, $0 \leq n < 127$ where $x\_0(n\_0)$ and $x\_1(n\_1)$ are two length-127 M-sequences, and each is with generator polynomial chosen from Table 3 (e.g., one is with generator polynomial $g\_0(x)=x^{\wedge}7+x^{\wedge}6+1$ and the other is with generator polynomial $g\_1(x)=x^{\wedge}7+x^{\wedge}3+1$) and proper initial condition, e.g., $x\_0$ (6:0)=$x\_1$ (6:0)=[0 0 0 0 0 0 1]; and N_IDinG^SL is the SL synchronization ID index within a group, and N_ID^SL=N_SPSS*N_IDinG^SL+N_GID^SL; and K_2, K_3, and K_4 are predefined integers.

For one instance, when N_SPSS=1, N_GID^SL=0, N_IDinG^SL is the same as N_ID^SL, and K_2=15, K_3=112, K_4=0, if N_NID^SL is 336, or 504, or 672.

For another instance, when N_SPSS=2, N_GID^SL=0 or 1, and K_2=15, K_3=112, K_4=5, if N_NID^SL is 672.

For yet another instance, when N_SPSS=2, N_GID^SL=0 or 1, and K_2=15, K_3=84, K_4=5, if N_NID^SL is 336.

For yet another instance, when N_SPSS=2, N_GID^SL=0 or 1, and K_2=15, K_3=56, K_4=5, if N_NID^SL is 336.

For yet another particular instance, when N_SPSS=3, N_GID^SL=0 or 1 or 2, and K_2=15, K_3=112, K_4=5, if N_NID^SL is 672.

For yet another instance, when N_SPSS=3, N_GID^SL=0 or 1 or 2, and K_2=15, K_3=75, K_4=5, if N_NID^SL is 672.

For yet another instance, when N_SPSS=3, N_GID^SL=0 or 1 or 2, and K_2=15, K_3=112, K_4=5, if N_NID^SL is 336.

In one example of IV-4, the sequence $d\_SSSS(n)$ in a symbol for S-SSS is defined by a BPSK modulated Gold-sequence with length-255, and given by: $d\_SSSS(n)=(1-2*x\_0(n\_0))*(1-2*x\_1(n\_1))$, $n\_0=(n+m\_0)$ mod 255, $n\_1=(n+m\_1)$ mod 255, $m\_0=K\_2*\lfloor N\_IDinG^{\wedge}SL/K\_3 \rfloor + K\_4*N\_GID^{\wedge}SL$, $m\_1=N\_IDinG^{\wedge}SL$ mod $K\_3$, $0 \leq n < 255$ where $x\_0(n\_0)$ and $x\_1(n\_1)$ are two length-255 M-sequences, and each is with generator polynomial chosen from Table 4 (e.g., one is with generator polynomial $g\_0(x)=x^{\wedge}8 \pm x^{\wedge}7 \pm x^{\wedge}6+x+1$ and the other is with generator polynomial $g\_1(x)=x^{\wedge}8 \pm x^{\wedge}7 \pm x^{\wedge}2+x+1$) and proper initial condition, e.g., $x\_0$ (7:0)=$x\_1$ (7:0)=[0 0 0 0 0 0 0 1] or [1 0 0 0 0 0 0 0]; and N_IDinG^SL is the SL synchronization ID index within a group, and N_ID^SL=N_SPSS*N_IDinG^SL+N_GID^SL; and K_2, K_3, and K_4 are predefined integers. For one consideration, this example can apply when the sequences constructing S-SSS are mapped to all the symbols for S-SSS.

For one instance, when N_SPSS=1, N_GID^SL=0, N_IDinG^SL is the same as N_ID^SL, and K_2=30, K_3=224, K_4=0, if N_NID^SL is 336, or 504, or 672.

For another instance, when N_SPSS=2, N_GID^SL=0 or 1, and K_2=30, K_3=224, K_4=10, if N_NID^SL is 672.

For yet another instance, when N_SPSS=2, N_GID^SL=0 or 1, and K_2=30, K_3=168, K_4=10, if N_NID^SL is 336.

For yet another instance, when N_SPSS=3, N_GID^SL=0 or 1 or 2, and K_2=30, K_3=224, K_4=10, if N_NID^SL is 672.

For yet another instance, when N_SPSS=3, N_GID^SL=0 or 1 or 2, and K_2=30, K_3=112, K_4=10, if N_NID^SL is 336.

In one example of IV-5, the sequence $d\_SSSS(n)$ in a symbol for S-SSS is defined by a BPSK modulated Gold-sequence with length-127, and given by: $d\_SSSS(n)=(1-2*x\_0(n\_0))*(1-2*x\_1(n\_1))$, $n\_0=(n+m\_0)$ mod 127, $n\_1=(n+m\_1)$ mod 127, $m\_0=K\_2*\lfloor N\_IDinG^{\wedge}SL/K\_3 \rfloor + K\_4*N\_GID^{\wedge}SL$, $m\_1=N\_IDinG^{\wedge}SL$ mod $K\_3$, $0 \leq n < 127$ where $x\_0(n\_0)$ is M-sequence with generator polynomial $g\_0(x)=x^{\wedge}7+x^{\wedge}4+1$, i.e., $x\_0(i+7)=(x\_0(i+4)+x\_0(i))$ mod 2 for i=0, 1, ..., 119, and initial condition of $x\_0(n\_0)$ is given by $x\_0$ (6:0)=[0 0 0 0 0 0 1]; and $x\_1(n\_1)$ is M-sequence with generator polynomial $g\_1(x)=x^{\wedge}7+x+1$, i.e., $x\_1(i+7)=(x\_1(i)+x\_1(i))$ mod 2 for i=0, 1, ..., 119, and initial condition of $x\_1(n\_1)$ is given by $x\_1$ (6:0)=[0 0 0 0 0 0 1]; and N_IDinG^SL is the SL synchronization ID index within a group, and N_ID^SL=(N_SPSS*N_IDinG^SL+N_GID^SL)/K_5; and K_2, K_3, K_4, and K_5 are predefined integers.

For one instance, when N_SPSS=1, N_GID^SL=0, N_IDinG^SL is the same as N_ID^SL, and K_2=15, K_3=112, K_4=0, K_5=3, if N_NID^SL is 336.

For another instance, when N_SPSS=3, N_GID^SL=0 or 1 or 2, N_IDinG^SL is the same as N_ID^SL, and K_2=15, K_3=112, K_4=0, K_5=3, if N_NID^SL is 336.

For yet another instance, when N_SPSS=1, N_GID^SL=0, N_IDinG^SL is the same as N_ID^SL, and K_2=15, K_3=112, K_4=0, K_5=2, if N_NID^SL is 504.

For yet another instance, when N_SPSS=2, N_GID^SL=0 or 1, N_IDinG^SL is the same as N_ID^SL, and K_2=15, K_3=112, K_4=0, K_5=2, if N_NID^SL is 504.

In one example of IV-6, the construction method is same as NR-SSS, such that the set of S-SSS is a subset of the same as the set of NR-SSS. For example, the sequence $d\_SSSS(n)$ in a symbol for S-SSS is defined by a BPSK modulated Gold-sequence with length-127, and given by: $d\_SSSS(n)=(1-2*x\_0(n\_0))*(1-2*x\_1(n\_1))$, $n\_0=(n+m\_0)$ mod 127, $n\_1=(n+m\_1)$ mod 127, $m\_0=15*\lfloor N\_IDinG^{\wedge}SL/112 \rfloor + 5*N\_GID^{\wedge}SL+K\_1$, $m\_1=N\_IDinG^{\wedge}SL$ mod 112, $0 \leq n < 127$ where $x\_0(n\_0)$ is M-sequence with generator polynomial $g\_0(x)=x^{\wedge}7+x^{\wedge}4+1$, i.e., $x\_0(i+7)=(x\_0(i+4)+x\_0(i))$ mod 2 for i=0, 1, ..., 119, and initial condition of $x\_0(n\_0)$ is given by $x\_0$ (6:0)=[0 0 0 0 0 0 1]; and $x\_1(n\_1)$ is M-sequence with generator polynomial $g\_1(x)=x^{\wedge}7+x+1$, i.e., $x\_1(i+7)=(x\_1(i)+x\_1(i))$ mod 2 for i=0, 1, ..., 119, and initial condition of $x\_1(n\_1)$ is given by $x\_1$ (6:0)=[0 0 0 0 0 0 1]; and N_IDinG^SL is the SL synchronization ID index within a group, SL synchronization ID can be expressed as $N\_ID^{\wedge}SL=N\_G*N\_IDinG^{\wedge}SL+N\_GID^{\wedge}SL$, wherein $N\_G$ is the number of groups, and $N\_GID^{\wedge}SL$ is the group ID; and $K\_1$ is a predefined integer.

For one aspect, there is a single S-PSS sequence (e.g., $N\_SPSS=1$) and there is a single group of SL synchronization IDs (e.g., $N\_G=1$). For this aspect, the number of SL synchronization ID could be 336, and $N\_GID^{\wedge}SL=0$, and $N\_IDinG^{\wedge}SL$ is the same as $N\_ID^{\wedge}SL$. In one instance of this aspect, $K\_1=0$, and the set of S-SSS sequences is a subset of NR-SSS sequence. In another instance of this aspect, the set of S-SSS sequences is a subset of NR-SSS sequence with a cyclic shift, and $K\_1>0$ (e.g., $K\_1=2$ or $K\_1=3$).

For another aspect, there is a single S-PSS sequence (e.g., $N\_SPSS=1$) and there are two groups of SL synchronization IDs (e.g., $N\_G=2$), such as the NR-SL PSS sequence does not carry the group ID. For this aspect, the number of SL synchronization ID could be 672, and $N\_GID^{\wedge}SL=0$ or 1. In one instance of this aspect, $K\_1=0$, and the set of S-SSS sequences is a subset of NR-SSS sequence. In another instance of this aspect, the set of S-SSS sequences is a subset of NR-SSS sequence with a cyclic shift, and $K\_1>0$ (e.g., $K\_1=2$ or $K\_1=3$).

For yet another aspect, there are two S-PSS sequences (e.g., $N\_SPSS=2$) and there are two groups of SL synchronization IDs (e.g., $N\_G=2$), such as each S-PSS sequence represents one of the groups of SL synchronization IDs. For this aspect, the number of SL synchronization ID could be 672, and $N\_GID^{\wedge}SL=0$ or 1. In one instance of this aspect, $K\_1=0$, and the set of S-SSS sequences is a subset of NR-SSS sequence. In another instance of this aspect, the set of S-SSS sequences is a subset of NR-SSS sequence with a cyclic shift, and $K\_1>0$ (e.g., $K\_1=7$ or $K\_1=8$).

In one embodiment for the components of PSBCH content, one or more approaches can be supported at the same time to construct the PSBCH content. For example, some approach or example of approach can be supported for a carrier frequency range only.

In a first approach, PSBCH content can contain time-domain information on indicating where the PSBCH of the corresponding S-SSB is located, wherein the time-domain information can contain at least one of DFN-level information (e.g., DFN or part of DFN), half-frame-level information (e.g., half frame indicator), slot-level information (e.g., slot index within a fame or half frame or predefined time duration), or S-SSB index (e.g., for $L\_SSB>1$ and more than one S-SSB within a slot). Upon detecting the system information contained in PSBCH content, the UE can determine the symbol index within a slot using a predefined S-SSB mapping in a slot, wherein the S-SSB index can be also utilized to determine the symbol index within a slot if one slot contains two S-SSBs, and the UE can also determine the slot index within a frame and DFN using the system information contained in PSBCH content.

Figure 21:
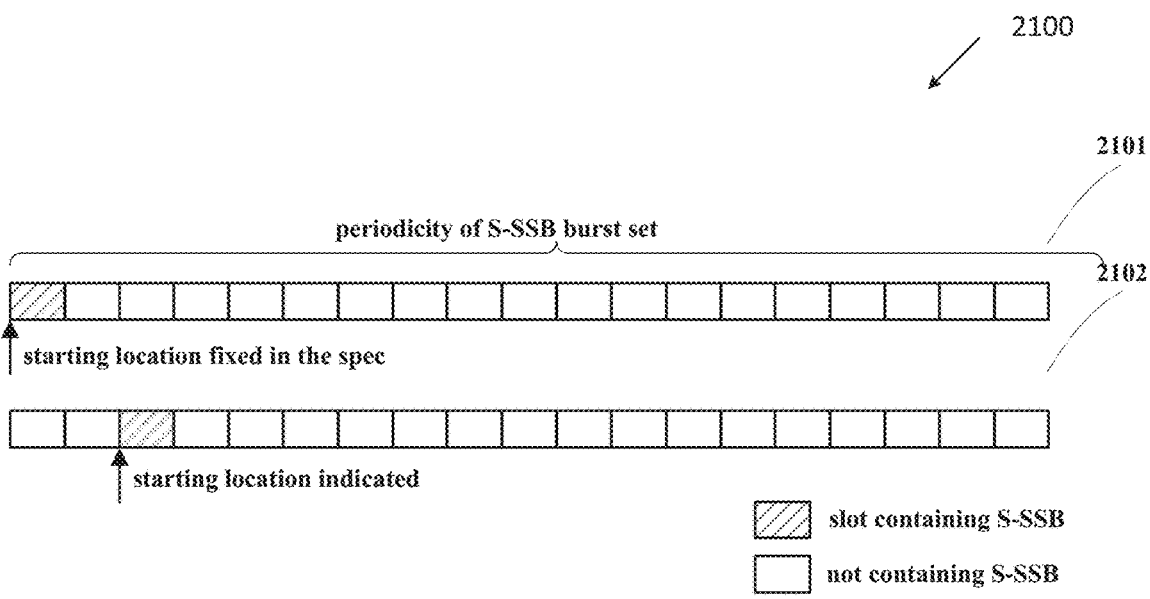
FIG. 21 illustrates an example time-domain mapping of an S-SSB burst set according to embodiments of the present disclosure.

FIG. 21 illustrates an example time-domain mapping of an S-SSB burst set 2100 according to embodiments of the present disclosure. The embodiment of the time-domain mapping of an S-SSB burst set 2100 illustrated in FIG. 21 is for illustration only. FIG. 21 does not limit the scope of this disclosure to any particular implementation.

In a first example of the first approach, one S-SSB burst set only contains single S-SSB (i.e., $L\_SSB=1$), such as S-SSB is operated in a single-beam manner, and the location of the slot containing the S-SSB is fixed in the spec, such as fixed as a particular slot (such as the first slot) within the periodicity of S-SSB burst set (e.g., 2101 in FIG. 21) or as a particular slot (such as the first slot) within a DFN or as a particular slot (such as the first slot) within a half frame.

In one sub-example, if the periodicity of S-SSB burst set is $2^{\wedge}n$ frame, where $n \geq 0$, and the location of the slot containing the S-SSB is fixed as a particular slot (such as the first slot) within the periodicity of S-SSB burst set, then the (10−n) MSBs of DFN (e.g., a (10−n)-bit field) wherein the PSBCH of the corresponding S-SSB is located can be indicated in PSBCH content.

In another sub-example, if the periodicity of S-SSB burst set is $2^{\wedge}n$ frame, where $n \geq 0$, and the location of the slot containing the S-SSB is fixed as a particular slot (such as the first slot) within a DFN, then the DFN (e.g., a 10-bit field taking value from 0 to 1023) wherein the PSBCH of the corresponding S-SSB is located can be indicated in PSBCH content.

In yet another sub-example, if the location of the slot containing the S-SSB is fixed as a particular slot (such as the first slot) within a half frame, then the DFN (e.g., a 10-bit field taking value from 0 to 1023) and half frame number (e.g., a 1-bit field indicating the first or second half frame within a frame) wherein the PSBCH of the corresponding S-SSB is located can be indicated in PSBCH content.

In a second example of the first approach, one S-SSB burst set only contains single S-SSB (i.e., $L\_SSB=1$), such as S-SSB is operated in a single-beam manner, and the location of the slot containing the S-SSB is variable and indicated (e.g., 2102 in FIG. 21).

In one sub-example, the DFN (e.g., a 10-bit field taking value from 0 to 1023) and the slot index within the indicated DFN wherein the PSBCH of the corresponding S-SSB is located can be indicated in PSBCH content, wherein the slot index within the DFN can be expressed in a (k+4)-bit field taking value from 0 to M−1, where $M=10*2^{\wedge}k$, and $15*2^{\wedge}k$ is the largest SCS supported for NR sidelink (such as k=4) or for a carrier frequency range of NR sidelink (such as k=4 for above 6 GHz and k=2 for below 6 GHz).

Figure 22:
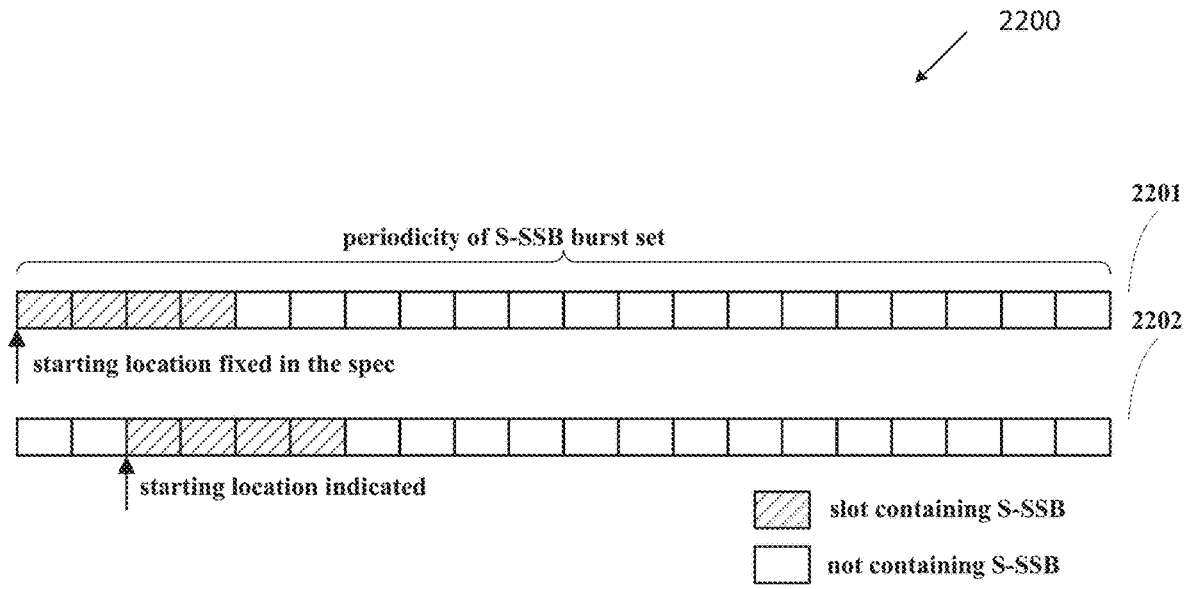
FIG. 22 illustrates another example time-domain mapping of an S-SSB burst set according to embodiments of the present disclosure.

FIG. 22 illustrates another example time-domain mapping of an S-SSB burst set 2200 according to embodiments of the present disclosure. The embodiment of the time-domain mapping of an S-SSB burst set 2200 illustrated in FIG. 22 is for illustration only. FIG. 22 does not limit the scope of this disclosure to any particular implementation.

In a third example of the first approach, one S-SSB burst set contains multiple S-SSB (i.e., $L\_SSB>1$), such as S-SSB could be operated in a multi-beam manner and/or repetitive manner, and the slots containing the S-SSBs are contiguous, and the locations of the slots containing the S-SSBs are fixed in the spec, such as fixed as starting from a particular slot (e.g., the first slot) within the periodicity of S-SSB burst set (e.g., 2201 in FIG. 22) or as starting from a particular slot (e.g., the first slot) within a DFN or as starting from a particular slot (e.g., the first slot) within a half frame.

In one sub-example, if the periodicity of S-SSB burst set is $2^{\wedge}n$ frame, where $n \geq 0$, and the location of the slot containing the S-SSB is fixed as starting from a particular slot (such as the first slot) within the periodicity of S-SSB burst set, then the (10−n) MSBs of DFN (e.g., a (10−n)-bit field) wherein the PSBCH of the corresponding S-SSB is located, as well as the S-SSB index (or MSBs of the S-SSB index), can be indicated in PSBCH content.

In another sub-example, if the periodicity of S-SSB burst set is $2^{\wedge}n$ frame, where $n \geq 0$, and the location of the slot containing the S-SSB is fixed as starting from a particular slot (such as the first slot) within the periodicity of S-SSB burst set, then the (10−n) MSBs of DFN (e.g., a (10−n)-bit field) wherein the PSBCH of the corresponding S-SSB is located can be indicated in PSBCH content, and the S-SSB index is indicated using other signal/channel from PSBCH such as DMRS of PSBCH.

In yet another sub-example, if the periodicity of S-SSB burst set is $2^n$ frame, where $n \geq 0$, and the location of the slot containing the S-SSB is fixed as starting from a particular slot (such as the first slot) within a DFN, then the DFN (e.g., a 10-bit field taking value from 0 to 1023) wherein the PSBCH of the corresponding S-SSB is located, as well as the S-SSB index, can be indicated in PSBCH content.

In yet another sub-example, if the periodicity of S-SSB burst set is $2^n$ frame, where $n \geq 0$, and the location of the slot containing the S-SSB is fixed as starting from a particular slot (such as the first slot) within a DFN, then the DFN (e.g., a 10-bit field taking value from 0 to 1023) wherein the PSBCH of the corresponding S-SSB is located can be indicated in PSBCH content, and the S-SSB index is indicated using other signal/channel from PSBCH such as DMRS of PSBCH.

In yet another sub-example, if the location of the slot containing the S-SSB is fixed as starting from a particular slot (such as the first slot) within a half frame, then the DFN (e.g., a 10-bit field taking value from 0 to 1023) and half frame number (e.g., a 1-bit field indicating the first or second half frame within a frame) wherein the PSBCH of the corresponding S-SSB is located, as well as the S-SSB index (or MSBs of the S-SSB index), can be indicated in PSBCH content.

In yet another sub-example, if the location of the slot containing the S-SSB is fixed as starting from a particular slot (such as the first slot) within a half frame, then the DFN (e.g., a 10-bit field taking value from 0 to 1023) and half frame number (e.g., a 1-bit field indicating the first or second half frame within a frame) wherein the PSBCH of the corresponding S-SSB is located can be indicated in PSBCH content, and the S-SSB index is indicated using other signal/channel from PSBCH such as DMRS of PSBCH.

In a fourth example of the first approach, one S-SSB burst set contains multiple S-SSB (i.e., L_SSB>1), such as S-SSB is operated in a multi-beam manner and/or repetitive manner, and the slots containing the S-SSBs are contiguous, and the starting location of the slots containing the S-SSBs is variable and indicated (e.g., 2202 in FIG. 22).

In one sub-example, the DFN (e.g., a 10-bit field taking value from 0 to 1023) and the slot index within the indicated DFN wherein the first slot containing S-SSB is located, as well as the S-SSB index (or MSBs of the S-SSB index), can be indicated in PSBCH content, wherein the slot index within the DFN can be expressed in a (k+4)-bit field taking value from 0 to M−1, where $M=10*2^k$, and $15*2^k$ is the largest SCS supported for NR sidelink (such as k=4) or a carrier frequency range of NR sidelink (such as k=4 for above 6 GHz and k=1 for below 6 GHz).

In another sub-example, the DFN (e.g., a 10-bit field taking value from 0 to 1023) and the slot index within the indicated DFN wherein the first slot containing S-SSB is located can be indicated in PSBCH content, wherein the slot index within the DFN can be expressed in a (k+4)-bit field taking value from 0 to M−1, where $M=10*2^k$, and $15*2^k$ is the largest SCS supported for NR sidelink (such as k=4) or a carrier frequency range of NR sidelink (such as k=4 for above 6 GHz and k=1 for below 6 GHz), and the S-SSB index is indicated using other signal/channel from PSBCH such as DMRS of PSBCH.

Figure 23:
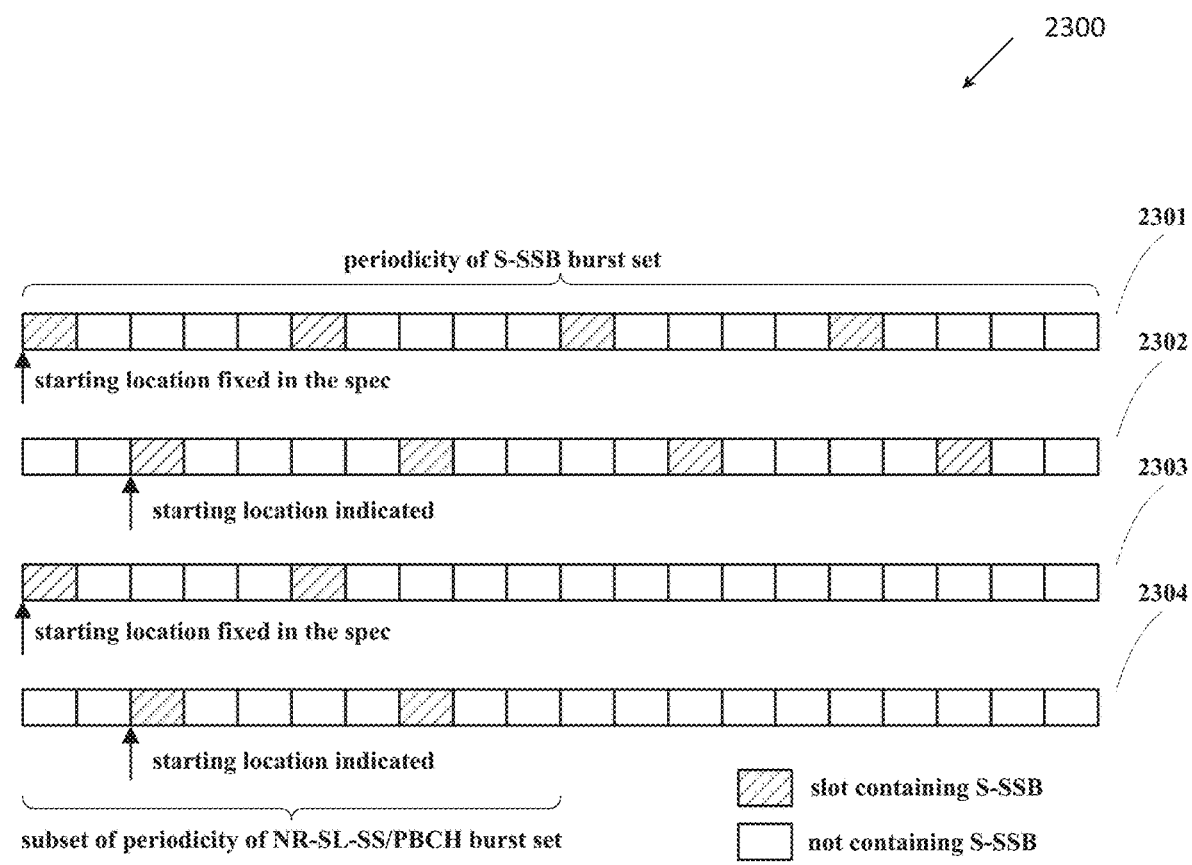
FIG. 23 illustrates another example time-domain mapping of an S-SSB burst set according to embodiments of the present disclosure.

FIG. 23 illustrates another example time-domain mapping of an S-SSB burst set 2300 according to embodiments of the present disclosure. The embodiment of the time-domain mapping of an S-SSB burst set 2300 illustrated in FIG. 23 is for illustration only. FIG. 23 does not limit the scope of this disclosure to any particular implementation.

In a fifth example of the first approach, one S-SSB burst set contains multiple S-SSB (i.e., L_SSB>1), such as S-SSB is operated in a multi-beam manner and/or repetitive manner, and the slots containing the S-SSBs can be non-contiguous, and slots containing the S-SSB are uniformly distributed with fixed interval within the periodicity of the S-SSB burst set, and the first slot containing the S-SSB is fixed in the spec, such as fixed as starting from a particular slot (such as the first slot) within the periodicity of S-SSB burst set (e.g., 2301 in FIG. 23) or as starting from a particular slot (such as the first slot) within a DFN or as starting from a particular slot (such as the first slot) within a half frame. For instance, the indexes of slots containing the S-SSB within the periodicity of S-SSB burst set (or the DFN, or the half frame) can be given by #0, #(N/L_SSB), #2*(N/L_SSB), . . . , #(L_SSB−1)*(N/L_SSB) if each slot contains single S-SSB, and given by #0, #2*(N/L_SSB), #2*2*(N/L_SSB), . . . , #2*(L_SSB/2−1)*(N/L_SSB) if each slot contains two S-SSBs, wherein L_SSB is the maximum number of S-SSBs in a burst set determined per carrier frequency range, and N is the periodicity of S-SSB burst set (or the DFN, or the half frame) in terms of slots.

In one sub-example, if the periodicity of S-SSB burst set is $2^n$ frame, where $n \geq 0$, and the location of the slot containing the S-SSB is fixed as starting from a particular slot (such as the first slot) within the periodicity of S-SSB burst set, then the (10−n) MSBs of DFN (e.g., a (10−n)-bit field) wherein the PSBCH of the corresponding S-SSB is located, as well as the S-SSB index (or MSBs of the S-SSB index), can be indicated in PSBCH content.

In another sub-example, if the periodicity of S-SSB burst set is $2^n$ frame, where $n \geq 0$, and the location of the slot containing the S-SSB is fixed as starting from a particular slot (such as the first slot) within the periodicity of S-SSB burst set, then the (10−n) MSBs of DFN (e.g., a (10−n)-bit field) wherein the PSBCH of the corresponding S-SSB is located can be indicated in PSBCH content, and the S-SSB index is indicated using other signal/channel from PSBCH such as DMRS of PSBCH.

In yet another sub-example, if the periodicity of S-SSB burst set is $2^n$ frame, where $n \geq 0$, and the location of the slot containing the S-SSB is fixed as starting from a particular slot (such as the first slot) within a DFN, then the DFN (e.g., a 10-bit field taking value from 0 to 1023) wherein the PSBCH of the corresponding S-SSB is located, as well as the S-SSB index, can be indicated in PSBCH content.

In yet another sub-example, if the periodicity of S-SSB burst set is $2^n$ frame, where $n \geq 0$, and the location of the slot containing the S-SSB is fixed as starting from a particular slot (such as the first slot) within a DFN, then the DFN (e.g., a 10-bit field taking value from 0 to 1023) wherein the PSBCH of the corresponding S-SSB is located can be indicated in PSBCH content, and the S-SSB index is indicated using other signal/channel from PSBCH such as DMRS of PSBCH.

In yet another sub-example, if the location of the slot containing the S-SSB is fixed as starting from a particular slot (such as the first slot) within a half frame, then the DFN (e.g., a 10-bit field taking value from 0 to 1023) and half frame number (e.g., a 1-bit field indicating the first or second half frame within a frame) wherein the PSBCH of the corresponding S-SSB is located, as well as the S-SSB index (or MSBs of the S-SSB index), can be indicated in PSBCH content.

In yet another sub-example, if the location of the slot containing the S-SSB is fixed as starting from a particular slot (such as the first slot) within a half frame, then the DFN (e.g., a 10-bit field taking value from 0 to 1023) and half frame number (e.g., a 1-bit field indicating the first or second half frame within a frame) wherein the PSBCH of the corresponding S-SSB is located can be indicated in PSBCH content, and the S-SSB index is indicated using other signal/channel from PSBCH such as DMRS of PSBCH.

In a sixth example of the first approach, one S-SSB burst set contains multiple S-SSB (i.e., L_SSB>1), such as S-SSB is operated in a multi-beam manner and/or repetitive manner, and the slots containing the S-SSBs can be non-contiguous, and slots containing the S-SSB are uniformly distributed with fixed interval within the periodicity of the S-SSB burst set, and the first slot containing the S-SSB is variable and indicated (e.g., 2302 in FIG. 23).

For instance, the indexes of slots containing the S-SSB within the periodicity of S-SSB burst set (or the DFN, or the half frame) can be given by # M, # M+(N/L_SSB), # M+2*(N/L_SSB), . . . , # M+(L_SSB−1)*(N/L_SSB) if each slot contains single S-SSB, and given by # M, # M+2*(N/L_SSB), # M+2*2*(N/L_SSB), . . . , # M+2*(L_SSB/2−1)*(N/L_SSB) if each slot contains two S-SSBs, wherein L_SSB is the maximum number of S-SSBs in a burst set determined per carrier frequency range, and N is the periodicity of S-SSB burst set (or the DFN, or the half frame) in terms of slots, and M is the index of the first slot containing the S-SSB which is indicated.

In one sub-example, the DFN (e.g., a 10-bit field taking value from 0 to 1023) and the slot index within the indicated DFN wherein the first slot containing S-SSB is located, as well as the S-SSB index (or MSBs of the S-SSB index), can be indicated in PSBCH content, wherein the slot index within the DFN can be expressed in a (k+4)-bit field taking value from 0 to M−1, where M=10*2^k, and 15*2^k is the largest SCS supported for NR sidelink (such as k=4) or a carrier frequency range of NR sidelink (such as k=4 for above 6 GHz and k=1 for below 6 GHz).

In another sub-example, the DFN (e.g., a 10-bit field taking value from 0 to 1023) and the slot index within the indicated DFN wherein the first slot containing S-SSB is located can be indicated in PSBCH content, wherein the slot index within the DFN can be expressed in a (k+4)-bit field taking value from 0 to M−1, where M=10*2^k, and 15*2^k is the largest SCS supported for NR sidelink (such as k=4) or a carrier frequency range of NR sidelink (such as k=4 for above 6 GHz and k=1 for below 6 GHz), and the S-SSB index is indicated using other signal/channel from PSBCH such as DMRS of PSBCH.

In a seventh example of the first approach, one S-SSB burst set contains multiple S-SSB (i.e., L_SSB>1), such as S-SSB is operated in a multi-beam manner and/or repetitive manner, and the slots containing the S-SSBs can be non-contiguous, and slots containing the S-SSB are uniformly distributed with fixed interval within a subset of the periodicity of the S-SSB burst set, and the first slot containing the S-SSB is fixed in the spec, such as fixed as starting from a particular slot (such as the first slot) within the periodicity of S-SSB burst set (e.g., 2303 in FIG. 23) or as starting from a particular slot (such as the first slot) within a DFN or as starting from a particular slot (such as the first slot) within a half frame.

For instance, the indexes of slots containing the S-SSB within the periodicity of S-SSB burst set (or the DFN, or the half frame) can be given by #0, #(N/L), #2*(N/L), . . . , #(L_SSB−1)*(N/L) if each slot contains single S-SSB, and given by #0, #2*(N/L), #2*2*(N/L), #2*(L_SSB/2−1)*(N/L) if each slot contains two S-SSBs, wherein L_SSB is the maximum number of S-SSBs in a burst set determined per carrier frequency range, and N is the periodicity of S-SSB burst set (or the DFN, or the half frame) in terms of slots, and L is a predefined integer with L>L_SSB.

In one sub-example, if the periodicity of S-SSB burst set is 2^n frame, where n≥0, and the location of the slot containing the S-SSB is fixed as starting from a particular slot (such as the first slot) within the periodicity of S-SSB burst set, then the (10−n) MSBs of DFN (e.g., a (10−n)-bit field) wherein the PSBCH of the corresponding S-SSB is located, as well as the S-SSB index (or MSBs of the S-SSB index), can be indicated in PSBCH content.

In another sub-example, if the periodicity of S-SSB burst set is 2^n frame, where n≥0, and the location of the slot containing the S-SSB is fixed as starting from a particular slot (such as the first slot) within the periodicity of S-SSB burst set, then the (10−n) MSBs of DFN (e.g., a (10−n)-bit field) wherein the PSBCH of the corresponding S-SSB is located can be indicated in PSBCH content, and the S-SSB index is indicated using other signal/channel from PSBCH such as DMRS of PSBCH.

In yet another sub-example, if the periodicity of S-SSB burst set is 2^n frame, where n≥0, and the location of the slot containing the S-SSB is fixed as starting from a particular slot (such as the first slot) within a DFN, then the DFN (e.g., a 10-bit field taking value from 0 to 1023) wherein the PSBCH of the corresponding S-SSB is located, as well as the S-SSB index, can be indicated in PSBCH content.

In yet another sub-example, if the periodicity of S-SSB burst set is 2^n frame, where n≥0, and the location of the slot containing the S-SSB is fixed as starting from a particular slot (such as the first slot) within a DFN, then the DFN (e.g., a 10-bit field taking value from 0 to 1023) wherein the PSBCH of the corresponding S-SSB is located can be indicated in PSBCH content, and the S-SSB index is indicated using other signal/channel from PSBCH such as DMRS of PSBCH.

In yet another sub-example, if the location of the slot containing the S-SSB is fixed as starting from a particular slot (such as the first slot) within a half frame, then the DFN (e.g., a 10-bit field taking value from 0 to 1023) and half frame number (e.g., a 1-bit field indicating the first or second half frame within a frame) wherein the PSBCH of the corresponding S-SSB is located, as well as the S-SSB index (or MSBs of the S-SSB index), can be indicated in PSBCH content.

In yet another sub-example, if the location of the slot containing the S-SSB is fixed as starting from a particular slot (such as the first slot) within a half frame, then the DFN (e.g., a 10-bit field taking value from 0 to 1023) and half frame number (e.g., a 1-bit field indicating the first or second half frame within a frame) wherein the PSBCH of the corresponding S-SSB is located can be indicated in PSBCH content, and the S-SSB index is indicated using other signal/channel from PSBCH such as DMRS of PSBCH.

In an eighth example of the first approach, one S-SSB burst set contains multiple S-SSB (i.e., L_SSB>1), such as S-SSB is operated in a multi-beam manner and/or repetitive manner, and the slots containing the S-SSBs can be non-contiguous, and slots containing the S-SSB are uniformly distributed with fixed interval within a subset of the periodicity of the S-SSB burst set, and the first slot containing the S-SSB is variable and indicated (e.g., 2304 in FIG. 23).

For instance, the indexes of slots containing the S-SSB within the periodicity of S-SSB burst set (or the DFN, or the half frame) can be given by # M, # M+(N/L), # M+2*(N/L), . . . , # M+(L_SSB−1)*(N/L) if each slot contains single S-SSB, and given by # M, # M+2*(N/L), # M+2*2*(N/L), . . . , # M+2*(L_SSB/2−1)*(N/L) if each slot contains two S-SSBs, wherein L_SSB is the maximum number of S-SSBs in a burst set determined per carrier frequency range, and N is the periodicity of S-SSB burst set (or the DFN, or the half frame) in terms of slots, and M is the index of the first slot containing the S-SSB which is indicated, and L is a predefined integer with L>L_SSB.

In one sub-example, the DFN (e.g., a 10-bit field taking value from 0 to 1023) and the slot index within the indicated DFN wherein the first slot containing S-SSB is located, as well as the S-SSB index (or MSBs of the S-SSB index), can be indicated in PSBCH content, wherein the slot index within the DFN can be expressed in a (k+4)-bit field taking value from 0 to M−1, where M=10*2^k, and 15*2^k is the largest SCS supported for NR sidelink (such as k=4) or a carrier frequency range of NR sidelink (such as k=4 for above 6 GHz and k=1 for below 6 GHz).

In another sub-example, the DFN (e.g., a 10-bit field taking value from 0 to 1023) and the slot index within the indicated DFN wherein the first slot containing S-SSB is located can be indicated in PSBCH content, wherein the slot index within the DFN can be expressed in a (k+4)-bit field taking value from 0 to M−1, where M=10*2^k, and 15*2^k is the largest SCS supported for NR sidelink (such as k=4) or a carrier frequency range of NR sidelink (such as k=4 for above 6 GHz and k=1 for below 6 GHz), and the S-SSB index is indicated using other signal/channel from PSBCH such as DMRS of PSBCH.

Figure 24:
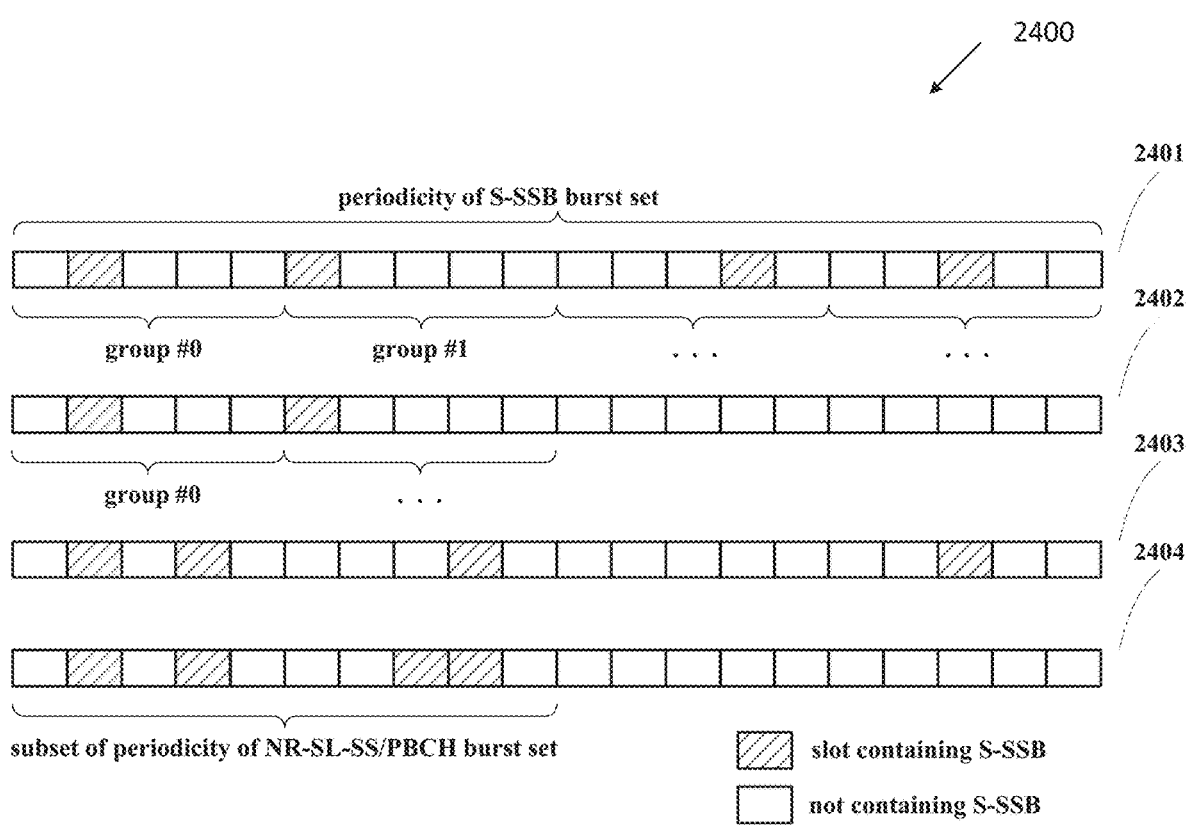
FIG. 24 illustrates another example time-domain mapping of an S-SSB burst set according to embodiments of the present disclosure.

FIG. 24 illustrates another example time-domain mapping of an S-SSB burst set 2400 according to embodiments of the present disclosure. The embodiment of the time-domain mapping of an S-SSB burst set 2400 illustrated in FIG. 24 is for illustration only. FIG. 24 does not limit the scope of this disclosure to any particular implementation.

In a ninth example of the first approach, one S-SSB burst set contains multiple S-SSB (i.e., L_SSB>1), such as S-SSB is operated in a multi-beam manner and/or repetitive manner, and the slots containing the S-SSBs can be non-contiguous, and each of slots containing the S-SSB is confined within a predefined group of slots, wherein the groups of slots are with same number of slots and consist of the periodicity of the S-SSB burst set (e.g., 2401 in FIG. 24). For instance, the periodicity of the S-SSB burst set is divided into L_SSB groups of slots if each slot contains single S-SSB, and is divided into L_SSB/2 groups of slots if each slot contains two S-SSBs, wherein each group is with same number of slots and each group contains one slot containing the S-SSB, and the location of the slot containing the S-SSB can be variable in the corresponding group and indicated. In this example, the group index is same as S-SSB index if each slot contains single S-SSB, and the combination of group index and the location of S-SSB within a slot (e.g., 1-bit indication) is same as S-SSB index if each slot contains two S-SSBs.

In one sub-example, the DFN (e.g., a 10-bit field taking value from 0 to 1023), slot index within the group, as well as the S-SSB index (or MSBs of the S-SSB index or group index), can be indicated in PSBCH content.

In another sub-example, the DFN (e.g., a 10-bit field taking value from 0 to 1023) and slot index within the group can be indicated in PSBCH content, and the S-SSB index (or LSBs of the S-SSB index or group index) is indicated using other signal/channel from PSBCH such as DMRS of PSBCH.

In a tenth example of the first approach, one S-SSB burst set contains multiple S-SSB (i.e., L_SSB>1), such as S-SSB is operated in a multi-beam manner and/or repetitive manner, and the slots containing the S-SSBs can be non-contiguous, and each of slots containing the S-SSB is confined within a predefined group of slots, wherein the groups of slots are with same number of slots and consist of a subset of the periodicity of the S-SSB burst set (e.g., 2402 in FIG. 24).

For instance, a subset of the periodicity of the S-SSB burst set is divided into L_SSB groups of slots if each slot contains single S-SSB, and is divided into L_SSB/2 groups of slots if each slot contains two S-SSBs, wherein each group is with same number of slots and each group contains one slot containing the S-SSB, and the location of the slot containing the S-SSB can be variable in the corresponding group and indicated. In this example, the group index is same as S-SSB index if each slot contains single S-SSB, and the combination of group index and the location of S-SSB within a slot (e.g., 1-bit indication) is same as S-SSB index if each slot contains two S-SSBs.

In one sub-example, the DFN (e.g., a 10-bit field taking value from 0 to 1023), slot index within the group, as well as the S-SSB index (or MSBs of the S-SSB index or group index), can be indicated in PSBCH content.

In another sub-example, the DFN (e.g., a 10-bit field taking value from 0 to 1023) and slot index within the group can be indicated in PSBCH content, and the S-SSB index (or LSBs of the S-SSB index or group index) is indicated using other signal/channel from PSBCH such as DMRS of PSBCH.

In an eleventh example of the first approach, one S-SSB burst set contains multiple S-SSB (i.e., L_SSB>1), such as S-SSB is operated in a multi-beam manner and/or repetitive manner, and the slots containing the S-SSBs can be non-contiguous, and the location of each slot containing the S-SSB can be variable within the periodicity of S-SSB burst set and indicated (e.g., 2403 in FIG. 24).

In one sub-example, the DFN (e.g., a 10-bit field taking value from 0 to 1023) and the slot index within the indicated DFN wherein the PSBCH of the corresponding S-SSB is located can be indicated in PSBCH content, wherein the slot index within the DFN can be expressed in a (k+4)-bit field taking value from 0 to M−1, where M=10*2^k, and 15*2^k is the largest SCS supported for NR sidelink (such as k=4) or a carrier frequency range of NR sidelink (such as k=4 for above 6 GHz and k=1 for below 6 GHz). If each slot contains two S-SSBs, the location of S-SSB within a slot (e.g., 1-bit indication for one of the two S-SSBs in a slot) can also be indicated PSBCH content.

In another sub-example, the DFN (e.g., a 10-bit field taking value from 0 to 1023) and the slot index within the indicated DFN wherein the PSBCH of the corresponding S-SSB is located can be indicated in PSBCH content, wherein the slot index within the DFN can be expressed in a (k+4)-bit field taking value from 0 to M−1, where M=10*2^k, and 15*2^k is the largest SCS supported for NR sidelink (such as k=4) or a carrier frequency range of NR sidelink (such as k=4 for above 6 GHz and k=1 for below 6 GHz). If each slot contains two S-SSBs, the location of S-SSB within a slot (e.g., 1-bit indication for one of the two S-SSBs in a slot) can be indicated using other signal/channel from PSBCH such as DMRS of PSBCH.

In a twelfth example of the first approach, one S-SSB burst set contains multiple S-SSB (i.e., L_SSB>1), such as S-SSB is operated in a multi-beam manner and/or repetitive manner, and the slots containing the S-SSBs can be non-contiguous, and the location of each slot containing the S-SSB can be variable within a subset of the periodicity of S-SSB burst set and indicated (e.g., 2404 in FIG. 24).

In one sub-example, the DFN (e.g., a 10-bit field taking value from 0 to 1023) and the slot index within the indicated DFN wherein the PSBCH of the corresponding S-SSB is located can be indicated in PSBCH content, wherein the slot index within the DFN can be expressed in a (k+4)-bit field taking value from 0 to M−1, where M=10*2^k, and 15*2^k is the largest SCS supported for NR sidelink (such as k=4) or a carrier frequency range of NR sidelink (such as k=4 for above 6 GHz and k=1 for below 6 GHz). If each slot contains two S-SSBs, the location of S-SSB within a slot (e.g., 1-bit indication for one of the two S-SSBs in a slot) can also be indicated PSBCH content.

In another sub-example, the DFN (e.g., a 10-bit field taking value from 0 to 1023) and the slot index within the indicated DFN wherein the PSBCH of the corresponding S-SSB is located can be indicated in PSBCH content, wherein the slot index within the DFN can be expressed in a (k+4)-bit field taking value from 0 to M−1, where M=10*2^k, and 15*2^k is the largest SCS supported for NR sidelink (such as k=4) or a carrier frequency range of NR sidelink (such as k=4 for above 6 GHz and k=1 for below 6 GHz). If each slot contains two S-SSBs, the location of S-SSB within a slot (e.g., 1-bit indication for one of the two S-SSBs in a slot) can be indicated using other signal/channel from PSBCH such as DMRS of PSBCH.

In a second approach, PSBCH content can contain a sidelink carrier bandwidth.

In a first example of this approach, the sidelink carrier bandwidth is indicated from a set of values in the unit of RBs, wherein the RB is in term of the SCS of S-SSB. The set of values can be determined per carrier frequency range.

In a second example of this approach, the sidelink carrier bandwidth is indicated from a set of values in the unit of RBs, wherein the RB is in term of the SCS indicated in PSBCH content. The set of values can be determined per indicated SCS and/or per carrier frequency range.

In a third example of this approach, the sidelink carrier bandwidth is indicated from a set of values in the unit of MHz. The set of values can be determined per carrier frequency range.

In a third approach, PSBCH content can contain numerology for a NR sidelink physical control channel (PSCCH) and/or NR sidelink physical shared channel (PSSCH).

In a first example of this approach, the numerology can contain at least subcarrier spacing for a PSSCH and/or PSCCH, indicated from a predefined set of values in the unit of kHz. The set of values can be determined per carrier frequency range.

In a second example of this approach, the numerology can contain at least subcarrier spacing for a PSSCH and/or PSCCH wherein the DMRS of the PSSCH and/or PSCCH is quasi co-located (QCLed) with the DMRS of current PSBCH, and the subcarrier spacing is indicated from a predefined set of values in the unit of kHz. The set of values can be determined per carrier frequency range.

In a fourth approach, PSBCH content can contain a frequency offset, wherein the frequency offset can contain at least one of a RE-level offset and a RB-level offset, where the RE or RB is in term of the numerology of PSCCH.

For a first example of this approach, the frequency offset refers to the difference between the lowest RE of the S-SSB and lowest RE of PSCCH.

For a second example of this approach, the frequency offset refers to the difference between the lowest RE of the S-SSB and lowest RE of the carrier.

For a third example of this approach, the frequency offset refers to the difference between the lowest RE of the S-SSB and lowest RE of the PSSCH.

For a fourth example of this approach, the frequency offset refers to the difference between the lowest RE of the S-SSB and lowest RE of the BWP where the S-SSB is located.

In a fifth approach, PSBCH content can contain the configuration of PSCCH and/or PSSCH.

In one example of this approach, the configuration can contain the BWP configuration.

In another example of this approach, the configuration can contain the multiplexing pattern of PSCCH and PSSCH.

In yet another example of this approach, the configuration can contain the resource allocation for PSCCH, e.g., the time-domain and frequency-domain resources mapped to PSCCH.

In yet another example of this approach, the configuration can contain the TDD slot configuration.

In a sixth approach, PSBCH content can contain information on the actually transmitted S-SSBs within a burst set.

In one example, the actually transmitted S-SSBs within a burst set is a bitmap with the length same as the maximum number of SS/PBCH blocks within a periodicity supported for a given band or carrier frequency range.

In another approach, if PSBCH content does not contain any information on the actually transmitted S-SSBs within a burst set, the UE may assume all S-SSBs within a burst set are transmitted.

In a seventh approach, PSBCH content can contain information on the power offset between S-SSB and PSCCH (or PSSCH).

For example, the power offset can refer to the energy per resource element (EPRE) between S-SSS (or equivalent as DMRS of PSBCH if S-SSS and DMRS of PSBCH have the same EPRE or predefined EPRE ratio) in the S-SSB and DMRS of PSCCH.

In an eighth approach, PSBCH content can contain information on the periodicity of S-SSB burst set.

In a ninth approach, PSBCH content can contain indication of the category of the system information in PSBCH content.

For example, 1 bit can be utilized to indicate whether the system information is from a base station or from a vehicle itself.

For another example, 2 bits can be utilized to indicate whether the system information is from a base station or from a vehicle itself, as well as the type of base station (e.g., NR base station or an LTE base station).

In a tenth approach, PSBCH content can contain at least one reserved bit for future extension.

In one embodiment, aspects for the scrambling of PSBCH are specified.

In a first approach, if the transmission time interval (TTI) of PSBCH is 2^m DFNs, and the periodicity of S-SSB burst set is 2^n DFNs, where m and n are integers and m≥n, then the (n+1)-th to m-th LSBs of DFN in the PSBCH content are not scrambled by the first-level scrambling sequence (all bits of DFN are scrambled if m=n), and the other bits in PSBCH content (not including CRC) are scrambled by the first-level scrambling sequence, wherein the first-level scrambling sequence is constructed based on sidelink synchronization ID and the (n+1)-th to m-th LSBs of DFN. All the bits after the first-level scrambling as well as the (n+1)-th to m-th LSBs of DFN not scrambled in the first-level scrambling are utilized to generate a CRC, and all the bits after the first-level scrambling, the (n+1)-th to m-th LSBs of DFN not scrambled in the first-level scrambling, together with the generated CRC are scrambled by the second-level scrambling, wherein the second-level scrambling sequence is constructed based on sidelink synchronization ID and, if applicable, other timing information carried by S-SSB but not by PSBCH (such as S-SSS and/or DMRS of PSBCH). An illustration of this example is shown in FIG. 25.

Figure 25:
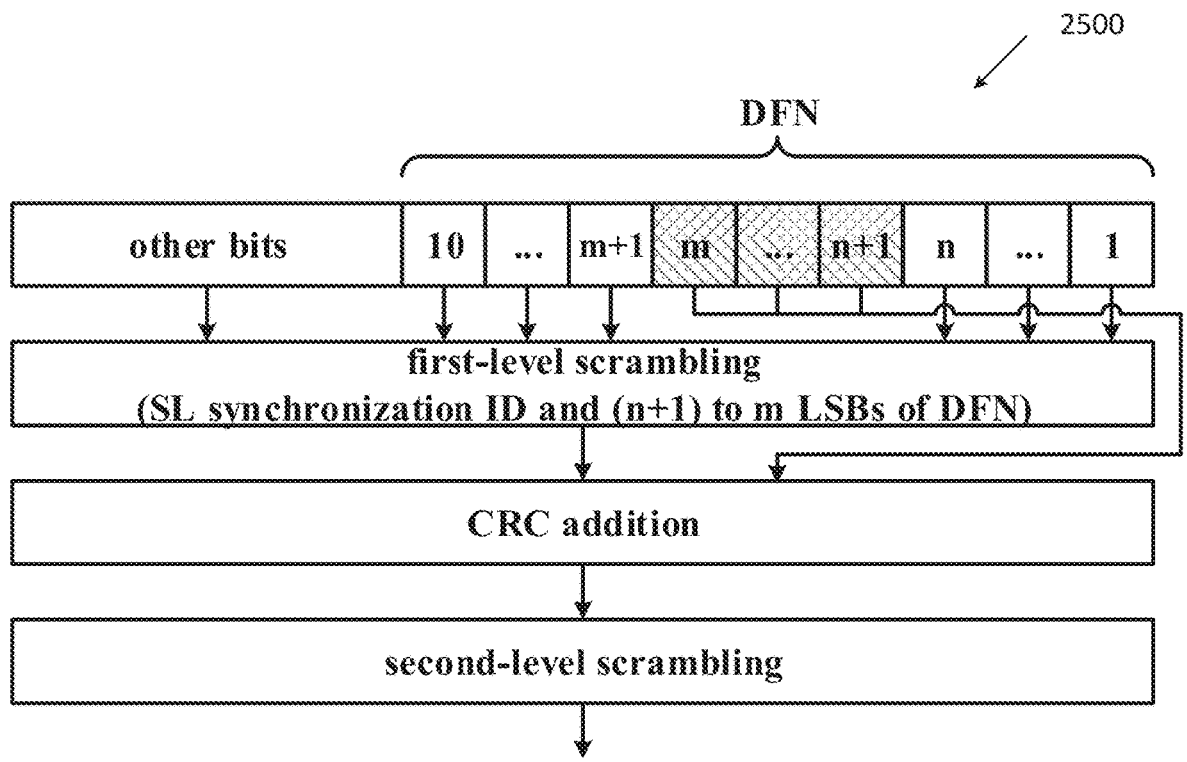
FIG. 25 illustrates an example scrambling of PSBCH according to embodiments of the present disclosure.

FIG. 25 illustrates an example scrambling of PSBCH 2500 according to embodiments of the present disclosure. The embodiment of the scrambling of PSBCH 2500 illustrated in FIG. 25 is for illustration only. FIG. 25 does not limit the scope of this disclosure to any particular implementation.

In a second approach, if the transmission time interval (TTI) of PSBCH is $2^m$ DFNs, and the periodicity of S-SSB burst set is $2^n$ DFNs, where m and n are integers and m≥n, then the 1st to m-th LSBs of DFN in the PSBCH content are not scrambled by the first-level scrambling sequence (all bits of DFN are scrambled if m=0), and the other bits in PSBCH content (not including CRC) are scrambled by the first-level scrambling sequence, wherein the first-level scrambling sequence is constructed based on sidelink synchronization ID and the 1st to m-th LSBs of DFN.

All the bits after the first-level scrambling as well as the 1st to m-th LSBs of DFN not scrambled in the first-level scrambling are utilized to generate a CRC, and all the bits after the first-level scrambling, the 1st to m-th LSBs of DFN not scrambled in the first-level scrambling, together with the generated CRC are scrambled by the second-level scrambling, wherein the second-level scrambling sequence is constructed based on sidelink synchronization ID and, if applicable, other timing information carried by S-SSB but not by PSBCH (such as S-SSS and/or DMRS of PSBCH). An illustration of this example is shown in FIG. 26.

Figure 26:
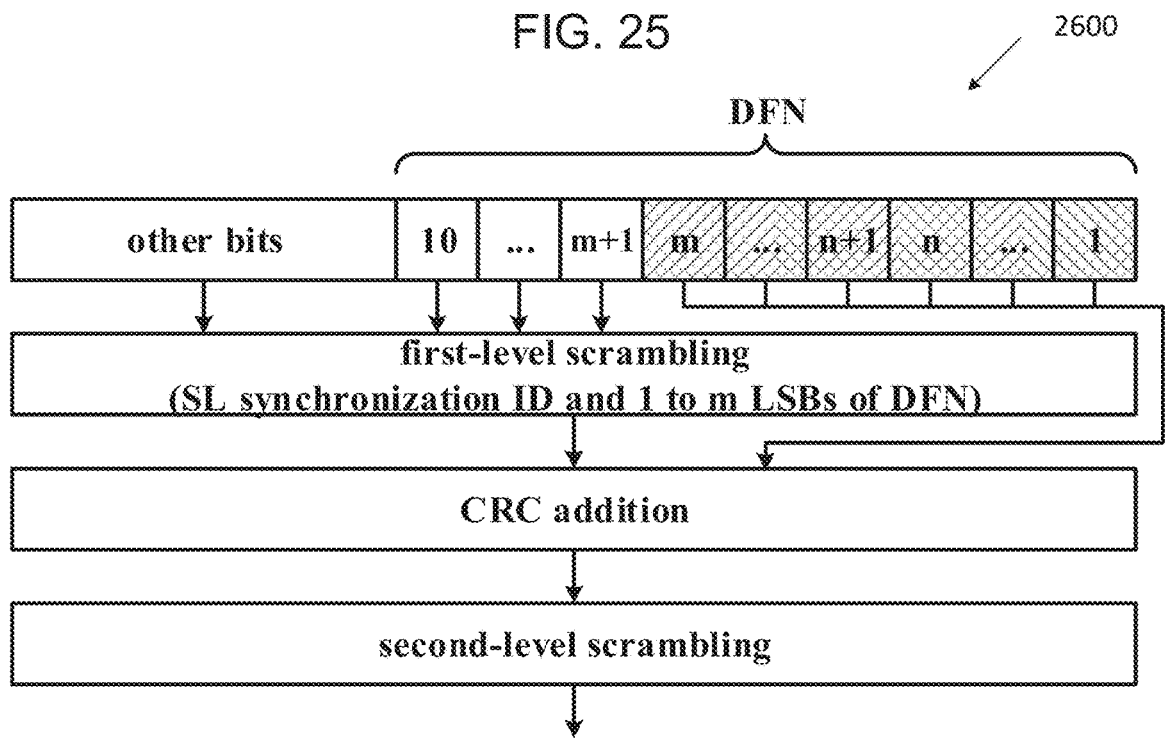
FIG. 26 illustrates another example scrambling of PSBCH according to embodiments of the present disclosure.

FIG. 26 illustrates another example scrambling of PSBCH 2600 according to embodiments of the present disclosure. The embodiment of the scrambling of PSBCH 2600 illustrated in FIG. 26 is for illustration only. FIG. 26 does not limit the scope of this disclosure to any particular implementation.

In a third approach, if the transmission time interval (TTI) of PSBCH is $2^m$ DFNs, and the periodicity of S-SSB burst set is $2^n$ DFNs, where m and n are integers and m≥n, then the 1st to m-th LSBs of DFN in the PSBCH content are not scrambled by the first-level scrambling sequence (all bits of DFN are scrambled if m=0), and the other bits in PSBCH content (not including CRC) are scrambled by the first-level scrambling sequence, wherein the first-level scrambling sequence is constructed based on sidelink synchronization ID and the (n+1)-th to m-th LSBs of DFN. All the bits after the first-level scrambling as well as the 1st to m-th LSBs of DFN not scrambled in the first-level scrambling are utilized to generate a CRC, and all the bits after the first-level scrambling, the 1st to m-th LSBs of DFN not scrambled in the first-level scrambling, together with the generated CRC are scrambled by the second-level scrambling, wherein the second-level scrambling sequence is constructed based on sidelink synchronization ID and, if applicable, other timing information carried by S-SSB but not by PSBCH (such as S-SSS and/or DMRS of PSBCH). An illustration of this example is shown in FIG. 27.

Figure 27:
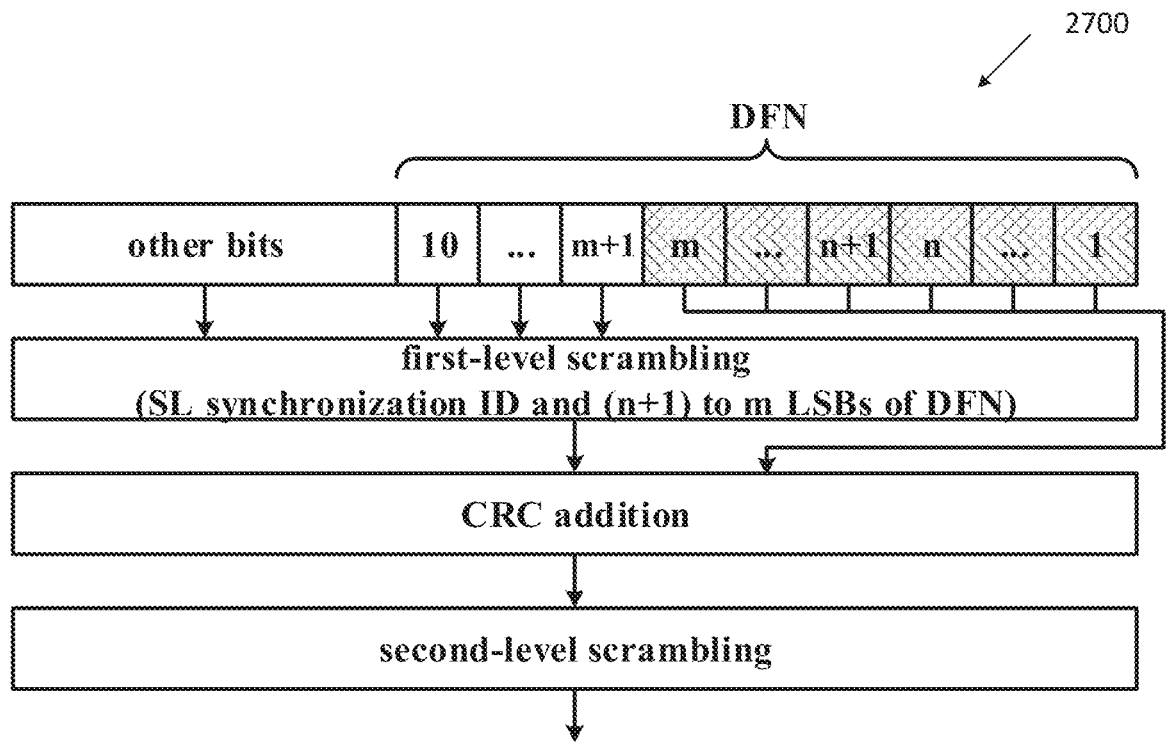
FIG. 27 illustrates yet another example scrambling of PSBCH according to embodiments of the present disclosure.

FIG. 27 illustrates yet another example scrambling of PSBCH 2700 according to embodiments of the present disclosure. The embodiment of the scrambling of PSBCH 2700 illustrated in FIG. 27 is for illustration only. FIG. 27 does not limit the scope of this disclosure to any particular implementation.

In a forth approach, all bits of DFN in the PSBCH content are scrambled by the first-level scrambling sequence, wherein the first-level scrambling sequence is constructed based on sidelink synchronization ID only. All the bits after the first-level scrambling are utilized to generate a CRC, and all the bits after the first-level scrambling are scrambled by the second-level scrambling, wherein the second-level scrambling sequence is constructed based on sidelink synchronization ID and, if applicable, other timing information carried by S-SSB but not by PSBCH (such as S-SSS and/or DMRS of PSBCH). An illustration of this example is shown in FIG. 28.

Figure 28:
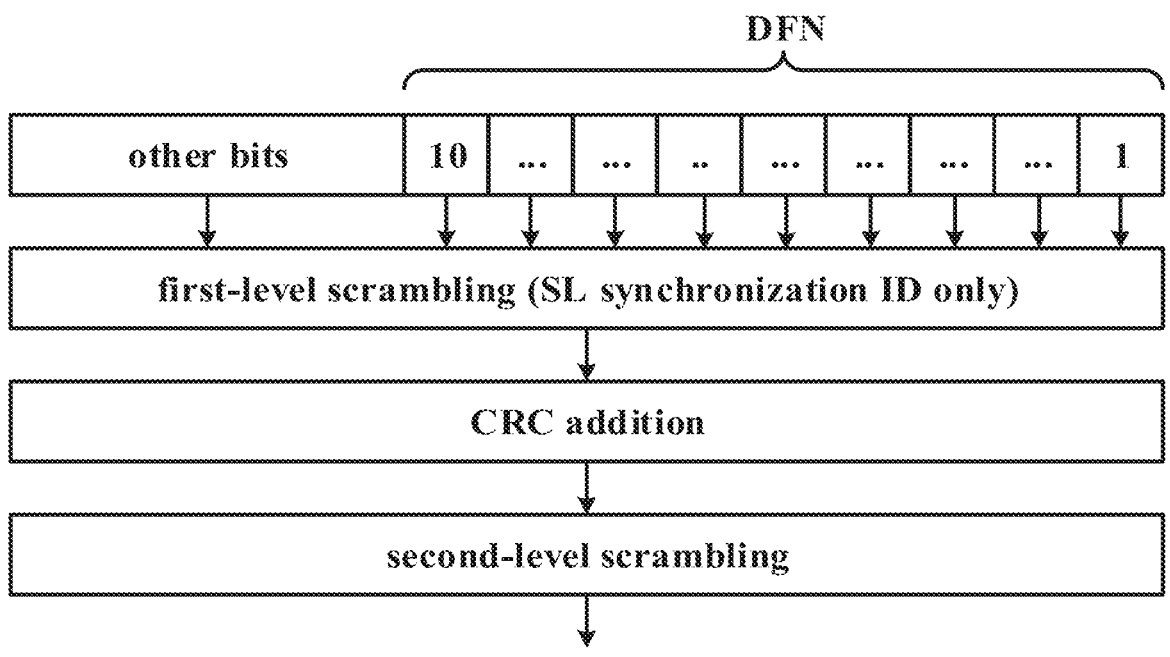
FIG. 28 illustrates yet another example scrambling of PSBCH according to embodiments of the present disclosure.

FIG. 28 illustrates yet another example scrambling of PSBCH 2800 according to embodiments of the present disclosure. The embodiment of the scrambling of PSBCH 2800 illustrated in FIG. 28 is for illustration only. FIG. 28 does not limit the scope of this disclosure to any particular implementation.

In a fifth approach, all bits other than CRC in the PSBCH content are scrambled by the scrambling sequence, wherein the scrambling sequence is constructed based on sidelink synchronization ID and, if applicable, other timing information carried by S-SSB but not by PSBCH (such as S-SSS and/or DMRS of PSBCH). All the bits after the scrambling are utilized to generate a CRC. There is only one level of scrambling in this approach. An illustration of this example is shown in FIG. 29.

Figure 29:
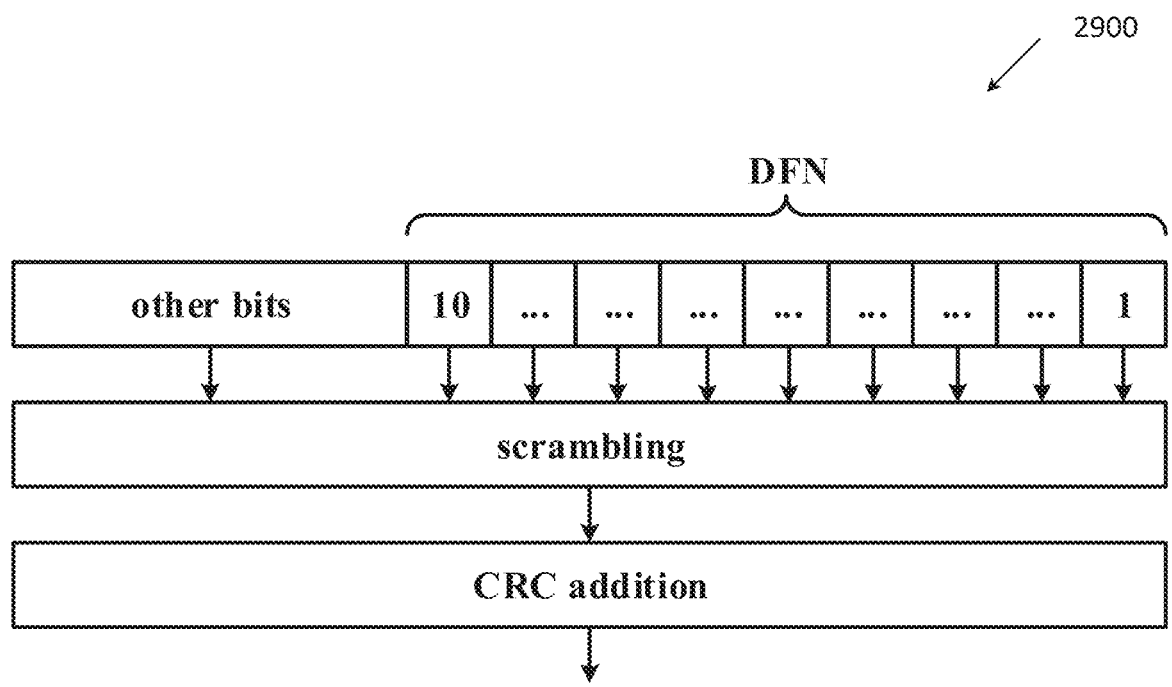
FIG. 29 illustrates yet another example scrambling of PSBCH according to embodiments of the present disclosure.

FIG. 29 illustrates yet another example scrambling of PSBCH 2900 according to embodiments of the present disclosure. The embodiment of the scrambling of PSBCH 2900 illustrated in FIG. 29 is for illustration only. FIG. 29 does not limit the scope of this disclosure to any particular implementation.

In one embodiment, aspects for the RE mapping of DMRS of PSBCH are specified.

In a first approach, part of the symbols within the S-SSBs are mapped for DMRS of PSBCH, such that symbol(s) containing DMRS of PSBCH are time division multiplexed (TDMed) with symbols containing PSBCH.

In one sub-approach, if the BW of S-SSB is larger than 12 RBs, and the BW of S-SSS is 12 RBs, then the remaining RBs, not mapped for S-SSS, in the symbol(s) containing S-SSS within the S-SSBs can be mapped for DMRS of PSBCH.

In one example of this approach, more than one TDM patterns can be supported, and each TDM pattern is associated with a group of sidelink synchronization IDs. For instance, the sidelink synchronization IDs can be divided into 2 groups (such as in-network and out-of-network), and the UE assumes the TDM pattern of symbol(s) containing DMRS of PSBCH and symbols containing PSBCH according to the detected sidelink synchronization ID from S-PSS and/or S-SSS. One example of the two TDM patterns is illustrated in FIG. 30, wherein some of the symbols containing DMRS of PSBCH in the first TDM pattern are mapped for PSBCH in the second TDM pattern, and some of the symbols containing PSBCH in the first TDM pattern are mapped for DMRS of PSBCH in the second TDM pattern.

Figure 30:
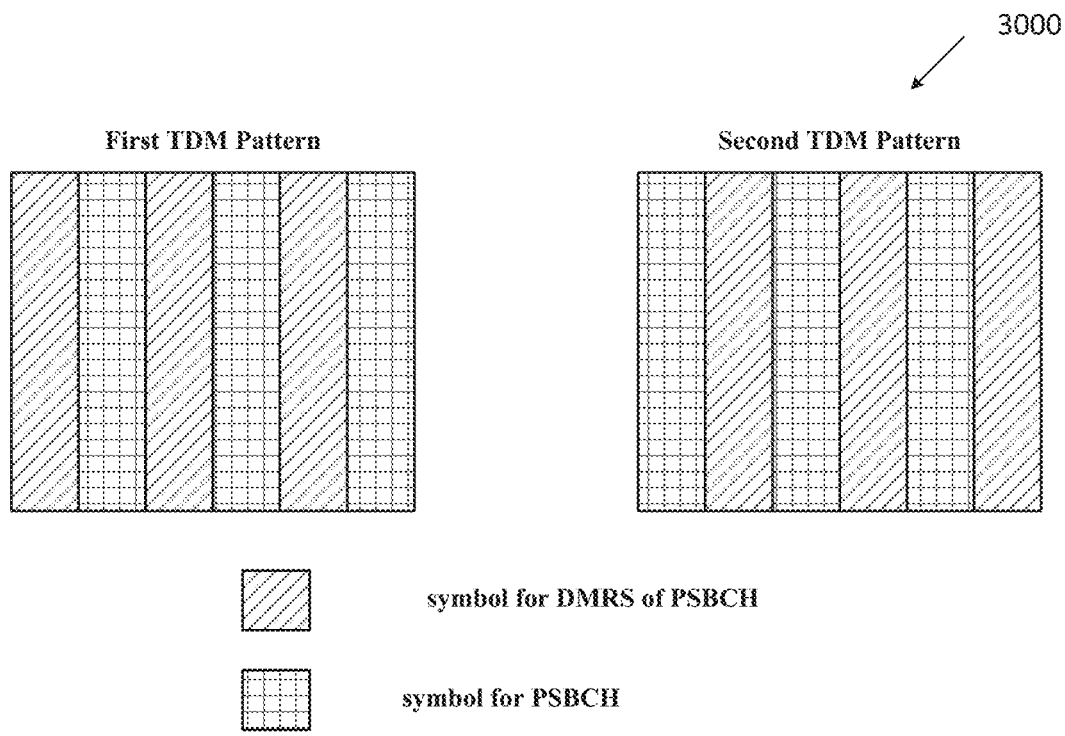
FIG. 30 illustrate an example TDM pattern of PSBCH and DMRS according to embodiments of the present disclosure.

FIG. 30 illustrate an example TDM pattern of PSBCH and DMRS 3000 according to embodiments of the present disclosure. The embodiment of the TDM pattern of PSBCH and DMRS 3000 illustrated in FIG. 30 is for illustration only. FIG. 30 does not limit the scope of this disclosure to any particular implementation.

In a second approach, DMRS of PSBCH is mapped to part of the REs within each RB containing REs carrying PSBCH, such that REs carrying DMRS of PSBCH are interleaved frequency division multiplexed (IFDMed) with REs carrying PSBCH.

In one example of this approach, the RE index within a RB of the RE carrying DMRS of PSBCH is fixed in the spec, such as $N\_RE\^DMRS \mod 4=1$ or $N\_RE\^DMRS \mod 2=0$, wherein $N\_RE\^DMRS$ is the RE index within a RB of the RE carrying DMRS of PSBCH.

In another example of this approach, the RE index within a RB of the RE carrying DMRS of PSBCH is determined by the sidelink synchronization ID. For one sub-example, $N\_RE\^DMRS \mod 4=(N\_ID\^SL \mod 4)$, wherein $N\_RE\^DMRS$ is the RE index within a RB of the RE carrying DMRS of PSBCH. For another sub-example, $N\_RE\^DMRS \mod 2=(N\_ID\^SL \mod 2)$, wherein $N\_RE\^DMRS$ is the RE index within a RB of the RE carrying DMRS of PSBCH.

In one embodiment, part of the system information could also be preconfigured, and is known to the V2X UE trying to synchronize to the source.

One or more approaches can be supported at the same time to construct the preconfigured system information. For example, some approach or example of approach can be supported for a carrier frequency range only.

In a first approach, the preconfigured system information can contain numerology for NR sidelink, and all the NR slidelink signals and channels are using the preconfigured numerology until configured again, if there is an extra configuration of numerology. The numerology contains at least one subcarrier spacing and a CP length.

In a second approach, the preconfigured system information can contain a sidelink carrier bandwidth.

In a first example of this approach, the sidelink carrier bandwidth is indicated from a set of values defined in the unit of RBs, wherein the RB is in term of the SCS contained within the preconfigured information. The set of values can be determined per carrier frequency range.

In a second example of this approach, the sidelink carrier bandwidth is indicated from a set of values defined in the unit of MHz. The set of values can be determined per carrier frequency range.

In a third approach, the preconfigured system information can contain the synchronization raster entry where an SS/PBCH block is located in the frequency domain.

In one example, the synchronization entry can be selected from a set of predefined frequency locations for a given band.

In a fourth approach, the preconfigured system information can contain a frequency offset, wherein the frequency offset can contain at least one of a RE-level offset and a RB-level offset, where the RE or RB is in term of the numerology in the preconfigured information.

For a first example of this approach, the frequency offset refers to the difference between the lowest RE of the S-SSB and lowest RE of PSCCH.

For a second example of this approach, the frequency offset refers to the difference between the lowest RE of the S-SSB and lowest RE of the carrier.

For a third example of this approach, the frequency offset refers to the difference between the lowest RE of the S-SSB and lowest RE of the PSSCH.

For a fourth example of this approach, the frequency offset refers to the difference between the lowest RE of the S-SSB and lowest RE of the BWP where the S-SSB is located.

In a fifth approach, the preconfigured system information can contain a BWP configuration. All the NR slidelink signals and channels are assumed to be with the preconfigured BWP until configured again, if there is an extra configuration of numerology.

In a sixth approach, the preconfigured system information can contain the indication of actually transmitted S-SSBs within a burst set.

In one example, the actually transmitted S-SSBs within a burst set is a bitmap with the length same as the maximum number of S-SSBs within a periodicity supported for a given band or carrier frequency range.

In a seventh approach, the preconfigured system information can contain the periodicity of S-SSB burst set.

In one embodiment, one sidelink SS/PBCH block (S-SSB) comprises of 2 OFDM symbols mapped for sidelink primary synchronization signal (S-PSS), 2 OFDM symbols mapped for sidelink secondary synchronization signal (S-SSS), and X OFDM symbols mapped for physical sidelink broadcast channel (PSBCH) and associated demodulation reference signal (DMRS). Hence, in totally, an S-SSB spans X+4 OFDM symbols, and the X+4 OFDM symbols are consecutive in time domain.

In one approach, X is fixed for all S-SSBs. One of the examples in this embodiment can be applicable for the composition of S-SSB if X is fixed.

In another approach, X can be variable/configurable, and a pre-configuration is known to the V2X UE that tries to synchronize to the synchronization source. At least one of the examples in this embodiment can be applicable for the composition of S-SSB with respect to a given X, if X is variable/configurable.

For one example of this approach, X can be different according to the numerology of S-SSB (e.g., cyclic prefix length), e.g., for normal CP, one S-SSB has X_1 number of symbols mapped for PSBCH and DMRS, while for extended CP, one S-SSB has X_2 number of symbols mapped for PSBCH and DMRS, wherein X_1 is different from X_2 (e.g., X_1>X_2), and the S-SSB composition can be different for normal CP and extended CP (e.g., one example of this embodiment with X_1 number of symbols for PSBCH and DMRS is used for normal CP, and another example of this embodiment with X_2 number of symbols for PSBCH and DMRS is used for extended CP). In one instance, the S-SSB for extended CP is truncated from the S-SSB for normal CP by last symbol(s), e.g., the last two symbols such that X_1=X_2+2. For one particular consideration for this instance, X_1=12 and X_2=10. For another particular consideration for this instance, X_1=13 and X_2=11.

In one approach, an S-SSB comprises of 8 OFDM symbols (e.g., X=4).

Figure 31:
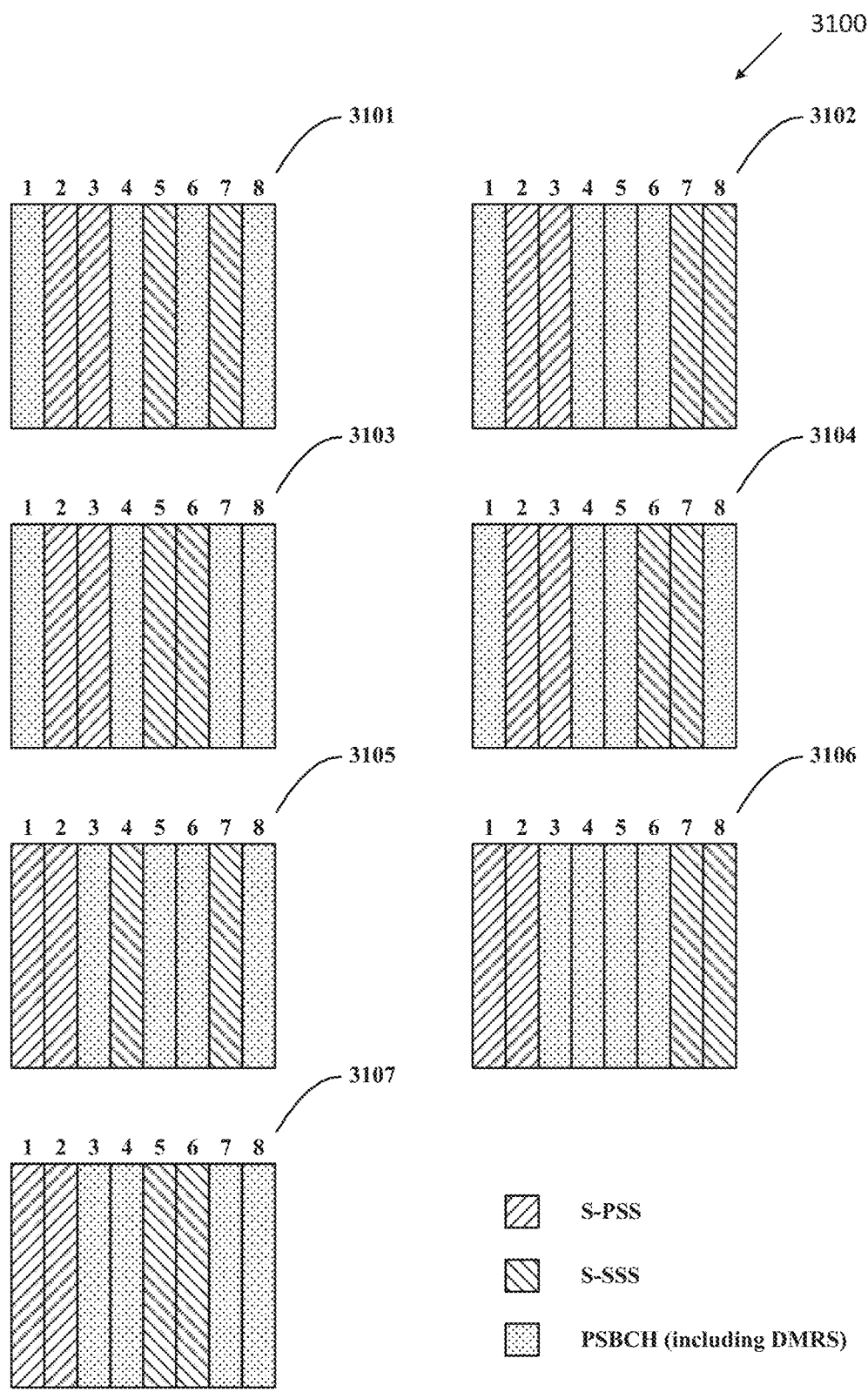
FIG. 31 illustrates an example S-SSB according to embodiments of the present disclosure.

FIG. 31 illustrates an example S-SSB 3100 according to embodiments of the present disclosure. The embodiment of the S-SSB 3100 illustrated in FIG. 31 is for illustration only. FIG. 31 does not limit the scope of this disclosure to any particular implementation.

In one example (e.g., 3101 in FIG. 31), #2 and #3 symbols in a S-SSB are mapped for S-PSS, and #5 and #7 symbols in a S-SSB are mapped for S-SSS, and #1, #4, #6, and #8 symbols in a S-SSB are mapped for PSBCH and DMRS.

In another example (e.g., 3102 in FIG. 31), #2 and #3 symbols in a S-SSB are mapped for S-PSS, and #7 and #8 symbols in a S-SSB are mapped for S-SSS, and #1, #4, #5, and #6 symbols in a S-SSB are mapped for PSBCH and DMRS.

In yet another example (e.g., 3103 in FIG. 31), #2 and #3 symbols in a S-SSB are mapped for S-PSS, and #5 and #6 symbols in a S-SSB are mapped for S-SSS, and #1, #4, #7, and #8 symbols in a S-SSB are mapped for PSBCH and DMRS.

In yet another example (e.g., 3104 in FIG. 31), #2 and #3 symbols in a S-SSB are mapped for S-PSS, and #6 and #7 symbols in a S-SSB are mapped for S-SSS, and #1, #4, #5, and #8 symbols in a S-SSB are mapped for PSBCH and DMRS.

In yet another example (e.g., 3105 in FIG. 31), #1 and #2 symbols in a S-SSB are mapped for S-PSS, and #4 and #7 symbols in a S-SSB are mapped for S-SSS, and #3, #5, #6, and #8 symbols in a S-SSB are mapped for PSBCH and DMRS.

In yet another example (e.g., 3106 in FIG. 31), #1 and #2 symbols in a S-SSB are mapped for S-PSS, and #7 and #8 symbols in a S-SSB are mapped for S-SSS, and #3, #4, #5, and #6 symbols in a S-SSB are mapped for PSBCH and DMRS.

In yet another example (3107 in FIG. 31), #1 and #2 symbols in a S-SSB are mapped for S-PSS, and #5 and #6 symbols in a S-SSB are mapped for S-SSS, and #3, #4, #7, and #8 symbols in a S-SSB are mapped for PSBCH and DMRS.

In another approach, a S-SSB comprises of 9 OFDM symbols (e.g., X=5).

Figure 32:
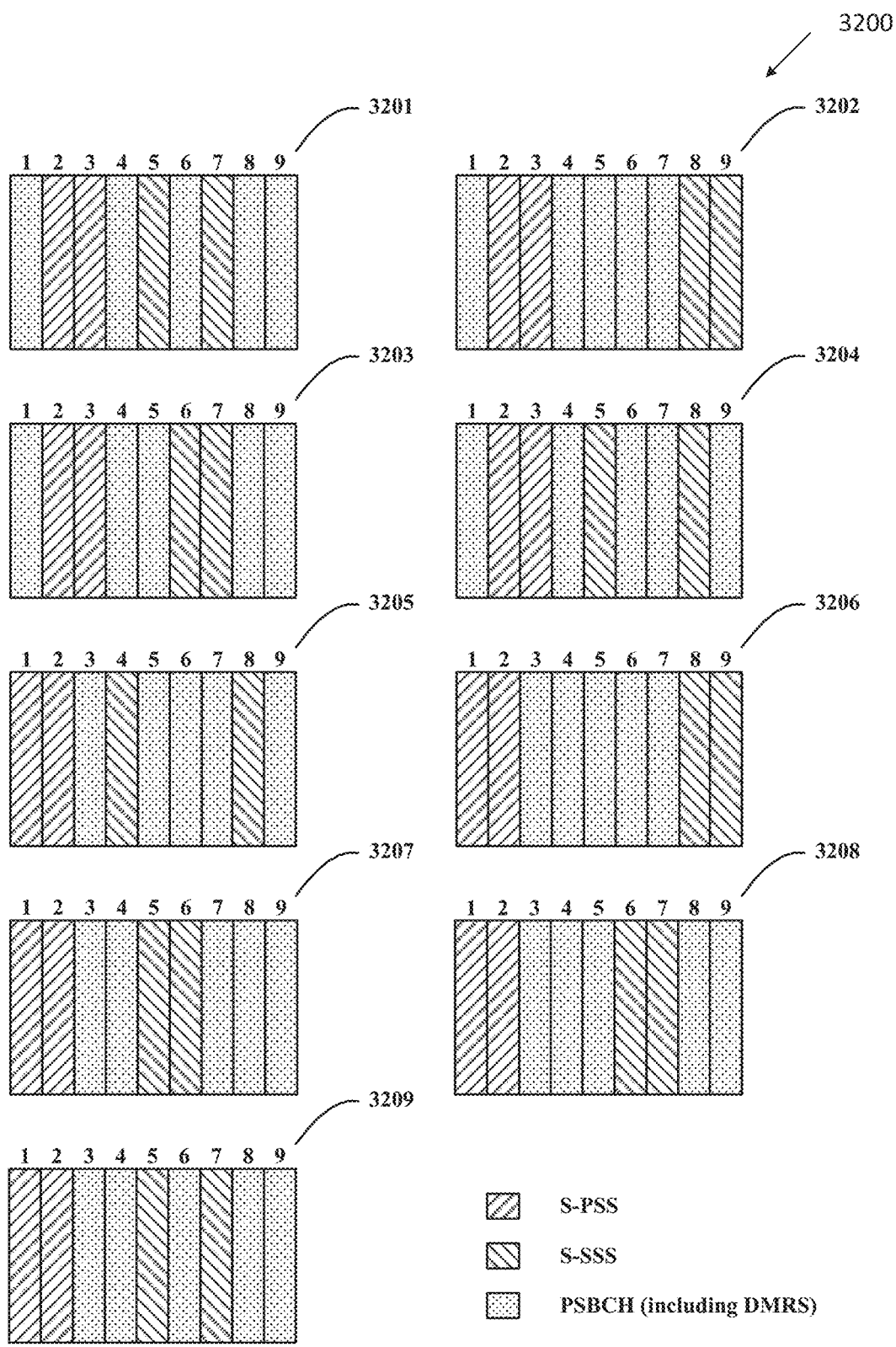
FIG. 32 illustrates another example S-SSB according to embodiments of the present disclosure.

FIG. 32 illustrates another example S-SSB 3200 according to embodiments of the present disclosure. The embodiment of the S-SSB 3200 illustrated in FIG. 32 is for illustration only. FIG. 32 does not limit the scope of this disclosure to any particular implementation.

In one example (e.g., 3201 in FIG. 32), #2 and #3 symbols in a S-SSB are mapped for S-PSS, and #5 and #7 symbols in a S-SSB are mapped for S-SSS, and #1, #4, #6, #8, and #9 symbols in a S-SSB are mapped for PSBCH and DMRS.

In another example (e.g., 3202 in FIG. 32), #2 and #3 symbols in a S-SSB are mapped for S-PSS, and #8 and #9 symbols in a S-SSB are mapped for S-SSS, and #1, #4, #5, #6, and #7 symbols in a S-SSB are mapped for PSBCH and DMRS.

In yet another example (e.g., 3203 in FIG. 32), #2 and #3 symbols in a S-SSB are mapped for S-PSS, and #6 and #7 symbols in a S-SSB are mapped for S-SSS, and #1, #4, #5, #8, and #9 symbols in a S-SSB are mapped for PSBCH and DMRS.

In yet another example (e.g., 3204 in FIG. 32), #2 and #3 symbols in a S-SSB are mapped for S-PSS, and #5 and #8 symbols in a S-SSB are mapped for S-SSS, and #1, #4, #6, #7, and #9 symbols in a S-SSB are mapped for PSBCH and DMRS.

In yet another example (e.g., 3205 in FIG. 32), #1 and #2 symbols in a S-SSB are mapped for S-PSS, and #4 and #8 symbols in a S-SSB are mapped for S-SSS, and #3, #5, #6, #7, and #9 symbols in a S-SSB are mapped for PSBCH and DMRS.

In yet another example (e.g., 3206 in FIG. 32), #1 and #2 symbols in a S-SSB are mapped for S-PSS, and #8 and #9 symbols in a S-SSB are mapped for S-SSS, and #3, #4, #5, #6, and #7 symbols in a S-SSB are mapped for PSBCH and DMRS.

In yet another example (e.g., 3207 in FIG. 32), #1 and #2 symbols in a S-SSB are mapped for S-PSS, and #5 and #6 symbols in a S-SSB are mapped for S-SSS, and #3, #4, #7, #8, and #9 symbols in a S-SSB are mapped for PSBCH and DMRS.

In yet another example (e.g., 3208 in FIG. 32), #1 and #2 symbols in a S-SSB are mapped for S-PSS, and #6 and #7 symbols in a S-SSB are mapped for S-SSS, and #3, #4, #5, #8, and #9 symbols in a S-SSB are mapped for PSBCH and DMRS.

In yet another example (e.g., 3209 in FIG. 32), #1 and #2 symbols in a S-SSB are mapped for S-PSS, and #5 and #7 symbols in a S-SSB are mapped for S-SSS, and #3, #4, #6, #8, and #9 symbols in a S-SSB are mapped for PSBCH and DMRS.

In yet another approach, an S-SSB comprises of 10 OFDM symbols (e.g., X=6).

Figure 33A:
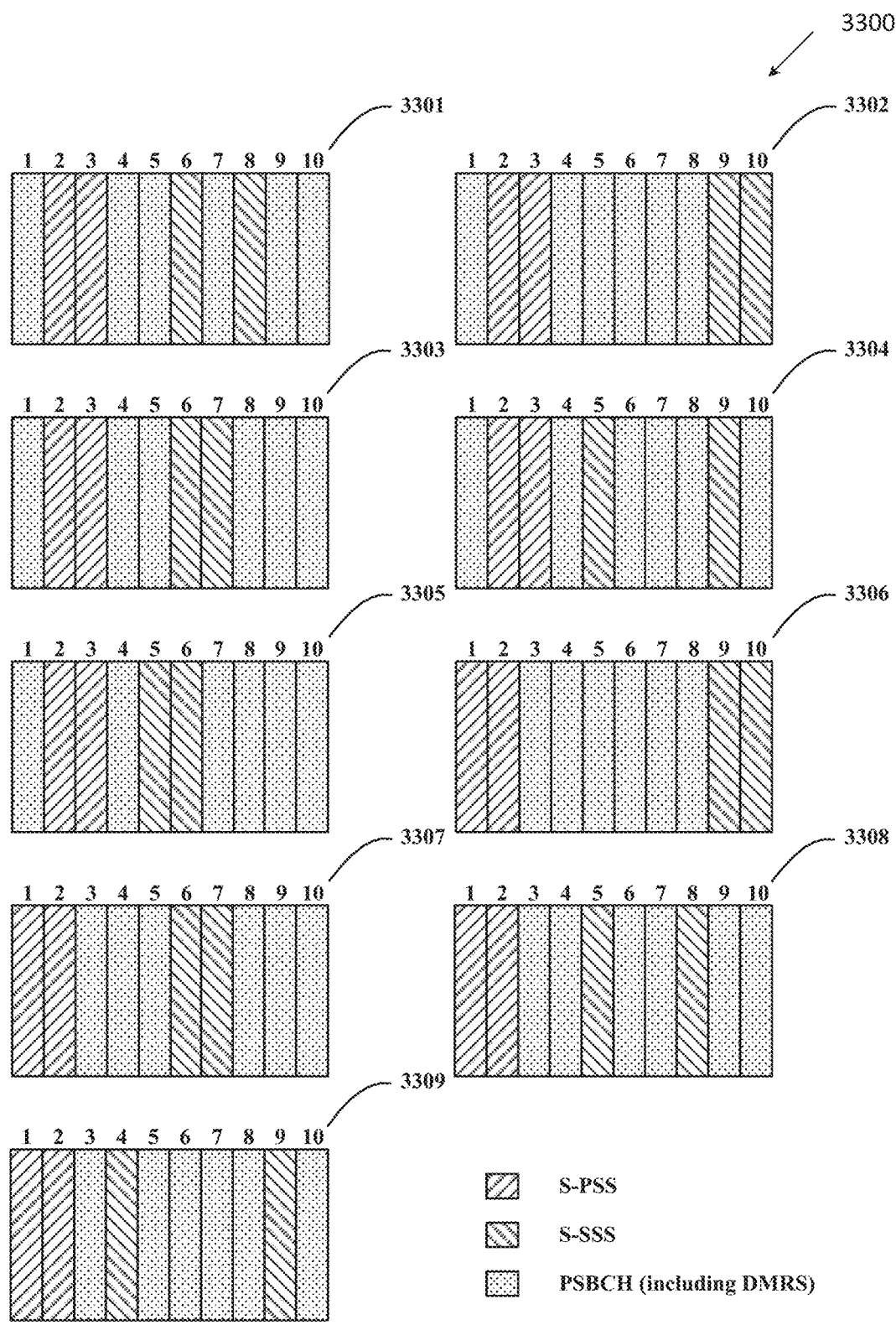
FIG. 33A illustrates yet another example S-SSB according to embodiments of the present disclosure.

FIG. 33A illustrates yet another example S-SSB 3300 according to embodiments of the present disclosure. The embodiment of the S-SSB 3300 illustrated in FIG. 33A is for illustration only. FIG. 33A does not limit the scope of this disclosure to any particular implementation.

In one example (e.g., 3301 in FIG. 33A), #2 and #3 symbols in a S-SSB are mapped for S-PSS, and #6 and #8 symbols in a S-SSB are mapped for S-SSS, and #1, #4, #5, #7, #9, and #10 symbols in a S-SSB are mapped for PSBCH and DMRS.

In another example (e.g., 3302 in FIG. 33A), #2 and #3 symbols in a S-SSB are mapped for S-PSS, and #9 and #10 symbols in a S-SSB are mapped for S-SSS, and #1, #4, #5, #6, #7, and #8 symbols in a S-SSB are mapped for PSBCH and DMRS.

In yet another example (e.g., 3303 in FIG. 33A), #2 and #3 symbols in a S-SSB are mapped for S-PSS, and #6 and #7 symbols in a S-SSB are mapped for S-SSS, and #1, #4, #5, #8, #9, and #10 symbols in a S-SSB are mapped for PSBCH and DMRS.

In yet another example (e.g., 3304 in FIG. 33A), #2 and #3 symbols in a S-SSB are mapped for S-PSS, and #5 and #9 symbols in a S-SSB are mapped for S-SSS, and #1, #4, #6, #7, #8, and #10 symbols in a S-SSB are mapped for PSBCH and DMRS.

In yet another example (e.g., 3305 in FIG. 33A), #2 and #3 symbols in a S-SSB are mapped for S-PSS, and #5 and #6 symbols in a S-SSB are mapped for S-SSS, and #1, #4, #7, #8, #9, and #10 symbols in a S-SSB are mapped for PSBCH and DMRS.

In yet another example (e.g., 3306 in FIG. 33A), #1 and #2 symbols in a S-SSB are mapped for S-PSS, and #9 and #10 symbols in a S-SSB are mapped for S-SSS, and #3, #4, #5, #6, #7, and #8 symbols in a S-SSB are mapped for PSBCH and DMRS.

In yet another example (3307 in FIG. 33A), #1 and #2 symbols in a S-SSB are mapped for S-PSS, and #6 and #7 symbols in a S-SSB are mapped for S-SSS, and #3, #4, #5, #8, #9, and #10 symbols in a S-SSB are mapped for PSBCH and DMRS.

In yet another example (e.g., 3308 in FIG. 33A), #1 and #2 symbols in a S-SSB are mapped for S-PSS, and #5 and #8 symbols in a S-SSB are mapped for S-SSS, and #3, #4, #6, #7, #9, and #10 symbols in a S-SSB are mapped for PSBCH and DMRS.

In yet another example (e.g., 3309 in FIG. 33A), #1 and #2 symbols in a S-SSB are mapped for S-PSS, and #4 and #9 symbols in a S-SSB are mapped for S-SSS, and #3, #5, #6, #7, #8, and #10 symbols in a S-SSB are mapped for PSBCH and DMRS.

Figure 33B:
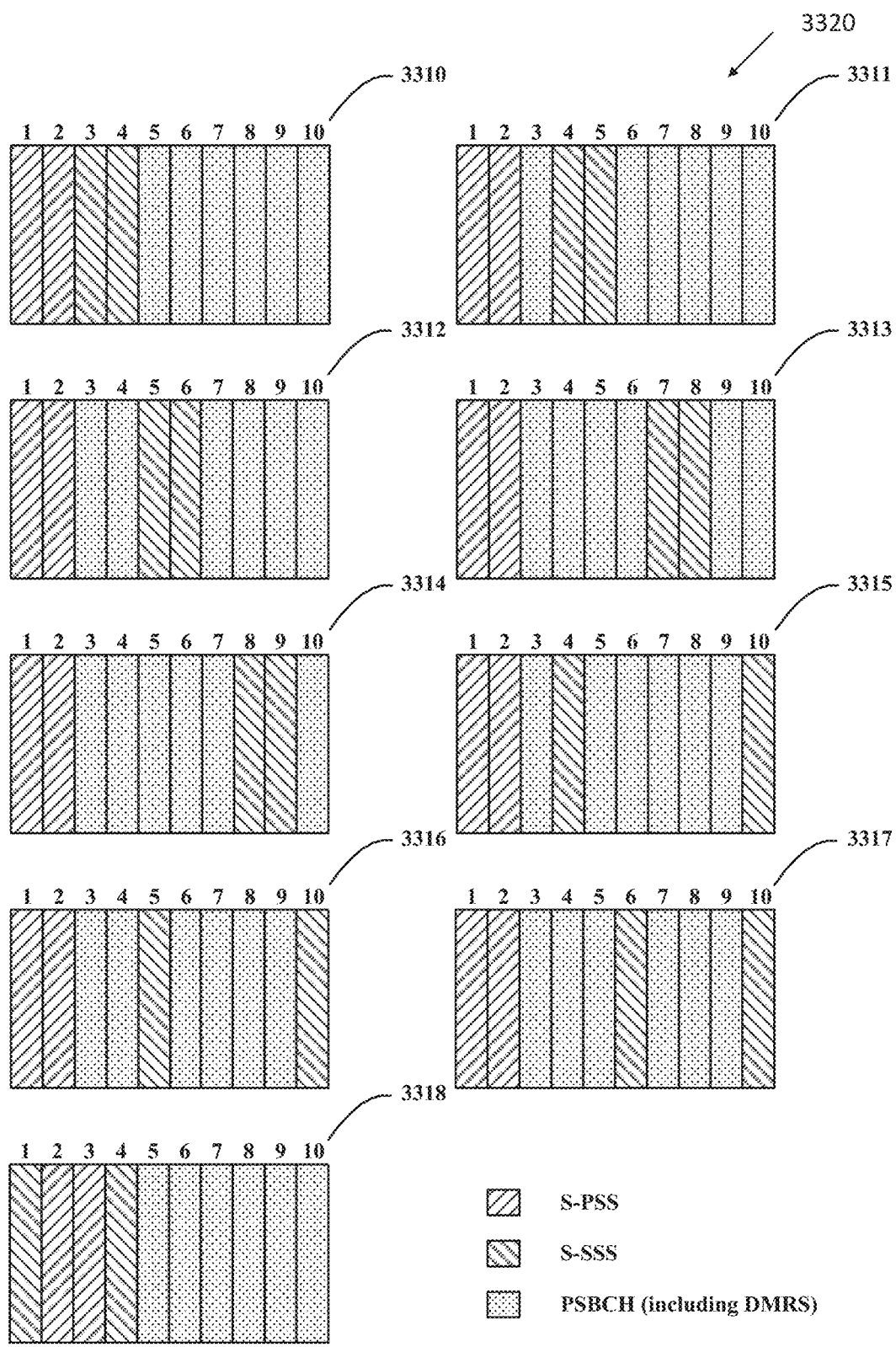
FIG. 33B illustrates yet another example S-SSB according to embodiments of the present disclosure.

FIG. 33B illustrates yet another example S-SSB 3320 according to embodiments of the present disclosure. The embodiment of the S-SSB 3320 illustrated in FIG. 33B is for illustration only. FIG. 33B does not limit the scope of this disclosure to any particular implementation.

In yet another example (e.g., 3310 in FIG. 33B), #1 and #2 symbols in a S-SSB are mapped for S-PSS, and #3 and #4 symbols in a S-SSB are mapped for S-SSS, and #5, #6, #7, #8, #9, and #10 symbols in a S-SSB are mapped for PSBCH and DMRS.

In yet another example (e.g., 3311 in FIG. 33B), #1 and #2 symbols in a S-SSB are mapped for S-PSS, and #4 and #5 symbols in a S-SSB are mapped for S-SSS, and #3, #6, #7, #8, #9, and #10 symbols in a S-SSB are mapped for PSBCH and DMRS.

In yet another example (e.g., 3312 in FIG. 33B), #1 and #2 symbols in a S-SSB are mapped for S-PSS, and #5 and #6 symbols in a S-SSB are mapped for S-SSS, and #3, #4, #7, #8, #9, and #10 symbols in a S-SSB are mapped for PSBCH and DMRS.

In yet another example (e.g., 3313 in FIG. 33B), #1 and #2 symbols in a S-SSB are mapped for S-PSS, and #7 and #8 symbols in a S-SSB are mapped for S-SSS, and #3, #4, #5, #6, #9, and #10 symbols in a S-SSB are mapped for PSBCH and DMRS.

In yet another example (e.g., 3314 in FIG. 33B), #1 and #2 symbols in a S-SSB are mapped for S-PSS, and #8 and #9 symbols in a S-SSB are mapped for S-SSS, and #3, #4, #5, #6, #7, and #10 symbols in a S-SSB are mapped for PSBCH and DMRS.

In yet another example (e.g., 3315 in FIG. 33B), #1 and #2 symbols in a S-SSB are mapped for S-PSS, and #4 and #10 symbols in a S-SSB are mapped for S-SSS, and #3, #5, #6, #7, #8, and #9 symbols in a S-SSB are mapped for PSBCH and DMRS.

In yet another example (e.g., 3316 in FIG. 33B), #1 and #2 symbols in a S-SSB are mapped for S-PSS, and #5 and #10 symbols in a S-SSB are mapped for S-SSS, and #3, #4, #6, #7, #8, and #9 symbols in a S-SSB are mapped for PSBCH and DMRS.

In yet another example (e.g., 3317 in FIG. 33B), #1 and #2 symbols in a S-SSB are mapped for S-PSS, and #6 and #10 symbols in a S-SSB are mapped for S-SSS, and #3, #4, #5, #7, #8, and #9 symbols in a S-SSB are mapped for PSBCH and DMRS.

In yet another example (e.g., 3318 in FIG. 33B), #2 and #3 symbols in a S-SSB are mapped for S-PSS, and #1 and #4 symbols in a S-SSB are mapped for S-SSS, and #5, #6, #7, #8, #9, and #10 symbols in a S-SSB are mapped for PSBCH and DMRS.

In yet another approach, an S-SSB comprises of 11 OFDM symbols (e.g., X=7).

Figure 34A:
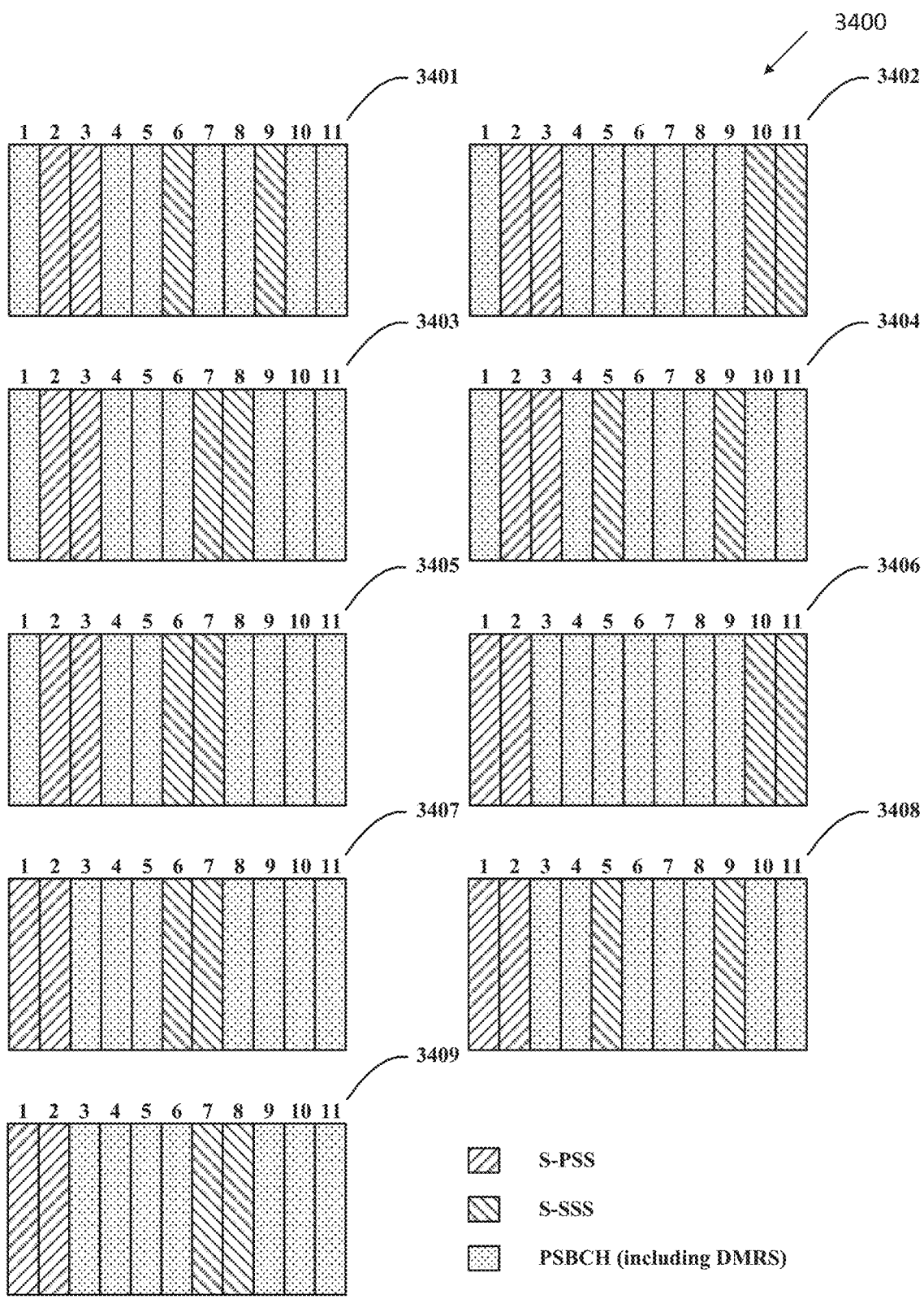
FIG. 34A illustrates yet another example S-SSB according to embodiments of the present disclosure.

FIG. 34A illustrates yet another example S-SSB 3400 according to embodiments of the present disclosure. The embodiment of the gNB 102 illustrated in FIG. 34A is for illustration only. FIG. 34A does not limit the scope of this disclosure to any particular implementation.

In one example (e.g., 3401 in FIG. 34A), #2 and #3 symbols in a S-SSB are mapped for S-PSS, and #6 and #9 symbols in a S-SSB are mapped for S-SSS, and #1, #4, #5, #7, #8, #10, and #11 symbols in a S-SSB are mapped for PSBCH and DMRS.

In another example (e.g., 3402 in FIG. 34A), #2 and #3 symbols in a S-SSB are mapped for S-PSS, and #10 and #11 symbols in a S-SSB are mapped for S-SSS, and #1, #4, #5, #6, #7, #8, and #9 symbols in a S-SSB are mapped for PSBCH and DMRS.

In yet another example (e.g., 3403 in FIG. 34A), #2 and #3 symbols in a S-SSB are mapped for S-PSS, and #7 and #8 symbols in a S-SSB are mapped for S-SSS, and #1, #4, #5, #6, #9, #10, and #11 symbols in a S-SSB are mapped for PSBCH and DMRS.

In yet another example (e.g., 3404 in FIG. 34A), #2 and #3 symbols in a S-SSB are mapped for S-PSS, and #5 and #9 symbols in a S-SSB are mapped for S-SSS, and #1, #4, #6, #7, #8, #10, and #11 symbols in a S-SSB are mapped for PSBCH and DMRS.

In yet another example (e.g., 3405 in FIG. 34A), #2 and #3 symbols in a S-SSB are mapped for S-PSS, and #6 and #7 symbols in a S-SSB are mapped for S-SSS, and #1, #4, #5, #8, #9, #10, and #11 symbols in a S-SSB are mapped for PSBCH and DMRS.

In yet another example (e.g., 3406 in FIG. 34A), #1 and #2 symbols in a S-SSB are mapped for S-PSS, and #10 and #11 symbols in a S-SSB are mapped for S-SSS, and #3, #4, #5, #6, #7, #8, and #9 symbols in a S-SSB are mapped for PSBCH and DMRS.

In yet another example (e.g., 3407 in FIG. 34A), #1 and #2 symbols in a S-SSB are mapped for S-PSS, and #6 and #7 symbols in a S-SSB are mapped for S-SSS, and #3, #4, #5, #8, #9, #10, and #11 symbols in a S-SSB are mapped for PSBCH and DMRS.

In yet another example (e.g., 3408 in FIG. 34A), #1 and #2 symbols in a S-SSB are mapped for S-PSS, and #5 and #9 symbols in a S-SSB are mapped for S-SSS, and #3, #4, #6, #7, #8, #10, and #11 symbols in a S-SSB are mapped for PSBCH and DMRS.

In yet another example (e.g., 3409 in FIG. 34A), #1 and #2 symbols in a S-SSB are mapped for S-PSS, and #7 and #8 symbols in a S-SSB are mapped for S-SSS, and #3, #4, #5, #6, #9, #10, and #11 symbols in a S-SSB are mapped for PSBCH and DMRS.

Figure 34B:
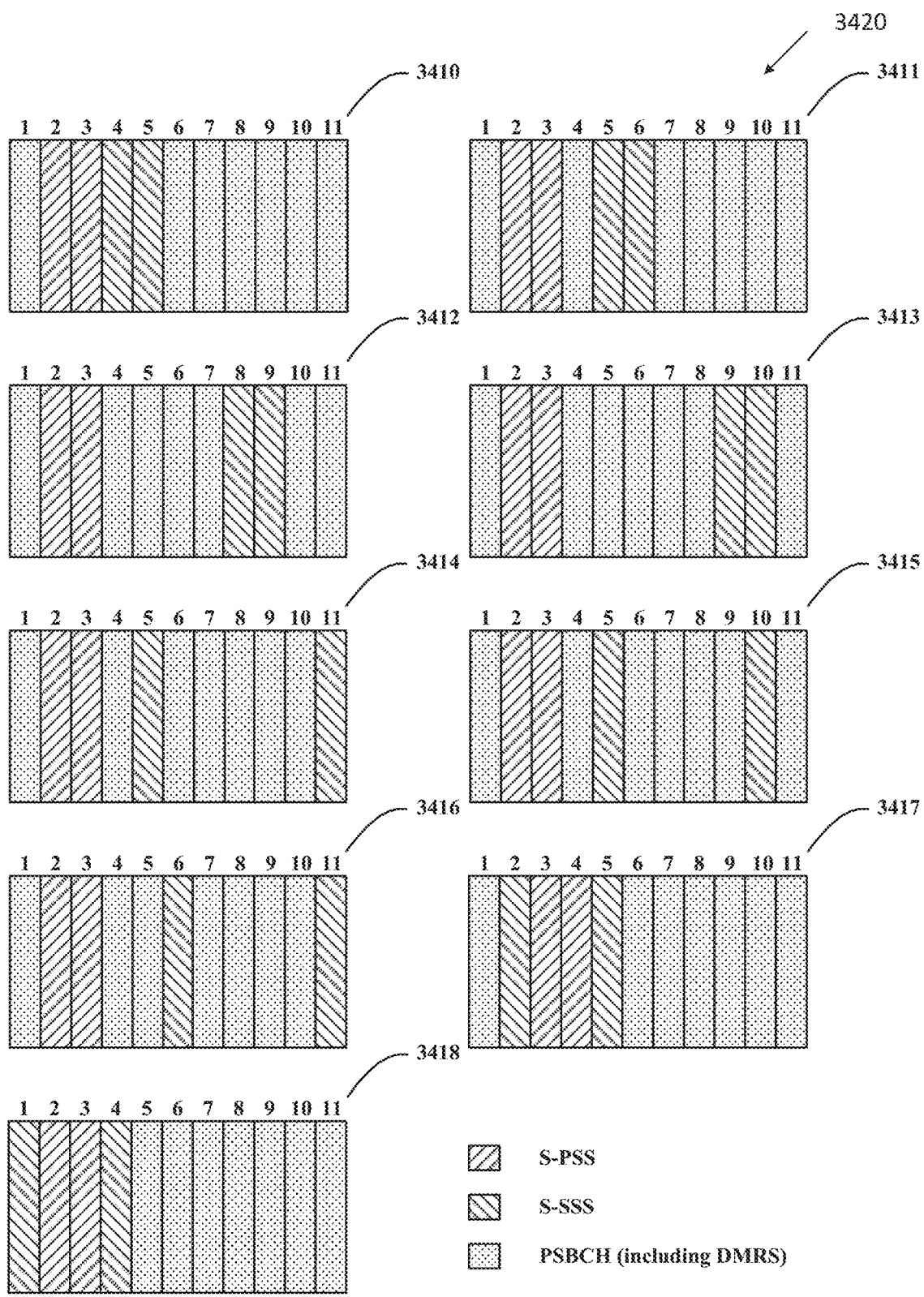
FIG. 34B illustrates yet another example S-SSB according to embodiments of the present disclosure.

FIG. 34B illustrates yet another example S-SSB 3420 according to embodiments of the present disclosure. The embodiment of the S-SSB 3420 illustrated in FIG. 34B is for illustration only. FIG. 34B does not limit the scope of this disclosure to any particular implementation.

In yet another example (e.g., 3410 in FIG. 34B), #2 and #3 symbols in a S-SSB are mapped for S-PSS, and #4 and #5 symbols in a S-SSB are mapped for S-SSS, and #1, #6, #7, #8, #9, #10, and #11 symbols in a S-SSB are mapped for PSBCH and DMRS.

In yet another example (e.g., 3411 in FIG. 34B), #2 and #3 symbols in a S-SSB are mapped for S-PSS, and #5 and #6 symbols in a S-SSB are mapped for S-SSS, and #1, #4, #7, #8, #9, #10, and #11 symbols in a S-SSB are mapped for PSBCH and DMRS.

In yet another example (e.g., 3412 in FIG. 34B), #2 and #3 symbols in a S-SSB are mapped for S-PSS, and #8 and #9 symbols in a S-SSB are mapped for S-SSS, and #1, #4, #5, #6, #7, #10, and #11 symbols in a S-SSB are mapped for PSBCH and DMRS.

In yet another example (e.g., 3413 in FIG. 34B), #2 and #3 symbols in a S-SSB are mapped for S-PSS, and #9 and #10 symbols in a S-SSB are mapped for S-SSS, and #1, #4, #5, #6, #7, #8, and #11 symbols in a S-SSB are mapped for PSBCH and DMRS.

In yet another example (e.g., 3414 in FIG. 34B), #2 and #3 symbols in a S-SSB are mapped for S-PSS, and #5 and #11 symbols in a S-SSB are mapped for S-SSS, and #1, #4, #6, #7, #8, #9, and #10 symbols in a S-SSB are mapped for PSBCH and DMRS.

In yet another example (e.g., 3415 in FIG. 34B), #2 and #3 symbols in a S-SSB are mapped for S-PSS, and #5 and

10 symbols in a S-SSB are mapped for S-SSS, and #1, #4, #6, #7, #8, #9, and #11 symbols in a S-SSB are mapped for PSBCH and DMRS.

In yet another example (e.g., 3416 in FIG. 34B), #2 and #3 symbols in a S-SSB are mapped for S-PSS, and #6 and #11 symbols in a S-SSB are mapped for S-SSS, and #1, #4, #5, #7, #8, #9, and #10 symbols in a S-SSB are mapped for PSBCH and DMRS.

In yet another example (e.g., 3417 in FIG. 34B), #3 and #4 symbols in a S-SSB are mapped for S-PSS, and #2 and #5 symbols in a S-SSB are mapped for S-SSS, and #1, #6, #7, #8, #9, #10, and #11 symbols in a S-SSB are mapped for PSBCH and DMRS.

In yet another example (e.g., 3418 in FIG. 34B), #2 and #3 symbols in a S-SSB are mapped for S-PSS, and #1 and #4 symbols in a S-SSB are mapped for S-SSS, and #5, #6, #7, #8, #9, #10, and #11 symbols in a S-SSB are mapped for PSBCH and DMRS.

In yet another approach, a S-SSB comprises of 12 OFDM symbols (e.g., X=8).

Figure 35A:
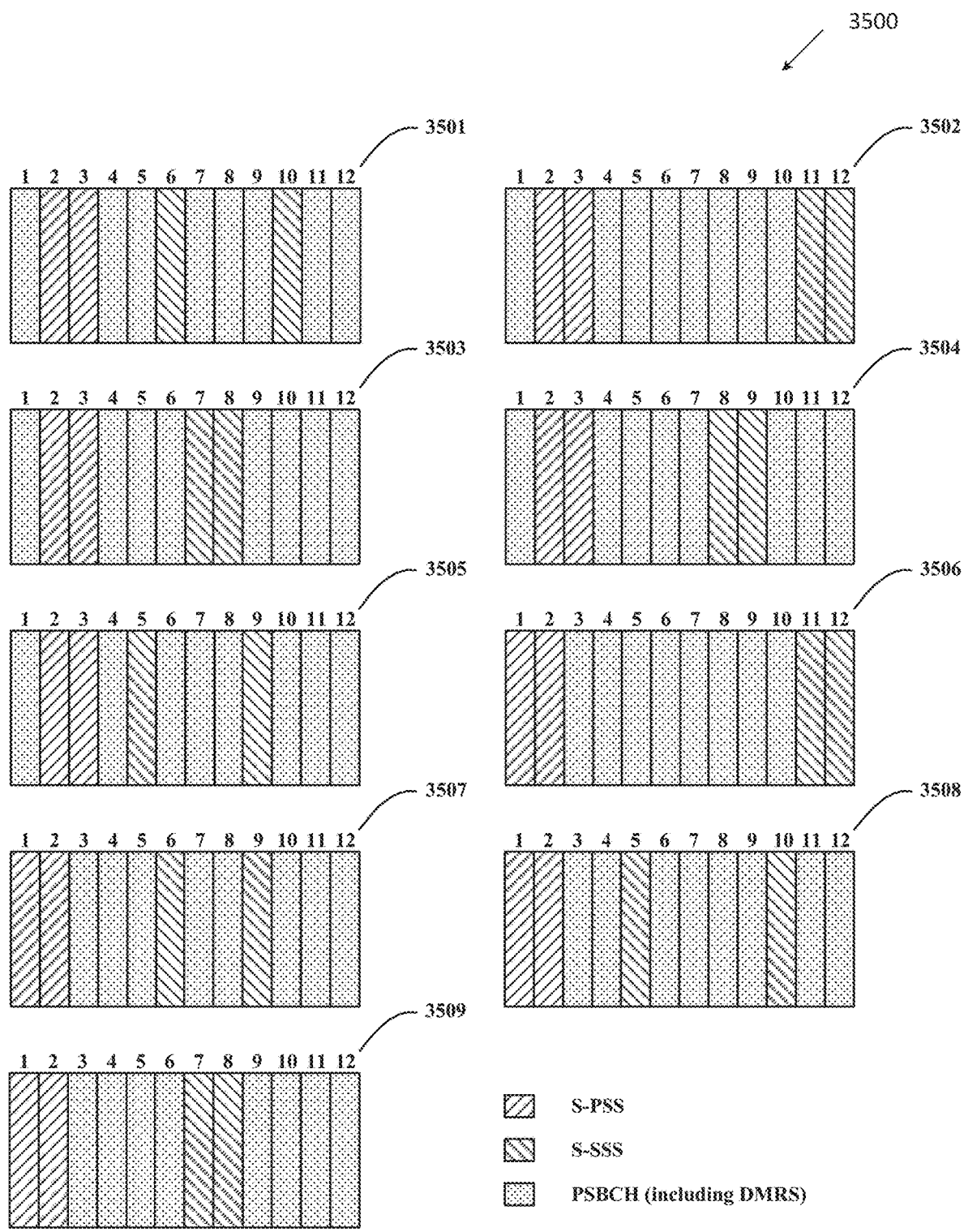
FIG. 35A illustrates yet another example S-SSB according to embodiments of the present disclosure.
Figure 35B:
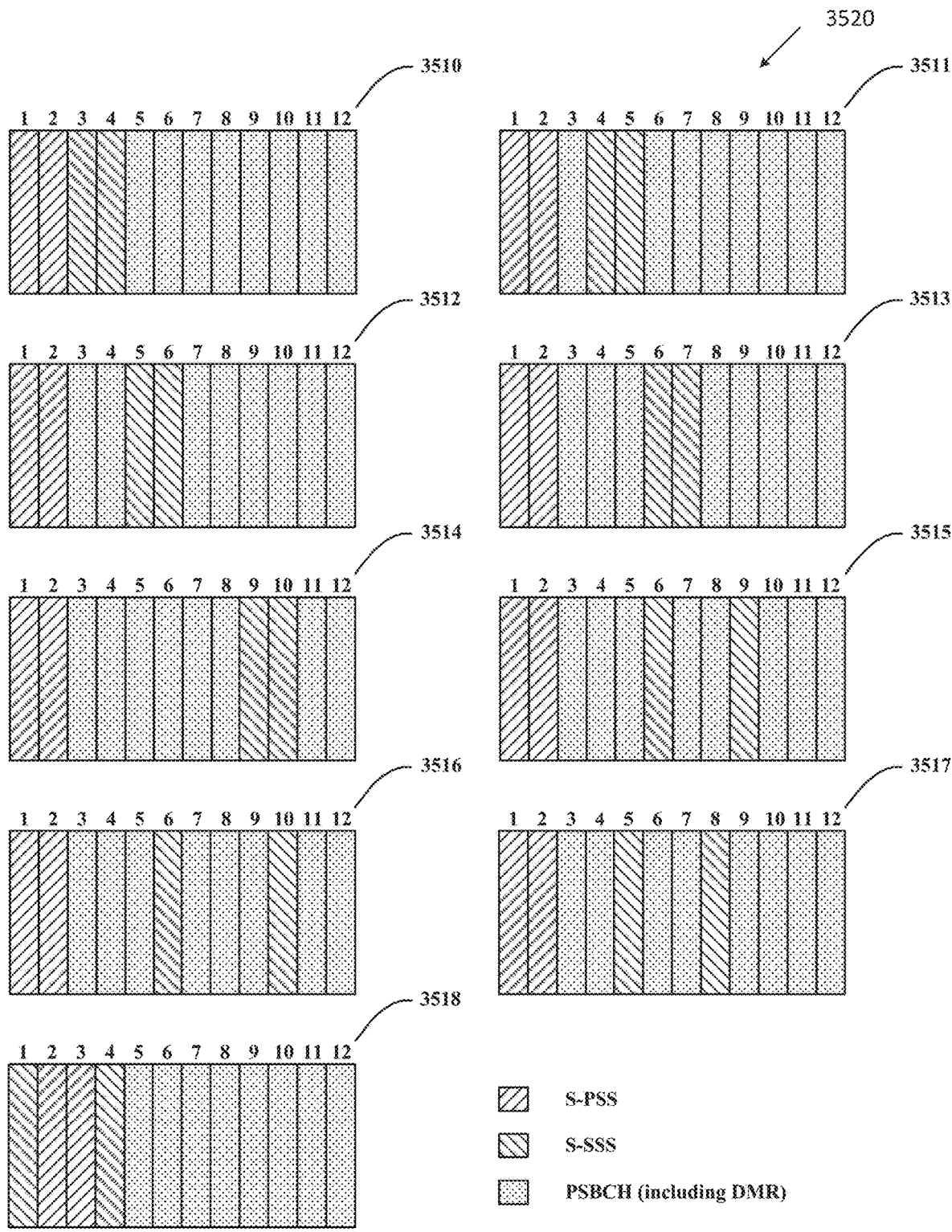
FIG. 35B illustrates yet another example S-SSB according to embodiments of the present disclosure.

FIG. 35A illustrates yet another example S-SSB 3500 according to embodiments of the present disclosure. The embodiment of the S-SSB 3500 illustrated in FIG. 35B is for illustration only. FIG. 35B does not limit the scope of this disclosure to any particular implementation.

In one example (e.g., 3501 in FIG. 35A), #2 and #3 symbols in a S-SSB are mapped for S-PSS, and #6 and #10 symbols in a S-SSB are mapped for S-SSS, and #1, #4, #5, #7, #8, #9, #11, and #12 symbols in a S-SSB are mapped for PSBCH and DMRS.

In another example (e.g., 3502 in FIG. 35A), #2 and #3 symbols in a S-SSB are mapped for S-PSS, and #11 and #12 symbols in a S-SSB are mapped for S-SSS, and #1, #4, #5, #6, #7, #8, #9, and #10 symbols in a S-SSB are mapped for PSBCH and DMRS.

In yet another example (e.g., 3503 in FIG. 35A), #2 and #3 symbols in a S-SSB are mapped for S-PSS, and #7 and #8 symbols in a S-SSB are mapped for S-SSS, and #1, #4, #5, #6, #9, #10, #11, and #12 symbols in a S-SSB are mapped for PSBCH and DMRS.

In yet another example (e.g., 3504 in FIG. 35A), #2 and #3 symbols in a S-SSB are mapped for S-PSS, and #8 and #9 symbols in a S-SSB are mapped for S-SSS, and #1, #4, #5, #6, #7, #10, #11, and #12 symbols in a S-SSB are mapped for PSBCH and DMRS.

In yet another example (e.g., 3505 in FIG. 35A), #2 and #3 symbols in a S-SSB are mapped for S-PSS, and #5 and #9 symbols in a S-SSB are mapped for S-SSS, and #1, #4, #6, #7, #8, #10, #11, and #12 symbols in a S-SSB are mapped for PSBCH and DMRS.

In yet another example (e.g., 3506 in FIG. 35A), #1 and #2 symbols in a S-SSB are mapped for S-PSS, and #11 and #12 symbols in a S-SSB are mapped for S-SSS, and #3, #4, #5, #6, #7, #8, #9, and #10 symbols in a S-SSB are mapped for PSBCH and DMRS.

In yet another example (e.g., 3507 in FIG. 35A), #1 and #2 symbols in a S-SSB are mapped for S-PSS, and #6 and #9 symbols in a S-SSB are mapped for S-SSS, and #3, #4, #5, #7, #8, #10, #11, and #12 symbols in a S-SSB are mapped for PSBCH and DMRS.

In yet another example (e.g., 3508 in FIG. 35A), #1 and #2 symbols in a S-SSB are mapped for S-PSS, and #5 and #10 symbols in a S-SSB are mapped for S-SSS, and #3, #4, #6, #7, #8, #9, #11, and #12 symbols in a S-SSB are mapped for PSBCH and DMRS.

In yet another example (e.g., 3509 in FIG. 35A), #1 and #2 symbols in a S-SSB are mapped for S-PSS, and #7 and #8 symbols in a S-SSB are mapped for S-SSS, and #3, #4, #5, #6, #9, #10, #11, and #12 symbols in a S-SSB are mapped for PSBCH and DMRS.

FIG. 35B illustrates yet another example S-SSB 3520 according to embodiments of the present disclosure. The embodiment of the S-SSB 3520 illustrated in FIG. 35B is for illustration only. FIG. 35B does not limit the scope of this disclosure to any particular implementation.

In yet another example (e.g., 3510 in FIG. 35B), #1 and #2 symbols in a S-SSB are mapped for S-PSS, and #3 and #4 symbols in a S-SSB are mapped for S-SSS, and #5, #6, #7, #8, #9, #10, #11, and #12 symbols in a S-SSB are mapped for PSBCH and DMRS.

In yet another example (e.g., 3511 in FIG. 35B), #1 and #2 symbols in a S-SSB are mapped for S-PSS, and #4 and #5 symbols in a S-SSB are mapped for S-SSS, and #3, #6, #7, #8, #9, #10, #11, and #12 symbols in a S-SSB are mapped for PSBCH and DMRS.

In yet another example (e.g., 3512 in FIG. 35B), #1 and #2 symbols in a S-SSB are mapped for S-PSS, and #5 and #6 symbols in a S-SSB are mapped for S-SSS, and #3, #4, #7, #8, #9, #10, #11, and #12 symbols in a S-SSB are mapped for PSBCH and DMRS.

In yet another example (e.g., 3513 in FIG. 35B), #1 and #2 symbols in a S-SSB are mapped for S-PSS, and #6 and #7 symbols in a S-SSB are mapped for S-SSS, and #3, #4, #5, #8, #9, #10, #11, and #12 symbols in a S-SSB are mapped for PSBCH and DMRS.

In yet another example (e.g., 3514 in FIG. 35B), #1 and #2 symbols in a S-SSB are mapped for S-PSS, and #9 and #10 symbols in a S-SSB are mapped for S-SSS, and #3, #4, #5, #6, #7, #8, #11, and #12 symbols in a S-SSB are mapped for PSBCH and DMRS.

In yet another example (e.g., 3515 in FIG. 35B), #1 and #2 symbols in a S-SSB are mapped for S-PSS, and #6 and #9 symbols in a S-SSB are mapped for S-SSS, and #3, #4, #5, #7, #8, #10, #11, and #12 symbols in a S-SSB are mapped for PSBCH and DMRS.

In yet another example (e.g., 3516 in FIG. 35B), #1 and #2 symbols in a S-SSB are mapped for S-PSS, and #6 and #10 symbols in a S-SSB are mapped for S-SSS, and #3, #4, #5, #7, #8, #9, #11, and #12 symbols in a S-SSB are mapped for PSBCH and DMRS.

In yet another example (e.g., 3517 in FIG. 35B), #1 and #2 symbols in a S-SSB are mapped for S-PSS, and #5 and #8 symbols in a S-SSB are mapped for S-SSS, and #3, #4, #6, #7, #9, #10, #11, and #12 symbols in a S-SSB are mapped for PSBCH and DMRS.

In yet another example (e.g., 3518 in FIG. 35B), #2 and #3 symbols in a S-SSB are mapped for S-PSS, and #1 and #4 symbols in a S-SSB are mapped for S-SSS, and #5, #6, #7, #8, #9, #10, #11, and #12 symbols in a S-SSB are mapped for PSBCH and DMRS.

In yet another approach, a S-SSB comprises of 13 OFDM symbols (e.g., X=9).

Figure 36A:
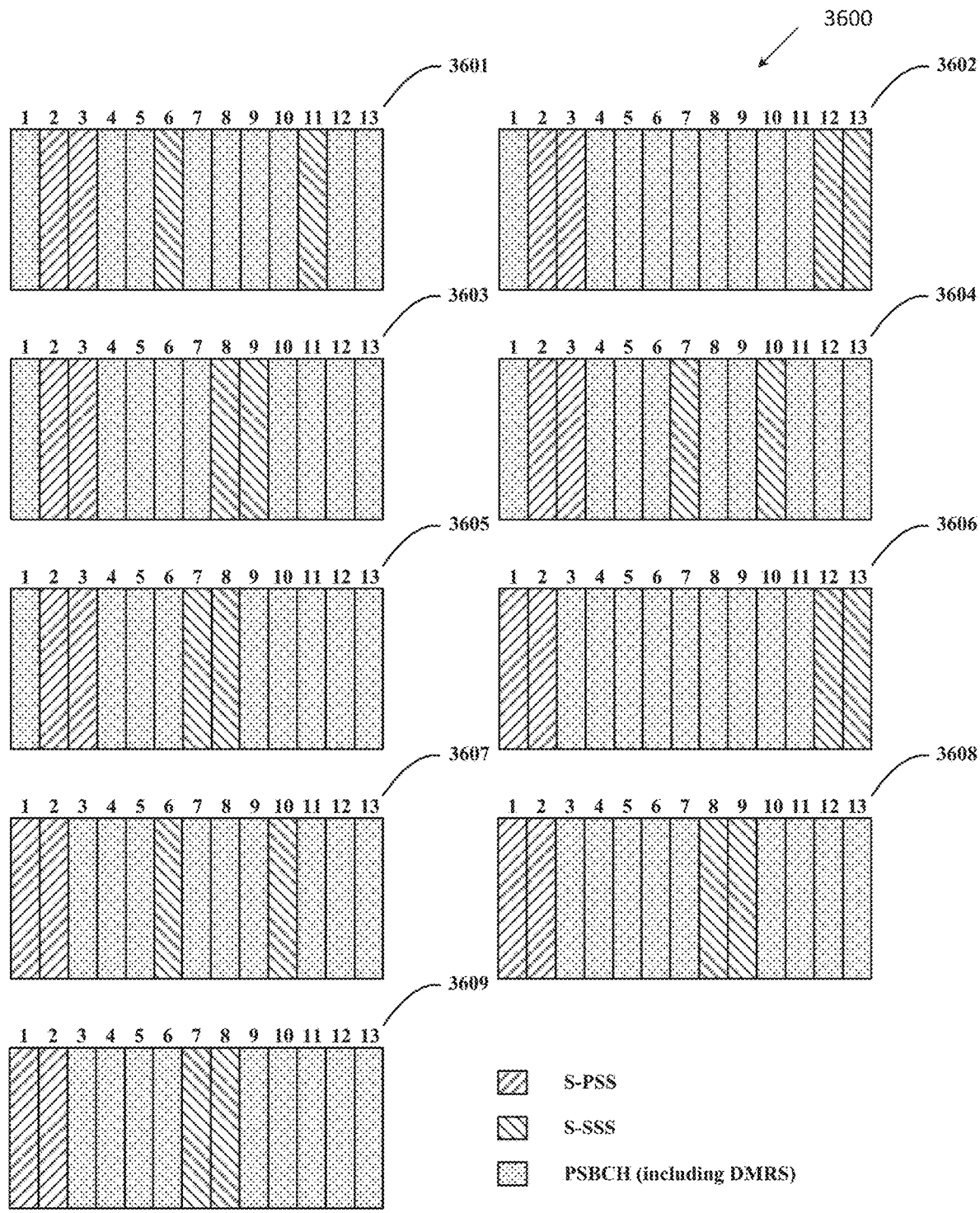
FIG. 36A illustrates yet another example S-SSB according to embodiments of the present disclosure.

FIG. 36A illustrates yet another example S-SSB 3600 according to embodiments of the present disclosure. The embodiment of the S-SSB 3600 illustrated in FIG. 36A is for illustration only. FIG. 36A does not limit the scope of this disclosure to any particular implementation.

In one example (e.g., 3601 in FIG. 36A), #2 and #3 symbols in a S-SSB are mapped for S-PSS, and #6 and #11 symbols in a S-SSB are mapped for S-SSS, and #1, #4, #5, #7, #8, #9, #10, #12, and #13 symbols in a S-SSB are mapped for PSBCH and DMRS.

In another example (e.g., 3602 in FIG. 36A), #2 and #3 symbols in a S-SSB are mapped for S-PSS, and #12 and #13 symbols in a S-SSB are mapped for S-SSS, and #1, #4, #5, #6, #7, #8, #9, #10, and #11 symbols in a S-SSB are mapped for PSBCH and DMRS.

In yet another example (e.g., 3603 in FIG. 36A), #2 and #3 symbols in a S-SSB are mapped for S-PSS, and #8 and #9 symbols in a S-SSB are mapped for S-SSS, and #1, #4, #5, #6, #7, #10, #11, #12, and #13 symbols in a S-SSB are mapped for PSBCH and DMRS.

In yet another example (e.g., 3604 in FIG. 36A), #2 and #3 symbols in a S-SSB are mapped for S-PSS, and #7 and #10 symbols in a S-SSB are mapped for S-SSS, and #1, #4, #5, #6, #8, #9, #11, #12, and #13 symbols in a S-SSB are mapped for PSBCH and DMRS.

In yet another example (e.g., 3605 in FIG. 36A), #2 and #3 symbols in a S-SSB are mapped for S-PSS, and #7 and #8 symbols in a S-SSB are mapped for S-SSS, and #1, #4, #5, #6, #9, #10, #11, #12, and #13 symbols in a S-SSB are mapped for PSBCH and DMRS.

In yet another example (e.g., 3606 in FIG. 36A), #1 and #2 symbols in a S-SSB are mapped for S-PSS, and #12 and #13 symbols in a S-SSB are mapped for S-SSS, and #3, #4, #5, #6, #7, #8, #9, #10, and #11 symbols in a S-SSB are mapped for PSBCH and DMRS.

In yet another example (e.g., 3607 in FIG. 36A), #1 and #2 symbols in a S-SSB are mapped for S-PSS, and #6 and #10 symbols in a S-SSB are mapped for S-SSS, and #3, #4, #5, #7, #8, #9, #11, #12, and #13 symbols in a S-SSB are mapped for PSBCH and DMRS.

In yet another example (e.g., 3608 in FIG. 36A), #1 and #2 symbols in a S-SSB are mapped for S-PSS, and #8 and #9 symbols in a S-SSB are mapped for S-SSS, and #3, #4, #5, #6, #7, #10, #11, #12, and #13 symbols in a S-SSB are mapped for PSBCH and DMRS.

In yet another example (e.g., 3609 in FIG. 36A), #1 and #2 symbols in a S-SSB are mapped for S-PSS, and #7 and #8 symbols in a S-SSB are mapped for S-SSS, and #3, #4, #5, #6, #9, #10, #11, #12, and #13 symbols in a S-SSB are mapped for PSBCH and DMRS.

Figure 36B:
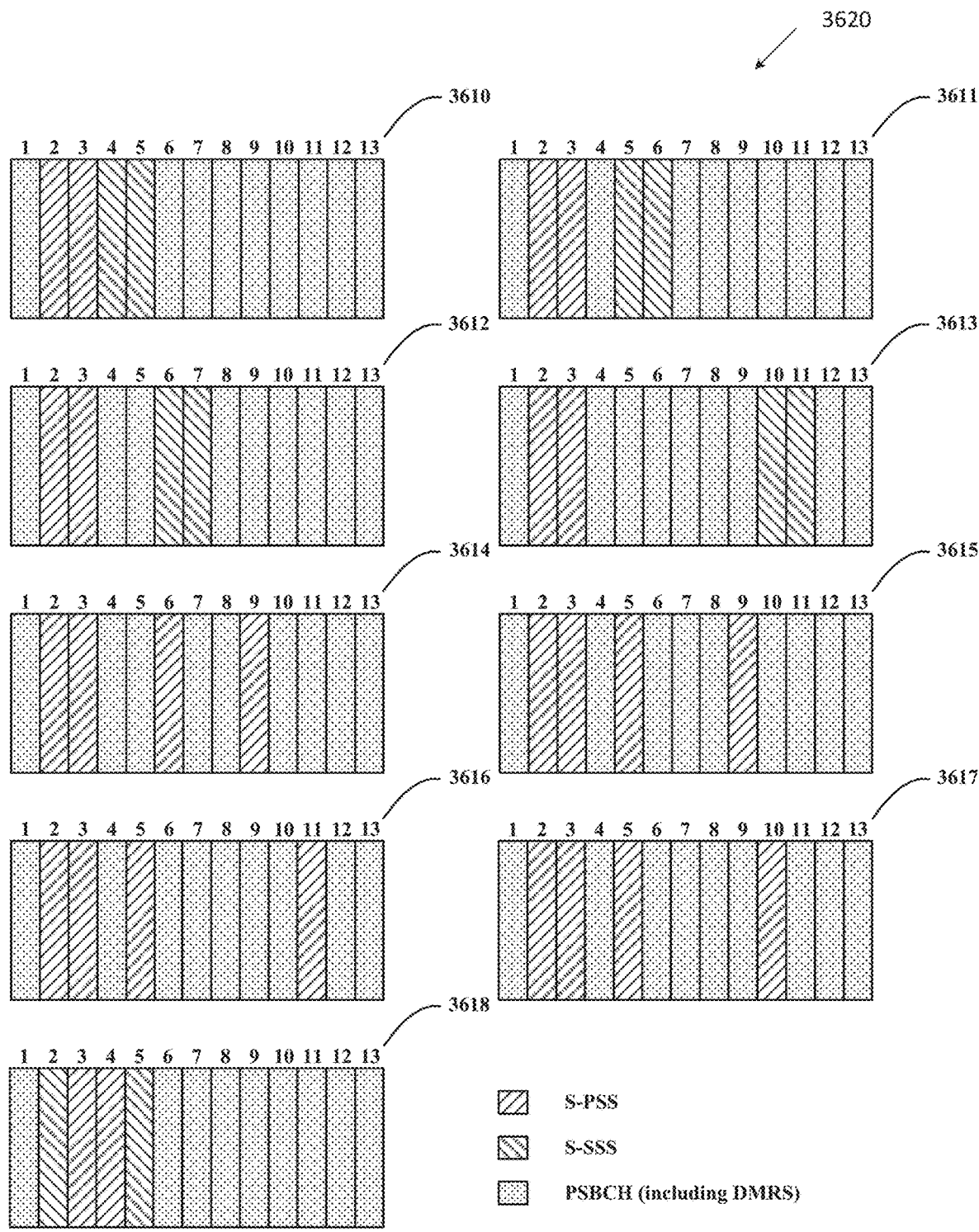
FIG. 36B illustrates yet another example S-SSB according to embodiments of the present disclosure.

FIG. 36B illustrates yet another example S-SSB 3620 according to embodiments of the present disclosure. The embodiment of the S-SSB 3620 illustrated in FIG. 36B is for illustration only. FIG. 36B does not limit the scope of this disclosure to any particular implementation.

In yet another example (e.g., 3610 in FIG. 36B), #2 and #3 symbols in a S-SSB are mapped for S-PSS, and #4 and #5 symbols in a S-SSB are mapped for S-SSS, and #1, #6, #7, #8, #9, #10, #11, #12, and #13 symbols in a S-SSB are mapped for PSBCH and DMRS.

In yet another example (e.g., 3611 in FIG. 36B), #2 and #3 symbols in a S-SSB are mapped for S-PSS, and #5 and #6 symbols in a S-SSB are mapped for S-SSS, and #1, #4, #7, #8, #9, #10, #11, #12, and #13 symbols in a S-SSB are mapped for PSBCH and DMRS.

In yet another example (e.g., 3612 in FIG. 36B), #2 and #3 symbols in a S-SSB are mapped for S-PSS, and #6 and #7 symbols in a S-SSB are mapped for S-SSS, and #1, #4, #5, #8, #9, #10, #11, #12, and #13 symbols in a S-SSB are mapped for PSBCH and DMRS.

In yet another example (e.g., 3613 in FIG. 36B), #2 and #3 symbols in a S-SSB are mapped for S-PSS, and #10 and #11 symbols in a S-SSB are mapped for S-SSS, and #1, #4, #5, #6, #7, #8, #9, #12, and #13 symbols in a S-SSB are mapped for PSBCH and DMRS.

In yet another example (e.g., 3614 in FIG. 36B), #2 and #3 symbols in a S-SSB are mapped for S-PSS, and #6 and #9 symbols in a S-SSB are mapped for S-SSS, and #1, #4, #5, #7, #8, #10, #11, #12, and #13 symbols in a S-SSB are mapped for PSBCH and DMRS.

In yet another example (e.g., 3615 in FIG. 36B), #2 and #3 symbols in a S-SSB are mapped for S-PSS, and #5 and #9 symbols in a S-SSB are mapped for S-SSS, and #1, #4, #6, #7, #8, #10, #11, #12, and #13 symbols in a S-SSB are mapped for PSBCH and DMRS.

In yet another example (e.g., 3616 in FIG. 36B), #2 and #3 symbols in a S-SSB are mapped for S-PSS, and #5 and #11 symbols in a S-SSB are mapped for S-SSS, and #1, #4, #6, #7, #8, #9, #10, #12, and #13 symbols in a S-SSB are mapped for PSBCH and DMRS.

In yet another example (e.g., 3617 in FIG. 36B), #2 and #3 symbols in a S-SSB are mapped for S-PSS, and #5 and #10 symbols in a S-SSB are mapped for S-SSS, and #1, #4, #6, #7, #8, #9, #11, #12, and #13 symbols in a S-SSB are mapped for PSBCH and DMRS.

In yet another example (e.g., 3618 in FIG. 36B), #2 and #3 symbols in a S-SSB are mapped for S-PSS, and #4 and #5 symbols in a S-SSB are mapped for S-SSS, and #1, #6, #7, #8, #9, #10, #11, #12, and #13 symbols in a S-SSB are mapped for PSBCH and DMRS.

In one embodiment, the mapping of S-SSB in a slot is fixed.

For one approach, the first symbol of S-SSB (e.g., symbol #1 in an S-SSB in the examples of the first embodiment of this disclosure) is aligned with the first OFDM symbol of a slot. For example, if the number of the total number of symbols for an S-SSB is smaller than or equal to the total number of OFDM symbols in a slot (e.g., 14 symbols for normal CP or 12 symbols for extended CP), the S-SSB starts from the first OFDM symbol in the slot, and the remaining symbol(s) (e.g., the last one or several symbols within the slot) could be utilized for other purpose (e.g., TX/RX switch gap and/or multiplexing with other signals/channels).

For another approach, the first symbol of S-SSB (e.g., symbol #1 in an S-SSB in the examples of the first embodiment of this disclosure) is aligned with the second OFDM symbol of a slot. For example, the S-SSB starts from the second OFDM symbol in the slot, and the first symbol in the slot is reserved (e.g., for AGC purpose), and the remaining symbol(s) (e.g., the last one or several symbols within the slot) could be utilized for other purpose (e.g., TX/RX switch gap and/or multiplexing with other signals/channels).

For yet another approach, the last symbol of S-SSB is aligned with the second last OFDM symbol of a slot. For example, the number of the total number of symbols for an S-SSB is smaller than or equal to the total number of OFDM symbols in a slot (e.g., 14 symbols for normal CP or 12 symbols for extended CP), the S-SSB ends at the second last symbol of a slot (e.g., 13th symbol of a slot for normal CP or 11th symbol of a slot for extended CP), and the last symbol in the slot is reserved (e.g., for TX/RX switch gap), and the remaining symbol(s) (e.g., the first one or several symbols within the slot), if any, could be utilized for other purpose (e.g., AGC and/or multiplexing with other signals/channels).

In another embodiment, the mapping of S-SSB in a slot is variable/configurable.

For one approach, if the number of the total number of symbols for an S-SSB is smaller than or equal to the total number of OFDM symbols in a slot (e.g., 14 symbols for normal CP or 12 symbols for extended CP), the S-SSB can start at any symbol in the slot (e.g., last symbol is reserved for TX/RX switch gap purpose) or a subset of the slot. For one aspect, one of the starting location within the slot where S-SSB starts is pre-configured to the V2X UE that tries to synchronize to the synchronization source. For another aspect, one of the starting location within the slot where S-SSB starts is indicated to the V2X UE that tries to synchronize to the synchronization source. One illustration of this approach is shown in FIG. 37.

Figure 37:
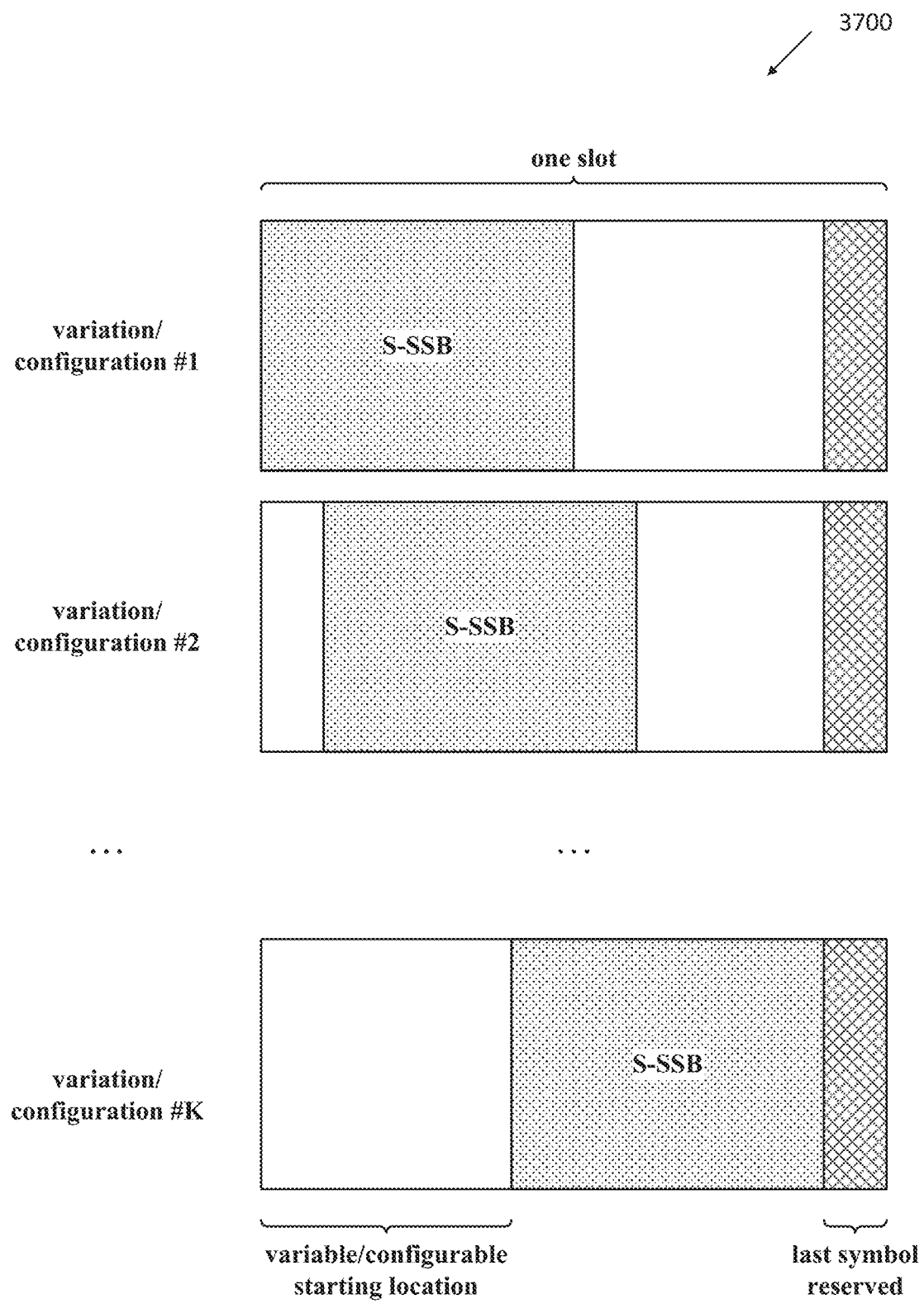
FIG. 37 illustrates an example S-SSB location within a slot according to embodiments of the present disclosure.

FIG. 37 illustrates an example S-SSB location within a slot 3700 according to embodiments of the present disclosure. The embodiment of the S-SSB location within a slot 3700 illustrated in FIG. 37 is for illustration only. FIG. 37 does not limit the scope of this disclosure to any particular implementation.

At least one of the following examples can be supported for the indication/pre-configuration of the variation/configuration of the mapping of S-SSB in a slot (e.g., by indicating the starting position of S-SSB within a slot).

In one example, the indication of the variation/configuration of the mapping of S-SSB is in the payload of PSBCH, e.g., a field in the payload of PSBCH indicates the starting location of S-SSB within the slot.

In another example, the variation/configuration of the mapping of S-SSB is pre-configured to the V2X UE that tries to synchronize to the synchronization source.

In yet another example, the indication of the variation/configuration of the mapping of S-SSB is carried by the DMRS sequence of PSBCH within the S-SSB.

In yet another example, the indication of the variation/configuration of the mapping of S-SSB is carried by the combination of DMRS sequence of PSBCH and the payload of PSBCH within the S-SSB.

In one embodiment, the S-SSB burst set can comprise at least one S-SSB and serves as the unit to be periodically transmitted in time domain.

In a first approach for the burst set composition, an S-SSB burst set can comprise a single S-SSB. For example, the S-SSB can be transmitted using a single-beam operation, such as for sub 6 GHz carrier frequency. In one consideration, the time domain location of the single S-SSB can be configurable, and the location is indicated in the signal/channel of the S-SSB, e.g., the content of PSBCH.

In a second approach for the burst set composition, an S-SSB burst set can comprise multiple S-SSBs, and the maximum number of S-SSBs in an S-SSB burst set can be determined based on the carrier frequency range and/or the SCS of S-SSBs. For example, the S-SSBs can be transmitted using a multiple-beam operation, or in a repetitive operation method, or the combination of multi-beam operation and repetitive operation.

In one example of the second approach, the multiple S-SSBs within an S-SSB burst set have the same composition method. For example, the S-SSB structure is the same within an S-SSB burst set, and the slots containing S-SSBs are repeated to construct the S-SSB burst set.

In another example of the second approach, the multiple S-SSBs within an S-SSB burst set have different composition methods. For example, the S-SSB structure could be different within an S-SSB burst set, and different examples in this disclosure are concatenated to construct the S-SSB burst set.

In a first approach for the actually transmitted S-SSBs within a burst set, the number of actually transmitted S-SSBs within a burst set is the same as the maximum number of S-SSBs within a burst set, such that if the maximum number of S-SSBs within a burst set is defined, every burst set has to contain the maximum number of S-SSBs for transmission.

In a second approach for the actually transmitted S-SSBs within a burst set, the number of actually transmitted S-SSBs within a burst set is smaller or equal to the maximum number of S-SSBs within a burst set, and information related to the number of actually transmitted S-SSBs within a burst set is indicated or known to the V2X UE. For one example on the information related to the number of actually transmitted S-SSBs within a burst set, it can be an explicit indication of the number of actually transmitted S-SSBs within a burst set. In one consideration of this example, the starting location and/or ending location of the S-SSBs within a burst set could be either fixed or indicated, wherein the number of S-SSBs within a burst set is as indicated.

For another example on the information related to the number of actually transmitted S-SSBs within a burst set, it can be an implicit indication from a bitmap indicating the actually transmitted S-SSBs within a burst set. In one example of the indication method, the indication can be in the PSBCH content. In another example of the indication method, the indication can be in the pre-configured information, e.g., associated with the pre-configured BWP.

In a third approach for the actually transmitted S-SSBs within a burst set, the number of actually transmitted S-SSBs within a burst set is fixed, regardless of the maximum number of S-SSBs within a burst set. In one consideration of this approach, the fixed number of actually transmitted S-SSBs could be different based on carrier frequency range and/or SCS of S-SSBs. For one example, the fixed number of the actually transmitted S-SSBs within a burst set is one.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claims scope. The scope of patented subject matter is defined only by the claims. Moreover, none of the claims are intended to invoke 35 U.S.C. § 112(f) unless the exact words "means for" are followed by a participle.

What is claimed is:

1. A first user equipment (UE) in a wireless communication system, the first UE comprising:
    at least one processor configured to:
        determine a sidelink synchronization identity (SL-SID), a numerology, and a set of resources, the numerology including a subcarrier spacing and a cyclic prefix (CP) length;
        generate at least one sidelink synchronization signal and physical broadcast channel block (S-SSB) based on the SL-SID and the set of resources, wherein each S-SSB of the at least one S-SSB includes first two symbols for a sidelink primary synchronization signal (S-PSS) and second two symbols for a sidelink secondary synchronization signal (S-SSS);
        generate a first sequence corresponding to the S-PSS, wherein the first sequence is determined based on a binary phase shift keying (BPSK) modulated M-sequence with a 127 of sequence length and a low-cross-correlation with a primary synchronization signal (PSS); and
        generate a second sequence corresponding to the S-SSS, wherein the second sequence is determined based on a BPSK modulated Gold-sequence with a 127 of sequence length; and
    a transceiver operably connected to the at least one processor, the transceiver configured to transmit, to a second UE, the at least one S-SSB over sidelink channels established with the second UE,
wherein the second sequence corresponding to the S-SSS is given by d_SSSS(n)=(1−2*x_0(n_0))*(1−2*x_1 (n_1)), n_0=(n+m_0) mod 127, n_1=(n+m_1) mod 127, m_0=15*⌊N_IDinG^SL/112⌋+5*N_GID^SL, m_1=N_IDinG^SL mod 112, 0≤n≤127 where: x_0 (n_0) is a first M-sequence given by x_0(i+7)=x_0(i+1)+x_0(i) for i=0, 1, . . . , 119, and x_0(6:0)=[0 0 0 0 0 0 1]; x_1(n_1) is a second M-sequence given by x_1(i+7)=x_1(i+1)+x_1(i) for i=0, 1, . . . , 119, and x_1(6:0)=[0 0 0 0 0 0 1]; N_IDinG^SL is a first part of the determined SL-SID; and N_GID^SL is a second part of the determined SL-SID.

2. The first UE of claim 1, wherein the first two symbols for the S-PSS comprise second and third symbols within the S-SSB, and wherein the generated first sequence corresponding to the S-PSS is repeatedly mapped to the first two symbols for the S-PSS.

3. The first UE of claim 1, wherein the second two symbols for the S-SSS comprise fourth and fifth symbols within the S-SSB, and wherein the generated second sequence corresponding to the S-SSS is repeatedly mapped to the second two symbols for the S-SSS.

4. The first UE of claim 1, wherein:
the at least one processor is further configured to determine a number of symbols for S-SSB based on the determined CP length,
the number of symbols for S-SSB is determined as 13 when the determined CP length is a normal CP length, and
the number of symbols for S-SSB is determined as 11 when the determined CP length is an extended CP length.

5. The first UE of claim 1, wherein the at least one processor is further configured to determine a first symbol within the S-SSB is a first orthogonal frequency division multiplexing (OFDM) symbol of a slot.

6. The first UE of claim 1, wherein the first sequence corresponding to the S-PSS is determined by a polynomial given by g(x)=x$^7$+x$^4$+1 where a M-sequence is generated with x(i+7)=x(i+4)+x(i) for i=0, 1, . . . , 119.

7. The first UE of claim 6, wherein the first sequence corresponding to the S-PSS is given by d_SPSS(n)=1−2*x (m), m=(n+43*N_GID^SL+22) mod 127, 0≤n<127, where x(i+7)=x(i+4)+x(i) for i=0, 1, . . . , 119, and x(6:0)=[1 1 0 1 1 0].

8. A second user equipment (UE) in a wireless communication system, the second UE comprising:
a transceiver configured to receive, from a first UE, at least one sidelink synchronization signal and physical broadcast channel block (S-SSB) over sidelink channels established with the first UE; and
at least one processor operably connected to the transceiver, the at least one processor configured to:
determine a set of resources, wherein the at least one S-SSB is received based on the set of resources, each S-SSB of the at least one S-SSB including first two symbols for a sidelink primary synchronization signal (S-PSS) and second two symbols for a sidelink secondary synchronization signal (S-SSS);
detect a first sequence corresponding to the S-PSS, the first sequence being determined based on a binary phase shift keying (BPSK) modulated M-sequence with a 127 of sequence length and a lowcross-correlation with a primary synchronization signal (PSS);
detect a second sequence corresponding to the S-SSS, the second sequence being determined based on a BPSK modulated Gold-sequence with a 127 of sequence length; and
determine a sidelink synchronization identity (SL-SID) based on the detected second sequence and determine a numerology including a subcarrier spacing and a cyclic prefix (CP) length,
wherein the second sequence corresponding to the S-SSS is given by d_SSSS(n)=(1−2*x_0(n_0))*(1−2*x_1 (n_1)), n_0=(n+m_0) mod 127, n_1=(n+m_1) mod 127, m_0=15*⌊N_IDinG^SL/112⌋+5*N_GID^SL, m_1=N_IDinG^SL mod 112, 0≤n<127 where: x_0 (n_0) is a first M-sequence given by x_0(i+7)=x_0(i+1)+x_0(i) for i=0, 1, . . . , 119, and x_0(6:0)=[0 0 0 0 0 0 1]; x_1(n_1) is a second M-sequence given by x_1(i+7)=x_1(i+1)+x_1(i) for i=0, 1, . . . , 119, and x_1(6:0)=[0 0 0 0 0 0 1]; N_IDinG^SL is a first part of the determined SL-SID; and N_GID^SL is a second part of the determined SL-SID.

9. The second UE of claim 8, wherein the first two symbols for the S-PSS comprise second and third symbols within the S-SSB, and wherein the determined first sequence corresponding to the S-PSS is repeatedly mapped to the first two symbols for the S-PSS.

10. The second UE of claim 8, wherein the second two symbols for the S-SSS comprise fourth and fifth symbols within the S-SSB, and wherein the determined second sequence corresponding to the S-SSS is repeatedly mapped to the second two symbols for the S-SSS.

11. The second UE of claim 8, wherein:
the at least one processor is further configured to determine a number of symbols for S-SSB based on the determined CP length,
the number of symbols for S-SSB is determined as 13 when the determined CP length is a normal CP length, and
the number of symbols for S-SSB is determined as 11 when the determined CP length is an extended CP length.

12. The second UE of claim 8, wherein the at least one processor is further configured to determine a first symbol within the S-SSB is a first orthogonal frequency division multiplexing (OFDM) symbol of a slot.

13. The second UE of claim 8, wherein the first sequence corresponding to the S-PSS is determined by a polynomial given by g(x)=x$^7$+x$^4$+1 where a M-sequence is generated with x(i+7)=x(i+4)+x(i) for i=0, 1, . . . , 119.

14. The second UE of claim 13, wherein the first sequence corresponding to the S-PSS is given by d_SPSS(n)=1−2*x (m), m=(n+43*N_GID^SL+22) mod 127, 0≤n<127, where x(i+7)=x(i+4)+x(i) for i=0, 1, . . . , 119, and x(6:0) [1 1 1 0 1 1 0].

15. A method of a first user equipment (UE) in a wireless communication system, the method comprising:
determining a sidelink synchronization identity (SL-SID), a numerology, and a set of resources, the numerology including a subcarrier spacing and a cyclic prefix (CP) length;
generating at least one sidelink synchronization signal and physical broadcast channel block (S-SSB) based on the SL-SID and the set of resources, wherein each S-SSB of the at least one S-SSB includes first two symbols for a sidelink primary synchronization signal (S-PSS) and second two symbols for a sidelink secondary synchronization signal (S-SSS);

generating a first sequence corresponding to the S-PSS, wherein the first sequence is determined based on a binary phase shift keying (BPSK) modulated M-sequence with a 127 of sequence length and a lowcross-correlation with a primary synchronization signal (PSS);

generating a second sequence corresponding to the S-SSS, wherein the second sequence is determined based on a BPSK modulated Gold-sequence with a 127 of sequence length; and transmitting, to a second UE, the at least one S-SSB over sidelink channels established with the second UE, wherein the second sequence corresponding to the S-SSS is given by $d\_SSSS(n)=(1-2*x\_0(n\_0))*(1-2*x\_1(n\_1))$, $n\_0=(n+m\_0)$ mod 127, $n\_1=(n+m\_1)$ mod 127, $m\_0=15*[N\_IDinG^SL/112]+5*N\_GID^SL$, $m\_1=N\_IDinG^SL$ mod 112, $0 \leq n < 127$ where: $x\_0(n\_0)$ is a first M-sequence given by $x\_0(i+7)=x\_0(i+1)+x\_0(i)$ for i=0, 1, . . . , 119, and $x\_0(6:0)=[0\ 0\ 0\ 0\ 0\ 0\ 1]$; $x\_1(n\_1)$ is a second M-sequence given by $x\_1(i+7)=x\_1(i+1)+x\_1(i)$ for i=0, 1, . . . , 119, and $x\_1(6:0)=[0\ 0\ 0\ 0\ 0\ 0\ 1]$; $N\_IDinG^SL$ is a first part of the determined SL-SID; and $N\_GID^SL$ is a second part of the determined SL-SID.

16. The method of claim 15, wherein:

the first two symbols for the S-PSS comprise second and third symbols within the S-SSB;

the generated first sequence corresponding to the S-PSS is repeatedly mapped to the first two symbols for the S-PSS;

the second two symbols for the S-SSS comprise fourth and fifth symbols within the S-SSB; and the generated second sequence corresponding to the S-SSS is repeatedly mapped to the second two symbols for the S-SSS.

17. The method of claim 15, further comprising;

determining a number of symbols for S-SSB based on the determined CP length, wherein the number of symbols for S-SSB is determined as 13 when the determined CP length is a normal CP length, and wherein the number of symbols for S-SSB is determined as 11 when the determined CP length is an extended CP length.

18. The method of claim 15, wherein the first sequence corresponding to the S-PSS is given by $d\_SPSS(n)=1-2*x(m)$, $m=(n+43*N\_GID^SL+22)$ mod 127, $0 \leq n < 127$, where $x(i+7)=x(i+4)+x(i)$ for i=0, 1, . . . , 119, and $x(6:0)=[1\ 1\ 1\ 0\ 1\ 1]$.

19. The method of claim 15, further comprising determining a first symbol within the S-SSB is a first orthogonal frequency division multiplexing (OFDM) symbol of a slot.

20. The method of claim 15, wherein the first sequence corresponding to the S-PSS is determined by a polynomial given by $g(x)=x^7+x^4+1$ where a M-sequence is generated with $x(i+7)=x(i+4)+x(i)$ for i=0, 1, . . . , 119.

* * * * *

UNITED STATES PATENT AND TRADEMARK OFFICE
CERTIFICATE OF CORRECTION

PATENT NO. : 10,834,708 B2
APPLICATION NO. : 16/503409
DATED : November 10, 2020
INVENTOR(S) : Hongbo Si and Li Guo Page 1 of 1

It is certified that error appears in the above-identified patent and that said Letters Patent is hereby corrected as shown below:

In the Claims

Claim 1, Column 75, Lines 8-9, delete "$x\_0(i+7) = x\_0(i+1)+x\_0(i)$" and insert --$x\_0(i+7) = x\_0(i+4)+x\_0(i)$--.

Claim 8, Column 76, Lines 14-15, delete "$x\_0(i+7) = x\_0(i+1)+x\_0(i)$" and insert --$x\_0(i+7) = x\_0(i+4)+x\_0(i)$--.

Claim 15, Column 77, Line 18-19, delete "$x\_0(i+7) = x\_0(i+1)+x\_0(i)$" and insert --$x\_0(i+7) = x\_0(i+4)+x\_0(i)$--.

Signed and Sealed this
Twenty-fourth Day of May, 2022

Katherine Kelly Vidal
*Director of the United States Patent and Trademark Office*